(12) United States Patent
Miyamoto et al.

(10) Patent No.: US 7,572,417 B2
(45) Date of Patent: Aug. 11, 2009

(54) REACTOR

(75) Inventors: Naotomo Miyamoto, Tokyo (JP); Kaoru Saito, Shiki (JP); Tadao Yamamoto, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 371 days.

(21) Appl. No.: 11/529,685

(22) Filed: Sep. 28, 2006

(65) Prior Publication Data

US 2007/0071653 A1  Mar. 29, 2007

(30) Foreign Application Priority Data

Sep. 29, 2005 (JP) ............................. 2005-284493
Sep. 29, 2005 (JP) ............................. 2005-284582
Sep. 29, 2005 (JP) ............................. 2005-284604
Sep. 29, 2005 (JP) ............................. 2005-284700

(51) Int. Cl.
*B01J 7/02* (2006.01)
*B01J 8/02* (2006.01)
*B01J 10/00* (2006.01)
*H01M 8/18* (2006.01)

(52) U.S. Cl. ...................... 422/236; 422/211; 422/222; 422/190; 422/193; 422/173; 48/61; 48/127.9; 429/19; 429/20

(58) Field of Classification Search ................. 422/102, 422/104, 211, 222, 224, 236, 190, 193, 173; 48/61, 127.9; 429/19, 20

See application file for complete search history.

(56) References Cited

U.S. PATENT DOCUMENTS 7,090,807 B1 * 8/2006 Brauchle et al. ............ 422/194
2002/0071797 A1  6/2002 Loffler et al.

(Continued)

FOREIGN PATENT DOCUMENTS

JP          60-040715 U       9/1986

(Continued)

OTHER PUBLICATIONS

Chinese Office Action (and English translation thereof) dated Apr. 4, 2008, issued in a counterpart Chinese Application.

(Continued)

*Primary Examiner*—Walter D Griffin
*Assistant Examiner*—Lessanework Seifu
(74) *Attorney, Agent, or Firm*—Frishauf, Holtz, Goodman & Chick, P.C.

(57) ABSTRACT

A reactor supplied with a reactant to cause reaction of the reactant includes a reaction device which has a hollow box type member having a top plate and a bottom plate opposed to each other and side plates connected to an edge of the top plate and an edge of the bottom plate. A partition member is housed in the box type member, the partition member coming into contact with at least internal faces of the side plates of the box type member and partitioning a space in the box type member into a plurality of reaction chambers to which the reactant is to be supplied. A penetrating region is provided in the partition member to connect the adjacent reaction chambers to each other, the penetrating region having the reactant passed therethrough.

39 Claims, 68 Drawing Sheets

U.S. PATENT DOCUMENTS

| | | | |
|---|---|---|---|
| 2002/0176813 A1* | 11/2002 | Erdman | 422/170 |
| 2004/0191591 A1* | 9/2004 | Yamamoto | 429/19 |
| 2005/0191534 A1* | 9/2005 | Kim et al. | 429/20 |
| 2006/0210846 A1* | 9/2006 | Isozaki et al. | 429/19 |

FOREIGN PATENT DOCUMENTS

| | | |
|---|---|---|
| JP | 10-245573 A | 9/1998 |
| JP | 2000-120996 A | 4/2000 |
| JP | 2001-009937 A | 1/2001 |
| JP | 2001-089105 A | 4/2001 |
| JP | 2002-249139 A | 9/2002 |
| JP | 2003-300703 A | 10/2003 |
| JP | 2004-303695 A | 10/2004 |
| WO | WO 99/29621 * | 6/1999 |

OTHER PUBLICATIONS

Japanese Office Action dated Jan. 27, 2009 (2 pages), and English translation thereof (3 pages) issued in counterpart Japanese Application No. 2005-284700.

Japanese Office Action dated Jan. 27, 2009 (2 pages), and English translation thereof (3 pages) issued in counterpart Japanese Application No. 2005-284582.

Japanese Office Action dated Jan. 27, 2009 (3 pages), and English translation thereof (4 pages) issued in counterpart Japanese Application No. 2005-284493.

* cited by examiner

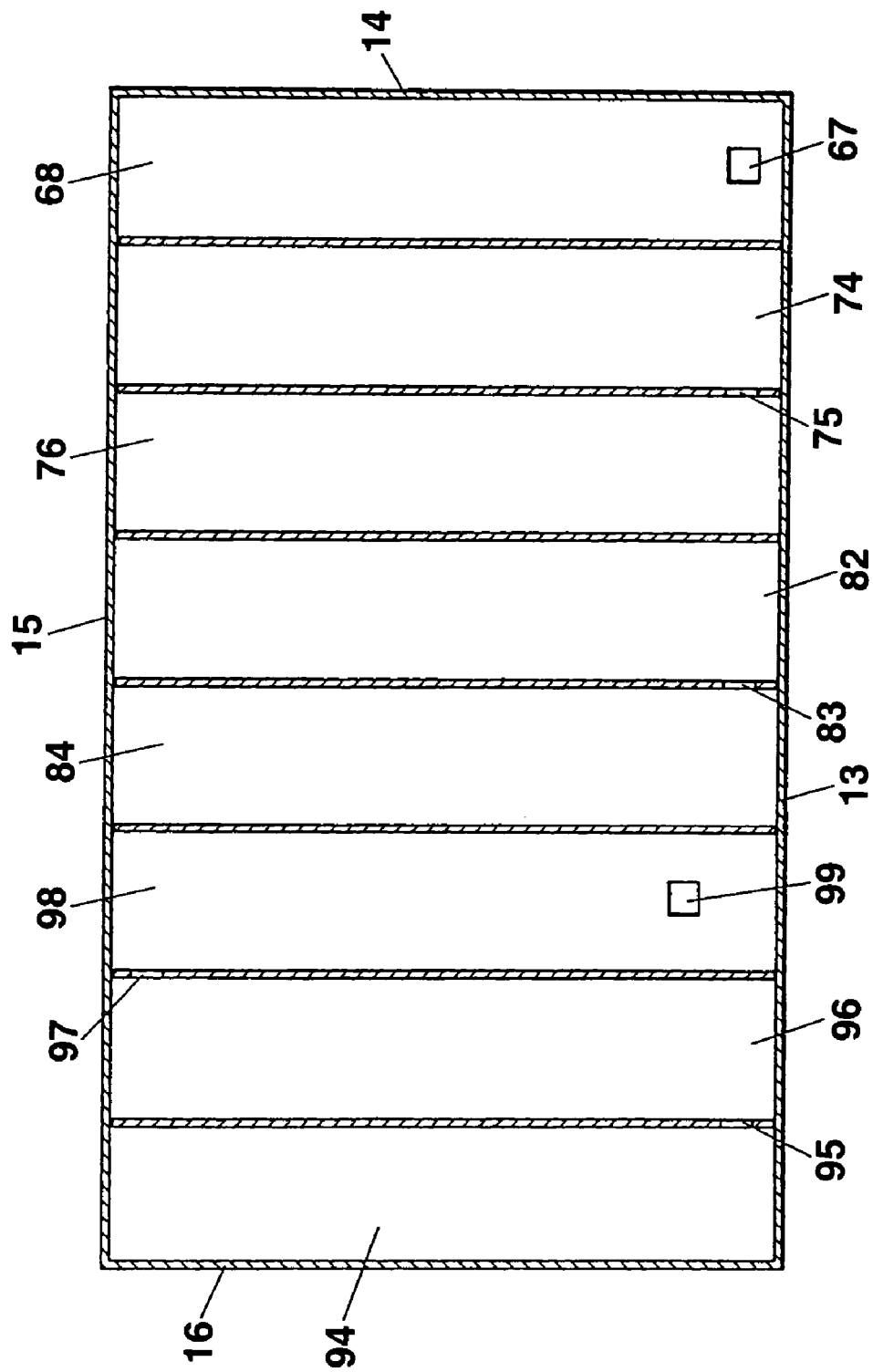

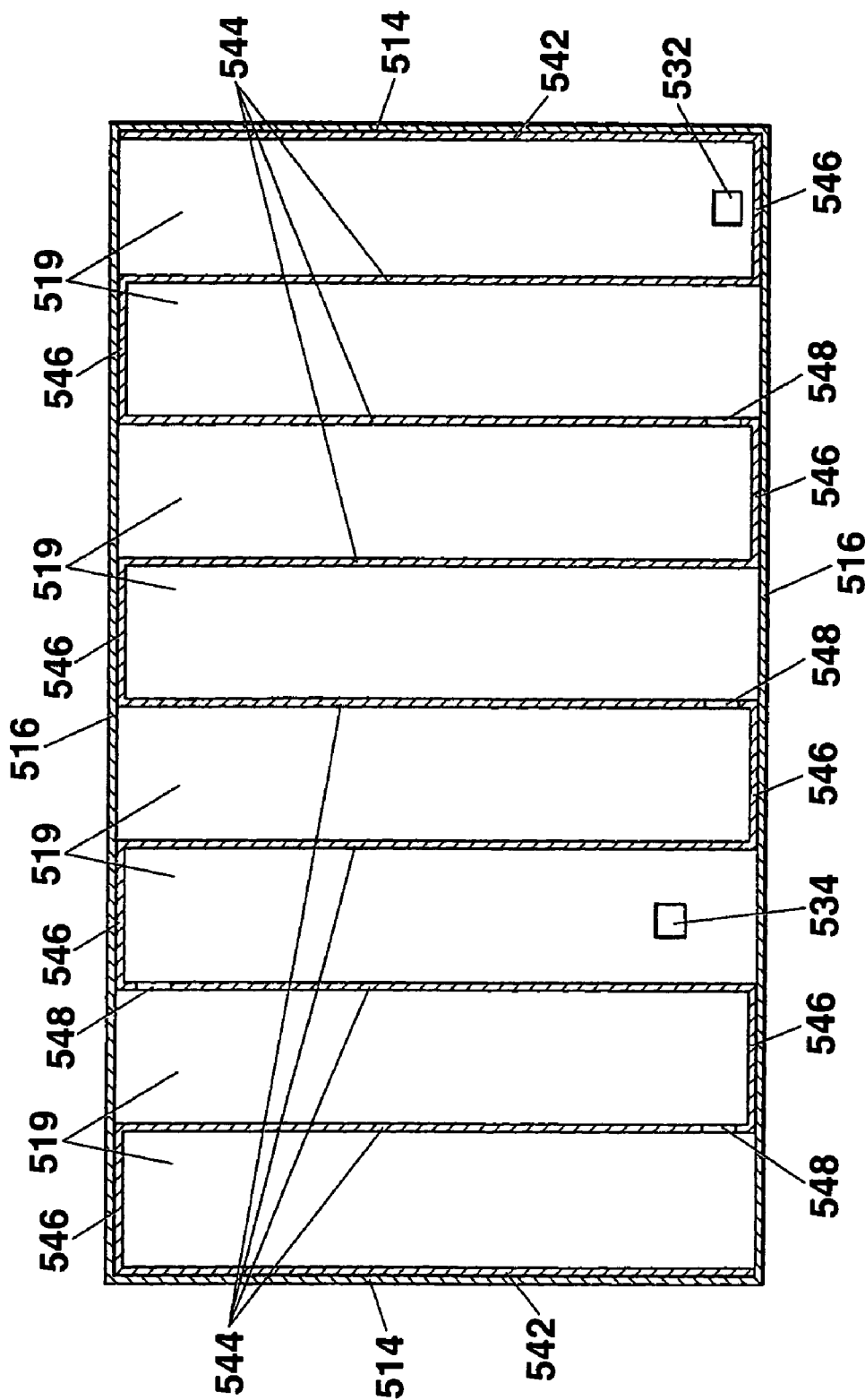

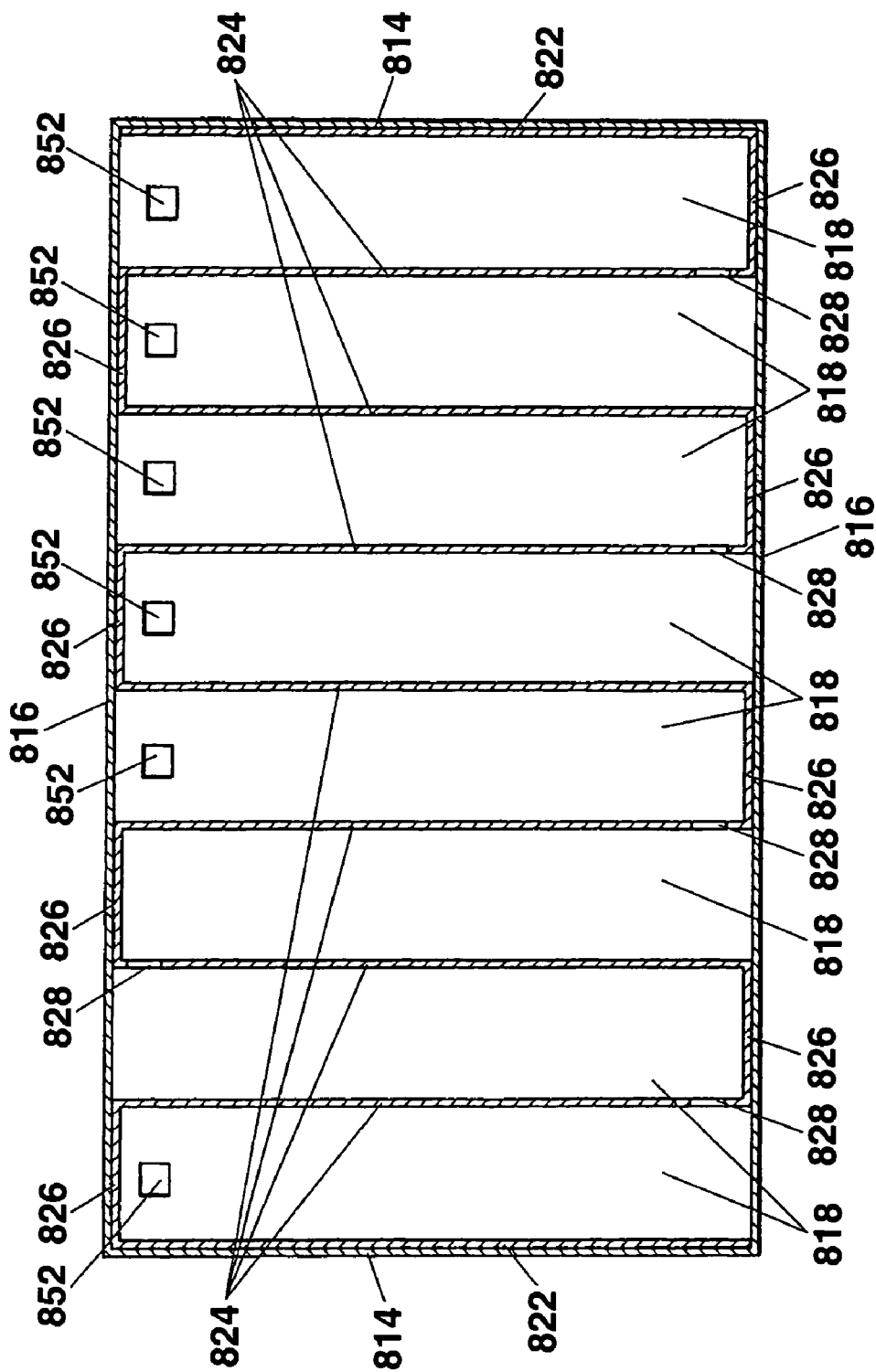

FIG.54
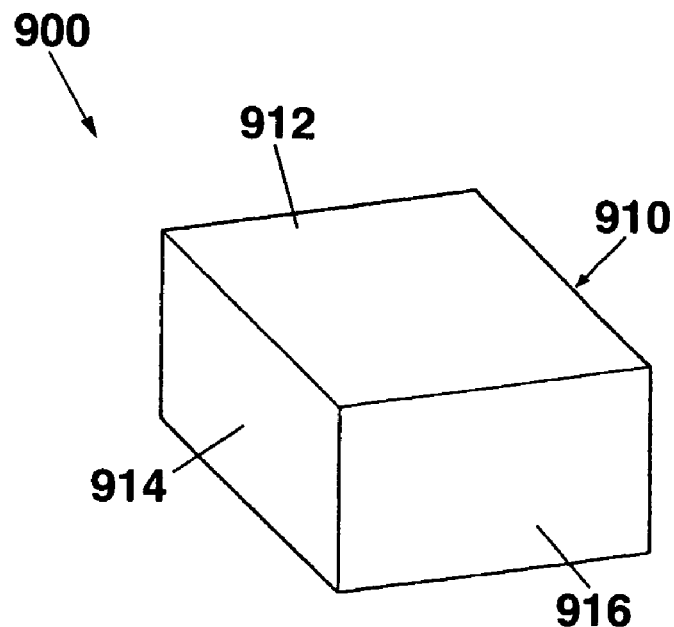
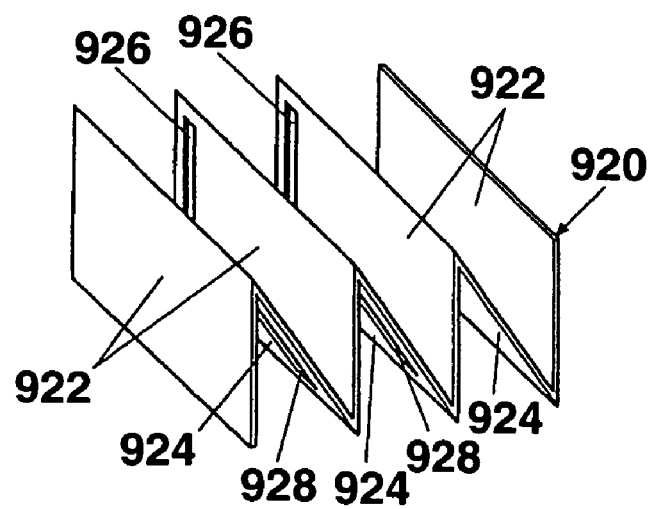
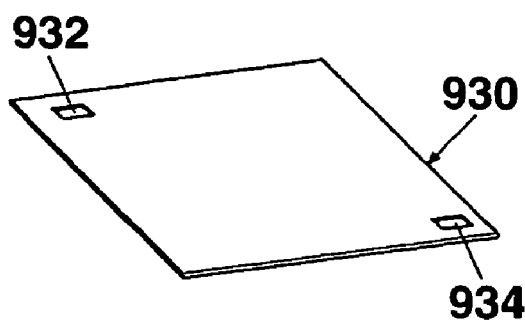

REACTOR

CROSS-REFERENCE TO RELATED APPLICATIONS

This application is based upon and claims the benefit of priority from prior Japanese Patent Applications No. 2005-284493, filed Sep. 29, 2005; No. 2005-284582, filed Sep. 29, 2005; No. 2005-284604, filed Sep. 29, 2005; and No. 2005-284700, filed Sep. 29, 2005, the entire contents of all of which are incorporated herein by reference.

BACKGROUND OF THE INVENTION

1. Field of the Invention

The present invention relates to a reactor to which a reactant is supplied, thereby causing reaction of the reactant.

2. Description of the Related Art

In recent years, a development has been underway to mount a fuel cell as a clean power supply with its high efficiency of energy conversion in automobiles or portable devices. The fuel cell is a device that causes a fuel and oxygen that is contained in an atmospheric air to react with each other in an electrochemical manner, thereby directly extracting electrical energy from chemical energy.

Although a hydrogen simplex can be exemplified as a fuel for use in a fuel cell, there is a problem in handling such a hydrogen simplex due to the fact that hydrogen is gaseous at a normal temperature and under a normal pressure. There has been an attempt to store hydrogen by a hydrogen storing alloy. Because a storage amount of hydrogen per unit volume is small, however, such an attempt has been insufficient as means for storing a fuel of a power supply of a small sized electronic device such as a portable electrical device in particular.

In contrast, there is provided, for example, a reformed fuel cell for reforming a hydrocarbon based liquid fuel to produce hydrogen, the cell having hydrogen atoms in a composition such as alcohol and gasoline. In such a reformed fuel cell, a fuel can be easily stored in a liquefied state.

Such a reformed fuel cell needs a reactor comprising a plurality of reaction devices including a vaporizer for vaporizing a liquid fuel and water; a reformer for removing hydrogen required for power generation by causing the vaporized liquid fuel and a high-temperature water vapor to react with each other; and a carbon monoxide removing unit for removing carbon monoxide that is a by-product of a reforming reaction.

In order to downsize the reformed fuel cell having such a configuration, and enable the battery to be mounted on a portable device or the like, a development has been underway with respect to, for example, a microreactor module having a vaporizer, a reformer, and a carbon oxide removing unit laminated with one another. In this case, metal substrates each having formed therein a groove or channel that serves as a flow channel for a fuel or the like are bonded so as to form the reactor.

In the meantime, in order to downsize a reacting unit while maintaining reaction efficiency in the reaction device, it is necessary to reduce sectional dimensions of the flow channel, thereby reducing a diffusion time of a reactant up to a catalyst provided on a surface of the flow channel and to increase a length of the flow channel, thereby increasing a reaction time. However, in order to reduce the sectional dimensions of the flow channel and to increase the length of the flow channel, it is necessary to form a fine flow channel that wobbles inside of the reaction device. In addition, it is necessary to provide a complicated flow channel structure in order to increase the length of the flow channel. That is, assembling becomes complicated.

In order to well carry out reaction in the reaction device, the reaction device is heated at a temperature suitable for such a reaction and is maintained at a predetermined temperature. In order to reduce a loss of thermal energy, a vacuum heat insulation structure is occasionally provided such that the periphery of the reaction device is established in a vacuum state. However, in the case where the thickness of metal substrates that configure the reaction device is reduced in order to reduce a weight of the reaction device, the rigidity of the reaction device is lowered. As a consequence, the reaction device is deformed or broken due to reaction caused by a pressure difference.

BRIEF SUMMARY OF THE INVENTION

The present invention is directed to a reactor comprising a reaction device to which a reactant is supplied to cause reaction of the reactant, and has an advantage capable of facilitating assembling of the reaction device in which a flow channel through which the reactant flows is formed inside of the reactor, the flow channel is wobbled, thereby increasing a length of the flow channel; and capable of improving the rigidity of the reaction device, thereby causing the reaction device to be hardly deformed by a stress.

In order to attain the above advantage, according to a first aspect of the present invention, there is provided a reactor supplied with a reactant to cause reaction of the reactant comprising:

a reaction device which comprises a hollow box type member having a top plate and a bottom plate opposed to each other and side plates connected to an edge of the top plate and an edge of the bottom plate;

a partition member housed in the box type member, the partition member coming into contact with at least internal faces of the side plates of the box type member and partitioning a space in the box type member into a plurality of reaction chambers to which the reactant is to be supplied; and a penetrating region provided in the partition member to connect the adjacent reaction chambers to each other, the penetrating region having the reactant passed therethrough.

The reactor may further comprise a heat insulation container that covers the entirety of the reaction device in which an internal space is lower in a gas pressure than an atmospheric pressure.

A first example of the partition member is constituted by: a first partition plate arranged in parallel to the bottom plate; and a plurality of second partition plates arranged in a vertical direction with respect to the first partition plate, the second partition plates being arranged in parallel to one another.

The partition member is configured such that a slit is formed on at least one of the first partition plate and the second partition plate, the first partition plate and the second partition plate are formed in combination at the slit portion, and the first partition plate and the second partition plate are preferably joined to each other by either of welding and brazing.

In addition, rim parts of the first partition plate and the second partition plate come into contact with at least internal faces of the side plates of the box type member, and preferably, are joined to each other by either of welding and brazing.

In this case, a first communicating port which forms a communication between the adjacent reaction chambers to each other via the first partition plate is formed at the first partition plate, and a second communicating port which forms a communication between the adjacent reaction chambers to each other via each of the second partition plates is formed at each of the second partition plates. The first communicating port and the second communicating port each form the penetrating region. Alternatively, a first cutout which forms a communication between the adjacent reaction chambers to each other via the first partition plates is formed at an end of the first partition plate, and a second cutout which forms a communication between the adjacent reaction chambers to each other via each of the second partition plates is formed at an end of each of the second partition plates. The first cutout and the second cutout each form the penetrating region.

A second example of the partition member is constituted by at least one third partition plate whose cross section is bent in a rectangular shape, the third partition plate having a plurality of return portions; a plurality of partition portions arranged between the return portions, the partition portions being opposed to each other; and reinforce portions arranged at both ends of the partition plate.

In this case, a wave height direction of the rectangular wave of the third partition plate is housed in the box type member so as to be parallel to the top plate of the box type member, and preferably, the reinforce portions of the third partition plate are joined to the internal faces of the side plates of the box type member by either of welding and brazing. The return portions of the third partition plate come into facial contact with the internal faces of the side plates of the box type member, and preferably, are joined thereto by either of welding and brazing. Further, a rim part of the third partition plate comes into contact with an internal face of at least one of the top plate and the bottom plate of the box type member, and preferably, is joined thereto by either of welding and brazing.

In this case, a first through-hole which forms a communication between the adjacent reaction chambers to each other via each of the partition portions is formed at one of one end and the other end taken along the wave height direction of the rectangular wave, of each of the partition portions of the third partition plate. The first through-hole forms the penetrating region.

A third example of the partition member is constituted by: a plurality of third partition plates laminated along the wave height direction of the rectangular wave, each of which has the same configuration as the third partition plate; and a first bulkhead plate arranged between the laminated third partition plates.

In this case, a rim part of the first bulkhead plate comes into contact with the internal faces of the side plates of the box type member, and preferably, is joined thereto by either of welding and brazing.

In this case, a second through-hole which forms a communication between the adjacent reaction chambers to each other via the second bulkhead plate is formed at the second bulkhead plate to form the penetrating region.

The third example of the partition member may further comprise a separate plate arranged in parallel to the wave height direction of the rectangular wave, of the third partition plate, the separate plate separating the third partition plate along the wave height direction.

In this case, the third partition plate and the separate plate are preferably joined to each other by either of welding and brazing. A rim part of the separate plate comes into contact with the internal faces of the side plates of the box type member, and preferably, is joined thereto by either of welding and brazing.

In addition, a first slot along the wave height direction of the rectangular wave is formed at each of the return portion and partition portion of the third partition plate, and the separate plate is inserted into the first slot. Alternatively, a second slot corresponding to each of the partition portions of the third partition plate is formed at the separate plate, and part of each partition portion is inserted into the second slot.

The first slot is formed, for example, at a central position of the third partition plate in a direction vertical to the wave height direction of the rectangular wave.

In this case, a third through-hole which forms a communication between the adjacent reaction chambers to each other via the separate plate is formed at the separate plate to form the penetrating region.

A fourth example of the partition member is constituted by a fourth partition plate having a plurality of bulkhead portions bent in a triangular wave shaped spiral shape in a cross sectional manner, the bulkhead portions being formed in a rectangular plate shape, and being coupled with one edge corresponding to a ridge part of the triangular wave.

In this case, the fourth partition plate is housed in the box type member such that the ridge part of the triangular wave comes into contact with the internal face of at least one of the top plate and the bottom plate of the box type member and at least any one of said plurality of bulkhead portions is bent.

In this case, a third through-hole which forms a communication between reaction chambers adjacent to each other via each of the bulkhead portions is formed at said each bulkhead portion of the fourth partition plate to form the penetrating region.

The fourth example of the partition member may comprise: a plurality of fourth partition plates laminated along the wave height direction of the triangular wave, each of which has the same configuration as that of the fourth partition plate, and a second bulkhead plate arranged between the fourth partition plates laminated.

In this case, a rim part of the second bulkhead plate comes into contact with the internal faces of the side plates of the box type member, and preferably, is joined thereto by either of welding and brazing.

In this case, a fourth through-hole which forms a communication between reaction chambers adjacent to each other via the second bulkhead plate is formed at the second bulkhead plate to form the penetrating region.

The reactor in the present invention may comprise: a first reaction unit set at a first temperature to cause reaction of a reactant; a second reaction unit set at a second temperature lower than the first temperature to cause reaction of a reactant; and a coupling unit for supplying a reactant and a product between the first reaction unit and the second reaction unit, wherein at least one of the first reaction unit and the second reaction unit is formed to be provided with the reaction device.

In this case, for example, the first reaction unit is where a first reactant is supplied as the reactant to produce a first reactant; and the second reaction unit is where the first product is supplied as the reactant to produce a second product. The first reactant is a mixture gas of vaporized water and a fuel containing hydrogen atoms in composition. The first reaction unit is a reformer that causes a reforming reaction of the first reactant, and hydrogen and carbon monoxide are contained in the first product. The second reaction unit is a carbon monoxide removing unit which removes the carbon monoxide contained in the first product by means of selective oxidization.

In this case, the reactor may comprises a heat insulation container which covers the entirety of the first reaction unit, the second reaction unit, and the coupling unit, in which an internal space is lower in a gas pressure than an atmospheric pressure.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

FIG. 3 is a cross sectional view taken along the section line III-III of FIG. 2;

FIG. 28 is a cross sectional view taken along the section line IX-IX of FIG. 27B;

FIG. 42 is a cross sectional view taken along the section line IV-IV of FIG. 41B;

FIG. 54 is an exploded perspective view of a reaction device in an eighth embodiment of the reactor according to the present invention as viewed from a slant power portion;

DETAILED DESCRIPTION OF THE INVENTION

Now, a reactor according to the present embodiment will be described in detail with reference to embodiments shown in the accompanying drawings. Although a variety of limitations that are technically preferable to carry out the present invention are applied to the embodiments described below, this does not imply that the scope of the invention is limit to the embodiments and illustrative examples shown below.

FIRST EMBODIMENT

Now, a first embodiment of the reactor according to the invention will be described here.

Figure 1:
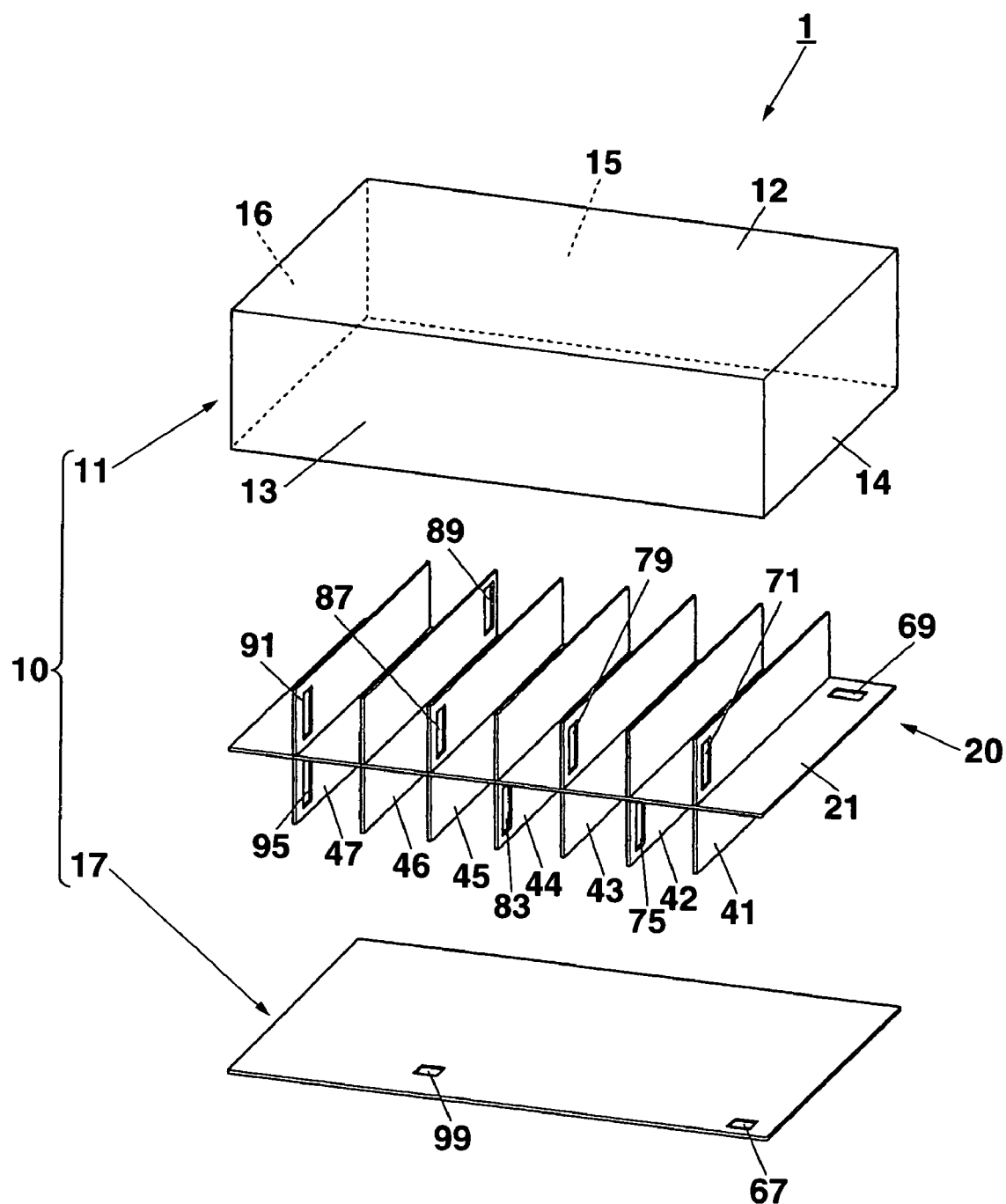
FIG. 1 is an exploded perspective view of a reaction device in a first embodiment of a reactor according to the present invention as viewed from a slant lower portion.
Figure 2A:
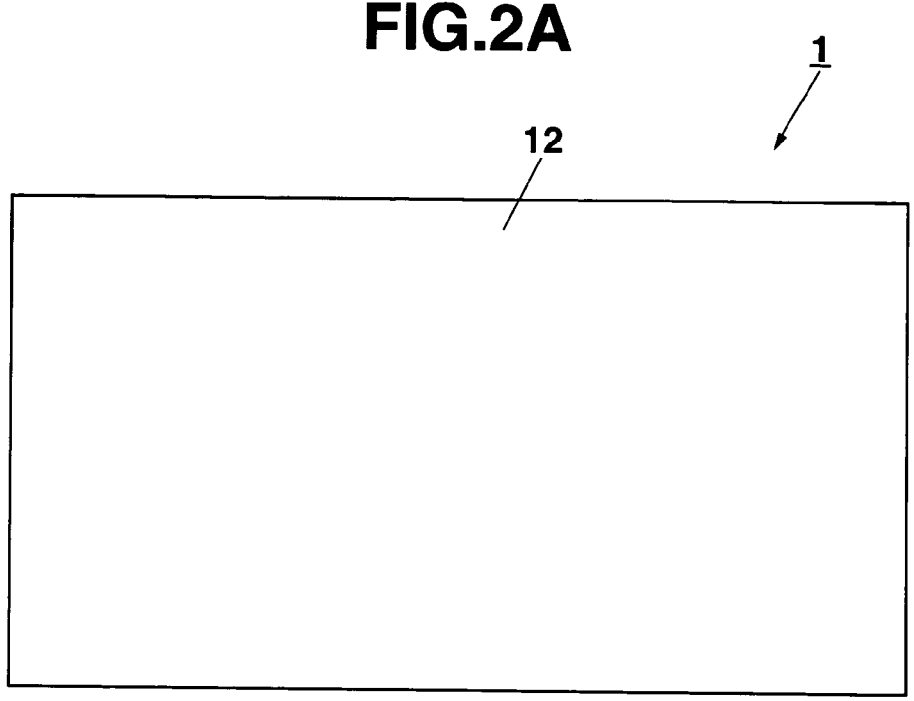
FIGS. 2A and 2B are a top view and a side view of the reaction device in the first embodiment.
Figure 2B:
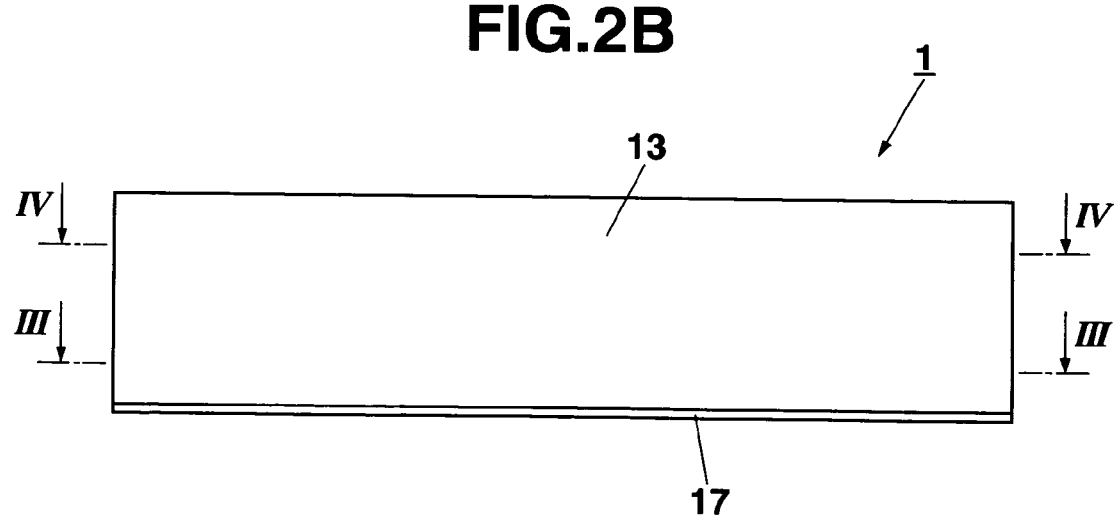
Figure 4:
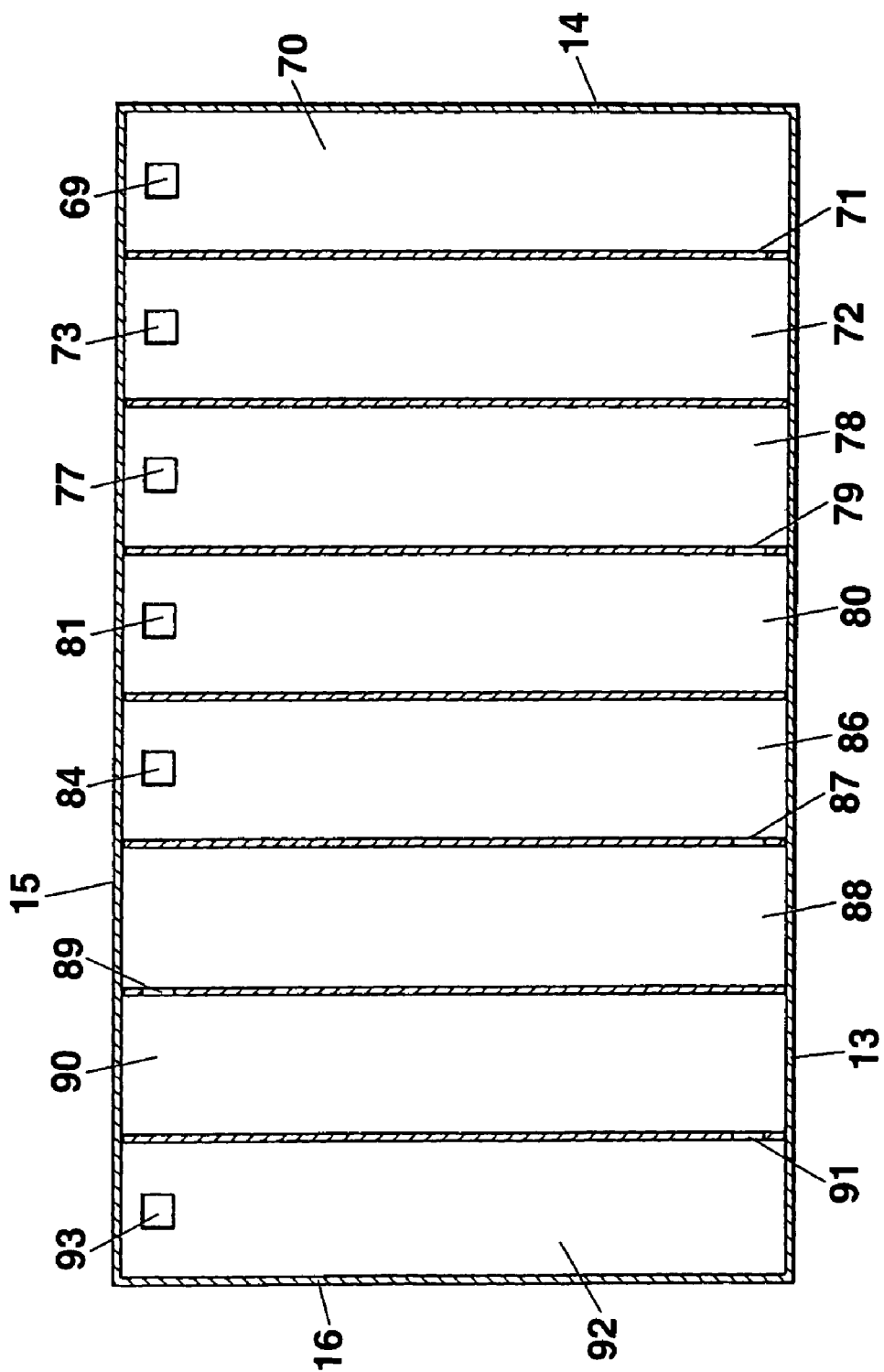
FIG. 4 is a cross sectional view taken along the section line IV-IV of FIG. 2.

FIG. 1 is an exploded perspective view of a reaction device in the first embodiment of the reactor according to the invention as viewed from a slant upper portion. FIGS. 2A and 2B are a top view and a side view of the reaction device in the present embodiment. FIG. 3 is a cross sectional view taken along the section line III-III of FIG. 2B. FIG. 4 is a cross sectional view taken along the section line IV-IV of FIG. 2B.

The reaction device or reactor 1, as shown in FIG. 1, has a reaction vessel 10 and a partition member 20 housed in the reaction vessel 10. The reaction vessel 10 is composed of a box type member 11 and a bottom plate 17. The box type member 11 has: a rectangular top plate 12; a pair of side plates 13 and 15 connected in a state that they communicate with two opposite edges of four edges of the top plate 12 at right angle to the top plate 12; and a pair of side plates 14 and 16 connected in a state that they communicate with the other two opposite edges of the top plate 12 at right angle to the top plate 12. The side plates 13 and 15 are connected to each other in a state that they vertically communicate with each other with respect to the side plates 14 and 16, and are provided in a square frame shape or a rectangular frame shape by these four side plates 13 to 16.

The bottom plate 17 is formed such that a rim part of the bottom plate 17 is joined to a lower edge part of each of the side plates 13 to 16 so as to be parallel to the top plate 12. A bottom face opening of the box type member 11 is thus closed by the bottom plate 17 to configure the reaction vessel 10 formed in a parallel tetrahedron shape having a hollow.

An intake port 67 of a reactant into the reaction vessel 10 and a discharge port 99 of a product outside the reaction vessel 10 are provided at an end of the bottom plate 17 at the side of the side plate 13. The intake port 67 is provided between the side plate 14 and a wall plate 41 described later, and the discharge port 99 is provided between wall plates 45 and 46 described later.

Figure 5:
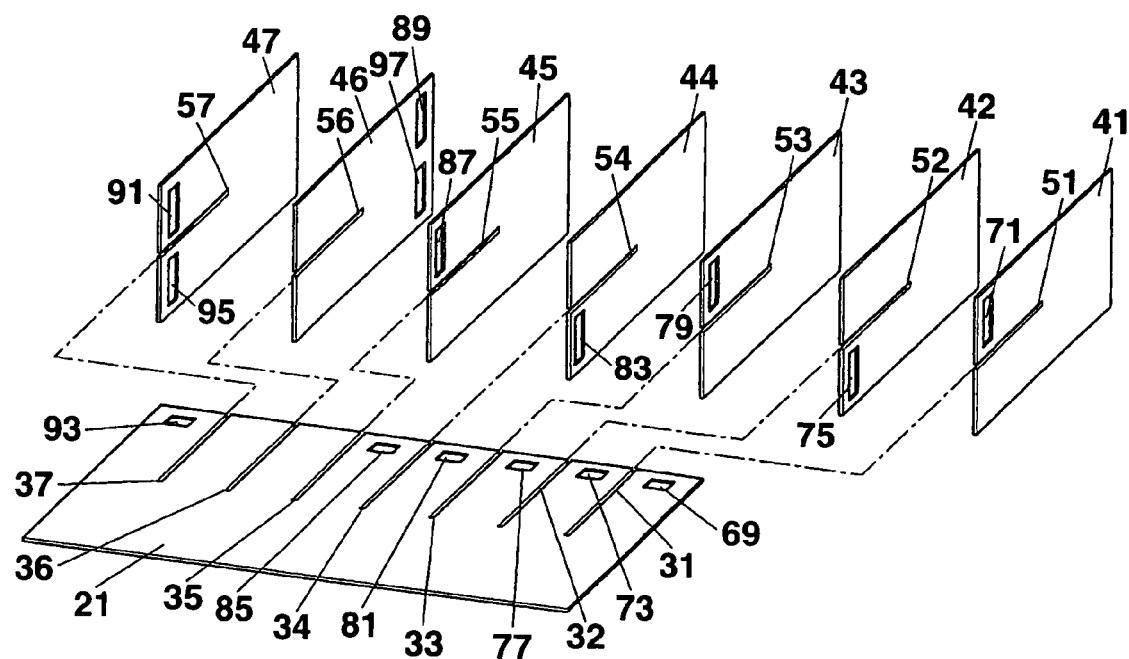
FIG. 5 is an exploded perspective view of a partition member for use in the reaction device in the first embodiment.

FIG. 5 is an exploded perspective view of a partition member 20 for use in the reaction device in the present embodiment. The partition member 20, as shown in FIG. 5, is composed of a floor plate 21 (first partition plate) and seven wall plates 41 to 47 (second partition plates).

The floor plate 21 is arranged in parallel to the top plate 12 and the bottom plate 17 in a state that the floor plate is housed in the reaction vessel 10 to divide the inside of the reaction vessel 10 into upper and lower two stages or chambers. On the floor plate 21, as shown in FIG. 5, seven slots 31 to 37 from the side of side plate 15 are equally arranged in parallel to the wall plates 41 to 47. The width of each of these slots 31 to 37 is equal to the thickness of each of the wall plates 41 to 47.

An end portion of the floor plate 21 at the side of the side plate 15 is divided into eight sections by the seven slots 31 to 37. Among these eight end portions, at the first to fifth and eight portions as viewed from the side of the side plate 14, communicating ports (first communicating ports) 69, 73, 77, 81, 85, and 93 penetrating the floor plate 21 are formed.

The wall plates 41 to 47 are arranged in parallel to the side plates 14 and 16, and divide the inside of the reaction vessel 10 in eight columns or chambers. Slots 51 to 57 from the side of the side plate 13 are arranged in parallel to the floor plate 21 at the central position in the height direction on the wall plates 41 to 47, respectively. The height of each of the slots 51 to 57 is equal to the thickness of the floor plate 21. An end portion of each of the wall plates 41 to 47 at the side of the side plate 13 is vertically divided into two sections by the slots 51 to 57.

The slots 31 to 37 and the corresponding slots 51 to 57 are formed such that a sum of these lengths is equal to or greater than the length in the slotting direction of the wall plates 41 to 47.

The wall plates 41, 43, and 45 that are the first, third, and fifth plates as viewed from the side of the side plate 14 are respectively provided with communicating ports (second communicating ports) 71, 79, and 87 at the upper end side of the side of the side plate 13, the communicating ports 71, 79, and 87 penetrating the wall plates 41, 43, and 45, respectively. The wall plates 41 and 44 that are the second and fourth plates as viewed from the side of the side plate 14 are respectively provided with communicating ports (second communicating ports) 75 and 83 at the lower end side of the side of the side plate 13, the communicating ports 75 and 83 penetrating the wall plates 42 and 44, respectively.

The sixth wall plate 46 as viewed from the side of the side plate 14 is provided with upper and lower two communicating ports (second communicating ports) 89 and 97 at the end side of the side of the side plate 15, the communicating ports 89 and 97 penetrating the wall plate 46. The seventh wall plate 47 as viewed from the side of the side plate 14 is provided with communicating ports (second communicating ports) 91 and 95 at both of the upper and lower end sides of the side of the side plate 13, respectively, the communicating ports 91 and 95 penetrating the wall plate 47.

The floor plate 21 and the wall plates 41 to 47 are vertically assembled to each other by combining the floor plate 21 so as to be sandwiched between portions of the slots 31 to 37 and the wall plates 41 to 47 so as to be sandwiched respectively between portions of the slots 51 to 57, making it possible to form the partition member 20. This assembled portion may be welded or brazed. By means of welding or brazing, the floor plate 21 and the wall plates 41, 42, 43, 44, 45, 46, and 47 can be securely fixed. In addition, the peripheral portions of the floor plate 21 and the wall plates 41 to 47 come into contact with the internal faces of the top plate 12, the bottom plate 17, and the side plates 13 to 16 in the reaction device 1, and preferably, are joined thereto by means of welding.

As shown in FIGS. 3 and 4, the inside of the reaction vessel 10 is divided into 16 reaction chambers 68, 70, 72, 74, 76, 78, 80, 82, 84, 86, 88, 90, 92, 94, 96, and 98 by the partition member 20.

That is, the inside of the reaction vessel 10 is divided into an upper stage (between the floor plate 21 and the top plate) and a lower stage (between the bottom plate 17 and the floor plate 21) by the floor plate 21. The upper stage is divided into eight reaction chambers 70, 72, 78, 80, 86, 88, 90, and 92 by the wall plates 41 to 47, as shown in FIG. 4. The lower stage is divided into eight reaction chambers 68, 74, 76, 82, 84, 98, 96, and 94 by the wall plates 41 to 47, as shown in FIG. 3.

Figure 6:
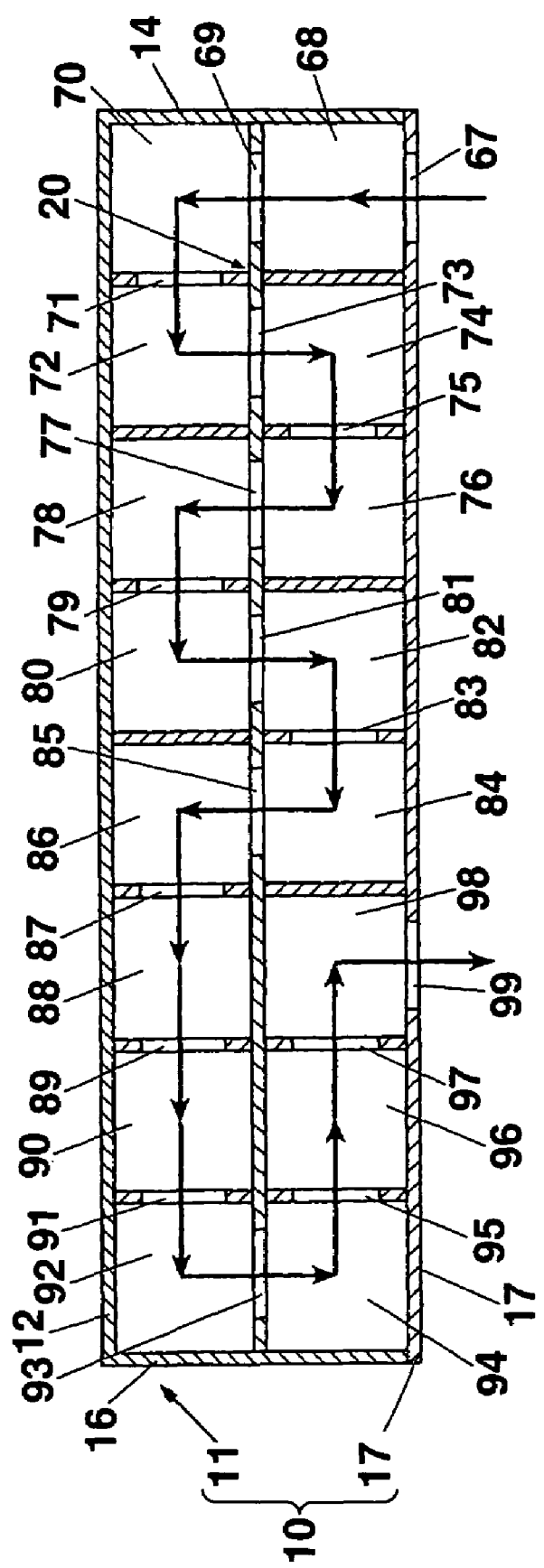
FIG. 6 is a schematic sectional view showing a relationship among each reaction chamber, an intake port, a discharge port, and each communicating port by cutting the reaction device in the first embodiment on a plane vertical to a partition member.

FIG. 6 is a schematic sectional view showing a relationship among each reaction chamber, an intake port, a discharge port, and each communicating port when the reaction device in the present embodiment is cut on a plane vertical to the partition member. The reaction chamber 68 communicates with the outside of the reaction chamber 10 by the intake port 67 and communicates with the reaction chamber 70 by the communicating port 69. The reaction chamber 98 communicates with the reaction chamber 96 by the communicating port 97 and communicates with the outside of the reaction vessel 10 by the discharge port 99. The other reaction chambers 70, 72, 74, 76, 78, 80, 82, 84, 86, 88, 90, 92, 94, and 96 communicate with the adjacent two reaction chambers by any two of the communicating ports 71, 73, 75, 77, 79, 81, 83, 85, 87, 89, 91, 93, and 95.

Now, a flow channel of a reactant in the reaction vessel 10 will be described.

As indicated by the arrow in FIG. 6, a reactant first inflows from the intake port 67 to the reaction chamber 68 in the reaction vessel 10, and then is passed through the communicating port 69, reaction chamber 70, communicating port 71, reaction chamber 72, communicating port 73, reaction chamber 74, communicating port 75, reaction chamber 76, communicating port 77, reaction chamber 78, communicating port 79, reaction chamber 80, communicating port 81, reaction chamber 82, communicating port 83, reaction chamber 84, communicating port 85, reaction chamber 86, communicating port 87, reaction chamber 88, communicating port 89, reaction chamber 90, communicating port 91, reaction chamber 92, communicating port 93, reaction chamber 94, communicating port 95, reaction chamber 96, communicating port 97, and reaction chamber 98 in this order, so that the reactant outflows from the discharge port 99 to the outside of the reaction vessel 10.

According to usage of the reaction device 1, a heater (such as a heating wire or combustor, for example) may be provided at least one of the top plate 12 and the bottom plate 17, or a catalyst for changing a reactant to a product may be carried onto the internal wall face of the reaction vessel 10 or the surface of a partition member 20. Herein, change from a reactant to a product includes a state change as well as a chemical change.

For example, in the case where the reaction device 1 is used as a vaporizer, a heating wire or a combustor is provided on the external face of at least one of the top plate 12 and the bottom plate 17. By doing this, a liquid serving as a reactant is heated while it flows from the intake port 67 to the discharge port 97, and a liquid is vaporized. In this manner, a gas serving as a product outflows from the discharge port 99.

In the case where the reacting device 1 is used as a reformer, a heating wire or a combustor is provided on the external face of at least one of the box type member 11 and the bottom plate 17, and a reforming catalyst (such as a Cu/ZnO-based catalyst or a Pd/ZnO-based catalyst, for example) is carried onto the internal wall face of the reaction vessel 10 or onto the surface of the partition member 20. By dong this, a gas mixture of a fuel and water serving as a reactant (gas mixture of methanol and water, for example) is heated while it flows from the intake part 67 to the discharge port 99, so that a hydrogen gas or the like is produced from the gas mixture by means of the reforming catalyst. In this manner, the gas mixture including the hydrogen gas or the like outflows from the discharge port 99 as a product.

In the case where the reaction device 1 is used as a carbon monoxide removing unit, a heating wire or a combustor is provided on the external face of at least one of the box type member 11 and the bottom plate 17, and then, a carbon monoxide selective oxidizing catalyst (such as platinum) is carried onto the internal wall face of the reaction vessel 10 or the surface of the partition member 20. By doing this, a hydrogen gas is heated while a gas mixture of a hydrogen gas, an oxygen gas and a carbon monoxide gas serving as a reactant flows from the intake port 67 to the discharge port 99, so that the carbon monoxide gas is selectively oxidized by means of the carbon monoxide selective oxidizing catalyst. In this manner, a gas with the carbon monoxide gas removed therefrom outflows from the discharge port 99 as a product.

In the case where the reaction device 1 is used as a combustor, a combustion catalyst (such as platinum) is carried onto the internal wall face of the reaction vessel 10 or the surface of the partition member 20. By doing this, a hydrogen gas is combusted while a gas mixture of a hydrogen gas and an oxygen gas serving as a reactant flows from the intake port 67 to the discharge port 99. In this manner, water outflows from the discharge port 99 as a product.

According to the above-described embodiment, the inside of the reaction vessel 10 is partitioned into the 16 reaction chambers 68, 70, 72, 74, 76, 78, 80, 82, 84, 86, 88, 90, 92, 94, 96, and 98, these reaction chambers communicate with any two reaction chambers that are adjacent to each other by the communicating ports 69, 71, 73, 75, 77, 79, 81, 83, 85, 87, 89, 91, 93, 95, and 97 provided at the partition member 20, and from the intake port 67 to the discharge port 99 provided in the reaction vessel 10 communicate with each other as one flow channel. As a consequence, sectional dimensions of the flow channel can be reduced and a diffusion time of a reactant up to the catalyst provided on the surface of the flow channel can be reduced. Further, a reaction time can be increased while the length of the flow channel is increased.

The floor plate 21 and the wall plates 41 to 47 are vertically assembled to each other by combining the floor plate 21 so as to be sandwiched between portions of the slots 31 to 37 and by combining the wall plates 41 to 47 respectively so as to be sandwiched between portions of the slots 51 to 57, thereby making it possible to form the partition member 20 and thus, easily assemble the partition member.

Now, a description will be given with respect to a heat insulation structure for restricting a thermal loss of the reaction vessel 10.

Figure 7:
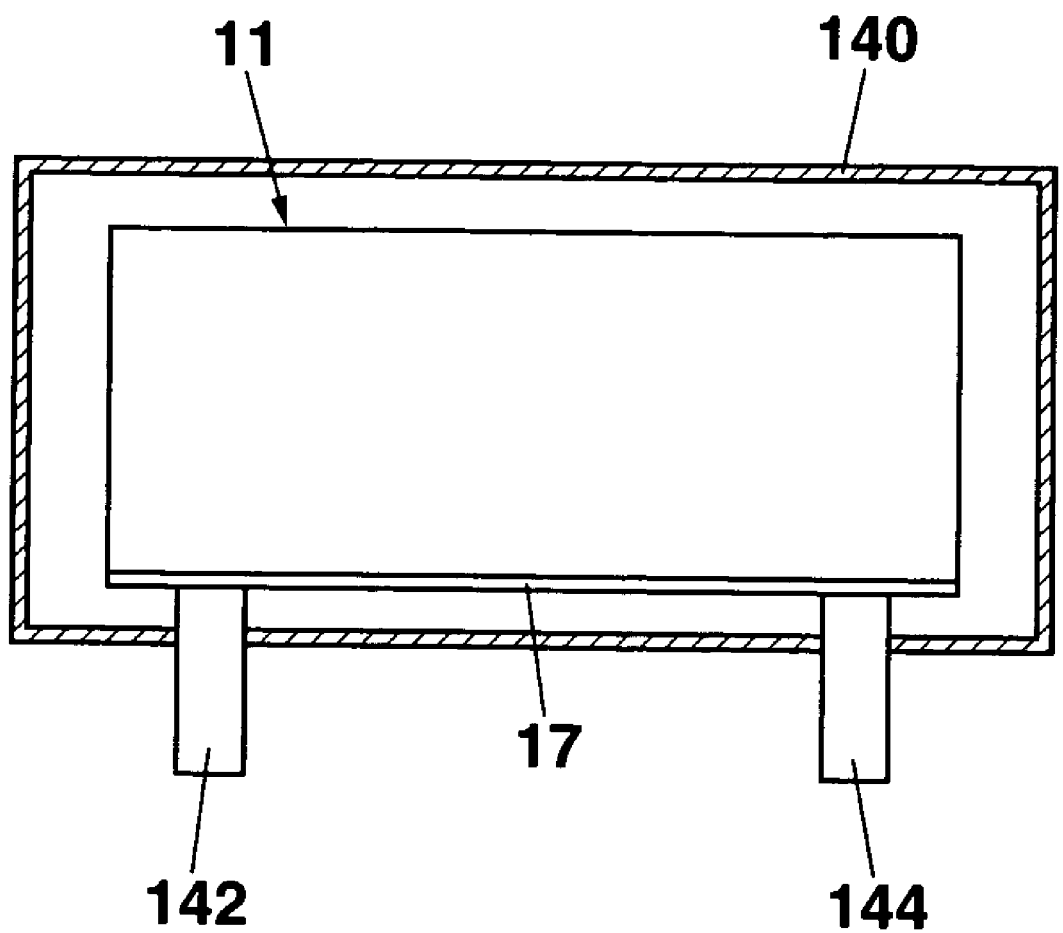
FIG. 7 is a perspective side view of a state in which a heat insulation package is arranged in the reaction device in the first embodiment.

FIG. 7 is a perspective side view of a state in which a heat insulation package 140 is provided in the reaction device in the embodiment. The heat insulation package (heat insulation vessel) 140 is made of, for example, a metal material such as a stainless steel, or ceramics. The package 140 houses the box type member 11 and the bottom plate 17 therein. In this case, two pipes 142 and 144 are made to pass through a wall face of the heat insulation package 140, and an end of one pipe 142 is connected to the intake port 67 in the heat insulation package 140 while an end of the other pipe 144 is connected to the discharge port 99. Here, assume that the box type member 11 and the bottom plate 17 are supported by the two pipes 142 and 144, and the box type member 11 and the bottom plate 17 are spaced from an internal face of the heat insulation package 140. In this case, direct heat conduction from the box type member 11 and the bottom plate 17 to the heat insulation package 140 can be restricted to improve heat insulation property more remarkably. Further, the inside of the heat insulation package 14 is vacuum-evacuated, and then, the internal space is set at a vacuum pressure that is lower than an atmospheric pressure, whereby a vacuum heat insulation structure is formed, making it possible to reduce a thermal energy loss.

Here, when the internal space of the heat insulation package 140 is set at a vacuum pressure, the inside of the reaction vessel of the reaction device 1 is set at a normal pressure, thus subjecting the box type member 11 and the bottom plate 17 to a stress in an expanding direction. However, if the peripheral portion of the floor plate 21 and the wall plates 41 to 47 of the partition member 20 is joined to the internal face sides of the top plate 12, the bottom plate 17, and the side plates 13 to 16 of the reaction vessel 10, the entirety of the reaction vessel 10 is reinforced, and is prevented from being destroyed or deformed due to such a stress.

MODIFIED EXAMPLE

Figure 8:
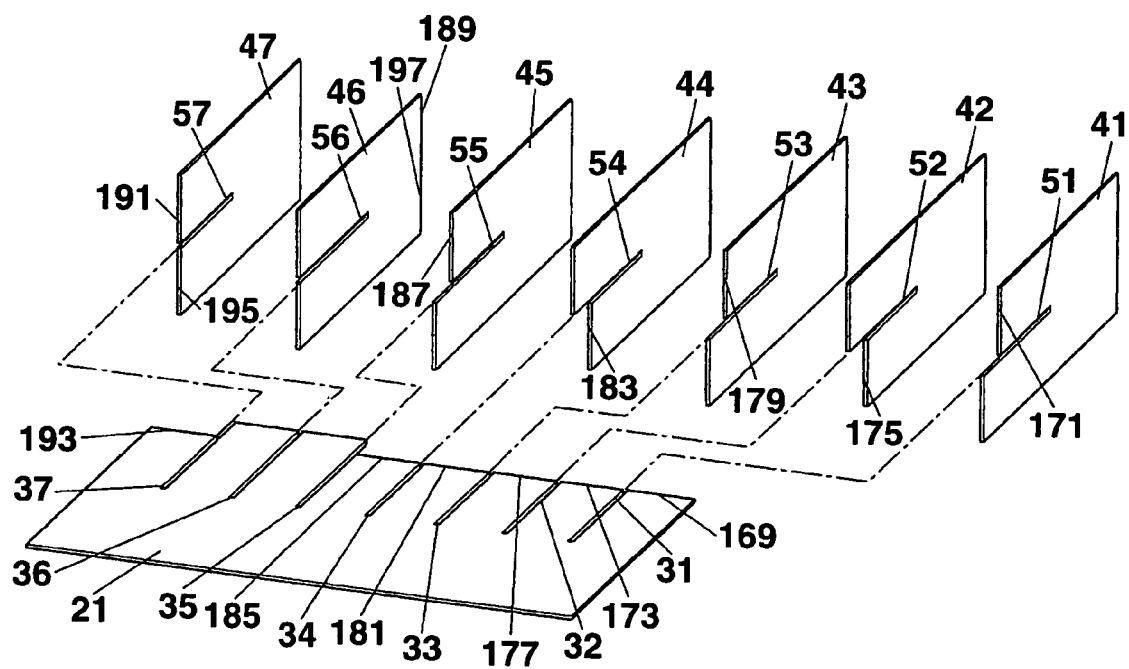
FIG. 8 shows a modified example of the partition member for use in the reaction device in the first embodiment.

FIG. 8 shows a modified example of the partition member for use in the reaction device in the present embodiment.

As shown in FIG. 8, a partition member 60, cutouts 169, 171, 173, 175, 177, 179, 181, 183, 185, 187, 189, 191, 193, 195, and 197 are provided at end portions of the wall plate 21 and the wall plates 41 to 47 that correspond to positions at which there are provided communicating ports 69, 71, 73, 75, 77, 79, 81, 83, 85, 87, 89, 91, 93, 95, and 97. Here, the cutouts 189 and 197 are integrally provided.

Even in the case where the cutouts are thus provided, the cutout portions function as communicating ports for connecting reaction vessels to each other. Thus, similar advantageous effect can be attained. The shape of the cutouts is arbitrarily formed without being limited to the shape shown in FIG. 7.

In the above modified example, slots 31 to 37 and 51 to 57 are provided on both of the floor plate 21 and the wall plates 41 to 47, they may be provided either one thereof.

SECOND EMBODIMENT

Now, a second embodiment of the reactor according to the present invention will be described here.

Figure 9:
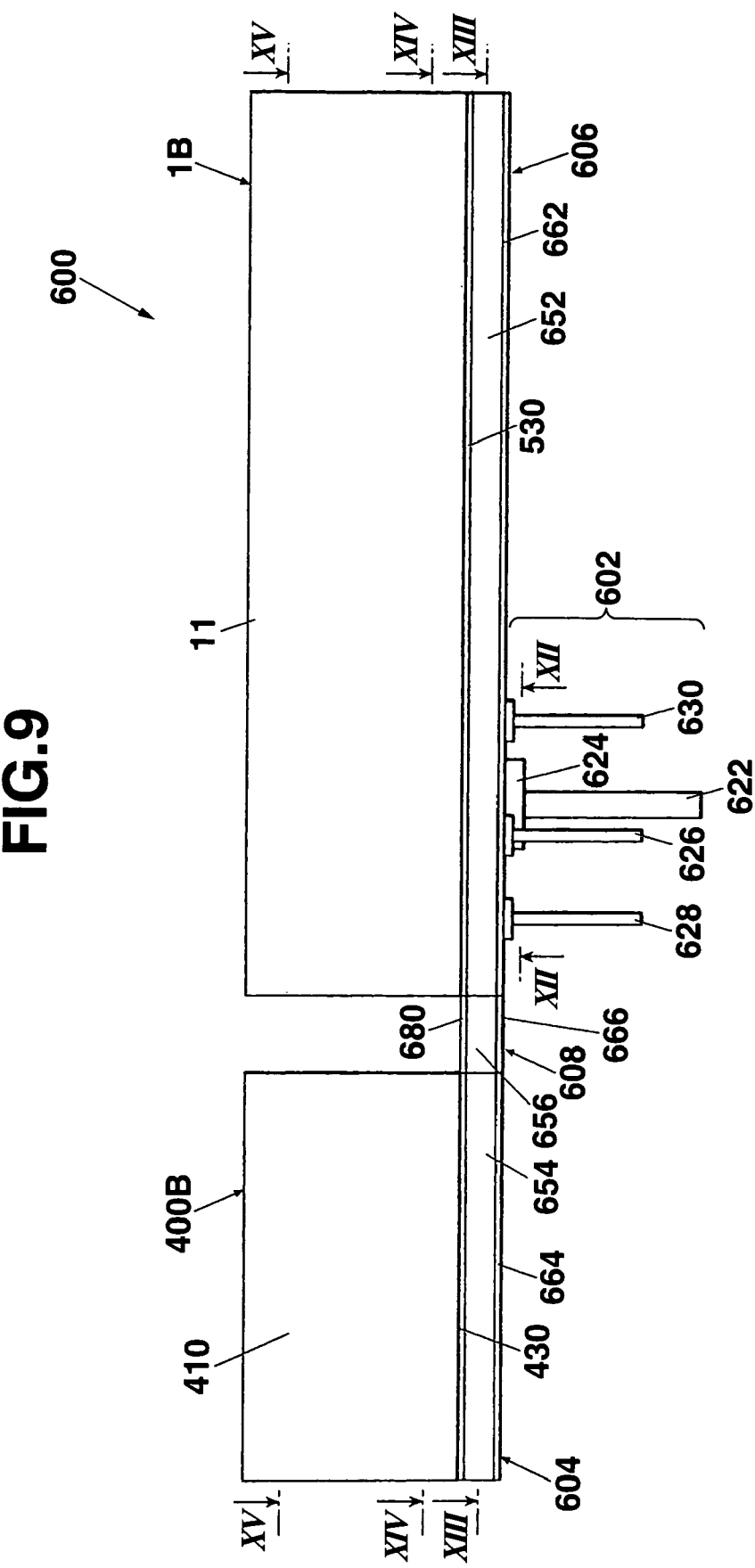
FIG. 9 is a side view of a microreactor module in a second embodiment of the reactor according to the present invention.
Figure 10:
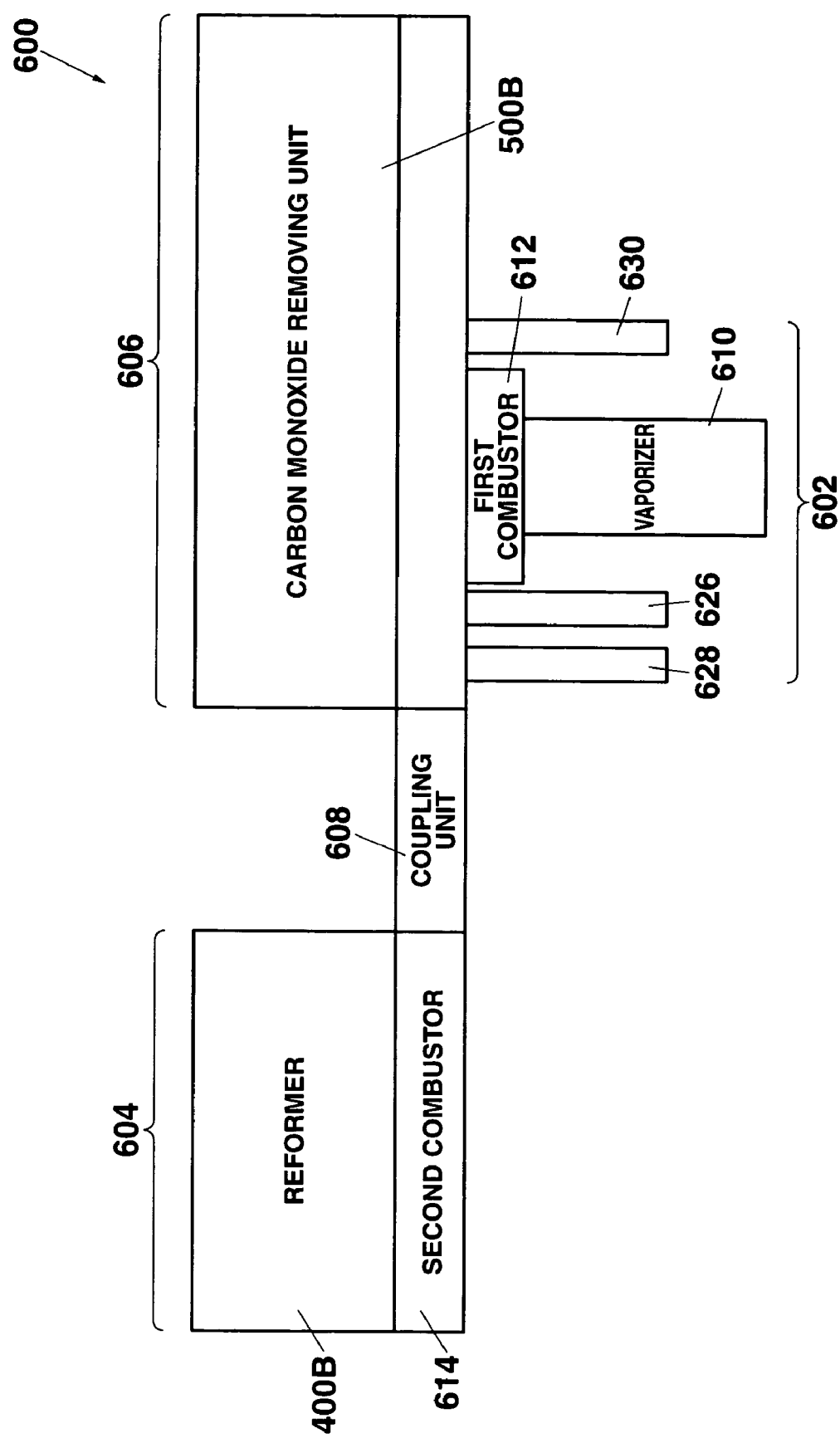
FIG. 10 is a schematic side view of the microreactor module in the second embodiment separated in terms of functions.

FIG. 9 is a side view of a microreactor module in the second embodiment of the reactor according to the invention. FIG. 10 is a schematic side view of the microreactor module 600 in this embodiment separated in terms of functions.

The microreactor module 600 is incorporated in, for example, an electronic device such as a notebook personal computer, a PDA, an electronic notebook, a digital camera, a portable cellular phone, a wristwatch, a resistor, or a projector, and produces a hydrogen gas for use in a fuel cell.

As shown in FIGS. 9 and 10, the microreactor module 600 comprises: a supply/discharge unit 602 that supplies a resistance or discharges a product; a high-temperature reaction unit 604 (first reaction unit) set at a comparatively high temperature to cause a reforming reaction; a low-temperature reaction unit 606 (second reaction unit) set at a temperature lower than a set temperature of the high-temperature reaction unit 604 to cause a selective oxidization reaction; and a coupling unit 609 that supplies a reactant or a product between the high-temperature reaction unit 604 and the low-temperature reaction unit 606.

A vaporizer 610 and a first combustor 612 are primarily provided at the supply/discharge unit 602. Air and a gas fuel (such as hydrogen gas or methanol gas, for example) are supplied to the first combustor 612 respectively separately or as a gas mixture, and a heat is generated by catalytic combustion of them. Water and a liquid fuel (for example, methanol, ethanol, dimethyl ether, butane, or gasoline) are supplied from a fuel container to the vaporizer 610 respectively separately or in a mixed state, and the water and liquid fuel are vaporized in the vaporizer 610 by means of a combustion heat in the first combustor 612.

The high-temperature reaction unit 604 is primarily provided with a second combustor 614 and a deformer 400B provided on the second combustor 614. Air and a gas fuel (such as hydrogen gas or methanol gas, for example) are supplied to the second combustor 614 respectively separately or as a gas mixture, and a heat is generated by catalytic combustion of them. Although electricity is produced in a fuel cell by an electrochemical reaction of a hydrogen gas, an unreacted hydrogen gas contained in an OFF gas discharged from the fuel cell may be supplied to the first combustor 612 and the second combustor 614 with the hydrogen gas mixed with air. Of course, the liquid fuel (for example, methanol, ethanol, dimethyl ether, butane, or gasoline) reserved in the fuel container may be vaporized by another vaporizer, whereby a gas mixture of the vaporized fuel and air may be supplied to the first combustor 612 and the second combustor 614.

The gas mixture (first reactant) of water and a liquid fuel vaporized is supplied from the vaporizer 610 to the reformer 400B, and the reformer 400B is heated by the second combustor 614. In the reformer 400B, a hydrogen gas or the like (first product) is produced from the water vapor and vaporized liquid fuel by means of a catalytic reaction, and further, a carbon monoxide gas is produced although its amount is very small. In the case where the fuel is methanol, chemical reactions take place as shown in the following formulas (1) and (2). The reaction by which hydrogen is produced is a heat absorption reaction, and a combustion heat of the second combustor 614 is used.

$$CH_3OH + H_2O \rightarrow 3H_2 + CO_2 \qquad (1)$$

$$2CH_3OH + H_2O \rightarrow 5H_2 + CO + CO_2 \qquad (2)$$

The low-temperature reaction unit 606A is primarily provided with a carbon monoxide removing unit 1B. To the carbon monoxide removing unit 1B, a gas mixture (second reactant) containing a very small amount of carbon monoxide gas or the like heated by the first combustor 612 and produced from the reformer 400B by means of the chemical reaction of (2) is supplied, and further, air is supplied. In the carbon monoxide removing unit 1B, carbon monoxide is selectively oxidized among the gas mixture, whereby carbon monoxide is removed. A gas mixture (second product: hydrogen-rich gas) having carbon monoxide removed therefrom is supplied to a fuel electrode of a fuel cell.

Now, a specific configuration of the microreactor module 600 will be described here.

Figure 11:
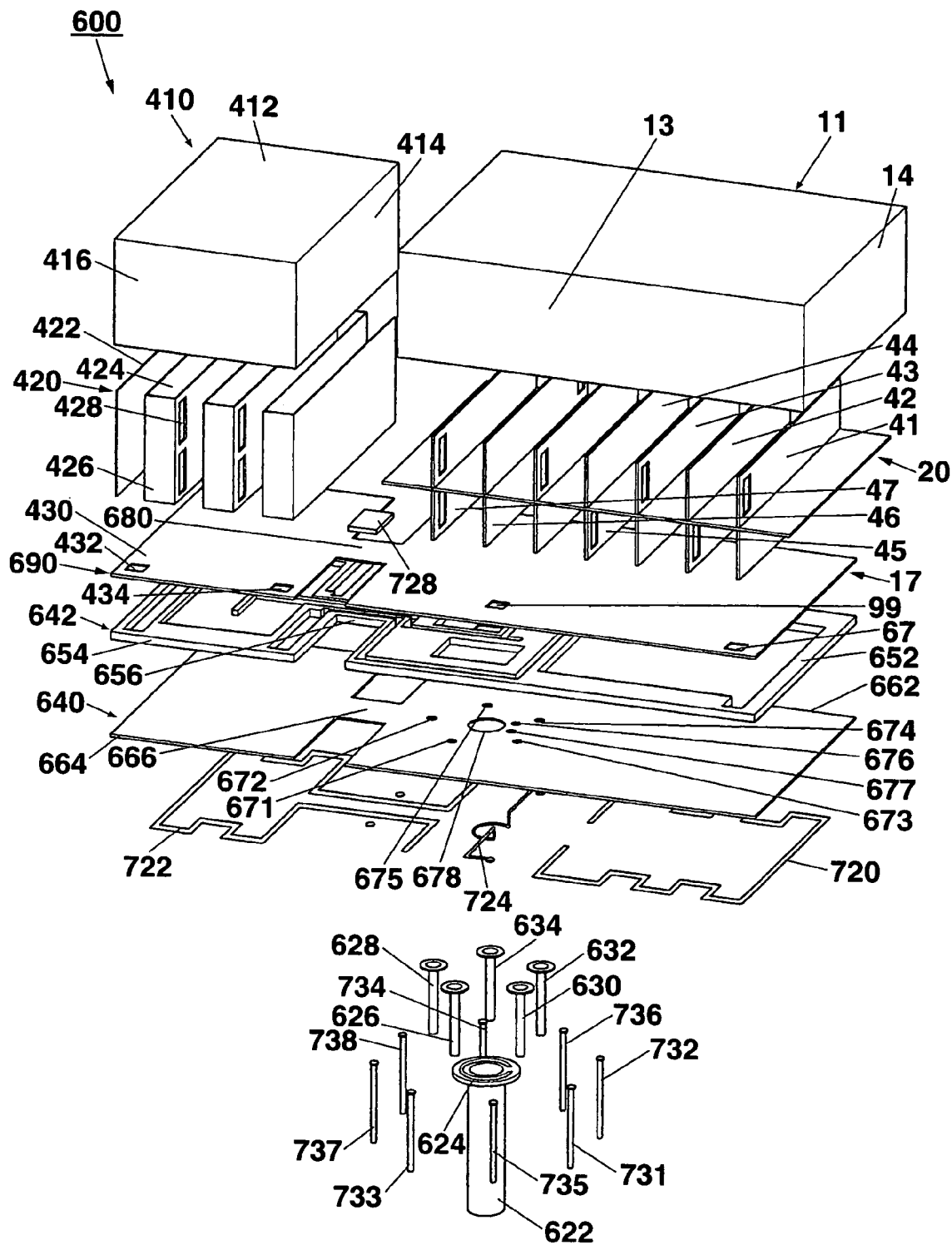
FIG. 11 is an exploded perspective view of the microreactor module in the second embodiment.
Figure 12:
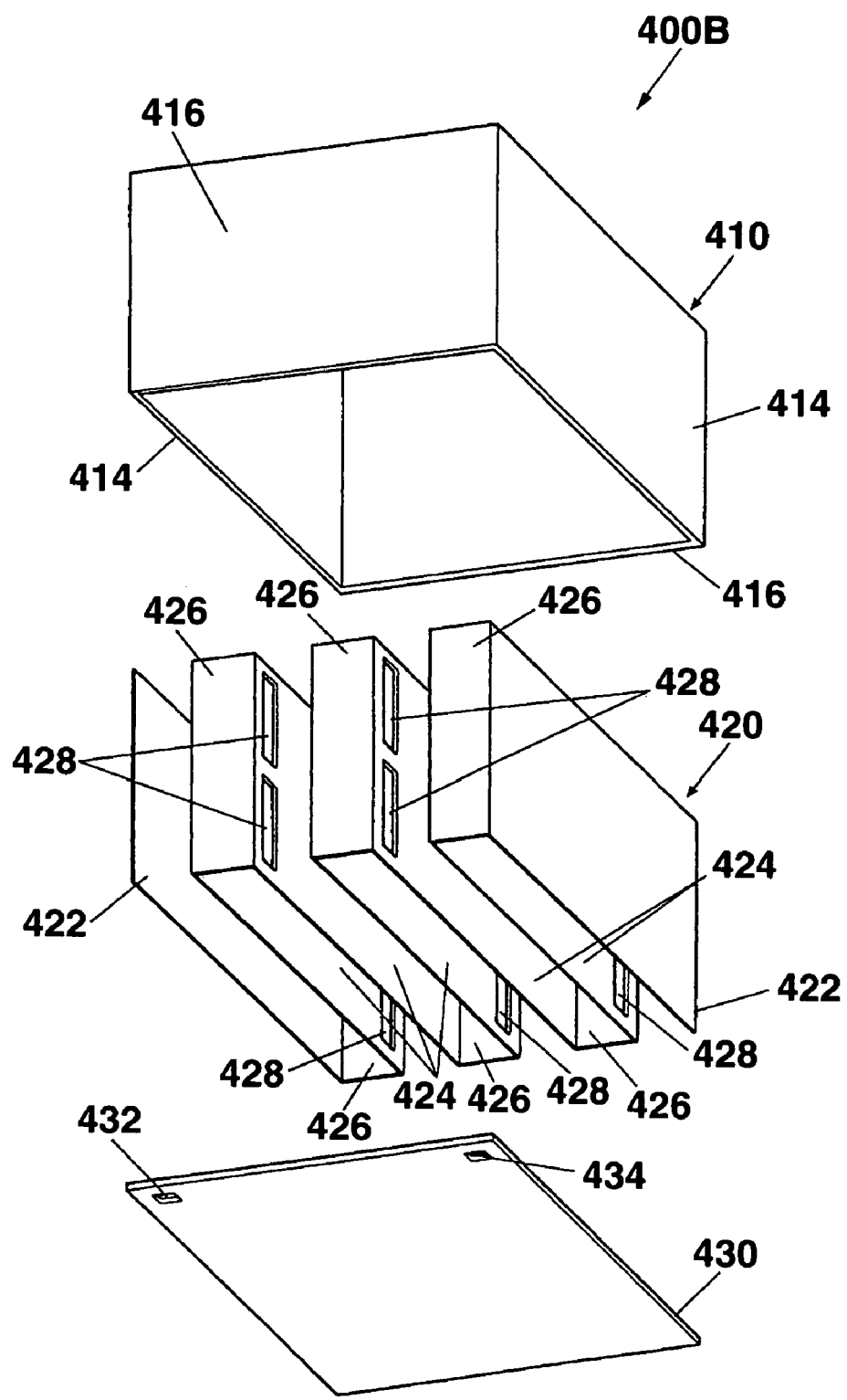
FIG. 12 is an exploded perspective view of a reformer in the microreactor module in the second embodiment.
Figure 13:
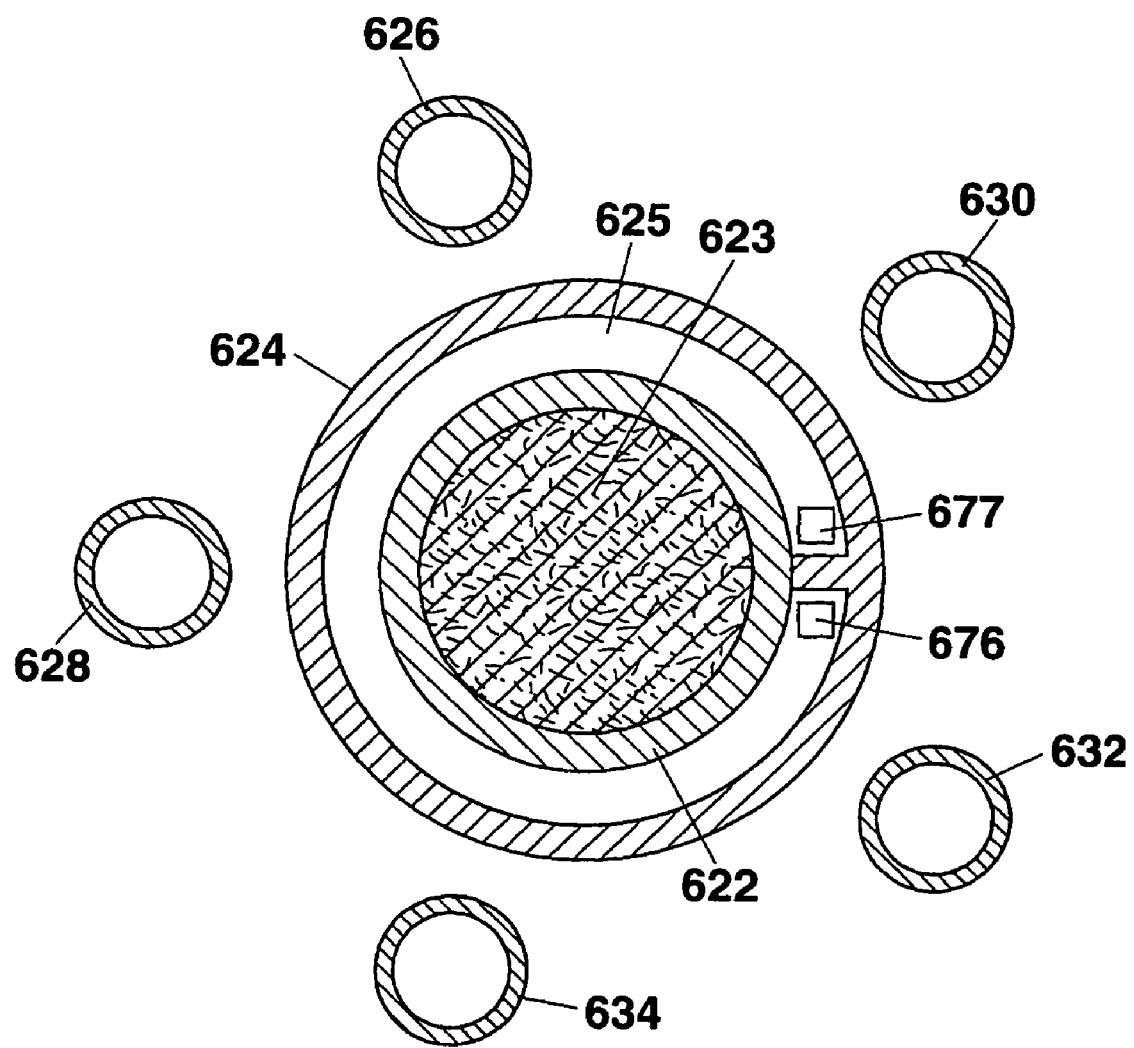
FIG. 13 is a cross sectional view taken along the section line XII-XII of FIG. 9.
Figure 14:
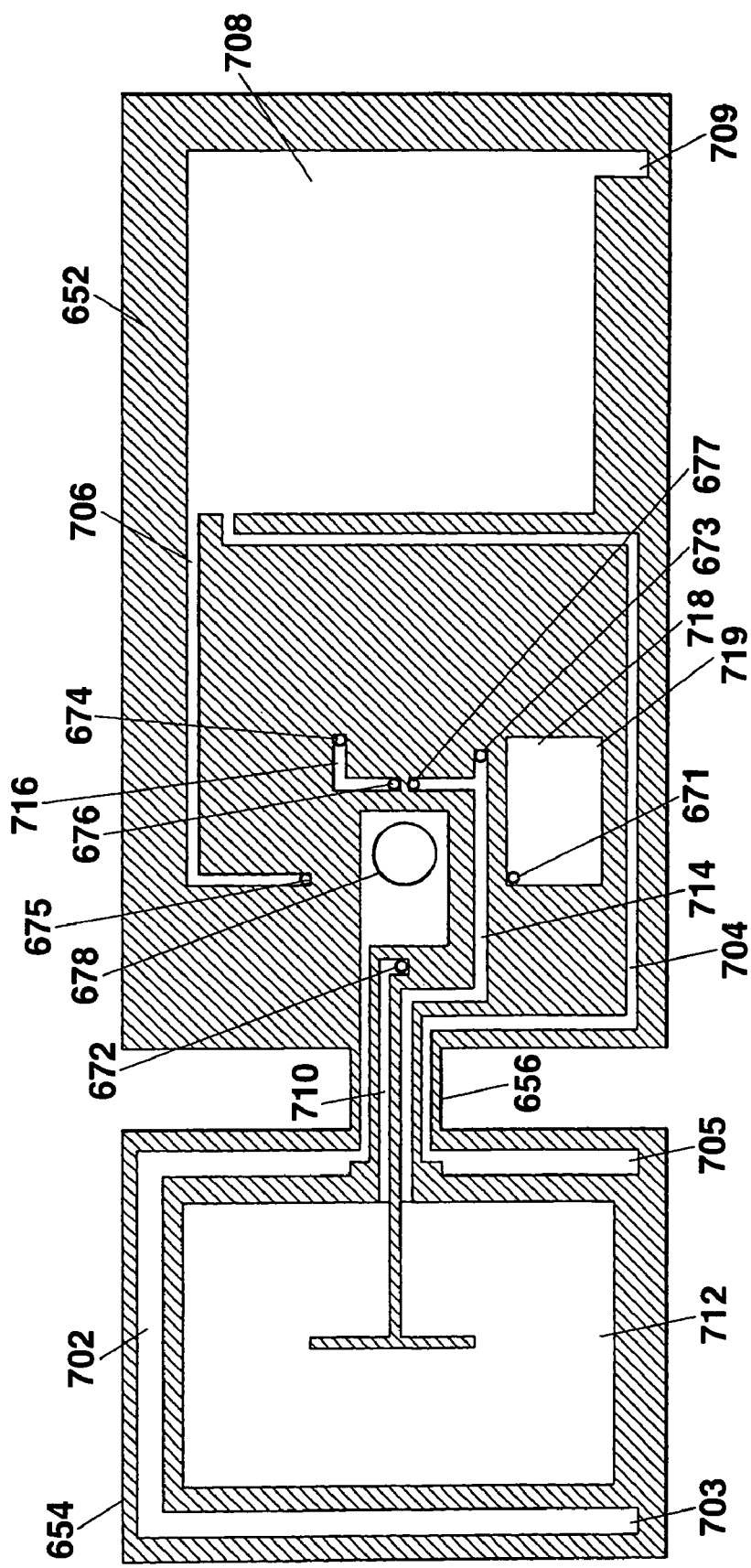
FIG. 14 is a cross sectional view taken along the section line XIII-XIII of FIG. 9.
Figure 15:
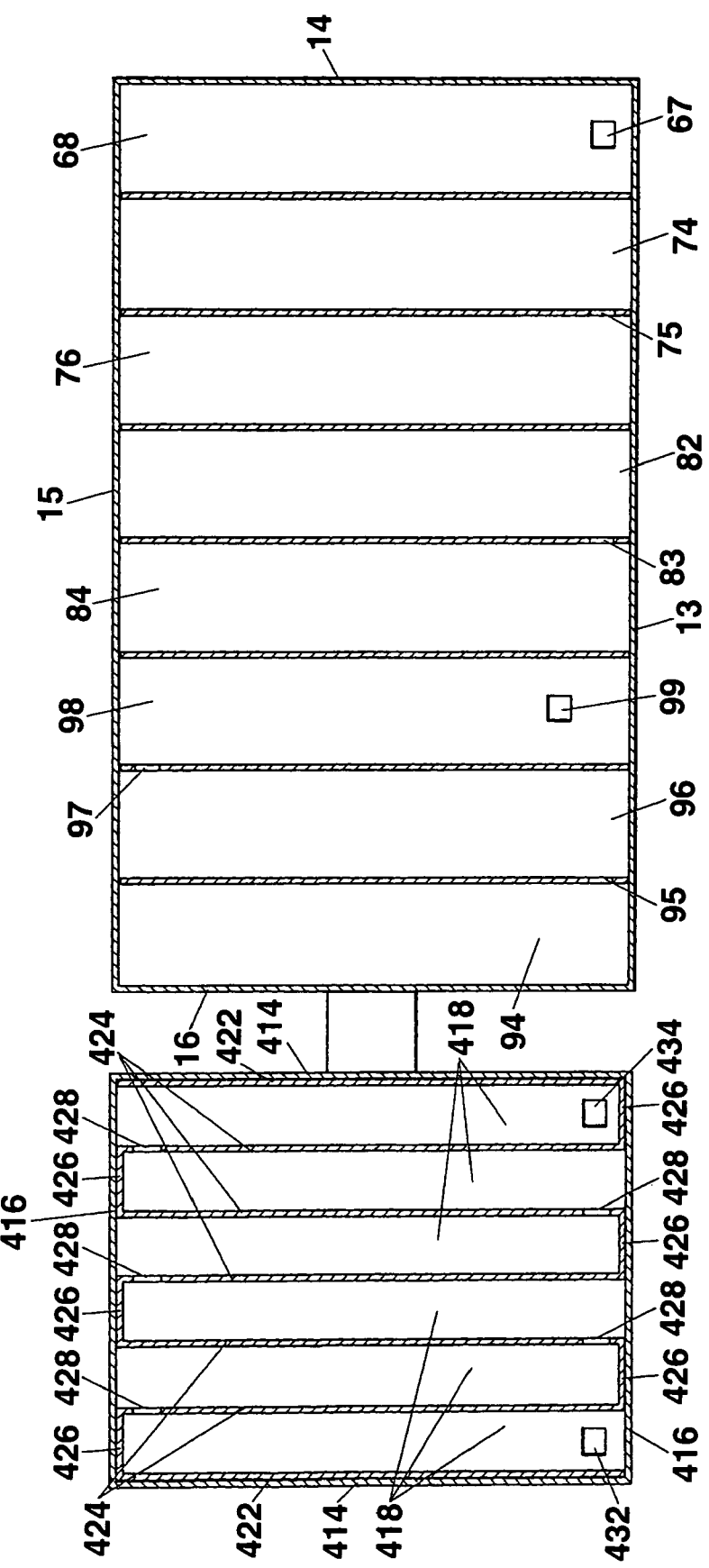
FIG. 15 is a cross sectional view taken along the section line XIV-XIV of FIG. 9.
Figure 16:
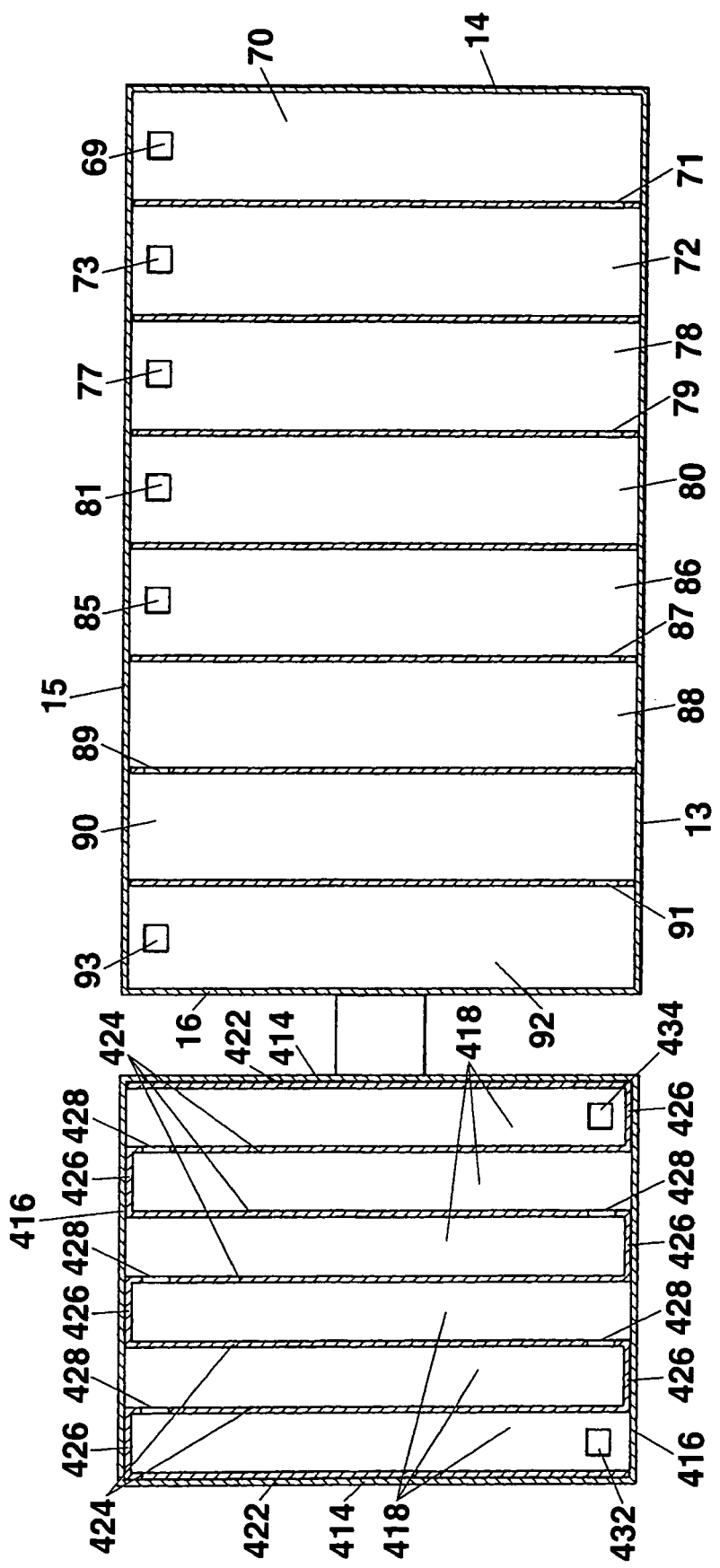
FIG. 16 is a cross sectional view taken along the section line XV-XV of FIG. 9.

FIG. 11 is an exploded perspective view of the microreactor module in the embodiment. FIG. 12 is an exploded perspective view of a reformer in the microreactor module according to the embodiment. FIG. 13 is a cross sectional view taken along the section line XII-XII of FIG. 9. FIG. 14 is a cross sectional view taken along the section line XIII-XIII of FIG. 9. FIG. 15 is a cross sectional view taken along the section line XIV-XIV of FIG. 9. FIG. 16 is a cross sectional view taken along the section line XV-XV of FIG. 9.

As shown in FIGS. 9, 11 and 13, the supply/discharge unit 602 comprises: a liquid fuel intake pipe 622; a combustor plate 624 provided so as to surround the liquid fuel intake pipe 622 at an upper end part of the liquid fuel intake pipe 622; and five pipes 626, 628, 630, 632, and 634 arranged at the periphery of the liquid fuel intake pipe 622.

The liquid fuel intake pipe 622 is made of a tubular metal material such as a stainless steel, and the liquid fuel intake pipe 622 is filled with a liquid absorption material 623. The liquid absorption material 623 is made of, for example, an inorganic fiber or an organic fiber bound with a binder; sintered inorganic powder, inorganic powder bound with a binder; or a mixture of graphite and grassy carbon. Specifically, a felt material, a ceramic porous material, a fiber material, a carbon porous material or the like is used as the liquid absorption material 623.

The pipes 626, 628, 630, 632, and 634 are made of a tubular metal material such as a stainless steel, for example. The combustor plate 624 is also made of a planar metal material such as a stainless steel. A through-hole is formed at the center part of the combustor plate 624, and the liquid fuel intake pipe 622 is engaged into the through-hole, so that the liquid fuel intake pipe 622 and the combustor plate 624 are joined to each other. Here, the liquid fuel intake pipe 622 is joined to the combustor plate 624 by means of brazing, for example. As a brazing agent, it is particularly preferable to apply gold brazing containing gold, silver, copper, zinc, and cadmium whose melting point is 700 degrees or more, which is a highest temperature of the temperatures of the fluids flowing through the liquid fuel intake pipe 622 or the combustor plate 624; brazing consisting essentially of gold, silver, zinc, and nickel, or brazing consisting essentially of gold, palladium, and silver. In addition, a bulkhead is provided so as to protrude on one face of the combustor plate 624. One part of the bulkhead is provided all around an outer rim of the combustor plate 624, and another part is provided all over a diameter direction, so that the combustor plate 624 is joined to a bottom face of the low-temperature reaction unit 606. Consequently, a combustion flow channel 625 is formed on a connection face, and the liquid fuel intake pipe 622 is surrounded by the combustion fuel channel 625. A combustion catalyst for combusting a combustion gas mixture is carried on a wall face of the combustion flow channel 625. Platinum is exemplified as a combustion catalyst, for example. The liquid absorption material 623 contained in the liquid fuel intake pipe 622 is filled up to a position of the combustor plate 624.

As shown in FIGS. 9 and 11, the high-temperature reaction unit 604, the low-temperature reaction unit 606, and the coupling unit 608 each have an insulation plate 640 and a base plate 642 that are laminated with each other as a common substrate. Therefore, the insulation plate 640 is provided as a bottom face common to the high-temperature reaction unit 604, the low-temperature reaction unit 606, and the coupling unit 608. However, a bottom face of the coupling unit 608 faces to a bottom face of the high-temperature reaction unit 604, and further, faces to a bottom face of the low-temperature reaction 606.

The base plate 642 is composed of: a base portion 652 serving as a substrate of the low-temperature reaction unit 606; a base portion 654 serving as a substrate of the high-temperature reaction unit 604; and a coupling base portion 656 serving as a substrate of the coupling unit 608. The base plate 642 is formed integrally with the base portion 652, the base portion 654, and the coupling base portion 656, and is established in a state that the base plate is enclosed in the coupling base portion 656. The base plate 642 is made of a planer metal material such as a stainless steel, for example.

The insulation plate 640 is composed of a base portion 662 serving as a substrate of the low-temperature reaction unit 606; a base portion 664 serving as a substrate of the high-temperature reaction unit 604; and a coupling base portion 666 serving as a substrate of the coupling unit 608. The insulation plate 640 is formed integrally with the base portion 662, the base portion 664, and the coupling base portion 666, and is established in a state that the plate is enclosed in the coupling base portion 666. The insulation plate 640 is made of an electric insulation element such as ceramics, for example.

As shown in FIGS. 11 and 14, through-holes 671 to 678 penetrate the base portion 652 of the base plate 642 and the base portion 662 of the insulation plate 640 in a state that the insulation plate 640 is joined to the base plate 642.

As shown in FIGS. 9 and 12, the base portion 662 of the insulation plate 640 is provided as a bottom face of the low-temperature reaction unit 606, and the pipes 626, 628, 630, 632, and 634 and the liquid fuel intake pipe 622 ate joined to the bottom face of the low-temperature reaction unit 606 by brazing or the like. Here, the pipe 626 is passed through the through-hole 671, the pipe 628 is passed through the through-hole 672, the pipe 630 is passed through the through-hole 673, the pipe 632 is passed through the through-hole 674, the pipe 634 is passed through the through-hole 675, and the liquid fuel intake pipe 622 is passed through the through-hole 678.

As shown in FIGS. 11, 13 and 14, although the combustion plate 624 is joined to the bottom face of the low-temperature reaction unit 606, one end of the combustion flow channel 625 of the combustion plate 624 is passed through the through-hole 676, and the other end of the combustion flow channel 625 is passed through the through-hole 677.

As shown in FIG. 14, the base plate 642 has formed thereon a reforming fuel supply flow channel 702, a communication flow channel 704, an air supply flow channel 706, a mixture chamber 708, a combustion fuel supply flow channel 710, a combustion chamber 712, an exhaust gas flow channel 714, a combustion fuel supply flow channel 716, and a discharge chamber 718.

The reform fuel supply flow channel 702 is formed from the through-hole 678 up to a corner of the base portion 654 through the coupling base portion 656. The mixture chamber 708 is formed in a rectangular shape in the base portion 652. The communication flow channel 704 is formed from the corner of the base portion 654 up to the mixture chamber 708 through the coupling base portion 656. The air supply flow channel 706 is formed from the through-hole 675 up to the combustion chamber 708.

The combustion chamber 712 is formed in a C shape at the center part of the base portion 654. A combustion catalyst for combusting a combustion gas mixture is carried on a wall face of the combustion chamber 712.

The combustion fuel supply flow channel 710 is formed from the through-hole 672 up to the combustion chamber 712 through the coupling base portion 656. The exhaust gas flow channel 714 is formed from the through-hole 677 up to the through-hole 673, and is formed from the combustion chamber 712 up to the through-hole 673 through the coupling base portion 656. The combustion fuel supply flow channel 716 is formed from the through-hole 674 up to the through-hole 676 in the base portion 652. The discharge chamber 718 is formed in a rectangular shape in the base portion 652, and the through-hole 671 is passed through the corner of the discharge chamber 718.

A carbon monoxide removing unit 1B is provided on the base portion 652. The carbon monoxide removing unit 1B applies the reaction device 1 in the first embodiment, and the carbon monoxide removing unit 1B is configured in the same manner as that in the reaction device 1 shown in FIG. 6.

A cross section of the carbon monoxide removing unit 1B shown in FIG. 15 corresponds to that of the reaction device 1 shown in FIG. 3, and a cross section of the carbon monoxide removing unit 1B shown in FIG. 16 corresponds to that of the reaction device 1 shown in FIG. 4. Between the carbon monoxide removing unit 1B and the reaction device 1, the mutually corresponding constituent elements are designated by like reference numerals, and a description of the portions corresponding thereto is omitted here.

As shown in FIGS. 9 and 11, a bottom plate 17 of the carbon oxide removing unit 1B is joined to a top face of the base portion 652. Part of the reforming fuel supply flow channel 702, part of the exhaust gas flow channel 714, part of the combustion fuel supply flow channel 710, part of the communication flow channel 704, the air supply flow channel 706, the mixture chamber 708, the combustion fuel supply flow channel 716, and the discharge chamber 718 are covered with the bottom plate 17. An intake port 67 formed at the bottom plate 17 is positioned on a corner 709 of the mixture chamber 708, and a discharge port 99 formed at the bottom plate 17 is positioned on a corner 719 of the discharge chamber 718. In the carbon monoxide removing unit 1B, a carbon monoxide selective oxidizing catalyst (for example, platinum) is carried on an internal wall face of the reaction vessel 10 or a surface of the partition member 20.

Next, a reformer 400B is formed on the base portion 654. As shown in FIGS. 12, 15 and 16, the reformer 400B comprises a box type member 410 that opens at the bottom face, a partition plate 420 housed in a box type member 410, and a bottom plate 430 that closes the bottom face opening of the box type member 410. Here, the partition plate 420 corresponds to a configuration in each of third to fifth embodiments in the present embodiment, although it is not limited thereto. A partition member having the same configuration as that of the partition member 20 in the embodiment or a partition member in another embodiment may be configured as being housed in the box shape member 410.

The box type member 410, the partition plate 420, and the bottom plate 430 may be made of a metal material such as a stainless, may be made of a ceramics material, may be made of a glass material, or may be made of a resin material.

The box type member 410 has: a top plate 412 formed in a square or rectangular shape; a pair of side plates 414 connected to each other in a state they communicate at right angle to the top plate 412 in two opposite edges of the four edges of the top plate 412; and a pair of side plates 416 connected in a state that they communicate with the other two oppose edges of the top plate 412 at right angle to the top plate 412. The side plates 416 are connected to each other in a state that they vertically communicate with each other with respect to the side plates 416, and are provided in a square frame shape or in a rectangular frame shape by these four side plates 414 and 416.

A rim part of the bottom plate 430 is joined to a lower rim part of each of the side plates 414 and 416 such that the bottom plate 430 is parallel to the top plate 412. In this way, the bottom face opening of the box type member 410 is closed by the bottom plate 430 to thereby configure a reaction vessel formed in a parallel tetrahedron shape having a hollow.

The partition plate 420 is formed in a rectangular wavy shape. The partition plate 420 has a pair of reinforce portions 422 opposed to each other at both sides thereof; a plurality of partition portions 424 opposed to the reinforce portions 422 between the two reinforce portions 422; and a plurality of return portions 426 connected between the adjacent partition portions 424 or between the adjacent partition portion 424 and reinforce portion 422 at one of the four edges of the partition portion 424.

The partition plate 420 is housed in the box type member 410 such that a wave height direction is parallel to the side plate 414. The reinforce portions 422 of the partition plate 420 come into contact while facing the side plates 414, and preferably the reinforce portions 422 are joined to the side plates 414 by means of welding. The return portions 426 of the partition plate 420 come into contact while facing the side plates 416, and preferably, the return portions 426 are joined to the side plates 416 by means of welding.

An upper edge part of the return portion 426 and an upper edge part of the reinforce portion 422 come into contact with the top plate 412 of the box type member 410, and preferably is joined thereto by means of welding. A lower edge part of the return portion 426 and a lower edge part of the reinforce portion 422 comes into contact with the bottom plate 430, and preferably, is joined thereto by means of welding.

In this way, since the partition plate 420 is housed in the box type member 410, a hollow defined by the box type member 410 and the bottom plate 430 is partitioned in a plurality of spaces 418 by the partition portion 424. Among the plurality of spaces 418, an intake port 432 communicating with the space 418 between one reinforce portion 422 and the partition portion 424 is formed at the bottom plate 430. A discharge port 434 communicating with the space 418 between the other reinforce portion 422 and the partition portion 424 is formed at the bottom plate 430.

A pair of top and bottom through-holes 428 are formed at one end of the partition portion 424 in the wave height direction, and the adjacent spaces 418 communicate with each other via the through-hole 428. For this reason, a hollow defined by the box type member 410 and the bottom plate 430 is provided in a flow channel shape from the intake port 432 up to the discharge port 434, and its flow channel is formed in a spiral shape.

As shown in FIGS. 9 and 11, the bottom plate 430 of the reformer 400B is joined to a top face of the base portion 654. Part of the reforming fuel supply flow channel 702, part of the exhaust gas flow channel 714, part of the combustion fuel supply flow channel 710, part of the communication flow channel 704, and the combustion chamber 712 are covered with the bottom plate 430. An intake port 67 formed at the bottom plate 430 is positioned on an end part 703 of the reforming fuel supply flow channel 702, and a discharge port 99 formed at the bottom plate 430 is positioned on an end part 705 of the communication flow channel 704.

In the reformer 400B, a reforming catalyst (for example, a Cu/ZnO-based catalyst or a Pd/ZnO-based catalyst) is carried onto the internal faces of the box type member 4109 and bottom plate 430 or on the partition plate 420.

As shown in FIG. 11, the bottom plate 430 of the reformer 400B and the bottom plate 17 of the carbon oxide removing unit 1B are integrally formed in a state that they are connected to each other by a coupling cap 680. A plate material 690 having integrated the bottom plate 430, the bottom plate 17, and the coupling cap 680 is established in a state that it is enclosed in the coupling cap 680. Although the plate material 690 is joined to the base plate 642, the coupling cap 680 of the plate material 690 is joined to the coupling base portion 656 of the base plate 642, whereby a coupling unit 608 is configured. Part of the reforming fuel supply flow channel 702, part of the exhaust gas flow channel 417, part of the combustion fuel supply flow channel 710, and part of the communication flow channel 704 are covered with the coupling cap 680.

As shown in FIG. 9 or the like, an external shape of the coupling unit 608 is formed in, for example, a rectangular cylinder shape. The width of the coupling unit 608 is narrower than the width of the high-temperature reaction unit 604 and the width of the low-temperature reaction unit 606, and the height of the coupling unit 608 is also lower than the height of each of the reaction units 604 and 606. Although the coupling unit 608 is bridged between the high-temperature reaction unit 604 and the low-temperature reaction unit 604, the coupling unit 608 is connected to the high-temperature reaction unit 604 at the center part in the widthwise direction of the high-temperature reaction unit 604 and is connected to the reaction unit 606 at the center part in the widthwise direction of the low-temperature reaction unit 606.

As has been described above, the coupling unit 608 is provided with the reforming fuel supply flow channel 702, the communication flow channel 704, the combustion fuel supply flow channel 714, and the exhaust gas flow channel 714.

Now, a description will be given with respect to flow channels provided inside of the supply/discharge unit 602, the high-temperature reaction unit 604, the low-temperature reaction unit 606, and the coupling unit 608.

Figure 17:
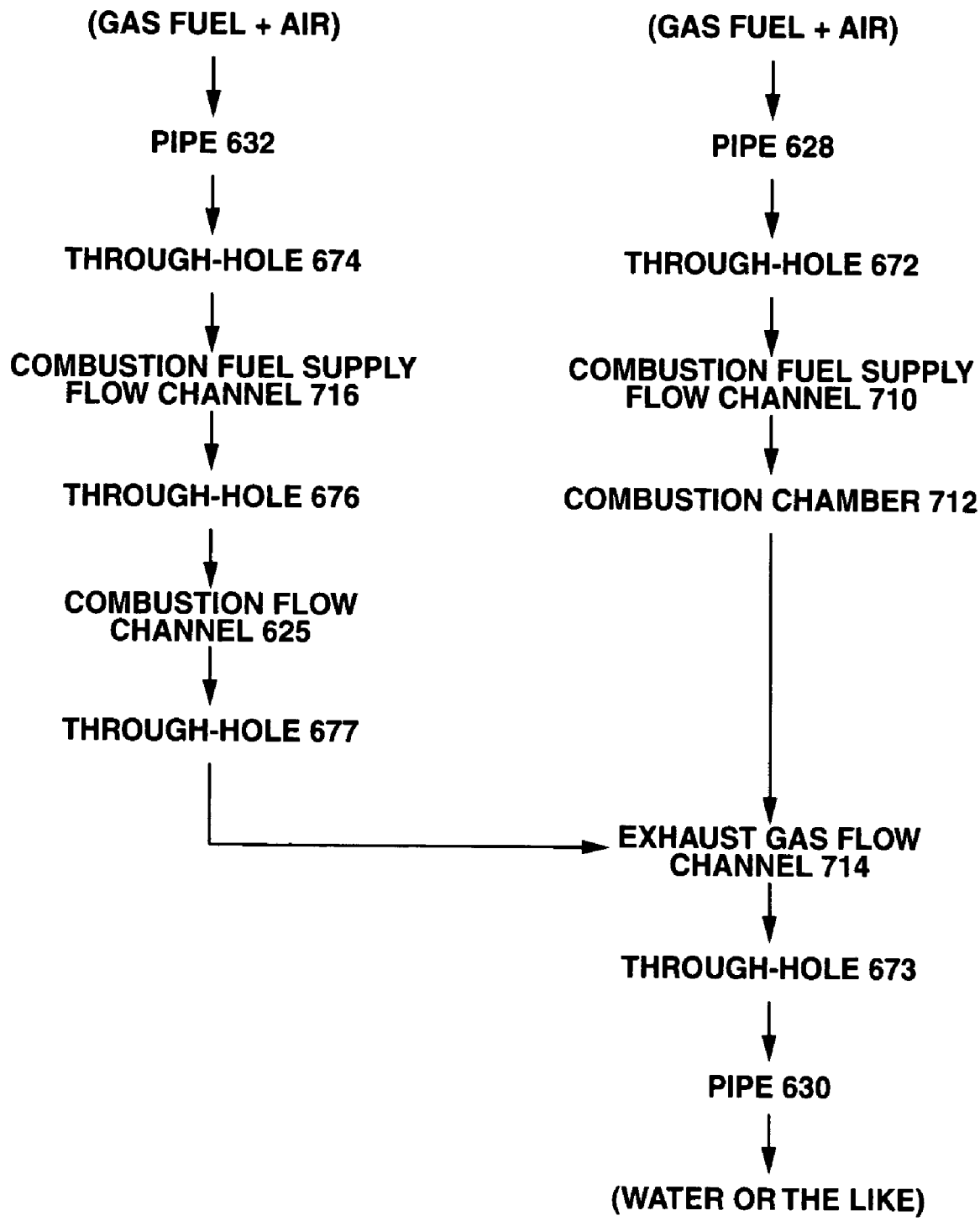
FIG. 17 shows a channel from supply of a combustion gas mixture consisting of a gas fuel and air to discharge of water vapor or the like that is a product in the microreactor module according to the second embodiment.
Figure 18:
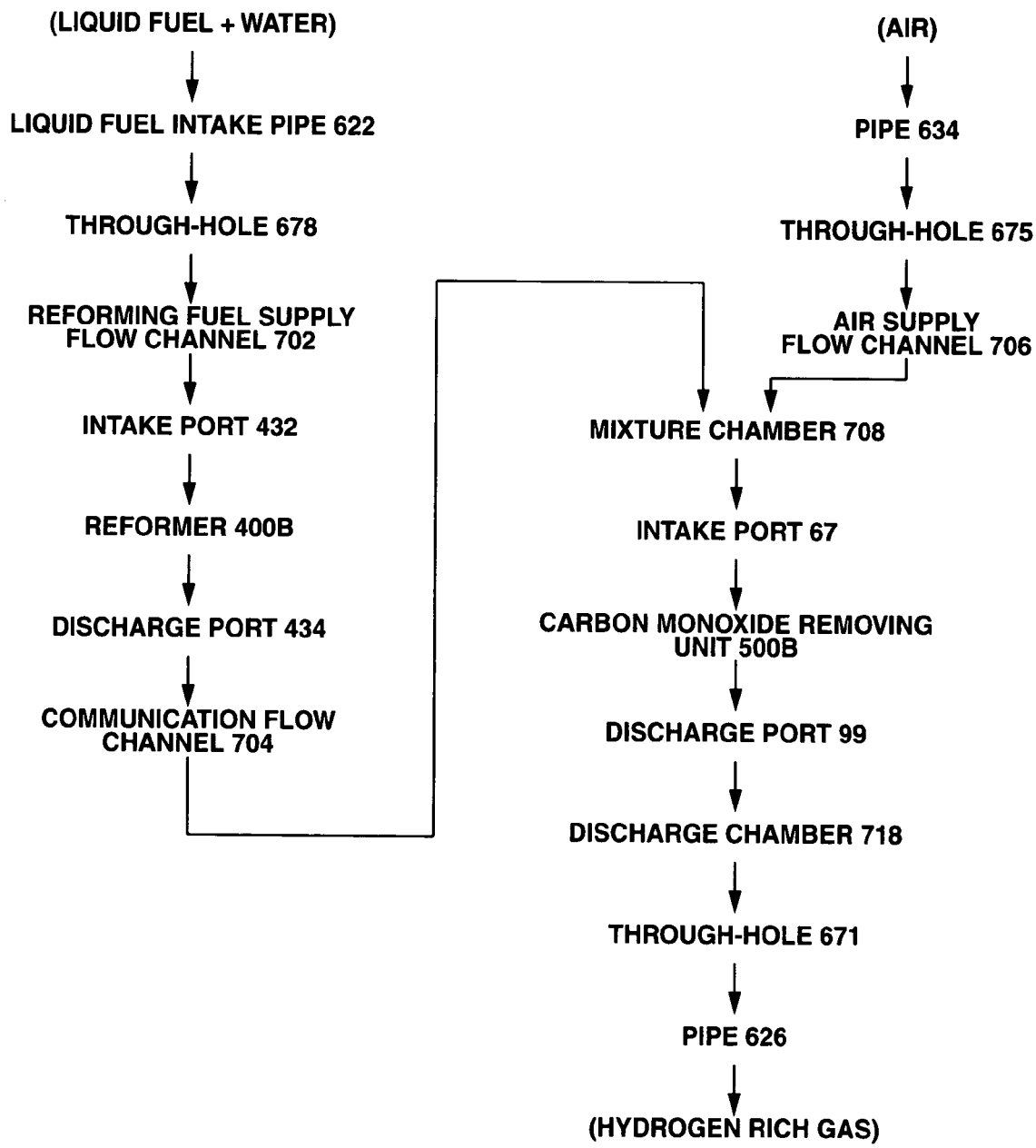
FIG. 18 shows a channel from supply of a liquid fuel and water to discharge according to a hydrogen gas that is a product in the microreactor module of the second embodiment.

FIG. 17 shows a channel from supply of a combustion gas mixture consisting of a gas fuel and air to discharge of water vapor or the like that is a product in the microreactor module according to the embodiment. FIG. 18 shows a channel from supply of a liquid fuel and water to discharge of a hydrogen gas that is a product in the microreactor module according to the embodiment.

Here, a description will be given with respect to a correlation among FIGS. 17, 18 and 10. The liquid fuel intake pipe 622 corresponds to the vaporizer 610, the combustion flow channel 625 corresponds to the first combustor 612, and the combustion chamber 712 corresponds to the second combustor.

As shown in FIG. 11, a heating wire 720 is patterned in a wobble state on the bottom face of the low-temperature reaction unit 606, namely, on the bottom face of the insulation plate 640, and a heating wire 722 is patterned in a wobble state from the low-temperature reaction unit 606 to the high-temperature reaction unit 604 through the coupling unit 608 on the bottom face of them. A heating wire 724 is patterned from the bottom face of the low-temperature reaction unit 606 to the side face of the liquid fuel intake pipe 622 through the surface of the combustor plate 624. Here, an insulation film made of, for example, silicon nitride or silicon oxide is formed on the side face of the liquid fuel intake pipe 622 and on the surface of the combustor plate 624, and the heating wire 724 is formed on the surface of the insulation film. Patterning the heating wires 720, 722, and 724 on the insulation film or insulation plate 640 makes it possible to improve the heating efficiency of the heating wires 720, 722, and 724 without a voltage to be applied being applied to the base plate 642, liquid fuel intake pipe 622, combustor plate 624 and the like which are made of a metal material.

The heating wires 720, 722, and 724 are laminated sequentially in order of the insulation film or insulation plate 640, a diffusion proof layer, and a heat generation layer. The heat generation layer is made of a material (for example, Au) having the lowest resistance rate among the three layers. If a voltage is applied to these heating wires, a current intensively flows, and a heat is generated. Even if the heating wires 720, 722, and 724 generate a heat, a material for the heat generation layer is hardly thermally diffused to the diffusion proof layer, and a material for the diffusion proof layer is hardly thermally diffused to the heat generation layer. It is preferable to use as the diffusion proof layer a material (for example, W) having a comparatively high melting point and low reactivity. In addition, in the case where the diffusion proof layer is lowly coherent to the insulation film and is easily released, a coherent layer may be further provided between the insulation film and the diffusion proof layer. The coherent layer is made of a material (such as Ta, Mo, Ti, or Cr, for example) having superior coherence to the diffusion proof layer and to the insulation film or the insulation plate 640. The heating wire 720 heats the low-temperature reaction unit 606 during startup, the heating wire 722 heats the high-temperature reaction unit 604 and the coupling unit 608 during startup, and the heating wire 724 heats the vaporizer 610 and the first combustor 612 of the supply/discharge unit 602. Then, when the second combustor 614 is combusted by an OFF gas containing hydrogen from a fuel cell, the heating wire 722 heats the high-temperature reaction unit 604 and the coupling unit 608 as an assistance of the second combustor 614. Similarly, in the case where the first combustor 612 is combusted by an OFF gas containing hydrogen from a fuel cell, the heating wire 720 heats the low-temperature reaction unit 606 as an assistance of the first combustor 612.

The heating wires 720, 722, and 724 each also function as a temperature sensor for reading a temperature change from a change in resistance value because an electrical resistance changes depending on a temperature. Specifically, a temperature of the heating wire is proportional to the electrical resistance.

All the ends of the heating wires 720, 722, and 724 are positioned on the bottom face of the low-temperature reaction unit 606, and these ends are arranged so as to surround the combustor plate 624. Lead wires 731 and 732 are respectively connected to both ends of the heating wire 720, lead wires 733 and 734 are respectively connected to both ends of the heating wire 722, and lead wires 735 and 736 are respectively connected to both ends of the heating wire 724. In FIG. 8, for the sake of clarity, the heating wires 720, 722, and 724 and the lead wires 731 to 736 are not shown.

As shown in FIG. 11, a getter material 728 may be provided on the surface of the coupling unit 608, for example. The getter material is provided with a heater such as a heating material, and lead wires 737 and 738 each are connected to the getter material 728. The getter material 728 is heated so as to be activated, thereby providing an adsorption action. By adsorbing a residual gas in an internal space in a heat insulation package 791 described later, a gas having leaked from the microreactor module 600 into the internal space of the heat insulation package 791, or a gas having invaded into the heat insulation package 791 from the outside, the impaired degree of vacuum of the internal space of the heat insulation package 791 and the lowering of heat insulation effect are restricted. Examples of a material for the getter material 728 may include an alloy consisting essentially of zirconium, barium, titanium, or vanadium. In FIG. 8, for the sake of clarity, the lead wires 737 and 738 are not shown.

Now, a description will be given with respect to a heat insulation structure for restricting a thermal loss of the microreactor module 600 in the embodiment.

Figure 19:
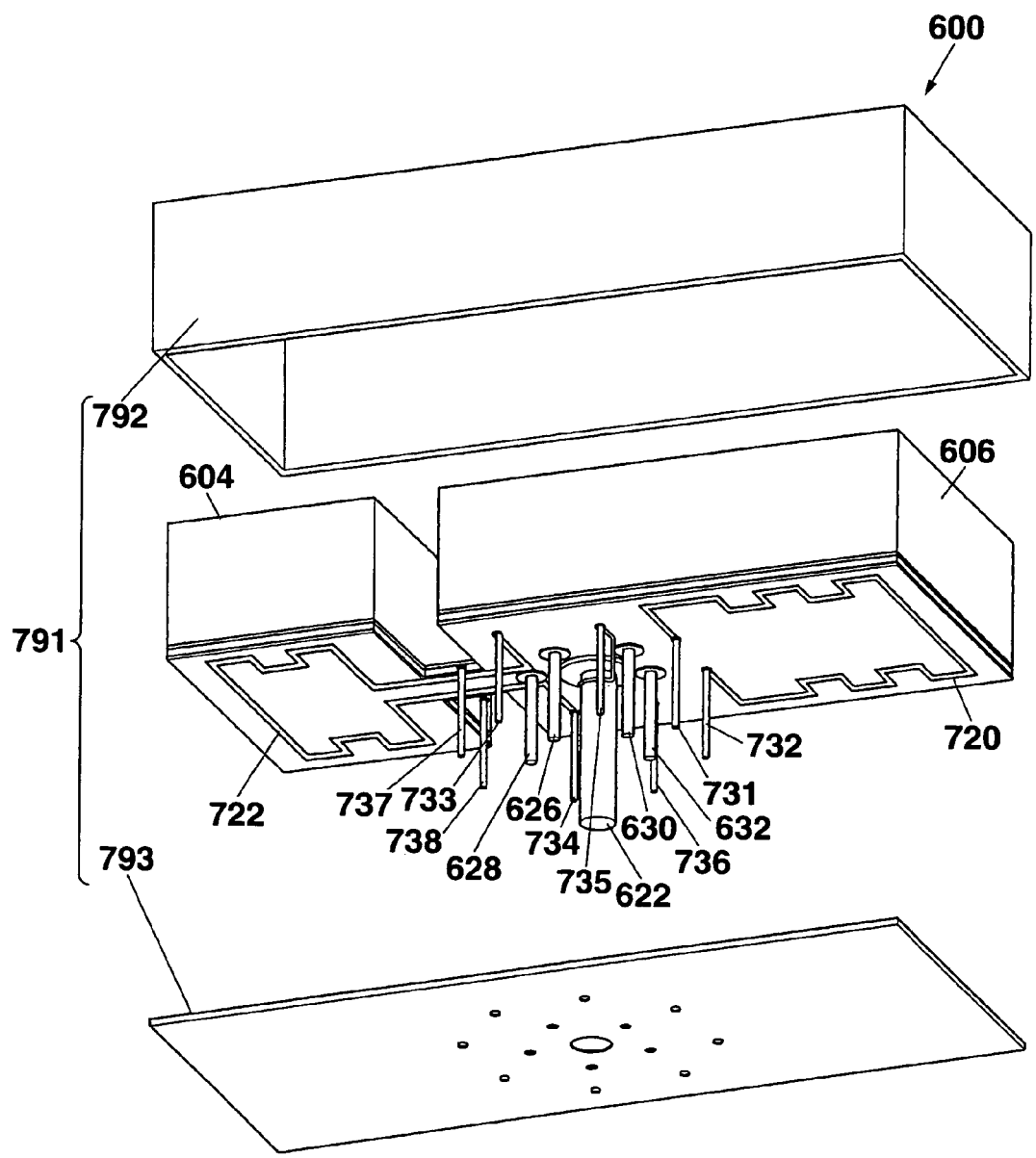
FIG. 19 is an exploded perspective view of a heat insulation package which covers the microreactor module according to the second embodiment.

FIG. 19 is an exploded perspective view of a heat insulation package that covers the microreactor module according to the embodiment. As shown in FIG. 19, a heat insulation package (heat insulation vessel) 791 is composed so as to cover the entirety of the microreactor module 600, and the high-temperature reaction unit 604, the low-temperature reaction unit 606, and the coupling unit 608 are housed in the heat insulation package 791. The heat insulation package 791 is composed of: a rectangular case 792 whose bottom face opens; and a plate 793 having closed the bottom face opening of the case 792, the plate 793 being joined to the case 792. Both the case 792 and the plate 793 are made of a heat insulation material such as glass or a metal material. Also, a metal reflection film made of aluminum, gold or the like may be formed on an inside face. When such a metal reflection film is formed, a thermal loss due to irradiation from the supply/discharge unit 602, the high-temperature reaction unit 604, the low-temperature reaction unit 606, and the coupling unit 608 can be restricted.

A plurality of through-holes penetrate the plate 793. The pipes 626, 628, 630, 632, and 634, the liquid fuel intake pipe 622, and the lead wires 731 to 738 are made to pass through their respective through-holes. In this state, the pipes 626, 628, 630, 632, and 634, the liquid fuel intake pipe 622 and lead wires 731 to 78 and the through-holes of the plate 793 are bonded and sealed with, for example, a glass material or an insulation sealing material such that atmospheric air or water does not invade the inside of the heat insulation package 791 through these through-holes. In addition, the internal space of the heat insulation package 791 is sealed and is vacuum-evacuated, and its internal space is set at a vacuum or lower pressure and is provided as a vacuum heat insulation structure. In this manner, the heat at each unit of the microreactor module 600 is restricted from being propagated to the outside, so that a thermal loss can be reduced.

The pipes 626, 628, 639, 632, and 634 and the liquid fuel intake pipe 622 are partially exposed to the outside of the heat insulation package 791. As a consequence, at the inside of the heat insulation package 791, the pipes and liquid fuel intake pipes are erected as columns with respect to the plate 793. Then, the high-temperature reaction unit 604, the low-temperature reaction unit 606, and the coupling unit 608 are supported by the pipes 626, 628, 630, 632, and 624 and the liquid fuel intake pipe 622, so that the high-temperature reaction unit 604, the low-temperature reaction unit 606, and the coupling unit 608 are spaced from the internal face of the heat insulation package 791.

It is desirable that the liquid fuel intake unit 622 is connected to the bottom face of the low-temperature reaction unit 606 at a gravity of the entirety of the high-temperature reaction unit 604, the low-temperature reaction unit 606, and the coupling unit 608 in planar viewing.

Although the getter material 728 is provided, for example, on the surface of the low-temperature reaction unit 606, a position at which the getter material 728 is to be provided is not limited in particular as long as it is positioned inside of the heat insulation package 791.

Now, an operation of the microreactor module 600 will be described here.

First, when a voltage is applied between the lead wires 737 and 738, the getter material 728 is heated by a heater, and thus activated. In this manner, the gas contained in the heat insulation package 791 is adsorbed by the getter material 728, so that the degree of vacuum in the heat insulation package 791 increases and heat insulation efficiency is improved.

When a voltage is applied between the lead wires 731 and 732, the heating wire 720 generate a heat, and the low-temperature reaction unit 606 is heated. When a voltage is applied between the lead wires 733 and 734, the heating wire 732 generates a heat, and the high-temperature reaction unit 604 is heated. When a voltage is applied between the lead wires 735 and 736, the heating wire 724 generates a heat, and the upper part of the liquid fuel intake pipe 622 is heated. Since the liquid fuel intake pipe 622, the high-temperature reaction unit 604, the low-temperature reaction unit 606, and the coupling unit 608 are made of a metal material, heat conduction is likely to occur therebetween. The currents/voltages of the heating wires 720, 722, and 724 are measured by a control device, whereby the temperatures of the liquid fuel intake pipe 622, the high-temperature reaction unit 604, and the low-temperature reaction unit 606 are measured, and the measured temperature is fed back to the control device. As a consequence, the voltages of the voltages of the heating wires 720, 722, and 724 are controlled by the control device, with the result that temperature control for the liquid fuel intake pipe 622, the high-temperature reaction 604, and the low-temperature reaction unit 606 is achieved.

Assume that, with the liquid fuel intake pipe 622, the high-temperature reaction unit 604, and the low-temperature reaction unit 606 heated by the heating wires 720, 722, and 724, a liquid mixture of a liquid fuel and water is continuously or intermittently supplied to the liquid fuel intake pipe 622 by means of a pump or the like. In this case, the liquid mixture is absorbed by a liquid absorption material 623, and the liquid mixture permeates toward the upper portion in the liquid fuel intake pipe 622 in accordance with a capillary phenomenon. Then, the liquid mixture contained in the liquid adsorptive material 623 is vaporized, and the gas mixture of the fuel and water evaporates from the liquid absorption material. Since the liquid mixture is vaporized in the liquid absorption material 623, rapid boiling can be reproduced and stable vaporization can be achieved.

The gas mixture having evaporated from the liquid absorption material 623 flows into the reformer 400 through the through-hole 678, the reforming fuel supply flow channel 702, and the intake port 432. Thereafter, when the gas mixture flows into the deformer 400, the gas mixture is heated to cause a catalytic reaction, whereby a hydrogen gas or the like is produced (In the case where the fuel is methanol, reference should be made to the above chemical formulas (1) and (2)).

The gas mixture (containing hydrogen gas, carbon dioxide gas, carbon monoxide gas and the like) produced by the reformer 400 flows into the mixture chamber 708 through the discharge port 99 and the communication flow channel 704. On the other hand, air is supplied to the pipe 634 by means of a pump or the like, and flows into the mixture chamber 708 through the though hole 675 and the air supply flow channel 706. Consequently, a mixture gas containing a hydrogen gas and air are mixed with each other.

Then, the gas mixture containing air, a hydrogen gas, a carbon monoxide gas, a carbon dioxide gas and the like flows into the carbon monoxide removing unit 1B from the mixture chamber 708 through the intake port 67. When the gas mixture flows in the carbon monoxide removing unit 1B, the carbon monoxide gas contained in the gas mixture is selectively oxidized, and the carbon monoxide gas is removed.

The gas mixture from which the carbon monoxide has been removed is supplied from the discharge port 99 to the fuel electrode or the like of the fuel cell via the discharge chamber 718, the through-hole 671, and the pipe 626. In the fuel cell, electricity is produced by electrochemical reaction of a hydrogen gas, and an OFF gas containing an unreacted hydrogen gas or the like is discharged from the fuel cell.

The above-described operation is provided as an operation at the initial stage. During the subsequent power generating operation, the liquid mixture is continuously supplied to the liquid fuel intake pipe 622. Then, air is mixed with the OFF gas discharged from the fuel cell, and its gas mixture (hereinafter, referred to as combustion gas mixture) is supplied to the pipe 632 and the pipe 628. The combustion gas mixture supplied to the pipe 632 flows into the combustion flow channel 625 through the through-hole 674, the combustion fuel supply flow channel 716, and the through-hole 676, and the combustion gas mixture is catalytically combusted in the combustion flow channel 625 to produce a combustion heat. Since the combustion flow channel 625 circulates the liquid fuel intake pipe 622 at the lower side of the low-temperature reaction unit 606, the liquid fuel intake pipe 622 is heated by the combustion heat and the low-temperature reaction unit 606 is heated. For this reason, electric power to be supplied to the heating wires 720 and 724 can be reduced, and energy utilization efficiency is improved.

On the other hand, the combustion gas mixture supplied to the pipe 628 flows into the combustion chamber 712 through the through-hole 672 and the combustion fuel supply flow channel 710, and the combustion gas mixture is catalytically combusted in the combustion chamber 712. In this manner, a combustion heat is generated. The reformer 400 is heated by this combustion heat. As a consequence, electric power to be supplied to the heating wire 722 can be reduced, and energy utilization efficiency is improved.

The liquid fuel reserved in the fuel container is vaporized, so that the combustion gas mixture of the vaporized fuel and air may be supplied to the pipes 628 and 632.

In a state that a liquid mixture has been supplied to the liquid fuel intake pipe 622 and the combustion gas mixture has been supplied to the pipes 628 and 632, the control device controls voltage to be applied to the heating wires 720, 722, and 724 and controls a pump or the like while measuring a temperature in accordance with the resistance values of the heating wires 720, 722, and 724. When the pump is controlled by the control device, a flow rate of the combustion gas mixture to be supplied to the pipes 628 and 632 is controlled, whereby a combustion heat rate of each of the combustors 612 and 614 is controlled. In this manner, the control device controls the heating wires 720, 72, and 724 and the pump to achieve temperature control of each of the liquid fuel intake pipe 622, the high-temperature reaction unit 604, and the low-temperature reaction unit 606. Here, temperature control is made such that the high-temperature reaction unit 604 ranges from 250° C. to 400° C., and preferably ranges from 300° C. to 380° C., and that the low-temperature reaction unit 606 is set at a temperature that is lower than that of the high-temperature reaction unit 4, specifically ranges from 120° C. to 200° C., and further preferably, ranges from 140° C. to 180° C.

As has been described above, according to the present embodiment, the inside of the carbon monoxide removing unit 1B is partitioned into the 16 reaction chambers 68, 70, 72, 74, 76, 78, 80, 82, 84, 86, 88, 90, 92, 94, 96, and 98 by the partition member 20, these reaction chambers communicate with any two reaction chambers adjacent to each other by the communicating ports 69, 71, 73, 75, 77, 79, 81, 83, 85, 87, 89, 91, 93, 95, and 97 provided at the partition member 20, and from the intake port 67 to the discharge port 99 provided in the reaction vessel 10 communicate with one carbon monoxide removing flow channel. As a consequence, sectional dimensions of the flow channel is reduced, it is possible to reduce a diffusion time of a gas mixture of a hydrogen gas, an oxygen gas, and a carbon monoxide gas serving as a reactant up to a catalyst provided on a surface of a flow channel. In addition, a reaction time can be increased while a length of a flow channel is increased.

The floor plate 21 and the wall plates 41 to 47 are vertically assembled by combining the floor plate 21 so as to sandwich the floor plate 21 between portions of the slots 31 to 37 and so as to sandwich the wall plates 41 to 47, respectively, between portions of the slots 51, 52, 53, 54, 55, 56, and 57, thereby making it possible to form the partition member 20. Accordingly, the carbon monoxide removing unit 1B can be easily assembled by using the partition member 20.

In addition, the internal space of the heat insulation package 791 is provided as a heat insulation space. The high-temperature reaction unit 604 is spaced from the low-temperature reaction unit 606, and a gap from the high-temperature reaction unit 604 to the low-temperature reaction unit 606 is provided as a length of the coupling unit 608. Therefore, a channel of heat conduction from the high-temperature reaction unit 604 and the low-temperature reaction unit 606 is limited to the coupling unit 608, and heat conduction to the low-temperature reaction unit 606 that does not require a high temperature is limited. In particular, the height and width of the coupling unit 608 are smaller than those of both the reaction units 604 and 606, and therefore, heat conduction through the coupling unit 608 is also restricted to the minimum. For this reason, a thermal loss of the high-temperature reaction unit 604 can be restricted and the low-temperature reaction unit 606 can be restricted from rising in temperature to a set temperature or higher. That is, even in the case where the high-temperature reaction unit 604 and the low-temperature reaction unit 606 are housed in one heat insulation package 791, a temperature difference can be produced between the high-temperature reaction unit 604 and the low-temperature reaction unit 606.

Since the flow channels 702, 704, 710, and 714 forming a communication between the low-temperature reaction unit 606 and the high-temperature reaction unit 604 are provided so as to be collected in one coupling unit 608, a stress produced with the coupling unit 608 or the like can be reduced. In other words, because a temperature difference exists between the high-temperature reaction unit 604 and the low-temperature reaction unit 606, the high-temperature reaction unit 604 inflates more significantly than the low-temperature reaction unit 606. However, the stress produced with the coupling unit 608 or the like can be restricted because the high-temperature reaction unit 604 has a free end except for the coupling unit with the coupling unit 608. In particular, the coupling unit 608 is smaller in height and width than the high-temperature reaction unit 604 or the low-temperature reaction unit 606, and further, the coupling unit 608 connects to the high-temperature reaction unit 604 and the low-temperature reaction unit 606 at the center part in the widthwise direction of the high-temperature reaction unit 604 and the low-temperature reaction unit 606. As a result, the stress is restricted from being generated on the coupling unit 608, the high-temperature reaction unit 604, and the low-temperature reaction unit 606.

Although the pipes 626, 628, 630, 632, and 634, and the liquid fuel intake pipe 622 extend to the outside of the heat insulation package 791, they are all connected to the low-temperature reaction unit 606. For this reason, direct heat conduction from the high-temperature reaction unit 604 to the outside of the heat insulation package 791 can be restricted, and a thermal loss of the heat-insulation reaction unit 604 can be restricted. Accordingly, even in the case where the high-temperature reaction unit 604 and the low-temperature reaction unit 606 are housed in one heat insulation package 791, a temperature difference can be produced between the high-temperature reaction unit 604 and the low-temperature reaction unit 606.

The bottom face of the coupling unit 608, the bottom face of the high-temperature reaction unit 604, and the bottom face of the low-temperature reaction unit 606 are in plane with one another. As a consequence, the heating wire 722 can be patterned comparatively easily, and disconnection of the heating wire 722 can be restricted.

In addition, the liquid fuel intake pipe 622 is filled with the liquid absorption material 623, and the liquid fuel intake pipe 622 is provided as the vaporizer 610. Thus, a temperature state required for vaporization of a liquid mixture (a state in which an upper part of the liquid fuel intake pipe 622 is set at 120° C.) can be established while downsizing simplification of the microreactor module 600 are promoted.

Further, the combustor plate 624 is provided at the periphery of a liquid fuel intake pipe at the upper end of the liquid fuel intake pipe 622, and further, the liquid absorption material 623 contained in the liquid fuel intake pipe 622 is filled up to the height position of the combustor plate 624, so that the combustion heat in the first combustor 612 can be efficiently used for vaporization of the liquid mixture.

The present invention is not limited to the above-described embodiments. Various modifications and design changes may occur without departing from the spirit of the invention.

For example, in the above-described embodiments, the partition member 20 is formed in combination between the floor plate 21 parallel to the top plate 12 and the bottom plate 17 and the wall plates 41 to 47 parallel to side plates 14 and 16. Without being limited thereto, however, the present invention may be formed by combining the wall plates parallel to the side plates 13 and 15 and the wall plates 41 to 47, or may be formed by combining the wall plates parallel to the side plates 13 and 15 and the floor plate 21. While, in the above-described embodiments, only one floor plate 21 parallel to the ceiling 12 and the bottom plate 17 is used, a plurality of floor plates may be used.

THIRD EMBODIMENT

Now, a third embodiment of the reactor according to the present invention will be described here.

Figure 20:
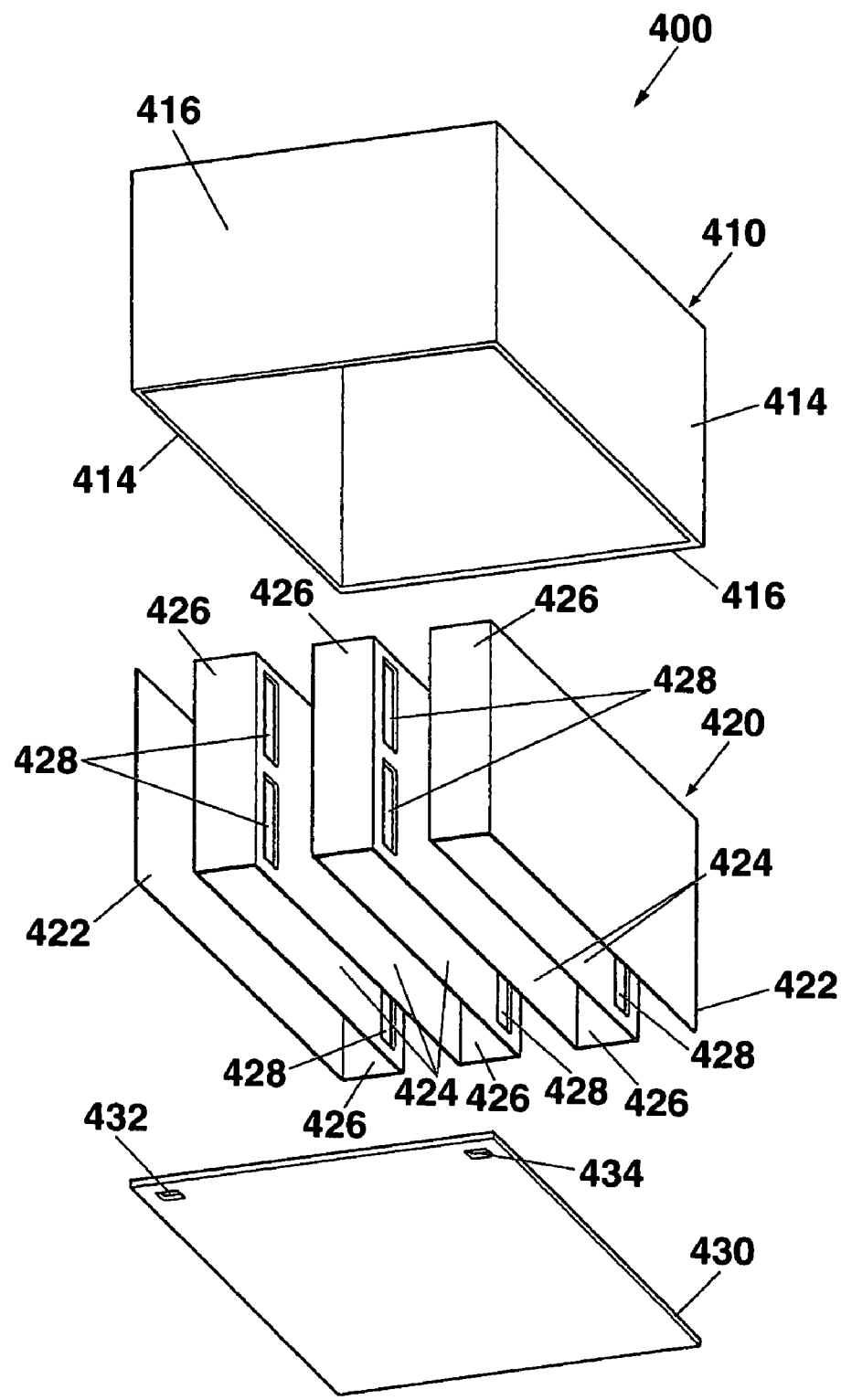
FIG. 20 is an exploded perspective view of a reaction device in a third embodiment of the reactor according to the present invention as viewed from a slant lower portion.
Figure 21A:
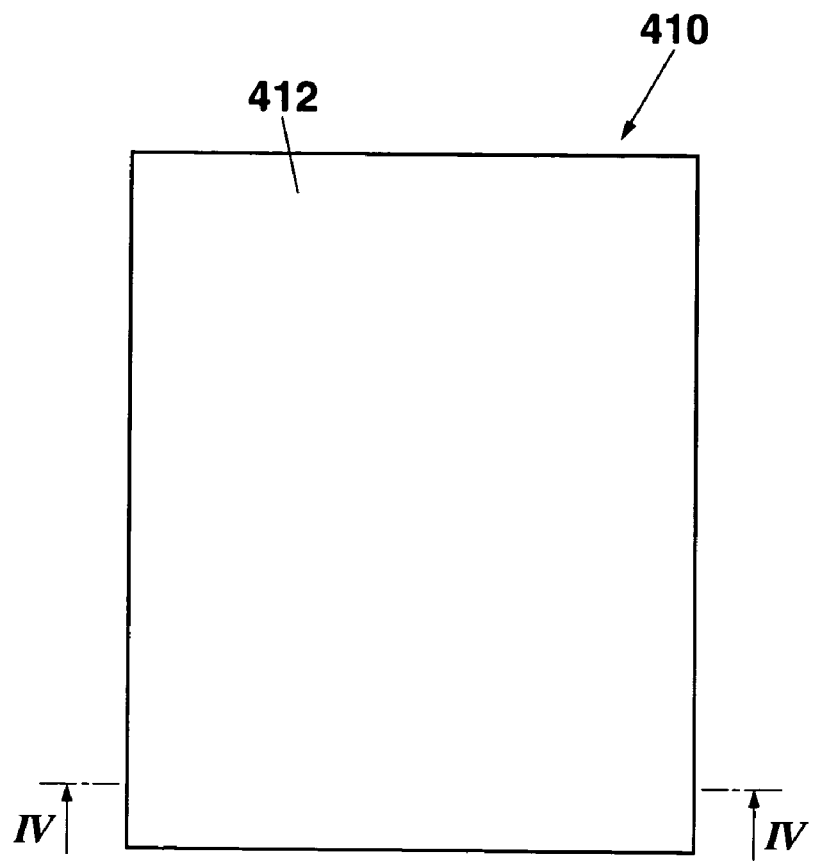
FIGS. 21A and 21B are a top view and a bottom view of the reaction device in the third embodiment.
Figure 21B:
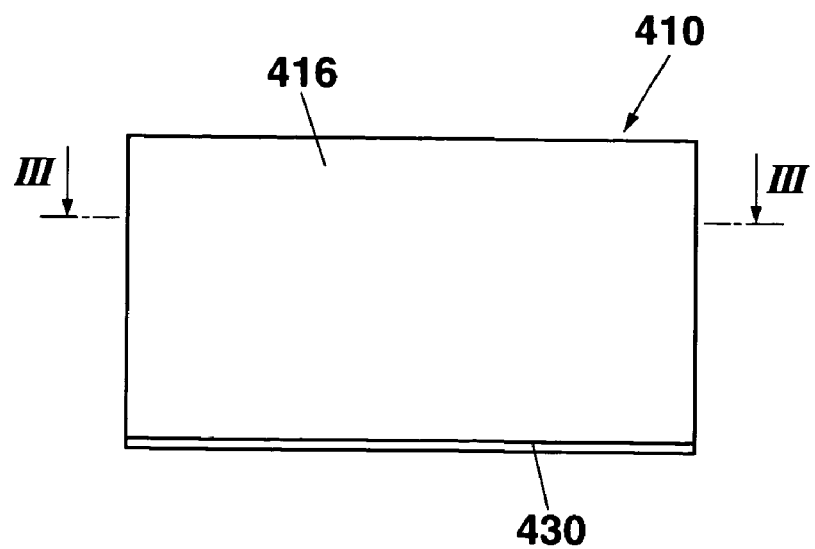
Figure 22:
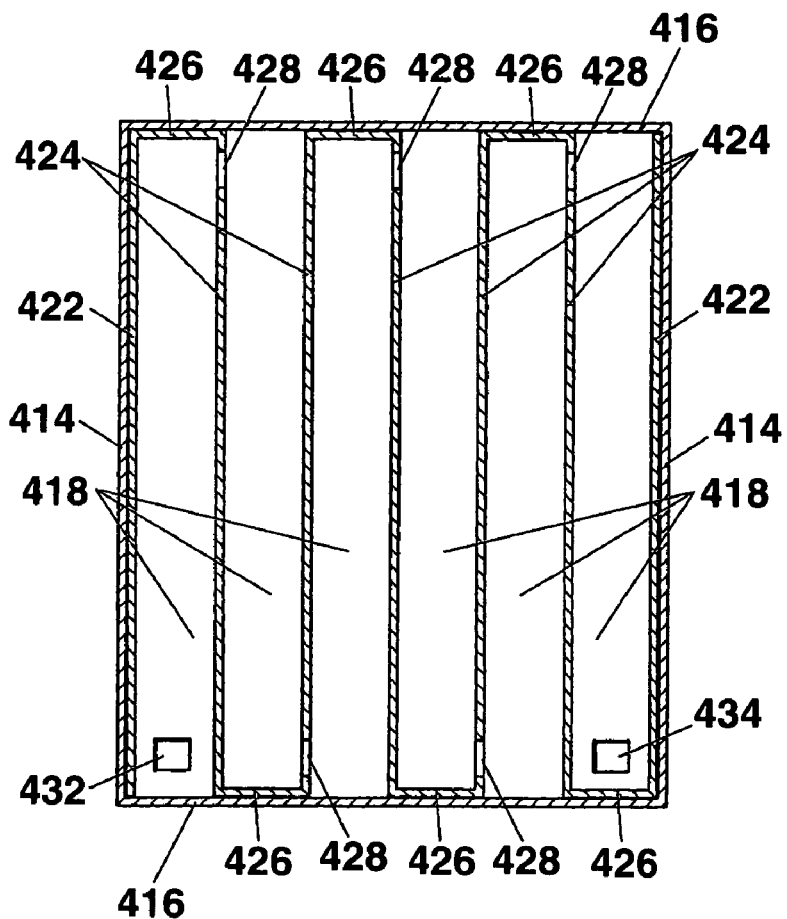
FIG. 22 is a cross sectional view taken along the section line III-III of FIG. 21B.
Figure 23:
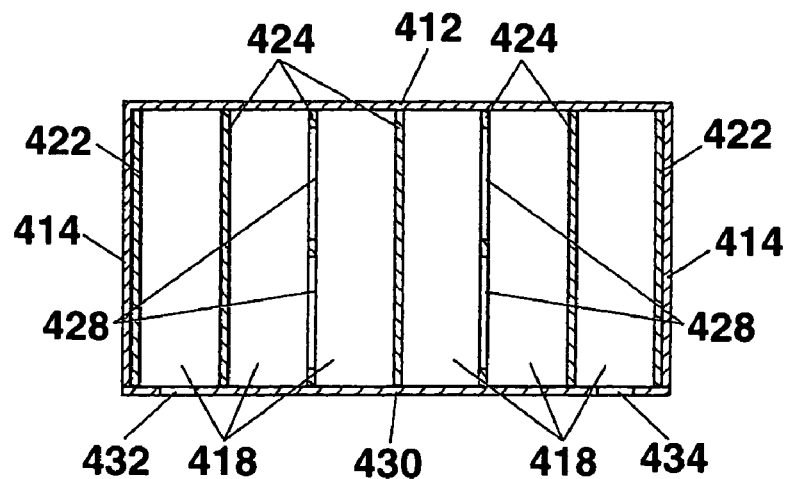
FIG. 23 is a cross sectional view taken along the section line IV-IV of FIG. 21A.

FIG. 20 is an exploded perspective view of a reaction device 400 in the third embodiment of the reactor according to the invention as viewed in a slant lower portion. FIGS. 21A and 21B are a top view and a lower view of the reaction device in the present embodiment. FIG. 22 is a cross sectional view taken along the section line III-III of FIG. 21B. FIG. 23 is a cross sectional view taken along the section line IV-IV of FIG. 21A.

As shown in the figures, the reactor 400 comprises a box type member 410 that opens at the bottom face; a partition plate (third partition plate: partition member) 420 housed in the box type member 410; and a bottom plate 430 that closes the lower side opening of the box type member 410.

The box type member 410, the partition plate 420, and the bottom plate 430 may be made of a planar metal material such as a stainless steel, may be made of a ceramics material, may be made of a glass material, or may be made of a resin material.

The box type member 410 has a top plate 412 formed in a square or a rectangle shape; a pair of side plate 414 arranged in a state that they are connected to two opposite edges among the four edges of the top plate 412 at right angle to the top plate 412; and a pair of side plates 416 is assembled in a state that they are connected to the other two opposite edges of the top plate 412 at right angle to the top plate 412. The side plates 414 are arranged to each other in a state that they are vertically connected to each other with respect to the side plates 416. The square frame shape or the rectangular frame shape is provided by these two pair of side plates 414 and 416.

A rim part of the bottom plate 430 is joined to a lower edge part of each of the side plates 414 and 416 so as to parallel to the top plate 412. The bottom face opening of the box type member 410 is thus closed by the bottom plate 430, whereby a reaction vessel formed in a parallel tetrahedron shape having a hollow is configured.

The partition plate 420 is formed in a rectangular wavy shape in a longitudinal cross-section. More specifically, the partition plate 420 has: a pair of planar reinforce portions 422 opposed to each other at both sides thereof; a plurality of partition portions 424 opposed to the reinforce portions 422 between the two reinforce portions 422; and a plurality of return portions 426 connected between the partition portions 424 and 424 adjacent to each other or between the adjacent partition portion 424 and reinforce portion 422 at one edge of the four edges of the partition portion 424.

The partition plate 420 is housed in the box type member 410 such that the wave height direction is parallel to the top plate 412. Namely, the reinforce portions 422 and 422 are provided as plate portions at both sides of the partition plate 420, the reinforce portions 422 come into facial contact width the side plates 414, and preferably, the reinforce portions 422 are joined to the side plates 414 by means of welding. In this manner, the side plates 414 can be reinforced to improve the rigidity of the reaction vessel of the reaction device 400.

The return portions 426 of the partition plate 420 come into facial contact width the side plates 416, and preferably, the return portions 426 are joined to the side plates 416 by means of welding. In this manner, the side plates 416 can be reinforced to improve the rigidity of the reaction vessel of the reaction device 400.

An upper edge part of the return portion 426, an upper edge part of the reinforce portion 422, and an upper edge part of the partition portion 424 are provided as an upper side rim part of the partition plate 420, and the lower side rim part of the partition plate 420 comes into contact with the top plate 412 of the box type member 410, and preferably is joined thereto by means of welding. In this manner, the top plate 412 can be reinforced to improve the rigidity of the reaction vessel of the reaction device 400.

A lower edge part of the return portion 426, a lower edge part of the reinforce portion 422, and a lower edge part of the partition portion 424 are provided as a lower side rim part of the partition plate 420, and the lower side rim part of the partition plate 420 comes into contact with the bottom plate 413, and preferably is joined thereto by means of welding. In this manner, the bottom plate 413 can be reinforced to improve the rigidity of the reaction vessel of the reaction device 400.

Since the partition plate 420 is thus housed in the box type member 410, a hollow defined by the box type member 410 and the bottom plate 430 is partitioned into a plurality of spaces 418 by the partition portion 424. Among the plurality of these spaces 418, an intake port 432 communicating with a space 418 between one reinforce portion 422 and the partition portion 424 is formed on the bottom plate 430, and a discharge port 434 communicating with a space 418 between the other reinforce portion 422 and the partition portion 424 is formed on the bottom plate 430.

A pair of top and bottom through-holes (first through-holes) 428 and 428 are formed in the vicinity of one end of the partition portion 424 in the wave height direction, and the adjacent spaces 418 communicate with each other via the through-holes 428. Consequently, a hollow defined by the box type member 410 and the bottom plate 430 is provided in a flow channel shape from the intake port 432 and the discharge port 434, and its flow channel is formed in a spiral shape.

In this reaction device 400, a reactant sequentially flows in the space 418 when the reactant is supplied to the intake port 432 by a pump or the like. While the reactant flows in the space 418, a product is produced from the reactant. Then, the product is discharged from the discharge port 434 to the outside. In each space 418, the reactant flows in the wave height direction of the partition plate 420.

Moreover, in accordance with usage of the reaction device 400, a heater (such as heating wire or combustor, for example) may be provided on the external face of at least one of the box type member 410 and the bottom plate 430, a catalyst can be carried to the partition plate 420 (primarily, on the surface of the partition plate 424), or a catalyst may be carried onto an internal face of at least one of the box type member 410 and the bottom plate 430.

For example, in the case where the reaction device 400 is used as a vaporizer, a heating wire or a combustor is provided on the external face of at least one of the box type member 410 and the bottom plate 430. By doing this, a liquid serving as a reactant is heated while it flows from the intake port 432 and the discharge port 434, and the liquid is vaporized. In this manner, a gas serving as a product outflows from the discharge port 434.

In the case where the reaction device 400 is used as a reformer, a heating wire or a combustor is provided on the external face of at least one of the box type member 410 and the bottom plate 430, and a reforming catalyst (for example, Cu/ZrO-based catalyst or Pd/ZnO-based catalyst) is carried onto the surface of the partition plate 424. By doing this, a gas mixture of a fuel and water serving as a reactant (for example, gas mixture of methanol and water) is heated while it flows from the intake port 432 to the discharge port 434, and a hydrogen gas or the like is produced from the gas mixture by the reforming catalyst. In this manner, the gas mixture containing the hydrogen gas or the like outflows as a product from the discharge port 434.

In the case where the reaction device 400 is used as a carbon monoxide removing unit, a heating wire or a combustor is provided on the external face of at least one of the box type member 410 and the bottom plate 430, and a carbon monoxide selective oxidization catalyst (for example, platinum) is carried onto the surface of the partition portion 424. By doing this, the gas mixture of a hydrogen gas, an oxygen gas, and a carbon monoxide gas serving as a reactant is heated while the gas mixture flows from the intake port 432 to the discharge port 434, and the carbon monoxide gas is selectively oxidized by the carbon monoxide selective oxidization catalyst. In this manner, the gas from which the carbon monoxide gas has been removed outflows as a product from the discharge port 434.

In the case where the reaction device 400 is used as a combustor, a combustion catalyst (for example, platinum) is carried onto the surface of the partition portion 424. By doing this, while a gas mixture of a hydrogen gas and an oxygen gas serving as a reactant flows from the intake port 432 to the discharge port 434, the hydrogen gas is combusted. In this manner, water serving as a product outflows from the discharge port 434.

Now, a description will be given with respect to a heat insulation structure for restricting a thermal loss of the reaction device 400.

Figure 24:
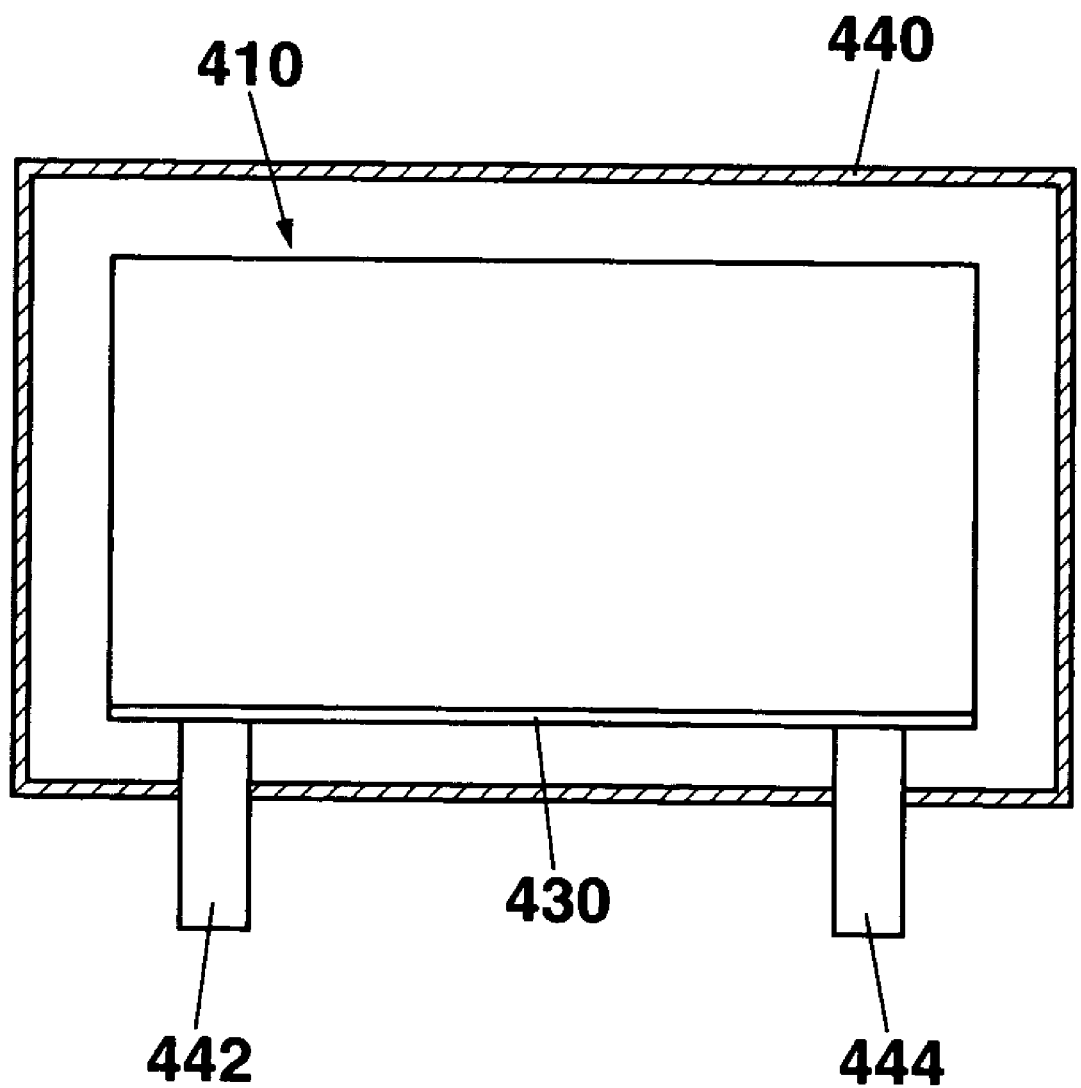
FIG. 24 is a perspective side view of a state in which a heat insulation package is provided in the reaction device in the third embodiment.

FIG. 24 is a perspective side view of a state in which a heat insulation package is provided in the reaction device in the present embodiment.

A heat insulation package (heat insulation vessel) 440 is made of a metal material such as a stainless steel, or a ceramics, for example. The box type member 410 and the bottom plate 430 are housed in the heat insulation package 440. In this case, two pipes 442 and 444 are penetrated on a wall face of the heat insulation package 440, and an end of one tube 442 is connected to the intake port 432 in the heat insulation package 440 while the other end of the pipe 444 is connected to the discharge port 434. Here, assume that the box type member 410 and the bottom plate 430 are supported by the two pipes 442 and 444, and spaced from the internal face of the heat insulation package 440. In this case, direct heat conduction from the box type member 410 and the bottom plate 430 to the heat insulation package 440 can be restricted, and heat insulation property is improved more significantly. Further, the inside of the heat insulation package 440 is vacuum-evacuated, and the inside space is set at a vacuum pressure that is lower than an atmospheric pressure to thereby form a vacuum heat insulation structure. If the internal space of the heat insulation package 440 is set at a vacuum pressure, the inside of the reaction vessel of the reaction device 400 is set at a normal pressure, and thus, is subjected to a stress in a direction in which the box type member 410 and the bottom plate 430 inflate. However, the reinforce portions 422 are engaged with the side plates 414 of the box type member 410, so that the side plates 414 are reinforced. The return portions 426 are joined to the side plates 416, so that the side plates 416 are reinforced. The lower rim part of the partition portion 424 is joined to the bottom plate 430, whereby the bottom plate 430 is reinforced. Then, the upper edge part of the partition portion 424 is joined to the top plate 412, whereby the top plate 412 is reinforced. By these elements, the entire reaction vessel is reinforced, and is prevented from being destroyed and deformed by a stress.

MODIFIED EXAMPLE

Figure 25:
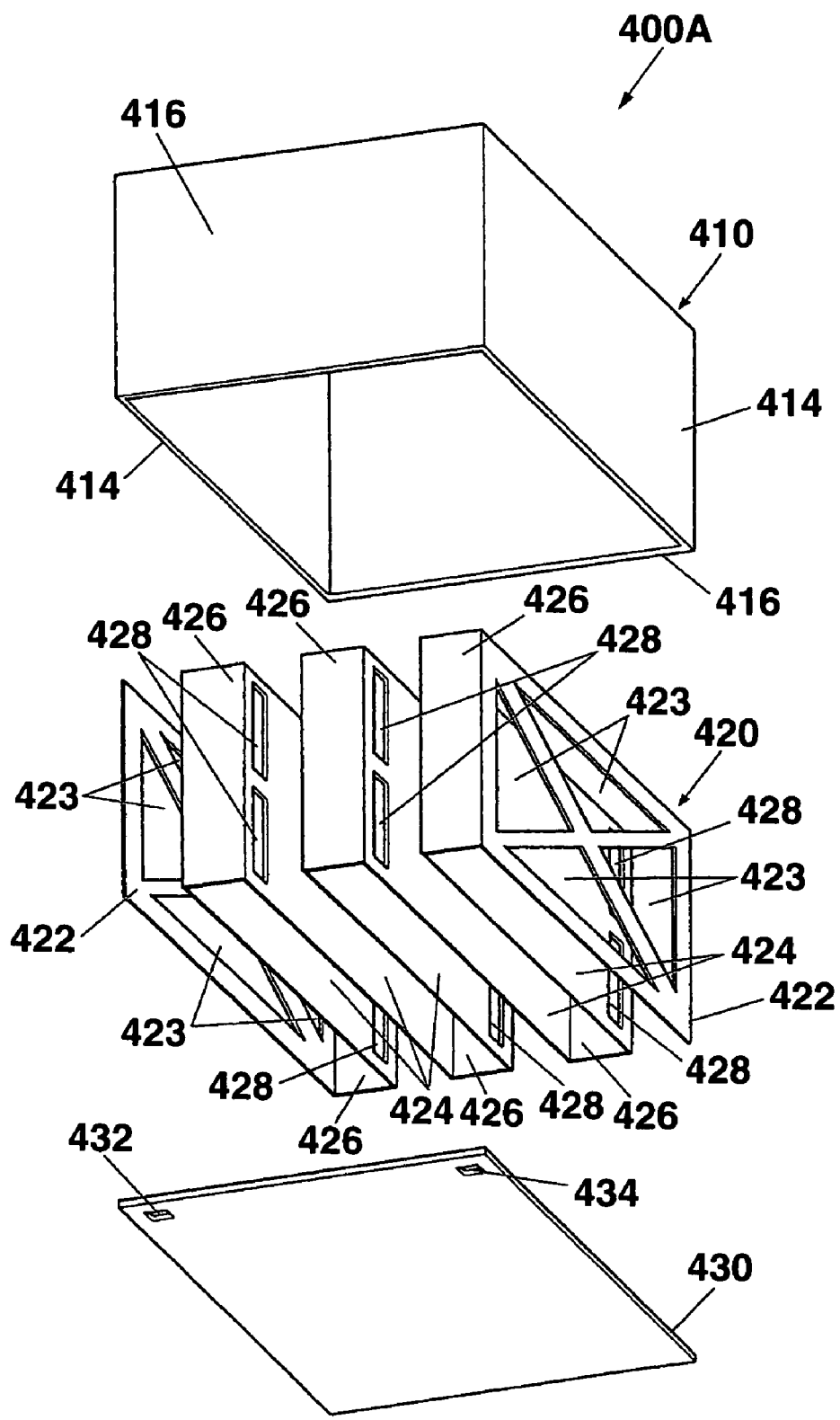
FIG. 25 is an exploded perspective view of a modified example of the reaction device in the third embodiment.

FIG. 25 is an exploded perspective view of a modified example of the reaction device in the present embodiment.

In this reaction vessel 400A, four triangular openings 423 are formed at a reinforce portion 422.

The reaction device 400A is provided in the same manner as that in the reaction device 400 of FIG. 20 except that the openings 423 are formed. Therefore, like constituent elements corresponding to the reaction device 400 shown in FIG. 20 are designated with like reference numerals, and a duplicate description is omitted here.

The openings 423 are formed at the reinforce portion 422, whereby a volume of the reinforce portion decreases, and a thermal capacitance of the reinforce portion can be reduced. As a consequence, the thermal loss in the reinforce portion 422 can be reduced, and a heat can be efficiently utilized for the sake of reaction. In particular, even if the four rectangular openings 423 are formed at the reinforce portion 422, the shape of the reinforce portion 422 is formed in the shape such that sleeves are pushed up with a cord, with the result that the lowered intensity of the reinforce portion 422 can be reduced to the minimum.

FOURTH EMBODIMENT

Now, a fourth embodiment of the reactor according to the present embodiment will be described here.

Figure 26:
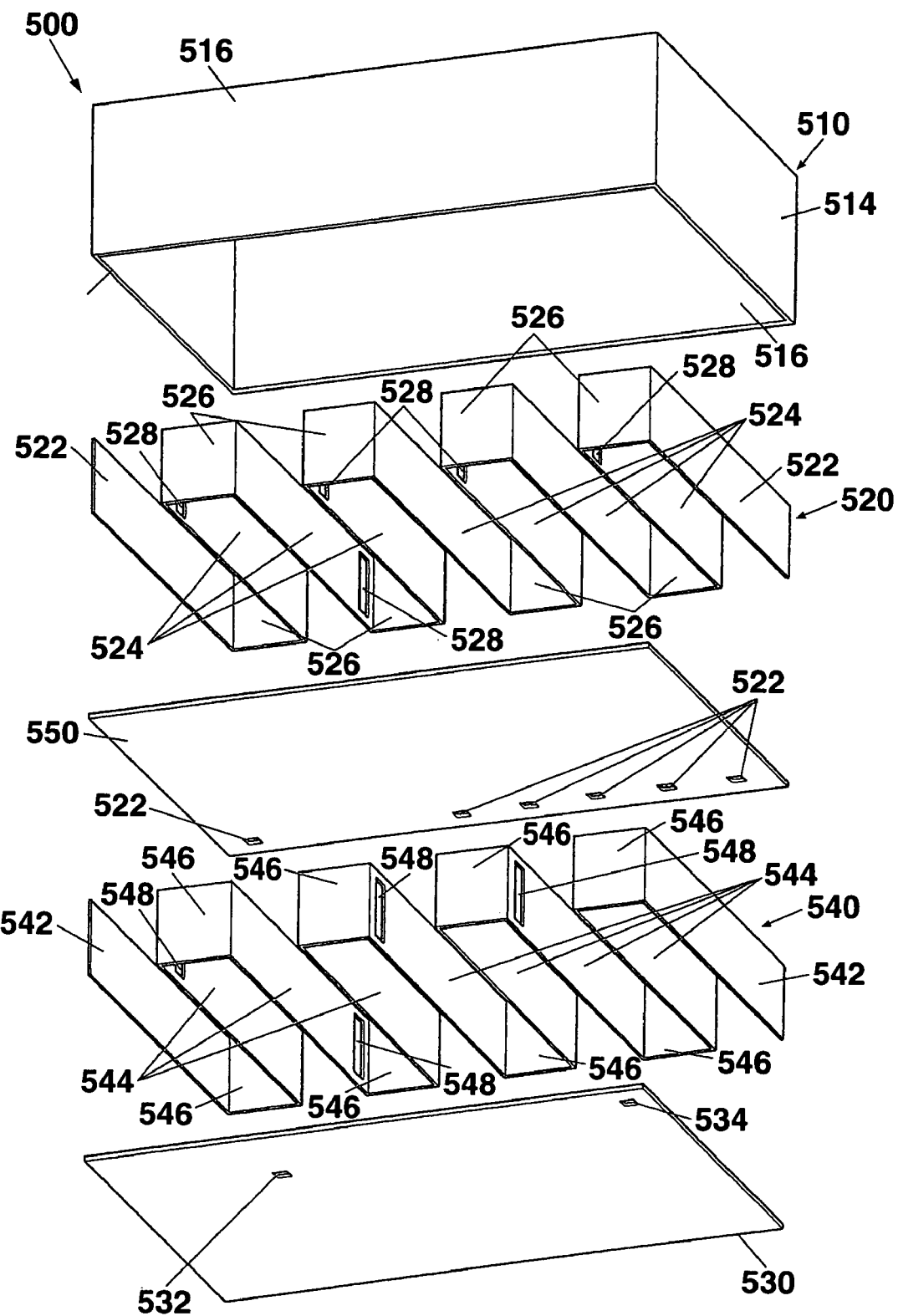
FIG. 26 is an exploded perspective view of a reaction device in a fourth embodiment of the reactor according to the present invention as viewed from a slant lower portion.
Figure 27A:
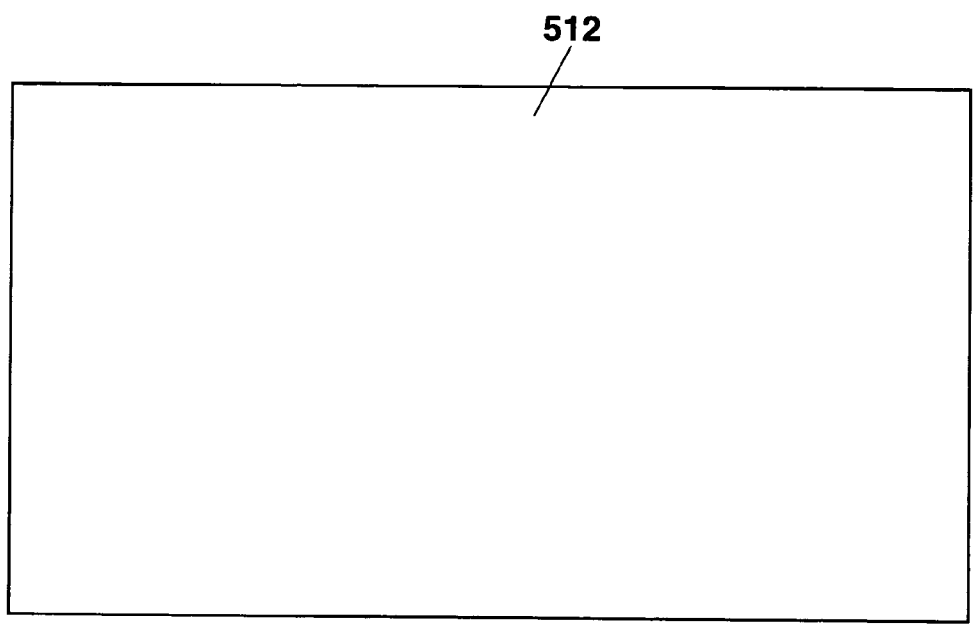
FIGS. 27A and 27B are a top view and a side view of the reaction device in the fourth embodiment.
Figure 27B:
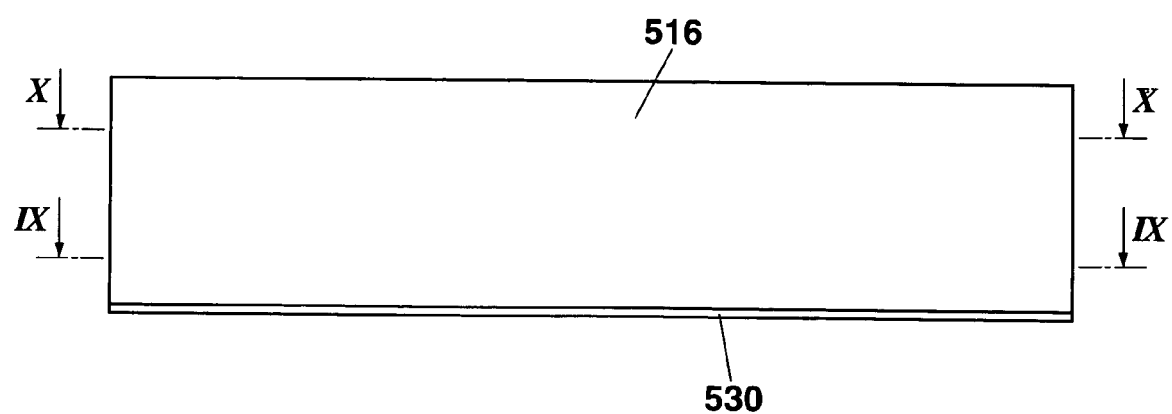
Figure 29:
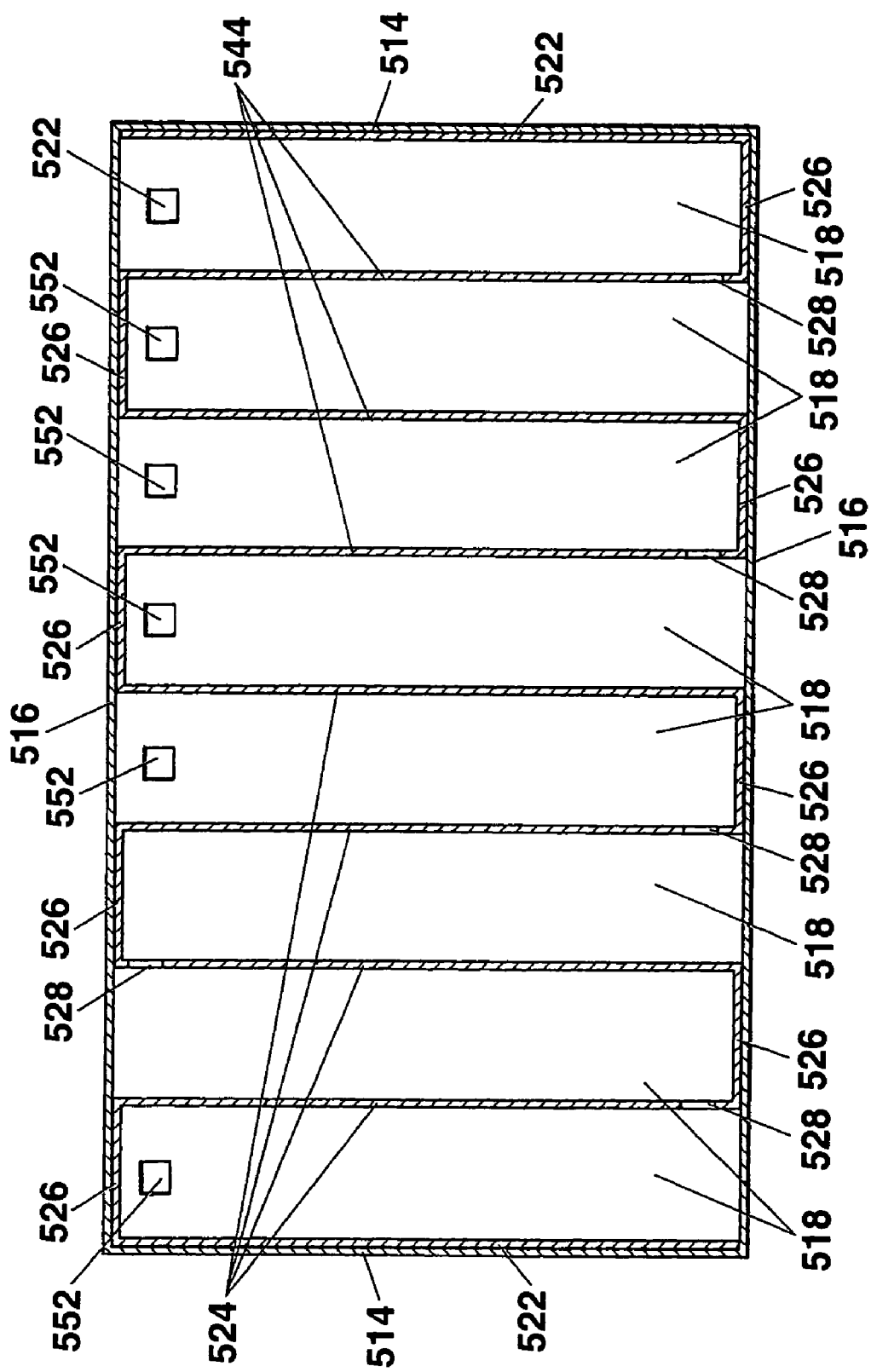
FIG. 29 is a cross sectional view taken along the section line X-X of FIG. 27B.

FIG. 26 is an exploded perspective view of a reaction device 500 in the fourth embodiment of the reactor according to the invention as viewed in a slant lower portion. FIGS. 27A and 27B are a top view and a side view of the reaction device in the present embodiment. FIG. 28 is a cross sectional view taken along the section line IX-IX of FIG. 27B. FIG. 29 is a cross sectional view taken along the section line X-X of FIG. 27B.

The reaction device 500 comprises: a box type member 510 that opens at the bottom face; a bulkhead plate (first bulkhead plate) 550 housed in the box type member 510, the bulkhead plate vertically partitioning a space in the box type member; a bottom plate 530 that closes the lower side opening of the box type member 510; a partition plate (third partition plate) 520 housed in the upper space of the two spaces partitioned by the bulkhead plate 550; and a partition plate (third partition plate) 540 housed in the lower space.

The box type member 510, the partition plate 520, the partition plate 540, the bulkhead plate 550, and the bottom plate 530 may be made of a metal material such as a stainless steel, may be made of a ceramics material, may be made of a glass material, or may be made of a resin material.

The box type member 510 has: a top plate 512 formed in a square or a rectangle shape; a pair of side plates 514 connected in a state that they communicate with two opposite edges among the four edges of the top plate 512 at right angle to the top plate 512; and a pair of side plates 516 connected in a state that they communicate with the other two opposite edges of the top plate 512 at right angle to the top plate 512. One side plate 514 is connected in a state that it vertically communicates with the other side plate 516.

A rim part of the bottom plate 530 is joined to the lower edge part of each of the side plates 514 and 516 such that the bottom plate 530 is parallel to the top plate 512 to configure a reaction vessel formed in a parallel tetrahedron shape having a hollow. The bulkhead plate 550 is housed in the box type member 510 so as to be parallel to the bottom plate 530 and the top plate 512, and a rim of the bulkhead plate 550 is joined to the vertical bellows part of each the side plates 514 and 516.

The partition plate 520 is formed in a rectangular wavy shape. Namely, the partition plate 520 has: a pair of planar reinforce portions 522 opposed to each other at both sides thereof; a plurality of partition portions 524 opposed to the reinforce portions between the two reinforce portions 522; and a plurality of return portions 526 connected between the adjacent partition portions 524 or between the adjacent partition portion 524 and reinforce portion 522 at one edge of the four edges of the partition portion 524.

Like the partition plate 520, the partition plate 540 has a pair of reinforce portions 542, a plurality of partition portions 544, and a plurality of return portions 546. The partitioning shape of the partition plate 540 is formed in the same manner as that of the partition plate 520.

The partition plate 520 is housed in a space between the bulkhead plate 550 and the top plate 512 such that the wave height direction is parallel to the top plate 512. The reinforce portions 522 are provided as planar portions at both sides of the partition plate 520, the reinforce portions 522 come into facial contact with the side plates 514, and preferably, the reinforce portions 522 are joined to the side plates 514 by means of welding. Further, the return portions 526 come into facial contact with the side plates 516, and preferably, the return portions 526 are joined to the side plates 516 by means of welding.

An upper edge part of the return portion 526, an upper edge part of the reinforce portion 522, and an upper edge part of the partition portion 524 are provided as an upper edge part of the partition plate 520. The upper edge part of the partition plate 520 comes into contact with the top plate 512 of the box type member 510, and preferably, is joined thereto by means of welding. A lower edge part of the return portion 526, a lower edge part of the reinforce portion 522, and a lower edge part of the partition portion 524 are provided as a lower edge part of the partition plate 520, and the lower edge part of the partition plate 520 comes into contact with the separate plate 550, and preferably, is joined thereto by means of welding.

The partition plate 520 is housed in a space between the top plate 512 and the separate plate 550 in the box type member 510, and its space is partitioning into a plurality of spaces 518 by the partition portion 524. The partition plate 540 is housed in a space between the separate plate 550 and the bottom plate 530 such that the wave height direction is parallel to the top plate 512. The reinforce portions 542 are provided as planar portions at both sides of the partition plate 540, the reinforce portions 542 come into facial contact with the side plates 514, and preferably, the reinforce portions 542 are joined to the side plates 514 by means of welding. In addition, the return portions 546 of the partition plate 540 come into facial contact with the side plates 516, and preferably, the return portions 546 are joined to the side plates 516 by means of welding.

An upper edge part of the return portion 546, an upper edge part of the reinforce portion 542, and an upper edge part of the partition portion 544 are provided as an upper edge part of the partition plate 540, and the upper edge part of the partition portion comes into contact with the separate plate 550, and preferably, is joined thereto by means of welding. A lower edge part of the return portion 546, a lower edge part of the reinforce portion 542, and a lower edge part of the partition portion 544 are provided as a lower edge part of the partition plate 540, and the lower edge part of this partition plate 540 comes into contact with the bottom plate 530, and preferably, is joined thereto by means of welding. With such a configuration, the box type member 510 and the bottom plate 530 are reinforced by the partition plates 520 and 540, and the separate plate 550. Thus, the rigidity of the reaction vessel of the reaction device 500 is improved.

The partition plate 540 is housed in a space between the bottom plate 530 and the separate plate 550 in the box type member 510, and the space is partitioned into a plurality of spaces 519 by the partition portion 544. The lower partition plate 540 is laminated on the upper partition plate 520 while sandwiching the separate plate 550, and the upper space 518 is partitioned from the lower space 519 by the separate plate 550.

A through-hole (first through-hole) 528 is formed in the partition portion 524, and the spaces 518 adjacent to each other pass via the through-hole 528. A through-hole 548 is formed in the partition portion 544, and the adjacent spaces 519 pass via the through-hole 548. A plurality of through-holes (second through-holes) 552 are formed in the bulkhead plate 550, and the vertically adjacent spaces 518 and 519 pass via the through-hole 552. These spaces 518 and 519 are provided as a series of spiral flow channels by the through-hole 528, the through-hole 548, and the through-hole 552. An intake port 532 communicating with any of the plurality of spaces 519 is formed at the bottom plate 430, and a discharge port 534 communicating another space 519 is formed at the bottom plate 530.

In the reaction device 500, a reactant is supplied to the intake port 532 by a pump or the like, so that the reactant flows through the plurality of spaces 518 and space 519. While the reactant flows through these spaces 518 and 519, a product is produced from the reactant. Then, the product is discharged from the discharge port 534 to the outside. In each of the spaces 518 and 519, the reactant flows in the wave height direction of the partition plates 520 and 540.

In the reaction device 500 as well, as in the reaction device 400 according to the third embodiment, the following configuration is available in accordance with usage. That is, a heater may be provided on the external face of at least one of the box type member 510 and the bottom plate 530, a catalyst may be carried onto the partition plates 520 and 540, a catalyst may be carried onto the internal face of at least one of the box type member 510 and the bottom plate 530, and a catalyst may be carried onto the separate plate 550.

Also in the present embodiment, as in the third embodiment, the reaction device 500 is housed in the heat insulation package (heat insulation vessel) whose inside is set at a vacuum pressure, whereby a thermal loss of the reaction device can be restricted. In this case as well, the reaction vessel produced by the box type member 510 and the bottom plate 530 is subjected to a stress in an inflating direction. However, also in the embodiment, the box type member 510 and the bottom plate 530 are reinforced by the separate plate 550 and the partition plates 520 and 540, and the rigidity of the reaction vessel of the reaction device 500 is improved, thus making it possible to prevent the reaction vessel from being destroyed or deformed due to a stress. In addition, one of two pipes penetrating the heat insulation package is connected to the intake port 532, and the other is connected to the discharge port 534. The box type member 510 and the bottom plate 530 are supported by the two pipes, and the box type member 510 and the bottom plate 530 are spaced from the internal face of the heat insulation package. In this state, direct thermal conduction to the heat insulation package is restricted, whereby heat insulation property may be improved.

FIFTH EMBODIMENT

Now, a fifth embodiment of the reactor according to the present embodiment will be described here. The identical or like constituent elements of the above-described embodiments are designated by the identical or like reference numerals, and a description thereof is briefly given or omitted here.

Figure 30:
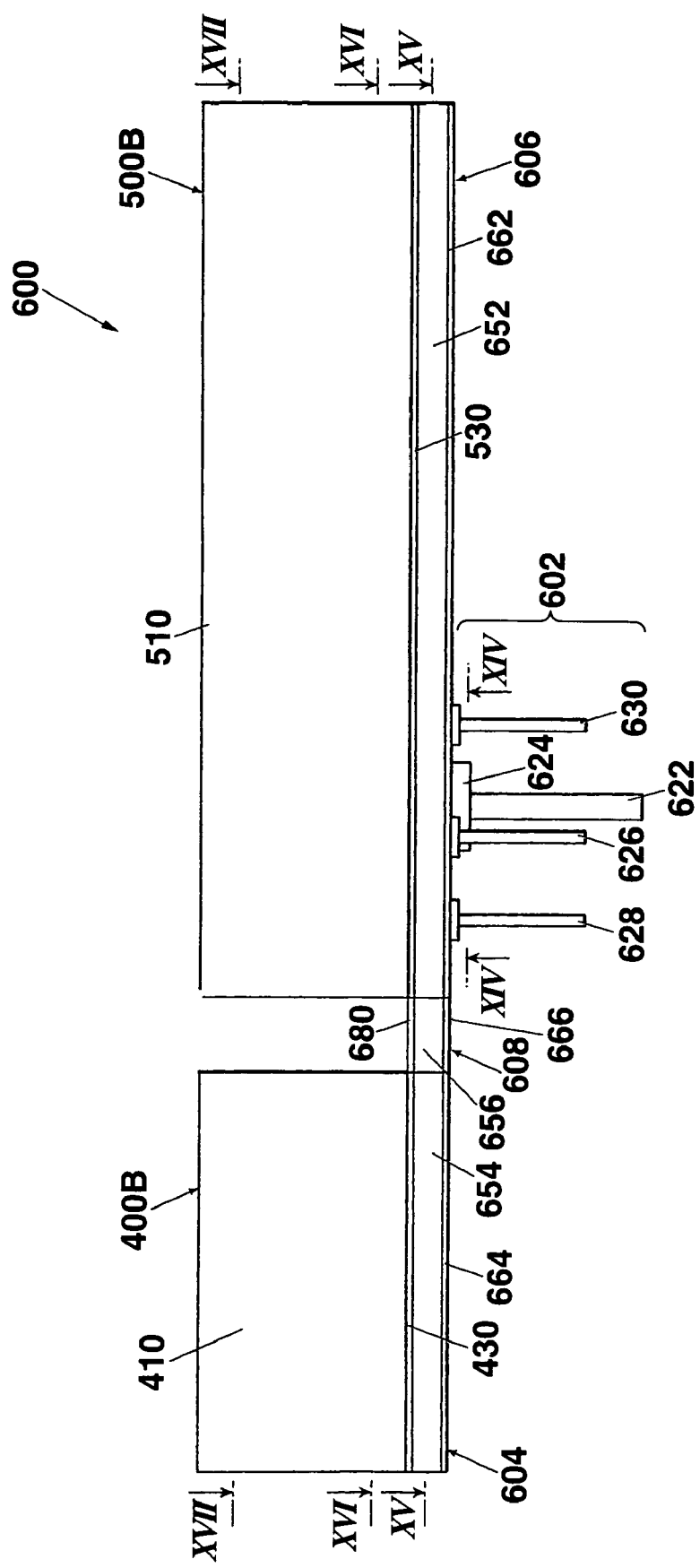
FIG. 30 is a side view of a microreactor module in a fifth embodiment of the reactor according to the present invention.
Figure 31:
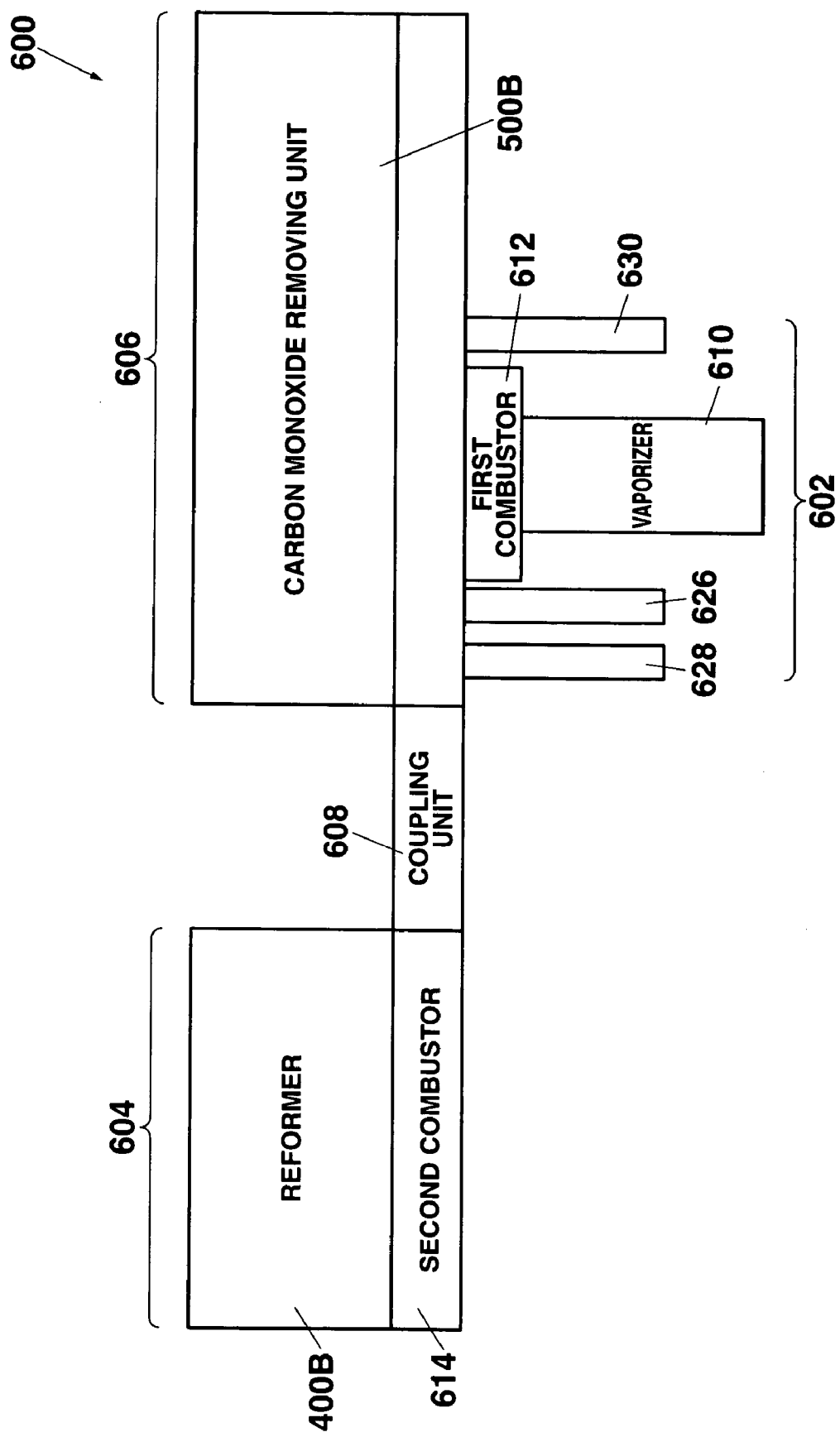
FIG. 31 is a schematic side view of the microreactor module in the fifth embodiment separated in terms of functions.

FIG. 30 is a side view of a microreactor module 600 in the fifth embodiment of the reactor according to the invention. FIG. 31 is a schematic side view of the microreactor module in the present embodiment separated in terms of functions. As shown in FIGS. 30 and 31, the microreactor module 600 has a configuration similar to that of the above microreactor module 600 in the second embodiment, and comprises: a supply/discharge unit 602; a high-temperature reaction unit 604 (first reaction unit) at which a reforming reaction occurs; a low-temperature reaction unit 606 (second reaction unit) at which a selective oxidization reaction occurs; and a coupling unit 608 that sends a reactant or a product between the high-temperature reaction unit 604 and the low-temperature reaction unit 606.

The supply/discharge unit 602A is primarily provided with a vaporizer 610 and a first combustor 612. Air and a gas fuel are supplied respectively separately or as a gas mixture to the first combustor 612, and a heat is generated by a catalytic combustion of them. Water and a liquid fuel are supplied respectively separately or in a mixed state from a fuel container to the vaporizer 610, and the water and the liquid fuel are vaporized by a combustion heat in the first combustor 612.

The high-temperature reaction unit 604 is provided with a second combustor 614 and a reformer 400B provided on the second combustor 614. Air and a gas fuel are supplied respectively separately or as a gas mixture to the second combustor 614, and a heat is generated by a catalytic combustion of them.

A gas mixture (first reactant) of the vaporized water and liquid fuel is supplied from the vaporizer 610 to the reformer 400, and then, the reformer 400B is heated by the second combustor 614. In the reformer 400B, a hydrogen gas or the like (first product) is produced from the liquid fuel vaporized with water vapor by means of a catalytic reaction, and further, a carbon monoxide gas is produced, although its amount is very small. In the case where the fuel is methanol, the above chemical reactions as shown in the chemical formulas (1) and (2) occur.

The low-temperature reaction unit 606 is primarily provided with a carbon monoxide removing unit 500B. The carbon monoxide removing unit 500B is heated by the first combustor 612. Then, a gas mixture (second reactant) containing a hydrogen gas from the reformer 400B and a small amount of carbon monoxide gas or the like produced by the chemical reaction of the above formula (2) is supplied, and further, oxygen (or occasionally air) is supplied. In the carbon monoxide removing unit 500B, carbon monoxide is selectively oxidized among the gas mixture, whereby the thus oxidized carbon monoxide is removed. A gas mixture (second product: hydrogen-rich gas) from which carbon monoxide has been removed is supplied to a fuel electrode of a fuel cell.

Now, a specific configuration of the microreactor module 600 in the embodiment will be described with reference to FIGS. 30 and 32 to 36.

Figure 32:
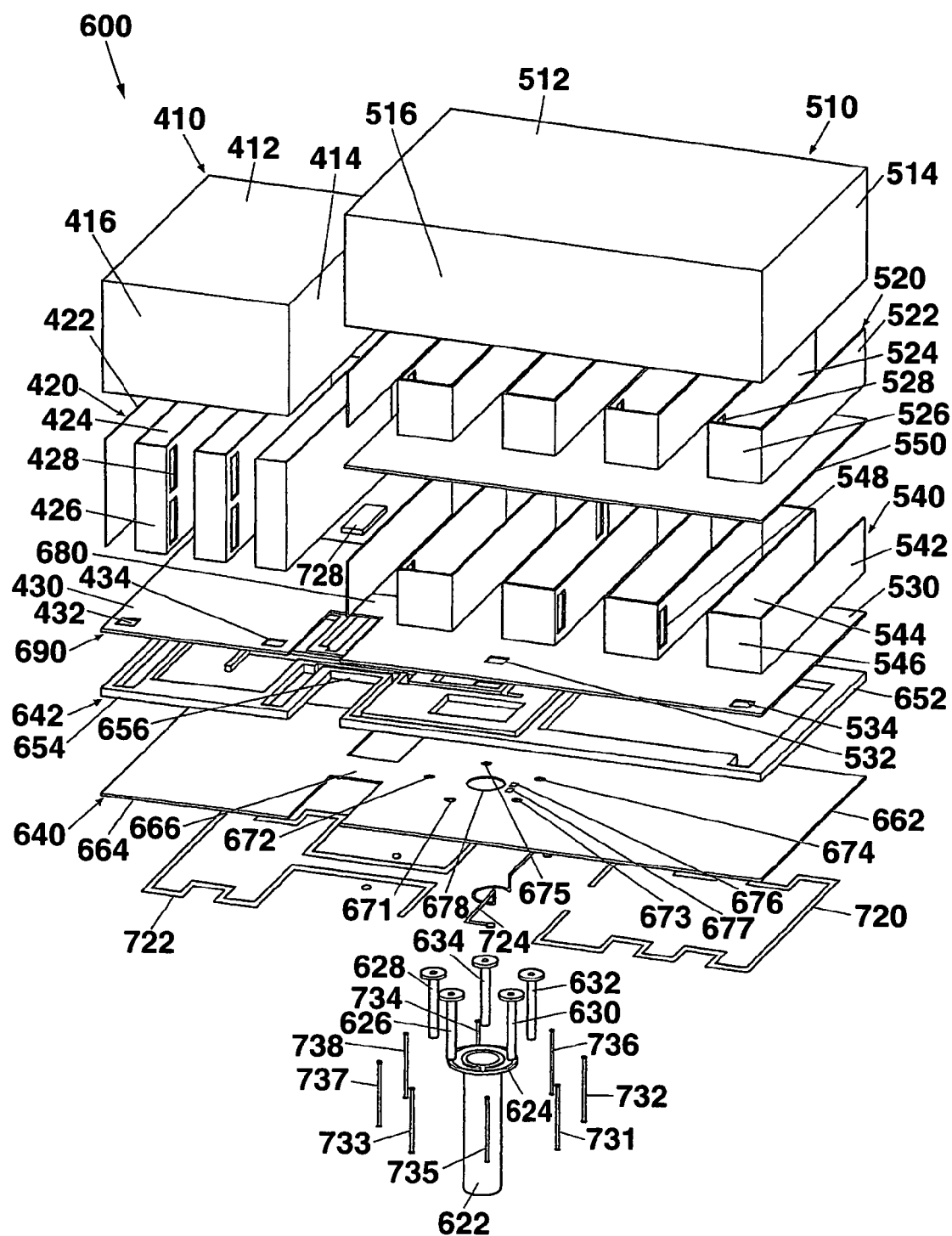
FIG. 32 is an exploded perspective view of the microreactor module in the fifth embodiment.
Figure 33:
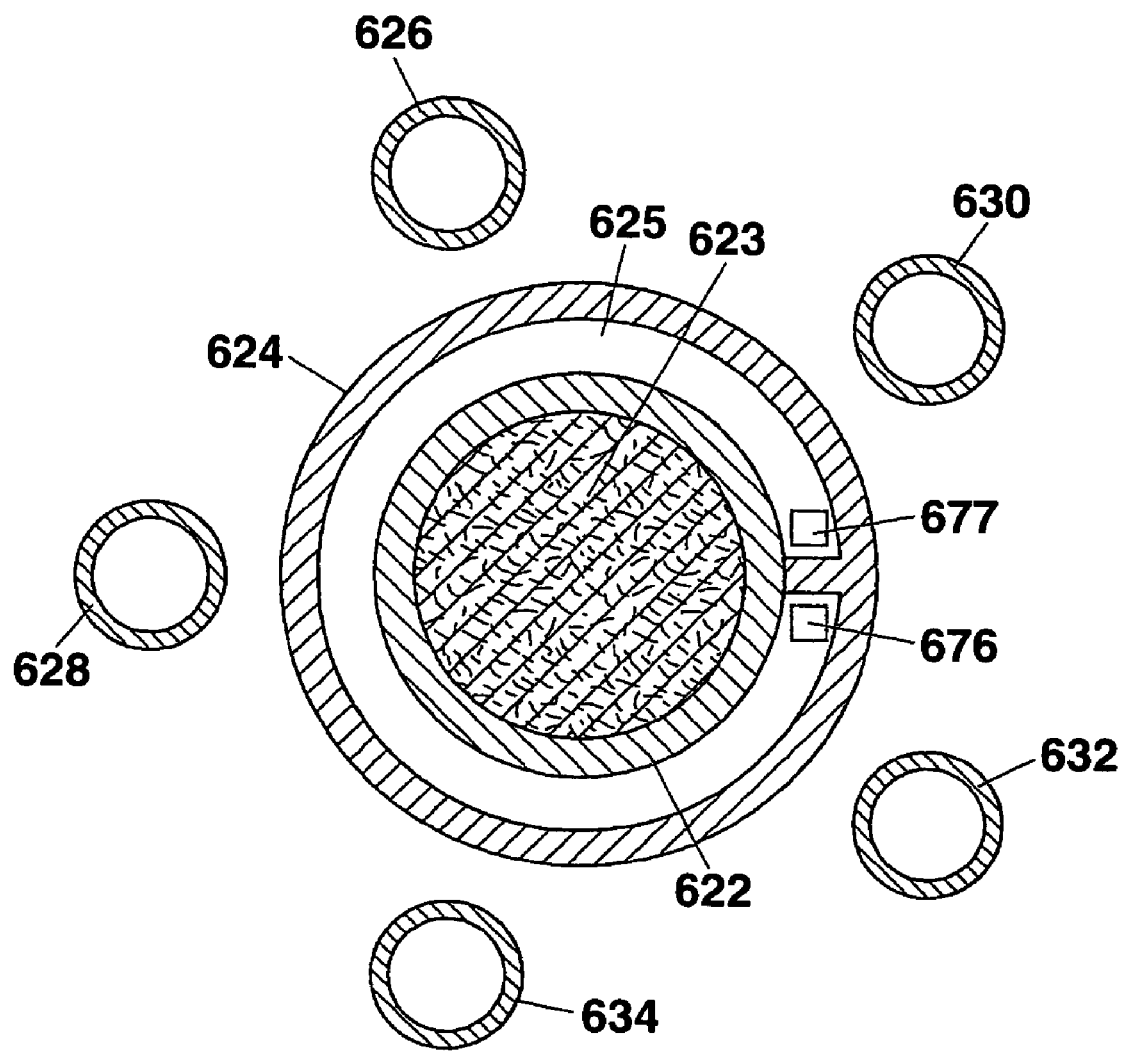
FIG. 33 is a cross sectional view taken along the section line XIV-XIV of FIG. 30.
Figure 34:
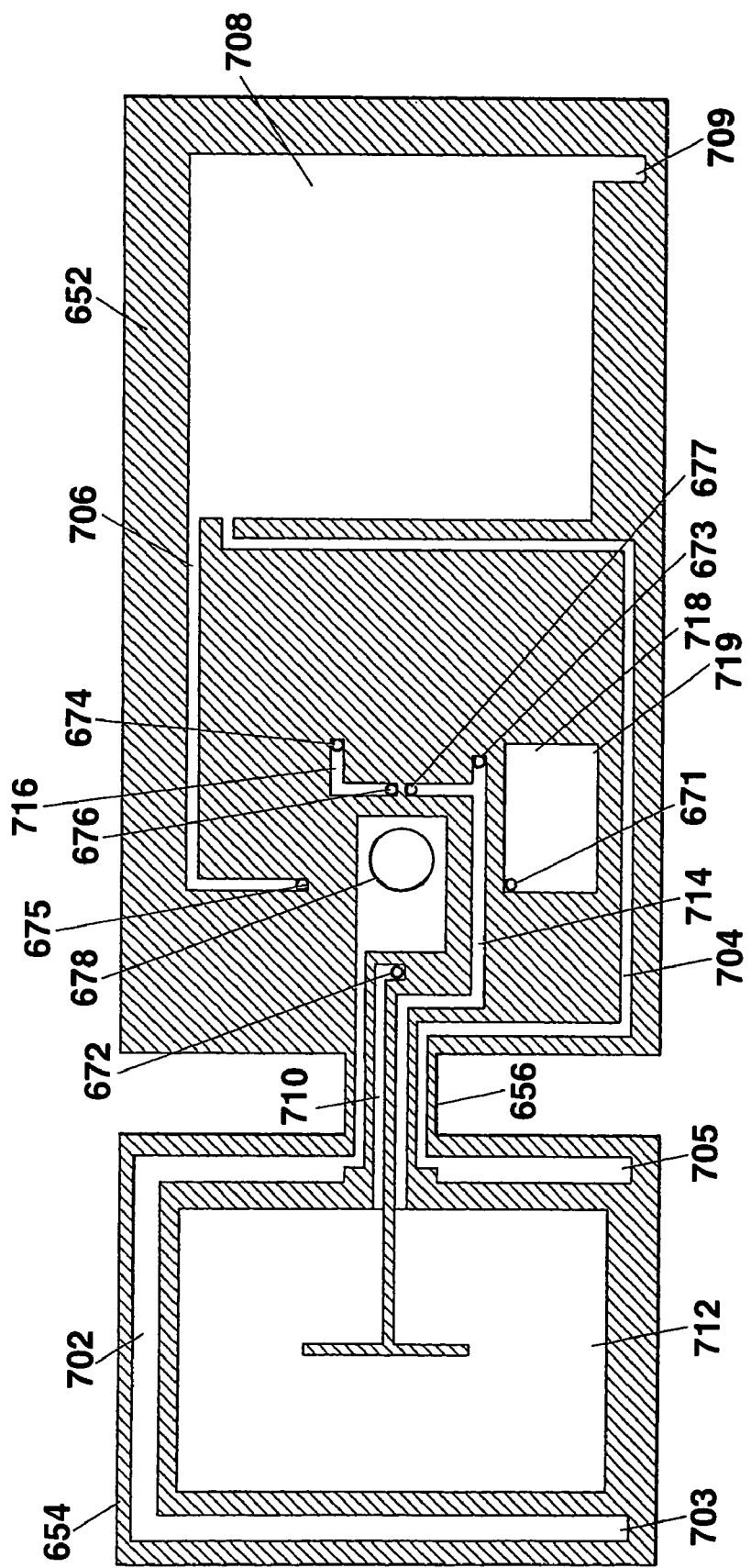
FIG. 34 is a cross sectional view taken along the section line XV-XV of FIG. 30.
Figure 35:
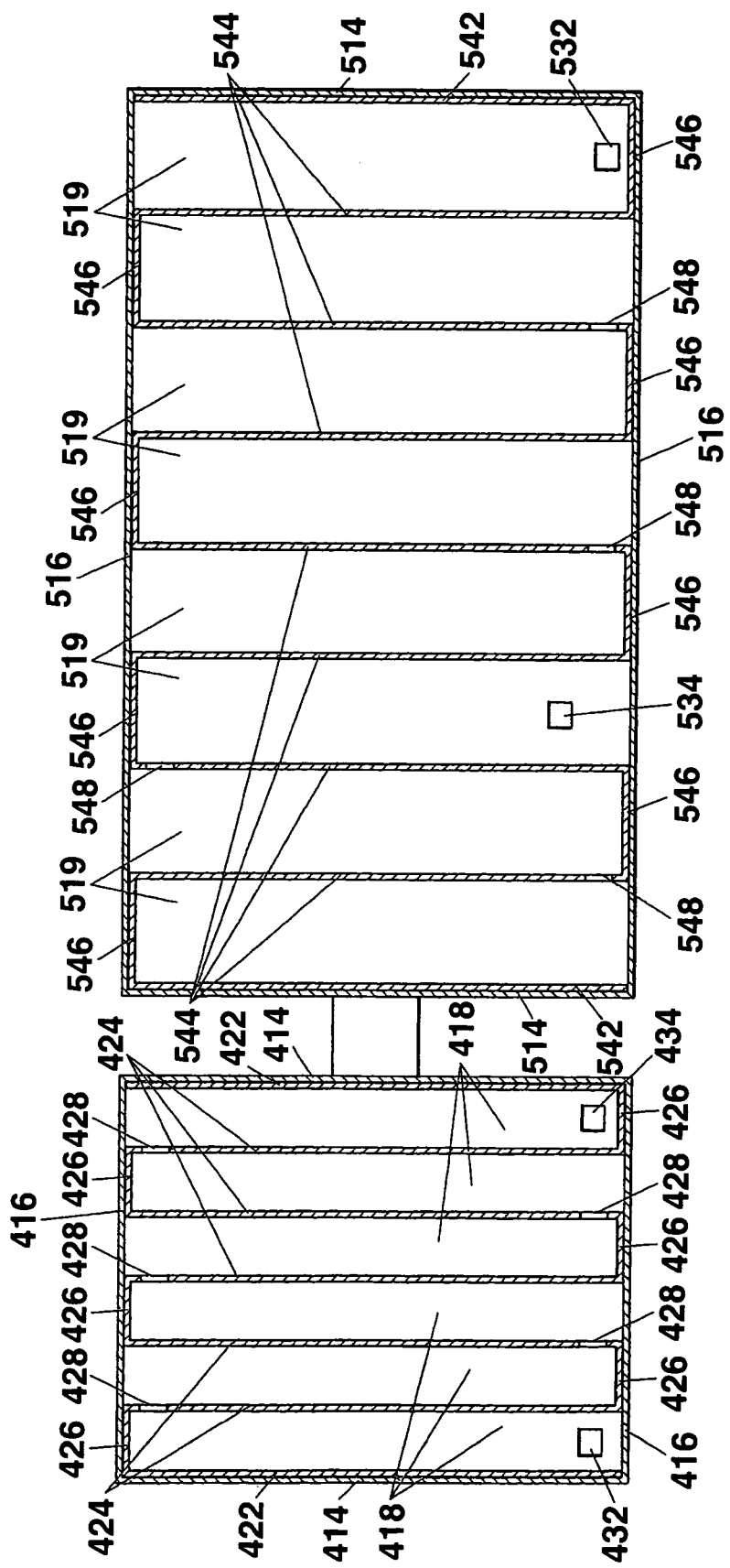
FIG. 35 is a cross sectional view taken along the section line XVI-XVI of FIG. 30.
Figure 36:
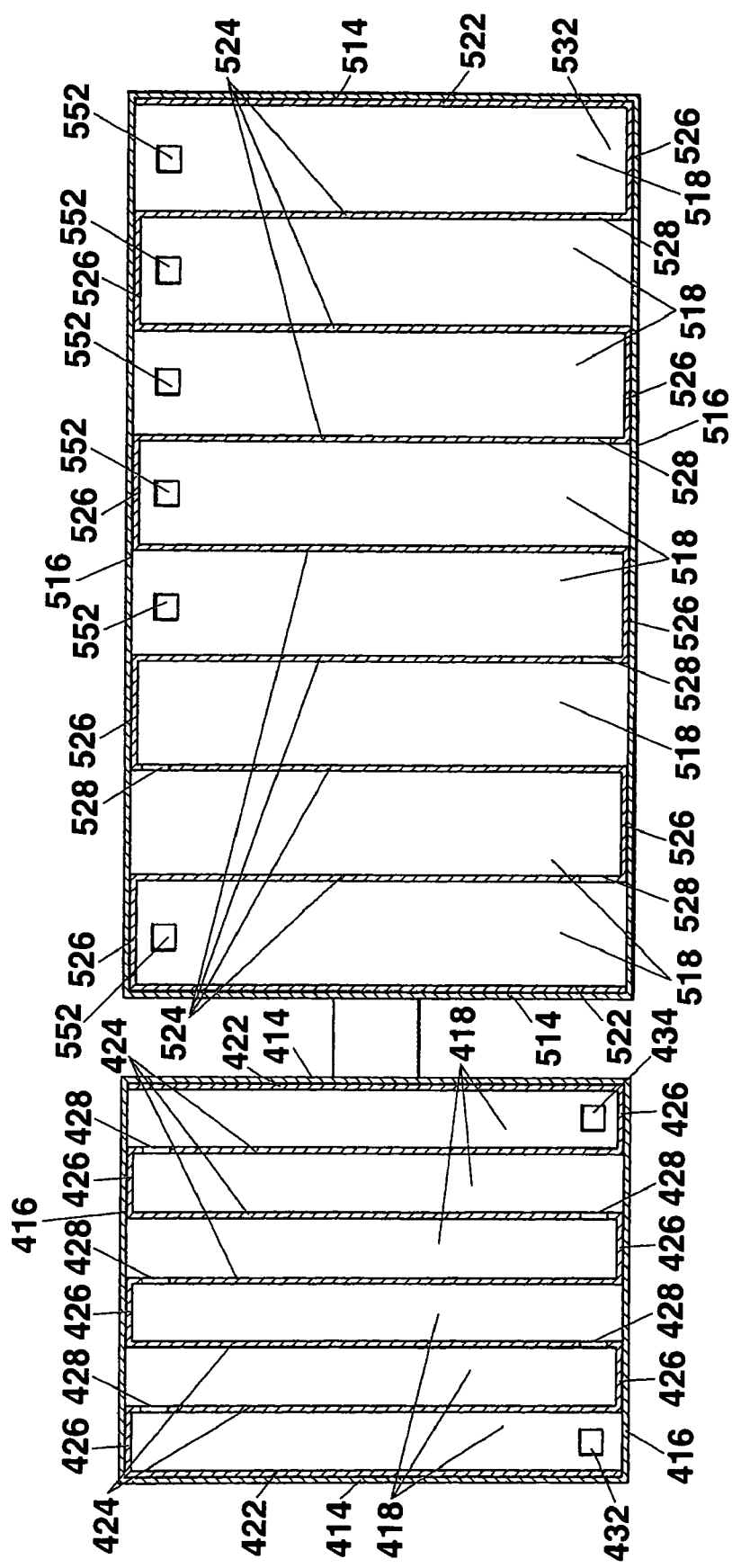
FIG. 36 is a cross sectional view taken along the section line XVII-XVII of FIG. 30.

FIG. 32 is an exploded perspective view of the microreactor module in the embodiment. FIG. 33 is a cross sectional view taken along the section line XIV-XIV of FIG. 30. FIG. 34 is a cross sectional view taken along the section line XV-XV of FIG. 30. FIG. 35 is a cross sectional view taken along the section line XVI-XVI of FIG. 30. FIG. 36 is a cross sectional view taken along the section line XVII-XVII of FIG. 30.

As shown in FIGS. 30, 32 and 33, the supply/discharge unit 602 comprises: a liquid fuel intake pipe 622; a combustor plate 624 provided so as to surround the liquid fuel intake pipe 622 at an upper end part of the liquid fuel intake pipe 622; and five pipes 626, 628, 630, 632, and 634 arranged at the periphery of the liquid fuel intake pipe 622.

The liquid fuel intake pipe 622 is made of a tubular metal material such as a stainless steel, for example, and the liquid fuel intake pipe 622 is filled with a liquid absorption material 623. The liquid absorption material 623 is intended to absorb a liquid. The liquid absorption material 623 is made of, for example, an inorganic fiber or an organic fiber bound with a binder; sintered inorganic powder; inorganic powder bound with a binder; or a mixture of graphite and grassy carbon. Specifically, a felt material, a ceramics porous material, a fiber material, a carbon porous material and the like are used as the liquid absorption material 623. The pipes 626, 628, 630, 632, and 634 each are made of a tubular metal material such as a stainless steel, for example.

The combustor plate 624 is also made of a tubular metal material such as a stainless steel, for example. A through-hole is formed at the center part of the combustor plate 624, the liquid fuel intake pipe 622 is engaged into the through-hole, and the liquid fuel intake pipe 622 and the combustor plate 624 are joined to each other. Here, the liquid fuel intake pipe 622 is joined to the combustor plate 624 by means of brazing, for example. Here, as a brazing agent, it is particularly preferable to use a gold brazing having a melting point higher than the highest temperature among the temperatures of the fluid that flows through the liquid fuel intake pipe 622 or the combustor plate 624 and containing gold, silver, zinc, and cadmium, a brazing consisting essentially of gold, silver, zinc, and nickel, or a brazing consisting essentially of gold, palladium, and silver. A bulkhead is provided so as to protrude on one face of the combustor plate 624. A part of the bulkhead is provided all around the outer rim of the combustor plate 624, and the other part thereof is provided around a diameter direction. The combustor plate is joined to the bottom face of the low-temperature reaction unit 606, whereby a combustion flow channel 625 is formed on the bonded face, and the liquid fuel intake pipe 622 is surrounded by the combustion flow channel. A combustion catalyst for combusting a combustion gas mixture is carried onto a wall face of the combustion flow channel 625. Platinum is exemplified as the combustion catalyst, for example. The liquid absorption material 623 in the liquid fuel intake pipe 622 is filled up to a position of the combustion plate 624.

As shown in FIGS. 30 and 32, the high-temperature reaction unit 604, the low-temperature reaction unit 606, and the coupling unit 608 use as a common substrate an insulation plate 640 and a base plate 642 that are laminated with each other. Thus, the insulation plate 640 is provided as a bottom face common to the high-temperature reaction unit 604, the low-temperature reaction unit 606, and the coupling unit 608, whereas the bottom face of the coupling unit 608 is in plane with the bottom face of the high-temperature reaction unit 604, and further, is in plane with the bottom face of the low-temperature reaction unit 606.

The base plate 642 is composed of: a base portion 652 serving as a substrate of the low-temperature reaction unit 606; a base portion serving as a substrate of the high-temperature reaction unit 604; and a coupling base portion 656 serving as a substrate of the coupling unit 608. The base plate 642 is formed integrally with the base portion 652, the base portion 654, and the coupling base portion 656, and is established in a state that the base plate is enclosed in the coupling base portion 656. The base plate 642 is made of a planar metal material such as a stainless steel, for example.

The insulation plate 640 is composed of: a base portion 662 serving as a substrate of the low-temperature reaction unit 606; a base portion 664 serving as a substrate of the high-temperature reaction unit 604; and a coupling base portion 666 serving as a substrate of the coupling unit 608. The insulation plate 640 is formed integrally with the base portion 662, the base portion 664, and the coupling base portion 666, and is established in a state that the insulation plate is enclosed in the coupling base portion 666. The insulation plate 640 is made of an electric insulation element such as ceramics, for example.

As shown in FIGS. 32 and 34, with the insulation plate 640 joined to the base plate 642, through-holes 671 to 678 each penetrate the base portion 652 of the base plate 642 and the base portion 662 of the insulation plate 640.

As shown in FIGS. 30 to 32, the base portion 662 of the insulation plate 640 is provided as a bottom face of the low-temperature reaction unit 606, whereas the pipes 626, 628, 630, 632, and 634 and the liquid fuel intake pipe 622 are joined to the bottom face of the low-temperature reaction unit 606 by means of brazing or the like. Here, the pipe 626 is passed through the through-hole 671, the pipe 628 is passed through the through-hole 672, the pipe 630 is passed through the through-hole 673, the pipe 632 is passed through the through-hole 674, the pipe 634 is passed through the through-hole 675, and the liquid fuel intake pipe 622 is passed through the through-hole 678.

As shown in FIGS. 32, 33 and 34, the combustor plate 624 is joined to the bottom face of the low-temperature reaction unit 606, whereas one end of the combustion flow channel 625 of the combustor plate 624 is passed through the through-hole 676, and the other end of the combustion flow channel 625 is passed through the through-hole 677.

As shown in FIG. 34, the base plate 672 has formed thereon: a reforming fuel supply flow channel 702; a communication flow channel 704; an air supply flow channel 706; a mixture chamber 708; a combustion fuel supply flow channel 710; a combustion chamber 712; an exhaust gas flow channel 714, a combustion fuel supply flow channel 716, and a discharge chamber 718.

The reforming fuel supply flow channel 702 is formed from the through-hole 678 up to a corner of the base portion 654 through the coupling base portion 656. The mixture chamber 708 is formed in a rectangular shape at the base portion 652. The communication flow channel 704 is formed from the corner of the base portion 654 up to the mixture chamber 708 through the coupling base portion 656. The air supply flow channel 706 is formed from the through-hole 675 up to the mixture chamber 708.

The combustion chamber 712 is formed in a C-shape at the center part of the base portion 654. A combustion catalyst for combusting a combustion gas mixture is carried onto a wall face of the combustion chamber 712.

The combustion fuel supply flow channel 710 is formed from the through-hole 672 up to the combustion chamber 712 through the coupling base portion 656. The exhaust gas flow channel 714 is formed from the through-hole 677 up to the through-hole 673 and is formed from the combustion chamber 712 up to the through-hole 673 through the coupling base portion 656. The combustion fuel supply flow channel 716 is formed from the through-hole 674 up to the through-hole 676 at the base portion 652. The discharge chamber 718 is formed in a rectangular shape at the base portion 652, and the through-hole 671 is provided at a corner of the evaluation chamber 718.

A carbon monoxide removing unit 500B is provided on the base portion 652. The carbon monoxide removing unit 500B is an application of the reaction device 500 in the fourth embodiment. The carbon monoxide removing unit 500B is configured in the same manner as that in the reaction device 500 of the fourth embodiment shown in FIGS. 26 to 29.

A cross section of the carbon monoxide removing unit 500B shown in FIG. 35 corresponds to that of the reaction device 500 shown in FIG. 28, and a cross section of the carbon monoxide removing unit 500B shown in FIG. 36 corresponds to that of the reaction device 500 shown in FIG. 29.

As shown in FIGS. 30 and 32, a bottom plate 530 of the carbon monoxide removing unit 500B is bonded on a top face of the base portion 652. The bottom plate 530 covers part of the reforming fuel supply flow channel 702, part of the exhaust gas flow channel 714, part of the combustion fuel supply flow channel 710, part of the communication flow channel 704, the air supply flow channel 706, the mixture chamber 708, the combustion fuel supply flow channel 716, and the discharge chamber 718. An intake port 532 formed at the bottom plate 530 is positioned on a corner 709 of the mixture chamber 708, and a discharge port 534 formed at the bottom plate 530 is positioned on a corner 719 of the discharge chamber 718. In the carbon monoxide removing unit 500B, a carbon monoxide selective oxidization catalyst (for example, platinum) is carried onto the internal faces of the box type member 510 and the bottom plate 530 and the partition plate 520, the partition plate 540, and the separate plate 550.

Next, a reformer 400B is provided on the base portion 654. This reformer 400B is an application of the reactor 400 in the third embodiment. The reformer 400B is configured in the same manner as that in the reaction device 400 shown in FIGS. 20 to 23. A cross section of the reformer 400B shown in FIG. 36 corresponds to that of the reaction device 400 shown in FIG. 22.

As shown in FIGS. 30 and 32, a bottom plate 430 of the reformer 400B is joined to a top face of the base portion 654. The bottom plate 430 covers part of the reforming fuel supply flow channel 702, part of the exhaust gas flow channel 714, part of the combustion fuel supply flow channel 710, part of the communication flow channel 704, and the combustion chamber 712. An intake port 432 formed at the bottom plate 430 is positioned on an end part 730 of the reforming fuel supply flow channel 702, and a discharge port 434 formed at the bottom plate 430 is positioned on an end part 705 of the communication flow channel 704.

In the reformer 400B, a reforming catalyst (for example, Cu/ZnO-base catalyst or Pd/ZnO-based catalyst) is carried onto the internal faces of the box type member 410 and the bottom plate 430 or on the partition plate 420.

As shown in FIG. 32, the bottom plate 430 of the reformer 400B and the bottom plate 530 of the carbon monoxide removing unit 500B are formed integrally while being connected to each other by a coupling cap 680. A plate material 690 integrated with the bottom plate 430, the bottom plate 530, and the coupling cap 680 is established in a state that it is enclosed in the coupling cap 680. Although the plate material 690 is joined to the base plate 642, the coupling cap 680 of the plate material 690 is joined to the coupling base portion 656 of the base plate 642, whereby the coupling unit 608 is configured. In the coupling unit 608, part of the reforming fuel supply flow channel 702, part of the exhaust gas flow channel 714, part of the combustion fuel supply flow channel 710, and part of the communication flow channel 704 are covered with the coupling cap 680.

As shown in FIG. 30 or the like, an external shape of the coupling unit 608 is formed in a rectangular cylinder shape, for example. A width of the coupling unit 608 is narrower than that of each of the high-temperature reaction unit 604 and the low-temperature reaction unit 606, and a height of the coupling unit 608 is also lower than that of each of the high-temperature reaction unit 604 and the low-temperature reaction unit 606. Then, the coupling unit 608 is bridged between the high-temperature reaction unit 604 and the low-temperature reaction unit 606. The coupling unit 608 is coupled with the high-temperature reaction unit 604 at the center part in the widthwise direction of the high-temperature reaction unit 604 and is coupled with the low-temperature reaction unit 606 at the center part in the widthwise direction of the low-temperature reaction unit 606.

As has been described above, the coupling unit 608 is provided with the reforming fuel supply flow channel 702, the communication flow channel 704, the combustion fuel supply flow channel 710, and the exhaust gas flow channel 714.

Now, a description will be given with respect to a flow channel provided inside of the supply/discharge portion 602, the high-temperature reaction unit 604, the low-temperature reaction unit 606, and the coupling unit 608.

Figure 37:
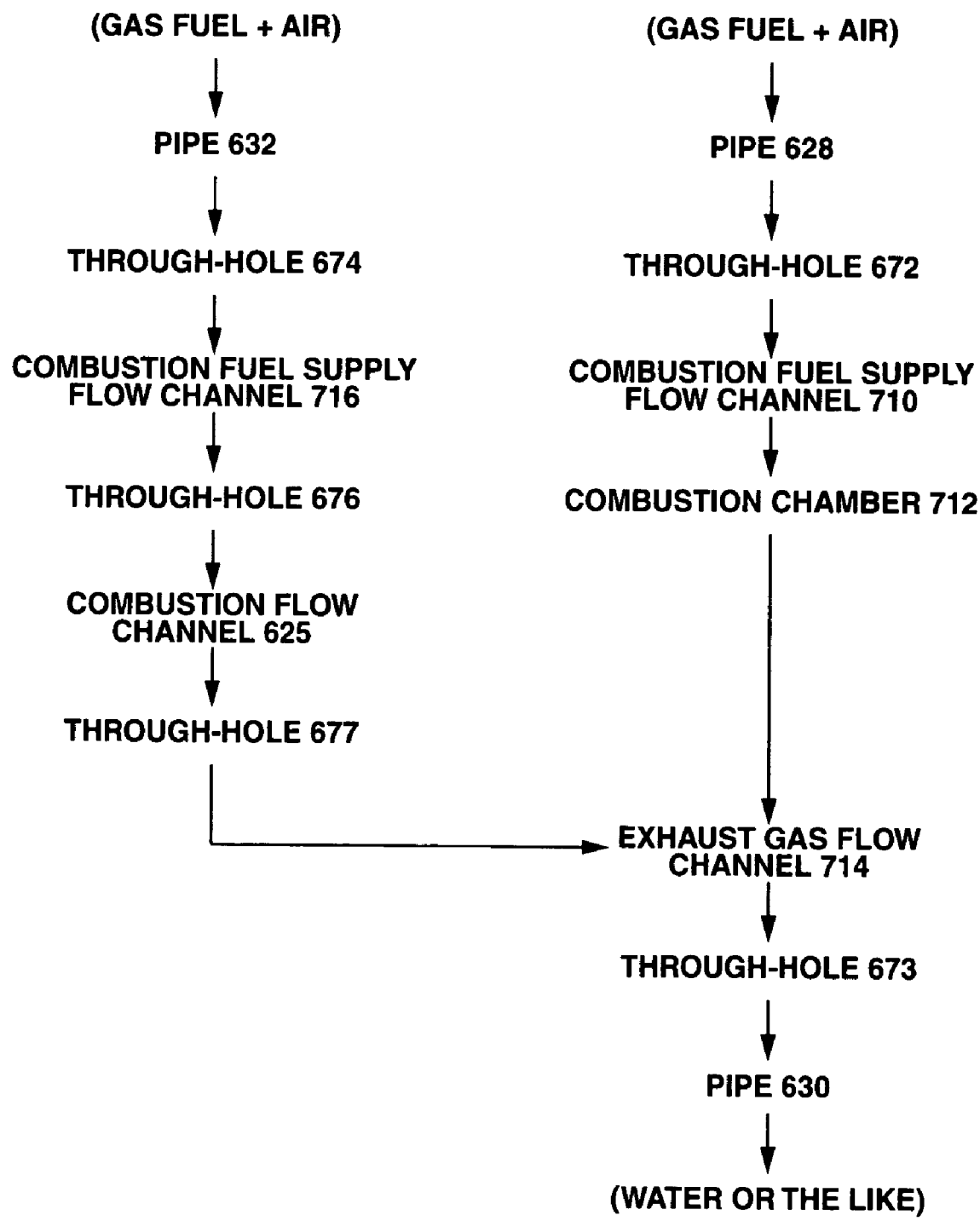
FIG. 37 shows a channel from supply of a combustion gas mixture consisting of a gas fuel and air to discharge of water or the like that is a product in the microreactor module according to the fifth embodiment.
Figure 38:
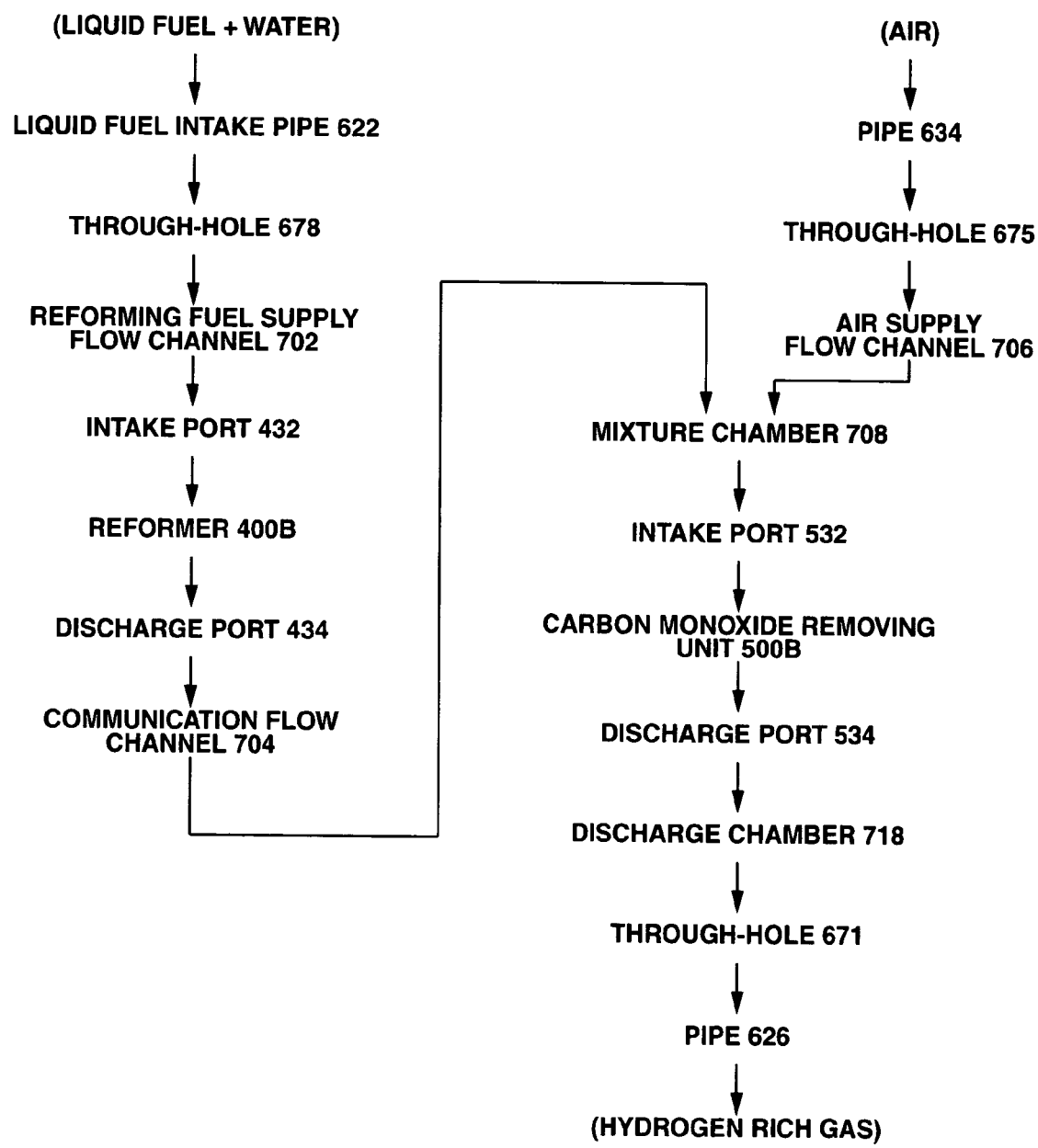
FIG. 38 shows a channel from supply a liquid fuel and water to discharge of a hydrogen gas that is a product in the microreactor module according to the fifth embodiment.

FIG. 37 shows a channel from supply of a combustion gas mixture consisting of a gas fuel and air to discharge of water or the like that is a product in the microreactor module according to the fifth embodiment. FIG. 38 shows a channel from supply a liquid fuel and water to discharge of a hydrogen gas that is a product in the microreactor module according to the fifth embodiment.

Here, a description will be given with respect to a correlation among FIGS. 37, 38 and 31. The liquid fuel intake pipe 622 corresponds to the vaporizer 610, the combustion flow channel 625 corresponds to the first combustor 612, and the combustion chamber 712 corresponds to the second combustor.

As shown in FIG. 32, a heating wire 720 is patterned in a wobble state on a bottom face of the low-temperature reaction unit 606, namely, on a bottom face of an insulation plate 640. On the bottom face from the low-temperature reaction unit 606 to the high-temperature reaction unit 604 through the coupling unit 608, a heating wire 722 is patterned in a wobble state. A heating wire 724 is patterned from the bottom face of the low-temperature reaction unit 606 to the side face of the liquid fuel intake pipe 622 through the surface of the combustor plate 624. Here, an insulation film made of silicon nitride, silicon oxide or the like is formed on the side face of the liquid fuel intake pipe 622 and on the surface of the combustor plate 624, and the heating wire 724 is formed on the surface of the insulation film. The heating wires 720, 722, and 724 are patterned on the insulation film or the insulation plate 640, whereby a voltage is not applied to the base plate 642, the liquid fuel intake pipe 622, the combustor plate 624 and the like which are made of a metal material, and heating efficiency of the heating wires 720, 722, and 724 can be improved.

The heating wires 720, 722, and 724 are laminated sequentially in order of the insulation film or insulation plate 640, a diffusion proof layer, and a heat generation layer. The heat generation layer is made of a material (for example, Au) having the lowest resistance rate among the three layers. If a voltage is applied to the heating wires 720, 722, and 724, a current intensively flows, and a heat is generated. Even if the heating wires 720, 722, and 724 are heated, a material for the heat generation layer is hardly thermally diffused to the diffusion proof layer, and a material for the diffusion proof layer is hardly thermally diffused to the heat generation layer. It is preferable to use as the diffusion proof layer a material (for example, W) having a comparatively high melting point and low reactivity. In the case where the diffusion proof layer is lowly coherent to the insulation film and is easily released, a coherent layer may be further provided between the insulation film and the diffusion proof layer. The coherent layer is made of a material (such as Ta, Mo, Ti or Cr, for example) having superior coherence to the diffusion proof layer and to the insulation film or the insulation plate 640. The heating wire 720 heats the low-temperature reaction unit 606 during startup, the heating wire 722 heats the high-temperature reaction unit 604 and the coupling unit 608 during startup, and the heating wire 724 heats the vaporizer 610 and the first combustor 612 of the supply/discharge unit 602. Thereafter, when the second combustor 614 is combusted by an OFF gas containing hydrogen from a fuel cell, the heating wire 722 heats the high-temperature reaction unit 604 and the coupling unit 608 as an assistance of the second combustor 614. Similarly, in the case where the first combustor 612 is combusted by an OFF gas containing hydrogen from a fuel cell, the heating wire 720 heats the low-temperature reaction unit 606 as an assistance of the first combustor 612.

The heating wires 720, 722, and 724 also function as a temperature sensor for reading a temperature change from a change of a resistance value because an electrical resistance changes depending on a temperature. Specifically, a temperature of the heating wires 720, 722, and 724 is proportional to the electrical resistance.

All the ends of the heating wires 720, 722, and 724 are positioned on the bottom face of the low-temperature reaction unit 606, and these ends are arranged so as to surround the combustor plate 624. Lead wires 731 and 732 are respectively connected to both ends of the heating wire 720, lead wires 733 and 734 are respectively connected to both ends of the heating wire 722, and lead wires 735 and 736 are respectively connected to both ends of the heating wire 724. In FIG. 30, for the sake of clarity, the heating wires 720, 722, and 724 and the lead wires 731 to 736 are not shown.

As shown in FIG. 32, a getter material 728 may be provided on the surface of the coupling unit 608. A heater such as a heating material is provided on the getter material 728, and lead wires 737 and 738 each are connected to the getter material 728. The getter material 728 is heated so as to be activated, thereby providing an adsorption action. By adsorbing a residual gas in an internal space of a heat insulation package 791 described later, a gas having leaked from the microreactor module 600 into the internal space of the heat insulation package 791, or a gas having invaded into the heat insulation package 791 from the outside, the impaired degree of vacuum of the internal space of the heat insulation package 791 and the lowering of heat insulation effect are restricted. Examples of a material for the getter material 728 may include an alloy consisting essentially of zirconium, barium, titanium, or vanadium. In FIG. 30, for the sake of clarity, the lead wires 737 and 738 are not shown.

Also in the microreactor module 600 in the embodiment, as in the case of the second embodiment, the entirety of the microreactor module 600 may be covered with the heat insulation package 791 (heat insulation vessel) in order to restrict a thermal loss. In this case, constituent elements are similar to those in the case of the second embodiment, and thus, a duplicate description is omitted here. In addition, since an operation of the microreactor module 600 in the embodiment is similar to that of the microreactor module in the second embodiment, a duplicate description thereof is omitted here.

As has been described above, according to the embodiment, the reformer 400B of the high-temperature reaction unit 604 is reinforced by the partition plate 420, thereby improving rigidity, and the carbon monoxide removing unit 500B of the low-temperature reaction unit 506 is reinforced by the partition plates 520 and 540, thus improving rigidity. In particular, because the reformer 400B and the carbon monoxide removing unit 500B are housed in the vacuum heat insulation package 791, a stress is acted such that the reformer 400B and the carbon monoxide removing unit 500B inflate. However, the partition plate 420 is joined in the reformer 400B, and the partition plates 520 and 540 are joined in the carbon monoxide removing unit 500B, thus making it possible to restrict the inflation and deformation of the reformer 400B and the carbon monoxide removing unit 500B.

An internal space of the heat insulation package 791 is provided as a heat insulation space. The high-temperature reaction unit 604 is spaced from the low-temperature reaction unit 606, and a gap from the high-temperature reaction unit 604 to the low-temperature reaction unit 606 is provided as a length of the coupling unit 608. Therefore, a channel of heat conduction from the high-temperature reaction unit 604 and the low-temperature reaction unit 606 is limited to the coupling unit 608, and heat conduction to the low-temperature reaction unit 606 that does not require a high temperature is limited. In particular, the height and width of the coupling unit 608 are smaller than those of both the reaction units 604 and 606. For this reason, heat conduction through the coupling unit 608 is also restricted to the minimum. Accordingly, a thermal loss of the high-temperature reaction unit 604 can be restricted, and the low-temperature reaction unit 606 can be restricted from rising in temperature to a set temperature or higher. That is, even in the case where the high-temperature reaction unit 604 and the low-temperature reaction unit 606 are housed in one heat insulation package 791, a temperature difference can be produced between the high-temperature reaction unit 604 and the low-temperature reaction unit 606.

Since the flow channels 702, 704, 710, and 714 forming a communication between the low-temperature reaction unit 606 and the high-temperature reaction unit 604 are provided in a state that they are collected in one coupling unit 608, a stress produced with the coupling unit 608 or the like can be reduced. In other words, because a temperature difference exists between the high-temperature reaction unit 604 and the low-temperature reaction unit 606, the high-temperature reaction unit 604 inflates more significantly than the low-temperature reaction unit 606. However, the high-temperature reaction unit 604 has a free end except for the coupling unit with the coupling unit 608, so that the stress produced with the coupling unit 608 or the like can be restricted. In particular, the coupling unit 608 is smaller in height and width than the high-temperature reaction unit 604 or the low-temperature reaction unit 606, and further, the coupling unit 608 connects to the high-temperature reaction unit 604 and the low-temperature reaction unit 606 at the center part in the widthwise direction of the high-temperature reaction unit 604 and the low-temperature reaction unit 606. As a consequence, the stress can be restricted from being generated on the coupling unit 608, the high-temperature reaction unit 604, and the low-temperature reaction unit 606.

Although the pipes 626, 268, 630, 632, and 634 and the liquid fuel intake pipe 622 extend to the outside of the heat insulation package 791, they are all connected to the low-temperature reaction unit 606. Thus, direct heat conduction from the high-temperature reaction unit 604 to the outside of the heat insulation package 791 can be restricted, and a thermal loss of the heat-insulation reaction unit 604 can be restricted. Accordingly, even in the case where the high-temperature reaction unit 604 and the low-temperature reaction unit 606 are housed in one heat insulation package 791, a temperature difference can be produced between the high-temperature reaction unit 604 and the low-temperature reaction unit 606.

A bottom face of the coupling unit 608, a bottom face of the high-temperature reaction unit 604, and a bottom face of the low-temperature reaction unit 606 are in plane with one another. For this reason, the heating wire 722 can be patterned comparatively easily, and disconnection of the heating wire 722 can be restricted.

In addition, the liquid fuel intake pipe 622 is filled with the liquid absorption material 623, and the liquid fuel intake pipe 622 is provided as a vaporizer 610. Consequently, a temperature state required for vaporization of a liquid mixture (a state in which an upper part of the liquid fuel intake pipe 622 is set at 120° C.) can be established while downsizing and simplification of a microreactor module 600 are promoted.

In addition, the combustor plate 624 is provided at the periphery of the liquid fuel intake pipe 622 at an upper end of the liquid fuel intake pipe 622, and further, the liquid absorption material 623 contained in the liquid fuel intake pipe 622 is filled up to the height position of the combustor plate 624. As a result, the combustion heat in the first combustor 612 can be efficiently used for vaporization of the liquid mixture.

The present invention is not limited to the above-described embodiments. Various modifications and design changes may occur without departing from the spirit of the invention.

For example, although one coupling unit 608 is bridged between the low-temperature reaction unit 606 and the high-temperature reaction unit 604, a plurality of coupling units may be bridged between these reaction units 604 and 606.

In the reaction device 500 and the carbon monoxide removing unit 500B, one separate plate is housed in the box type member 510, and the inside of the box type member is partitioned into two spaces. However, a plurality of separate plates are housed in the box type member 510, and then, the inside thereof may be partitioned into further many more spaces. In this case, partition plates are housed in each space in the same manner as that in the partition plates 520 and 540.

SIXTH EMBODIMENT

Now, a sixth embodiment of the reactor according to the present invention will be described here. The same or like constituent elements of the above-described embodiments are designated by the same or like reference numerals, and a description is briefly given or omitted here.

Figure 39:
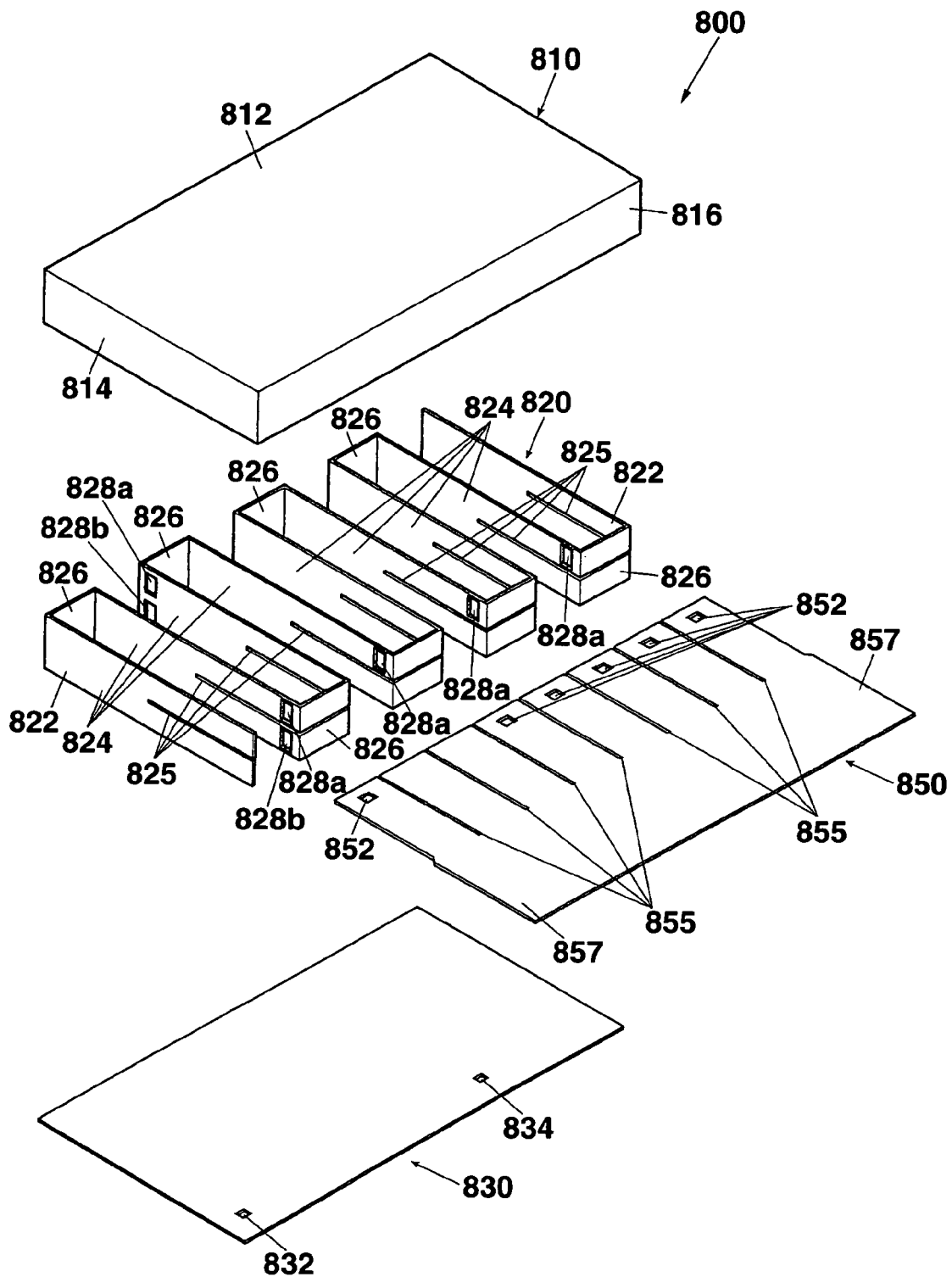
FIG. 39 is an exploded perspective view of a reaction device in a sixth embodiment of the reactor according to the present invention as viewed from a slant lower portion.
Figure 40:
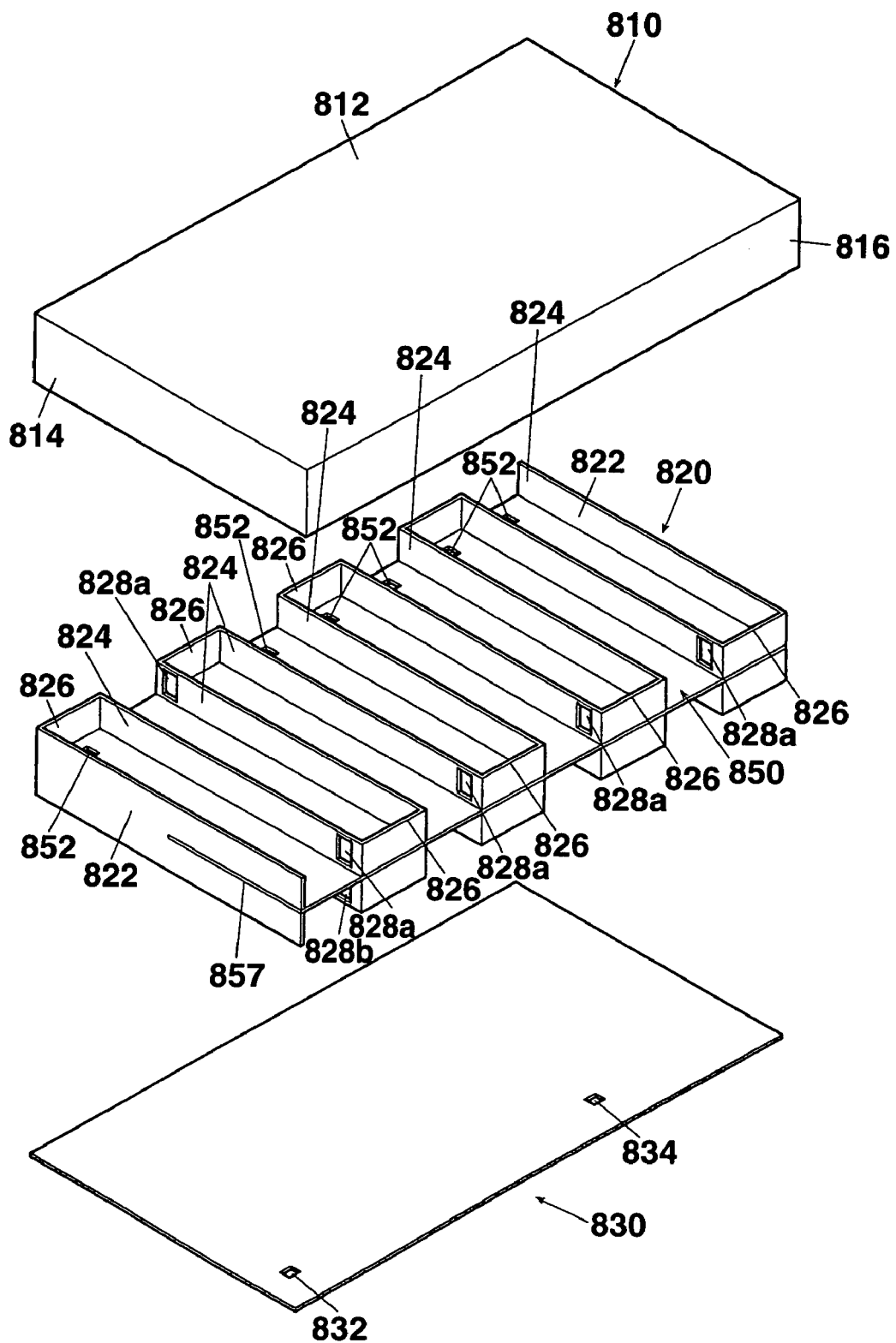
FIG. 40 is an exploded perspective view of the reaction device in a state that a separate plate is assembled on a partition plate in the sixth embodiment.
Figure 41A:
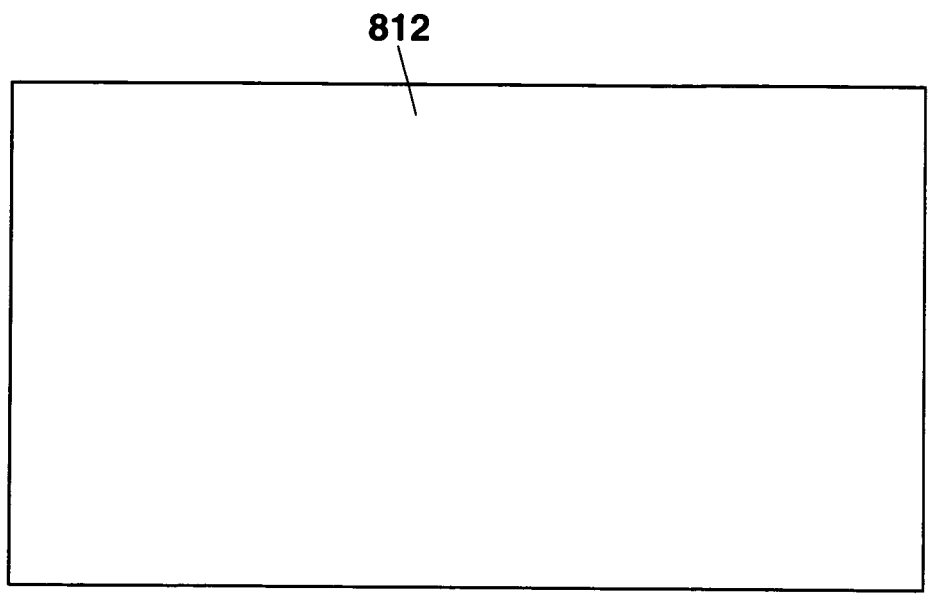
FIGS. 41A and 41B are a top view and a side view of the reaction device in the sixth embodiment.
Figure 41B:
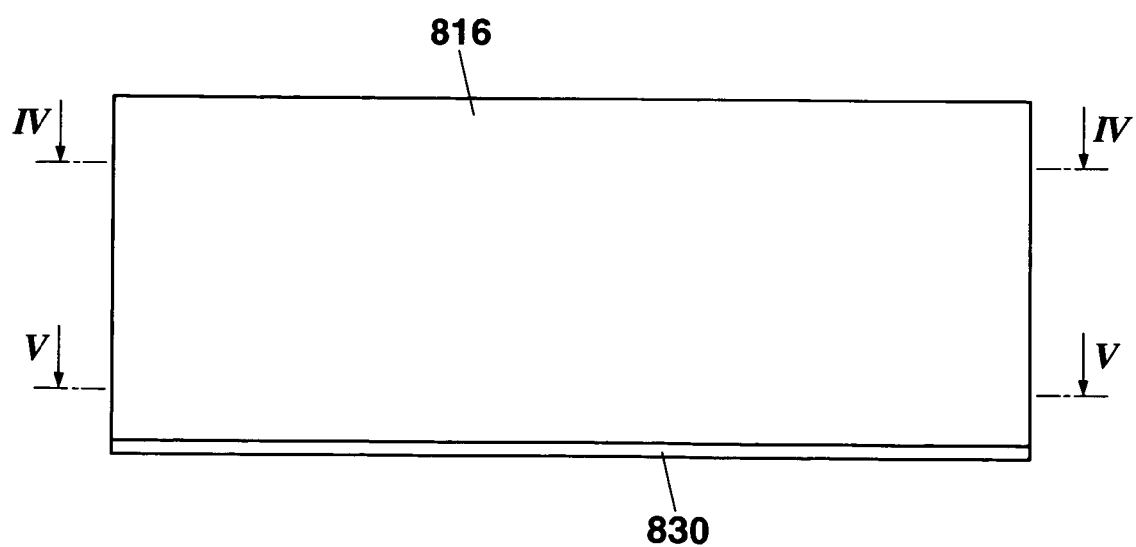
Figure 43:
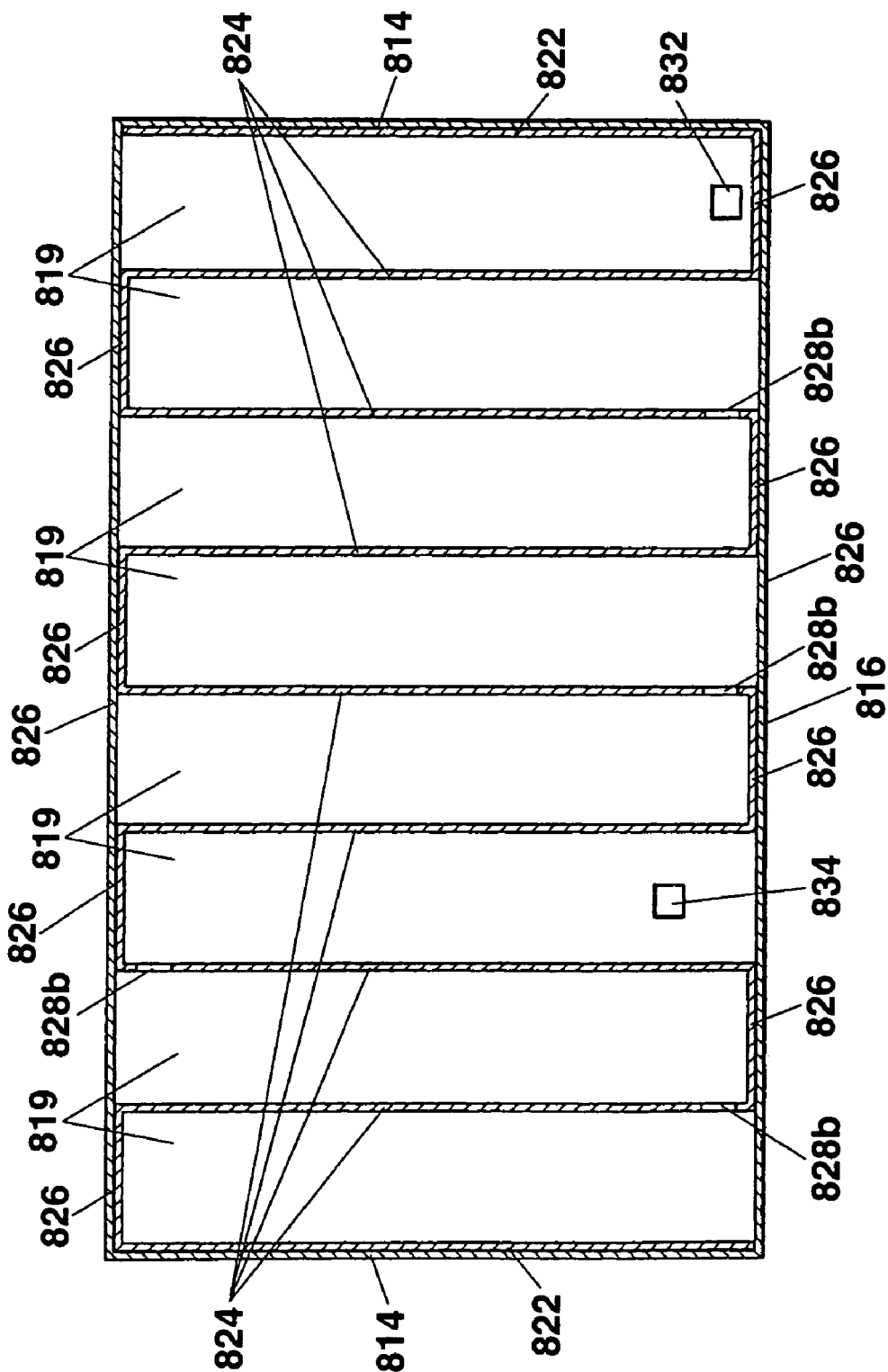
FIG. 43 is a cross sectional view taken along the section line V-V of FIG. 41B.

FIG. 39 is an exploded perspective view of a reaction device 800 in the sixth embodiment of the reactor according to the present invention as viewed from a slant lower portion. FIG. 40 is an exploded perspective view of the reaction device in a state that a separate plate is assembled on a partition plate in the sixth embodiment. FIGS. 41A and 41B are a top view and a side view of the reaction device in the sixth embodiment. FIG. 42 is a cross sectional view taken along the section line IV-IV of FIG. 41B. FIG. 43 is a cross sectional view taken along the section line V-V of FIG. 41B.

As shown in FIGS. 39 to 43, the reaction device 800 in the embodiment comprises: a box type member 810 that opens at the bottom face; a bottom plate 830 that closes the bottom face opening of the box type member 810; a partition plate (third partition plate: partition member) 820 erected on the bottom plate 830, the partition plate being housed in the box type member 810; and a separate plate 850 housed in the box type member 810 and assembled to cross the partition plate 820, thereby vertically partitioning a space in the box type member.

The box type member 810, the partition plate 820, the partition plate 840, the bulkhead plate 850, and the bottom plate 830 may be made of a metal material such as a stainless steel, may be made of a ceramics material, may be made of a glass material, or may be made of a resin material.

As shown in FIG. 39, the box type member 810 is formed in a rectangular solid whose bottom face opens, and has: a top plate 812 formed in a rectangular shape; a pair of side plates connected in a state they communicate with two opposite edges of the four edges of the top plate 812 at right angle to the top plate 812; and a pair of side plates 816 connected in a state that they communicate with the other two oppose edges of the top plate 812 at right angle to the top plate 812. The side plates 814 are connected in a state that they communicate vertically with respect to the side plates 816, and are provided in a rectangular frame shape by these four side plates 814, 814 and 816, 816. In a state that the partition plate 820 and the separate plate 850 are inserted into the opening of the box type member 810 and the partition plate 820 is housed in the box type member 810, the opening of the box shape member 810 is closed by the bottom plate 830, and the box type member 810 is joined to the bottom plate 830.

A rim part of the bottom plate 830 is joined to a lower edge part of each of the side plates 814 and 816 such that the bottom plate 830 is parallel to the top plate 812. In this manner, the bottom face opening of the box type member 810 is closed by the bottom plate 830, whereby a reaction vessel formed in a parallel hexahedron shape having a hollow is configured.

The partition plate 820 is formed in a rectangular wavy shape, and has: a pair of reinforce portions (bulkheads) 822 opposed to each other at both sides; seven partition portions (bulkheads) 824 opposed to the reinforce portions 822 between these reinforce portions 822; and eight return portions 826 connected between the adjacent partition portions 824 or between the adjacent partition portions 824 and reinforce portion 822 at one edge of the four edges of the partition portion 824. The return portions 826 are coupled to each other so as to be vertical with respect to a longitudinal direction of the reinforce portion 822 or the partition portion 824. These return portions are coupled to each other respectively alternately at one end of both ends of the reinforce portion 822 or the partition portion 824.

At the center position in the height direction of the reinforce portion 822 and partition portion 824 that configure the partition plate 820 and the return portion 826 formed integrally with them, slots 815 are formed which extend up to the center position along the longitudinal direction of the reinforce portion 822 or the partition portion 824. These slots 825 are formed in parallel to the bottom plate 830, and the height of the slot 825 is equal to that of the separate plate 850. When the separate plate 850 is inserted into these slots 825, the ends of the reinforce portion 822 and the partition portion 824 and the return portion 826 are vertically divided into two sections.

The separate plate 850 is made of a plate material formed in a substantially rectangular shape whose size is substantially equal to that of the bottom plate 830. At one side rim part of the separate plate 850, a plurality of slots 855 extending from the side rim part up to the center position in the transverse direction are formed so as to be orthogonal to the side rim part. Seven slots 855 are formed parallel to the partition portion 824 at intervals that are substantially equal to the width of the return portion 826 of the partition plate 820. The width of each of the slots 855 is equal to the thickness of the partition portion 824. In addition, the slot 825 of the partition plate 820 and the slot 855 of the corresponding separate plate 850 are formed so as to be equal to or greater than the lengths in the slotting direction of the partition plate 820 and the separate plate 850 in sum of their lengths.

As shown in FIG. 40, in a state that the slot 825 of the partition plate 820 and the slot 855 of the corresponding separate plate 850 are aligned, one side rim part of the separate plate 850 is inserted into the slot 825 of the partition plate 820. Then, the slot 855 of the separate plate 850 is engaged into a portion at which the slot 825 of the partition plate 820 is not formed, and the slot 825 of the partition plate 820 is engaged into a portion at which the slot 855 of the separate plate 850 is not formed. As a result, the partition plate 820 and the separate plate 850 are assembled and fixed.

Protrusive portions 857 to be engaged into the slots 825 of the reinforce portion 822 are formed, respectively, partly of both side rim parts of the separate plate 850 in the transverse direction. These protrusive portions 857 protrude from the side rim part, and extend from the center position of the separate plate 850 in the transverse direction to the other end in the longitudinal direction. These protrusive portions 857 protrude from the side rim part by the thickness of the reinforce portion 822, and is in plane with a side face of the reinforce portion 822 while being engaged into the slots 825 of the reinforce portion 822.

The assembled partition plate 820 and separate plate 850 is joined, preferably at the assembled portion by means of welding or brazing, etc.

Such a partition plate 820 is housed in the box type member 510 such that its wave height direction is parallel to the side plate 514. Then, the external faces of the reinforce portions 822 of the partition plate 820 are provided as planar portions at both sides of the partition plate 820 and come into contact with (come into facial contact with) the side plates 814 while they face to each other, and the external faces of the return portions 826 come into contact with (come into facial contact with) the side plates 816 while they face to each other. Preferably, the external faces of both the reinforce portions 822 and the side plates 814 are joined to each other by means of welding, and the external faces of the return portions 826 and the side plates 816 are also joined to each other by means of welding.

An upper edge part of the return portion 826 and an upper edge part of each of the reinforce portion 822 and the partition portion 824 come into contact with the top plate 812 of the box type member 810, and preferably, is joined thereto by means of welding. A lower edge part of the return portion 826 and a lower edge part of each of the box type member 810 come into contact with the bottom plate 830, and preferably, is joined thereto by means of welding.

With such a structure, the box type member 810 and the bottom plate 830 are reinforced by the partition plate 820 and the separate plate 850, and the rigidity of a reaction vessel of the reaction device 800 is improved.

Since the partition plate 820 is thus housed in the box type member 810, a hollow defined by the box type member 810 and the bottom plate 830 is partitioned into a plurality of spaces in such a manner that the hollow is partitioned in a transverse direction by the reinforce portion 822 and the partition portion 824, and is partitioned in a vertical direction by the separate plate 850.

Among the plurality of partition plates 824, through-holes (first through-holes) 828a and 828b are formed at the two partition portions 824 while the slot 825 is sandwiched therebetween. At the other partition portion 824, a through-hole 828a is formed at only the upper side of the slot 825 or a through-hole 828b is formed at only the lower side thereof, and spaces adjacent to each other in a horizontal direction are passed through these through-holes 828a and 828b. The through-holes 828a and 828b are formed, for example, in a rectangular shape, and are formed to be spaced from an end of the partition portion 824 in the longitudinal direction and formed to be spaced from the upper edge part or the lower edge part.

A through-hole (third through-hole) 852 is formed in the separate plate 850, and spaces vertically adjacent to each other are passed via the through-holes 852. Specifically, five through-holes 852 are formed at one side rim part of the separate plate 850 and one is formed at a left corner. The through-hole 852 is formed in a square shape, for example. The through-hole 852 is formed to be spaced from one side rim part of the separate plate 850, and is formed to be spaced from each of the slots 855. These through-holes 828a and 828b form the plurality of spaces 818 and spaces 819 as a series of spiral flow channels.

An intake port 832 communicating with any of the plurality of spaces 819 is formed at the bottom plate 830, whereas a discharge port 834 communicating with another space 819 is formed at the bottom plate 830.

In the reaction device 800, a reactant is made to flow into the intake port 832 by a pump or the like, so that the reactant flows in the space 818 and the space 819. While the reactant flows in the space 818 and the space 819, a product is produced from the reactant. Then, the product is discharged from the discharge port 834 to the outside. In each of the spaces 818 and 819, the reactant flows in the wave height direction of the partition plates 820 and 840.

As has been described above, according to the present embodiment, the reaction device 800 is configured such that the partition plate 820 and the separate plate 850 are housed in the box type member 810, and the bottom face opening of the box type member 810 is closed by the bottom plate 830. As a consequence, a series of spiral flow channels can be easily formed in the box type member 810, and its manufacture can be facilitated. In addition, the reaction vessel constructed by the box type member 810 and the bottom plate 830 is reinforced by the partition plate 820 and the separate plate 850, whereby the rigidity of the reaction vessel can be improved.

According to usage of the reaction device 800, a heater (such as a heating wire or combustor, for example) may be provided on the external face of at least one of the box type member 810 and the bottom plate 830, a catalyst may be carried onto the partition plate 820 (primarily, on the surface of the reinforce portion 822 and partition portion 824), or a catalyst may be carried onto the internal face of at least one of the box type member 810 and the bottom plate 830.

For example, in the case where the reaction device 800 is used as a vaporizer, a heating wire or a combustor is provided on the external face of at least one of the box type member 810 and the bottom plate 830. By doing this, a liquid serving as a reactant is heated while it flows from the intake port 832 to the discharge port 834, and a liquid is vaporized. In this manner, a gas serving as a product outflows from the discharge port 834.

In the case where the reacting device 800 is used as a reformer, a heating wire or a combustor is provided on the external face of at least one of the box type member 810 and the bottom plate 830, and a reforming catalyst (Cu/ZnO-based catalyst or Pd/ZnO-based catalyst, for example) is carried onto the surface of each of the reinforce portion 822 and the partition plate 824. By dong this, a gas mixture of a fuel and water serving as a reactant (gas mixture of methanol and water, for example) is heated while it flows from the intake part 832 to the discharge port 824, and a hydrogen gas or the like is produced from the gas mixture by means of the reforming catalyst. In this manner, the gas mixture containing the hydrogen gas or the like outflows from the discharge port 834 as a product.

In the case where the reaction device 800 is used as a carbon monoxide removing unit, a heating wire or a combustor is provided on the external face of at least one of the box type member 810 and the bottom plate . 830, and a carbon monoxide selective oxidizing catalyst (platinum, for example) is carried on the surface of each of the reinforce portion 822 and the partition portion 824. By doing this, a gas mixture of a hydrogen gas, an oxygen gas, and a carbon monoxide gas serving as a reactant is heated while it flows from the intake port 832 to the discharge port 834. Then, the carbon monoxide gas is selectively oxidized by the carbon monoxide selective oxidization catalyst. As a consequence, a gas from which the carbon monoxide gas has been removed outflows as a product from the discharge port 834.

In the case where the reaction device 800 is used as a combustor, a combustion catalyst (for example, platinum) is carried onto the surface of each of the reinforce portion 822 and the partition portion 824. By doing this, a hydrogen gas is combusted while a gas mixture of a hydrogen gas and an oxygen gas serving as a reactant flows from the intake port 832 to the discharge port 834. As a result, water outflows as a product from the discharge port 834.

Now, a description will be given with respect to a heat insulation structure for restricting a thermal loss of the reaction device 800.

Figure 44:
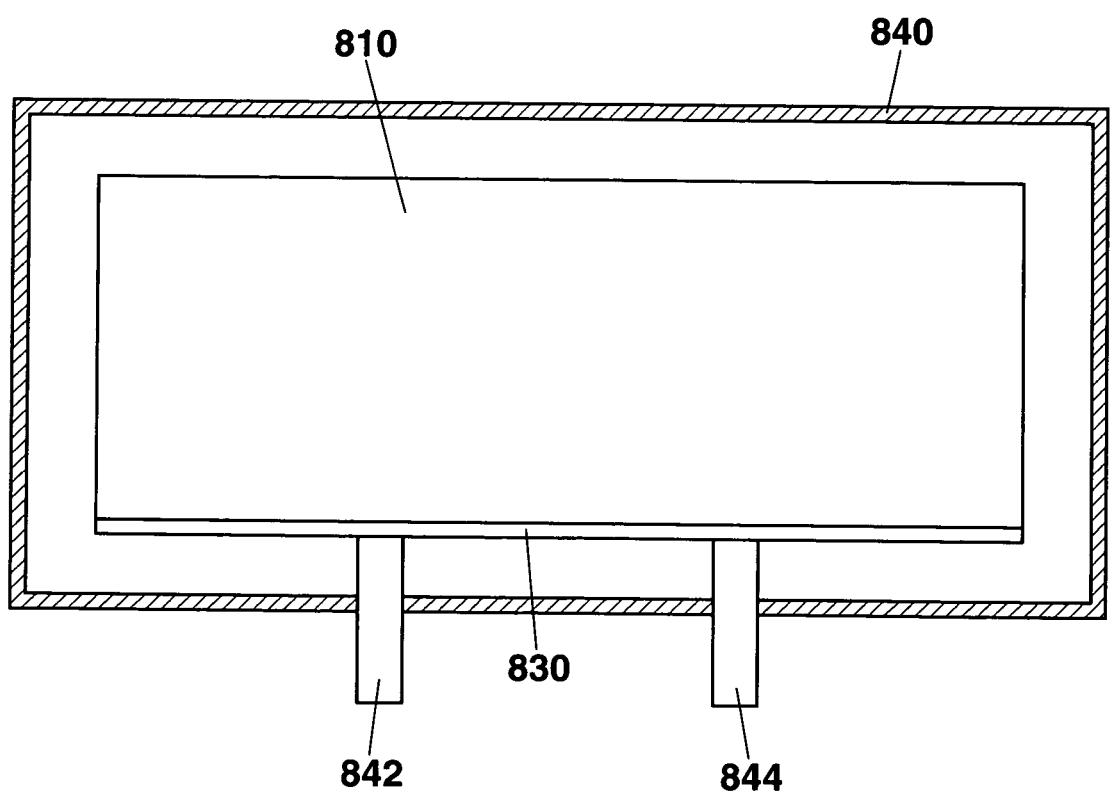
FIG. 44 is a perspective side view of a state in which a heat insulation package is provided in the reaction device in the sixth embodiment.

FIG. 44 is a perspective side view of a state in which a heat insulation package 840 is provided in the reaction device in the embodiment. The heat insulation package 840 is made of, for example, a metal material such as a stainless steel, or ceramics. The box type member 810 and the bottom plate 830 are housed in the heat insulation package 800. In this case, two pipes 842 and 844 are penetrated on a wall face of the heat insulation package 840, an end of one pipe 842 is connected to the intake port 832 in the heat insulation package 840 while an end of the other pipe 844 is connected to the discharge port 834. Here, assume that the box type member 810 and the bottom plate 830 are supported by the two pipes 842 and 844, and the box type member 810 and the bottom plate 830 are spaced from an internal face of the heat insulation package 840. In this state, direct heat conduction from the box type member 810 and the bottom plate 830 to the heat insulation package 840 can be restricted, and heat insulation property is improved more significantly. Further, the inside of the heat insulation package 840 is vacuum-evacuated, and the inside space is set at a vacuum pressure that is lower than an atmospheric pressure, thereby forming a vacuum heat insulation structure. If the internal space of the heat insulation package 840 is set at a vacuum pressure, the inside of the reaction vessel of the reaction device 800 is set at a normal pressure, and thus, is subjected to a stress in a direction in which the reaction vessel inflates by the box type member 810 and the bottom plate 830. However, the reinforce portions 822 are engaged with the side plates 814 of the box type member 810, and the side plates 814 are reinforced. The return portions 826 are joined to the side plates 816, and the side plates 816 are reinforced. Then, the lower rim part of the partition portion 824 is joined to the bottom plate 830, and the bottom plate 830 is reinforced. Then, the upper edge part of the partition portion 824 is joined to the top plate 812, and the top plate 812 is reinforced. By these elements, the entire reaction vessel is reinforced, and is prevented from being destroyed and deformed by a stress.

SEVENTH EMBODIMENT

Now, a seventh embodiment of the reactor according to the present embodiment will be described here. The identical or like constituent elements of the above described embodiments are designated by the identical or like reference numeral, and a description thereof is briefly described or omitted here.

Figure 45:
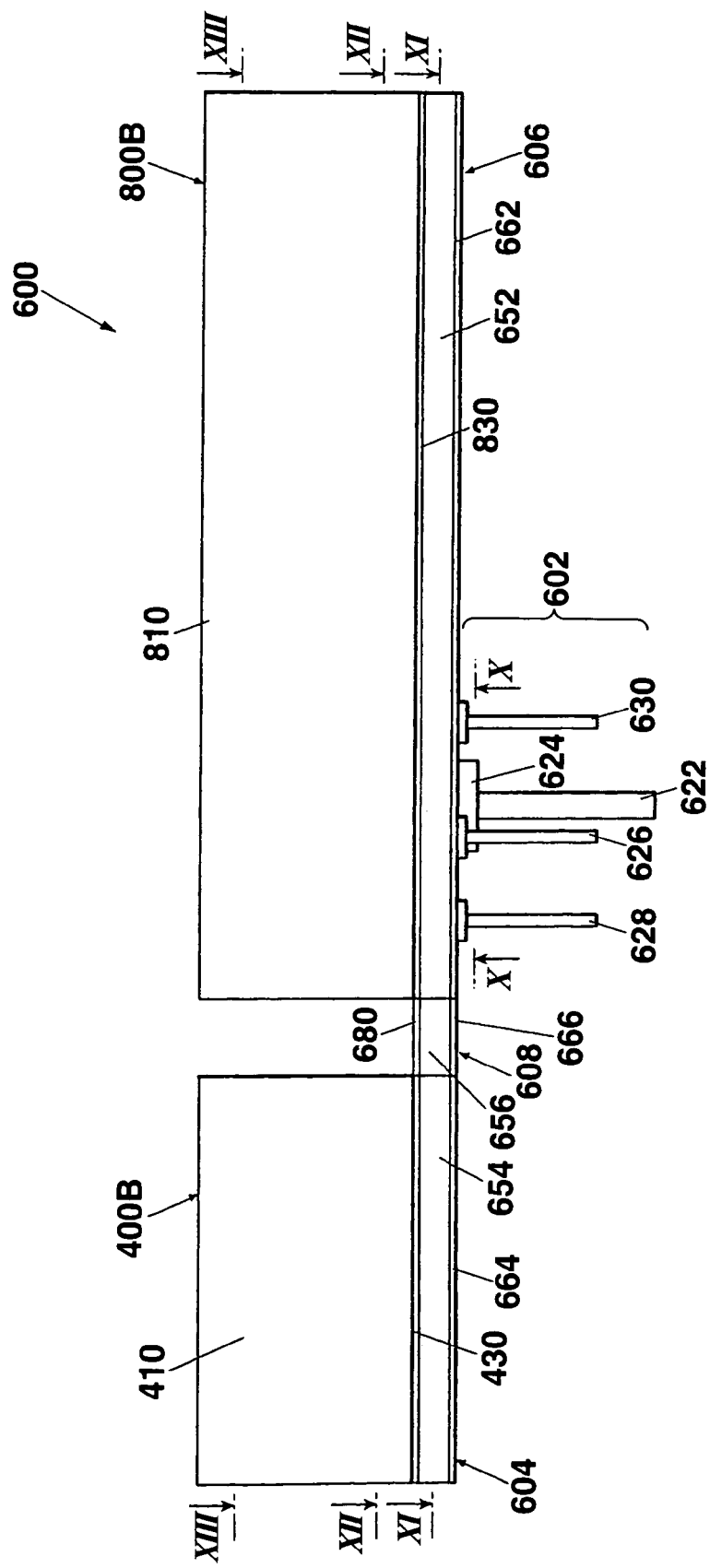
FIG. 45 is a side view of a microreactor module in a seventh embodiment of the reactor according to the present invention.
Figure 46:
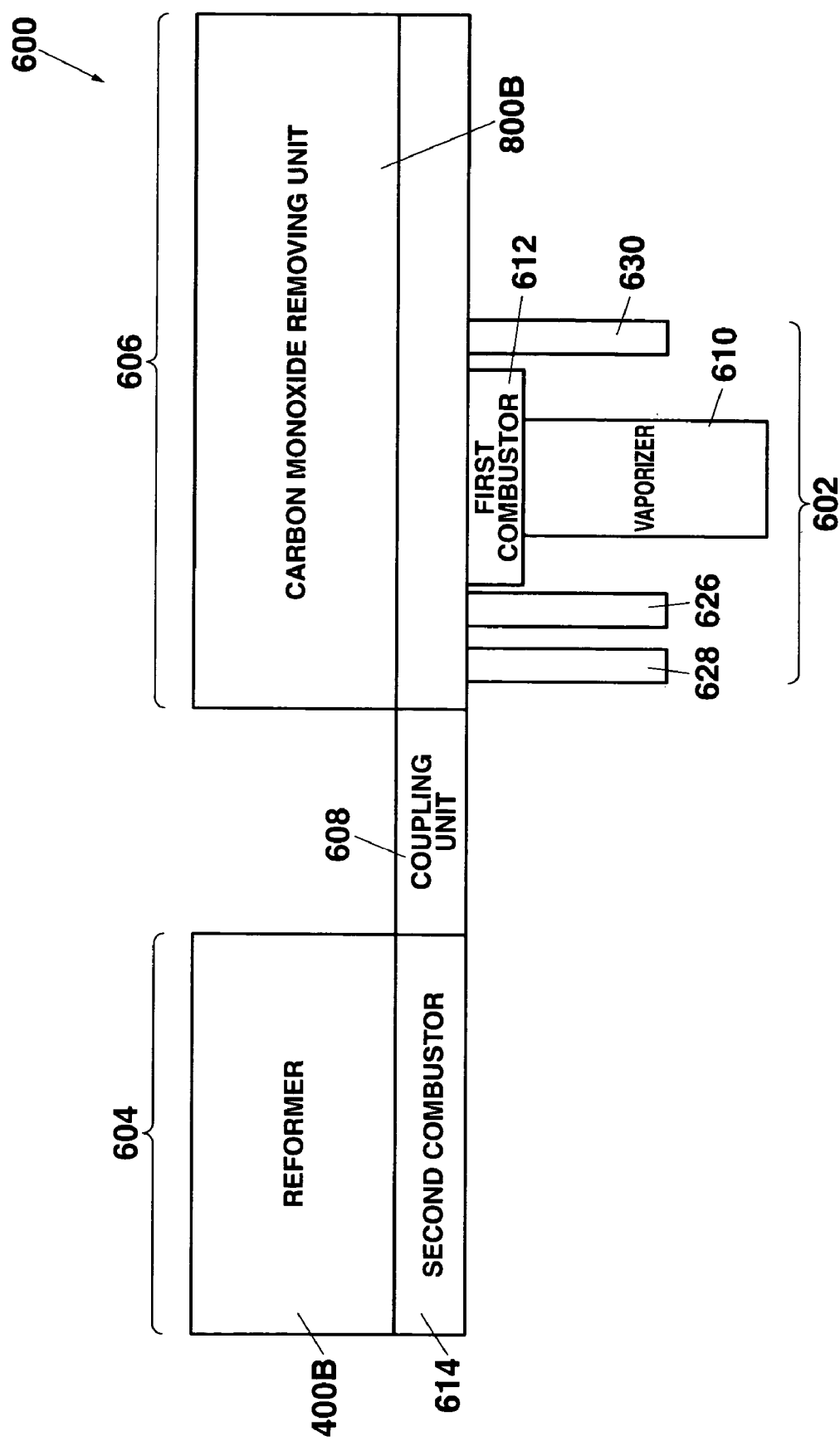
FIG. 46 is a schematic side view of the microreactor module in the seventh embodiment separated in terms of functions.

FIG. 45 is a side view of a microreactor module in the seventh embodiment of the reactor according to the invention. FIG. 46 is a schematic side view of the microreactor module in the seventh embodiment separated in terms of functions.

As shown in FIGS. 45 and 46, the microreactor module 600 has a configuration similar to the microreactor module 600 in the second embodiment, and comprises: a supply/discharge unit 602; a high-temperature reaction unit 604 (first reaction unit) at which a reforming reaction occurs; a low-temperature reaction unit 606 (second reaction unit) at which a selective oxidization reaction occurs; and a coupling unit 608 that sends a reactant or a product between the high-temperature reaction unit 604 and the low-temperature reaction unit 606.

The supply/discharge unit 602 is primarily provided with a vaporizer 610 and a first combustor 612. Air and a gas fuel are supplied respectively separately or as a gas mixture to the first combustor 612, and a heat is generated by a catalytic combustion of them. Water and a liquid fuel are supplied respectively separately or in a mixed state from a fuel container to the vaporizer 610, and the water and the liquid fuel are vaporized by a combustion heat in the first combustor 612.

The high-temperature reaction unit 604 is primarily provided with a second combustor 614 and a reformer 400B provided on the second combustor 614. Air and a gas fuel are supplied respectively separately or as a gas mixture to the second combustor 614, and a heat is generated by a catalytic combustion of them.

A gas mixture (first reactant) of the vaporized water and liquid fuel is supplied from the vaporizer 610 to the reformer 400, and then, the reformer 400B is heated by the second combustor 614. In the reformer 400B, a hydrogen gas or the like (first product) is produced from the liquid fuel vaporized with water vapor by means of a catalytic reaction, and further, a carbon monoxide gas is produced, although its amount is very small. In the case where the fuel is methanol, the above chemical reactions as shown in the chemical formulas (1) and (2) occur.

The low-temperature reaction unit 606 is primarily provided with a carbon monoxide removing unit 800B. The carbon monoxide removing unit 800B is heated by the first combustor 612. A gas mixture (second reactant) containing a hydrogen gas from the reformer 400B and a small amount of carbon monoxide gas or the like produced by the chemical reaction of the above formula (2) is supplied, and further, oxygen (or occasionally air) is supplied. In the carbon monoxide removing unit 500B, carbon monoxide is selectively oxidized among the gas mixture, whereby the thus oxidized carbon monoxide is removed. A gas mixture (second product: hydrogen-rich gas) from which carbon monoxide has been removed is supplied to a fuel electrode of a fuel cell.

Now, a specific configuration of the microreactor module 600 in the present embodiment will be described with reference to FIGS. 45 and 47 to 51.

Figure 47:
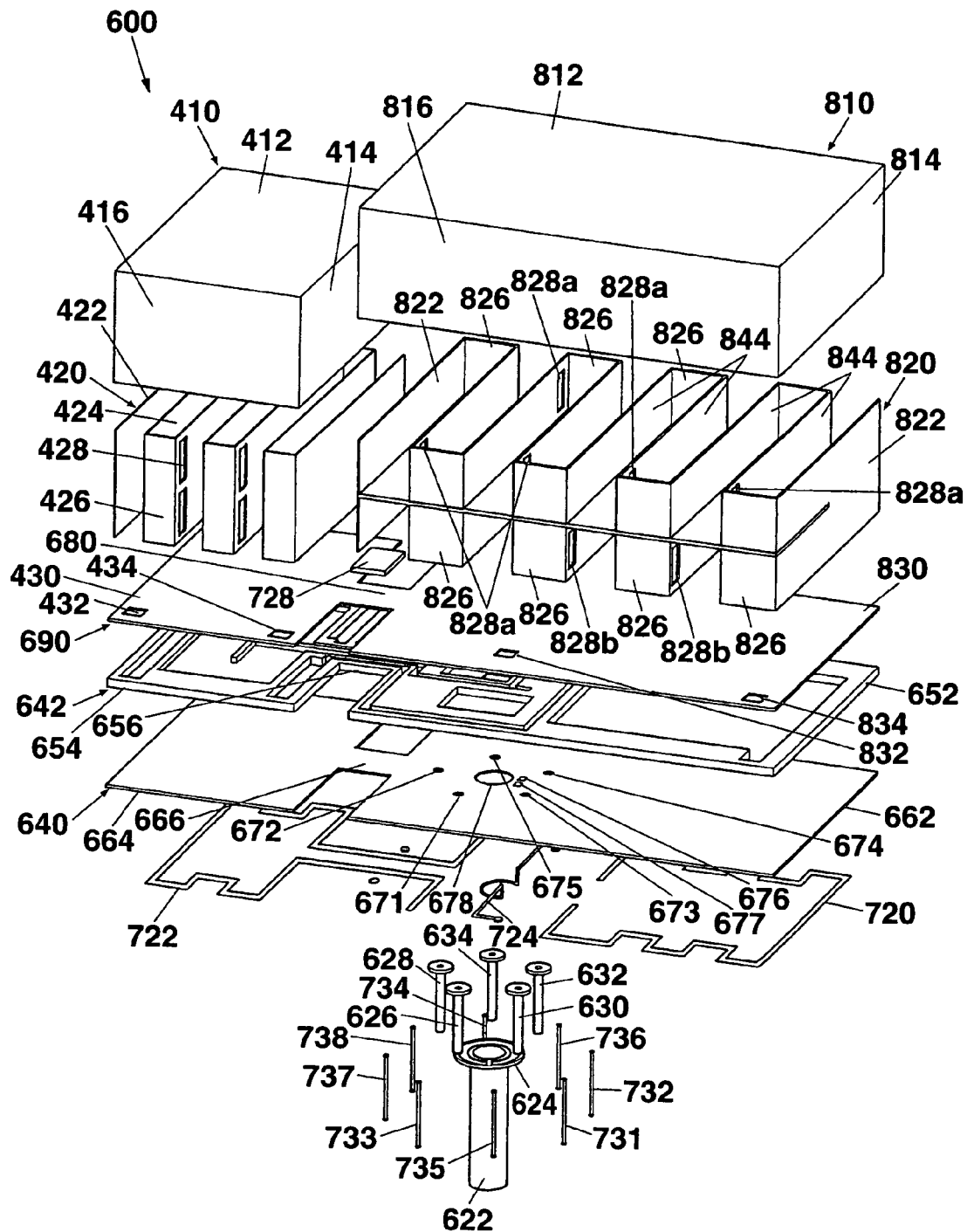
FIG. 47 is an exploded perspective view of the microreactor module in the seventh embodiment.
Figure 48:
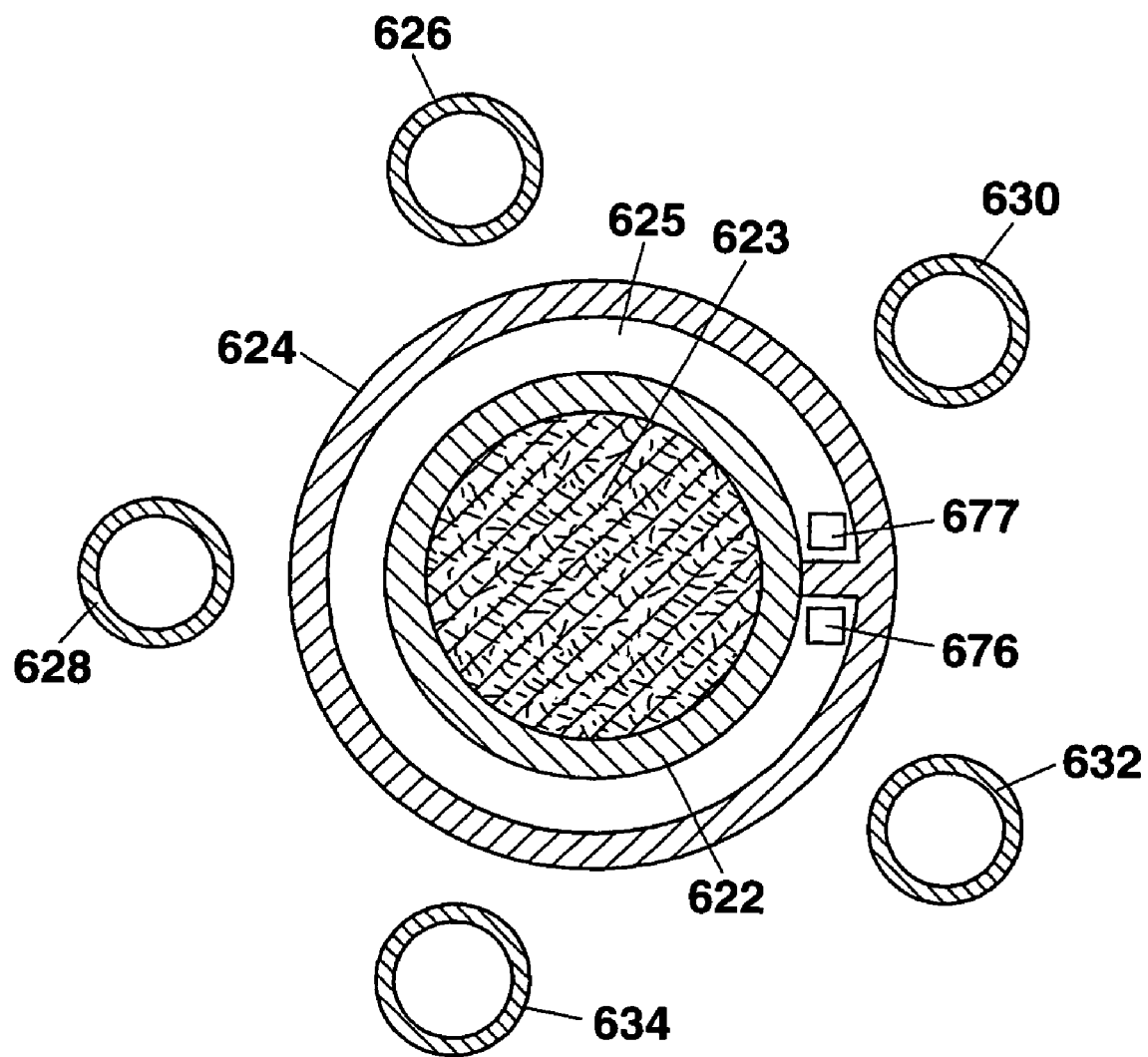
FIG. 48 is a cross sectional view taken along the section line X-X of FIG. 45.
Figure 49:
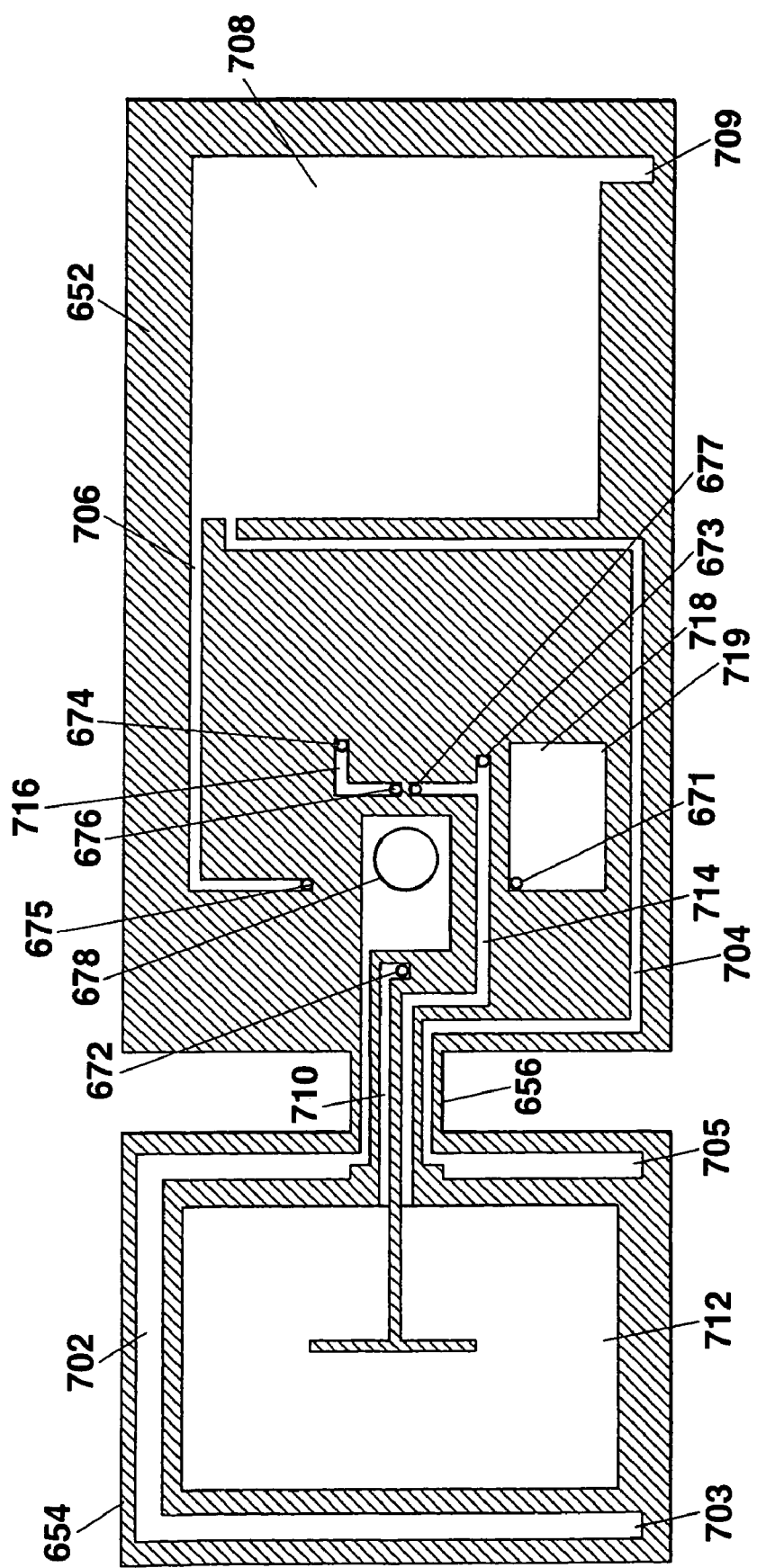
FIG. 49 is a cross sectional view taken along the section line XI-XI of FIG. 45.
Figure 50:
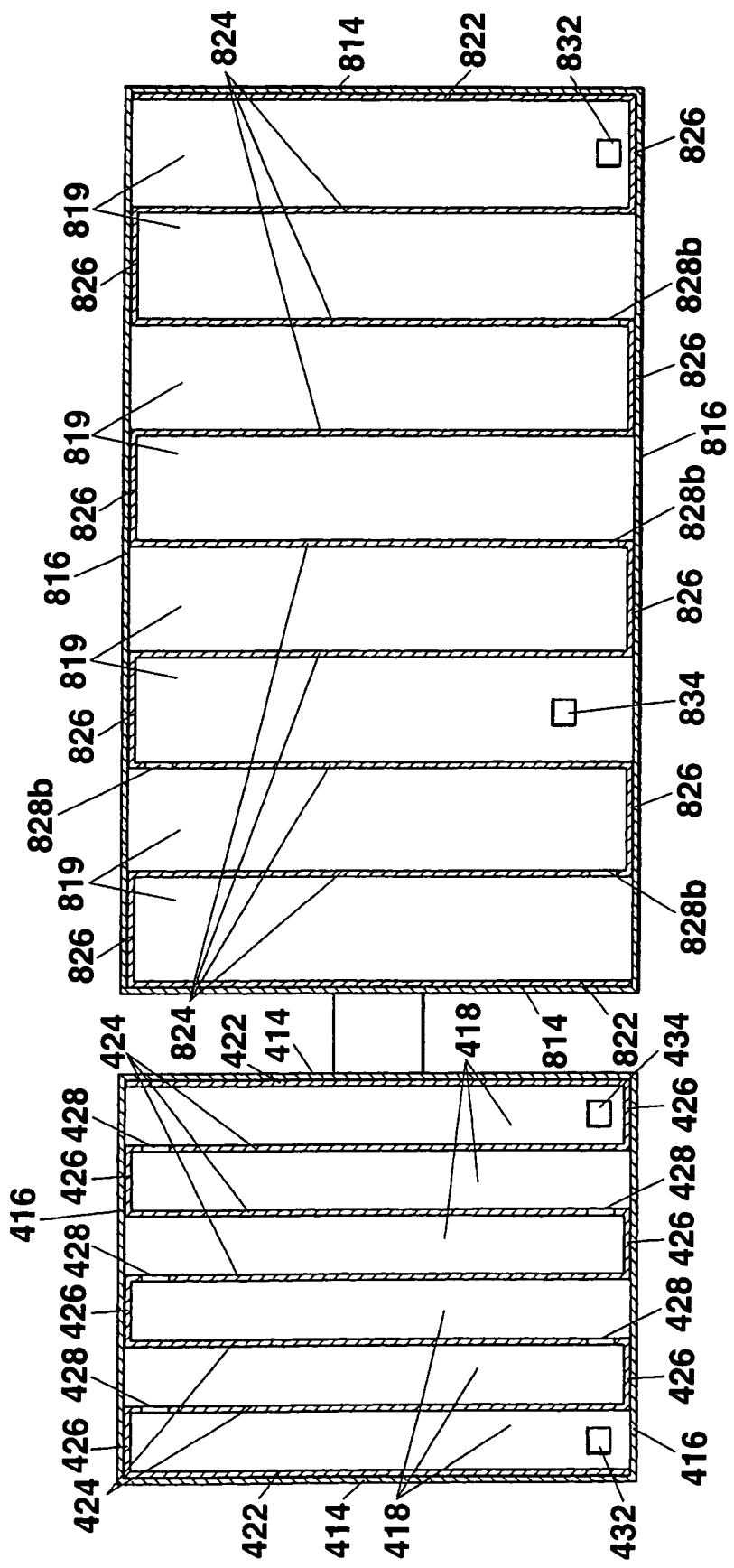
FIG. 50 is a cross sectional view taken along the section line XII-XII of FIG. 45.
Figure 51:
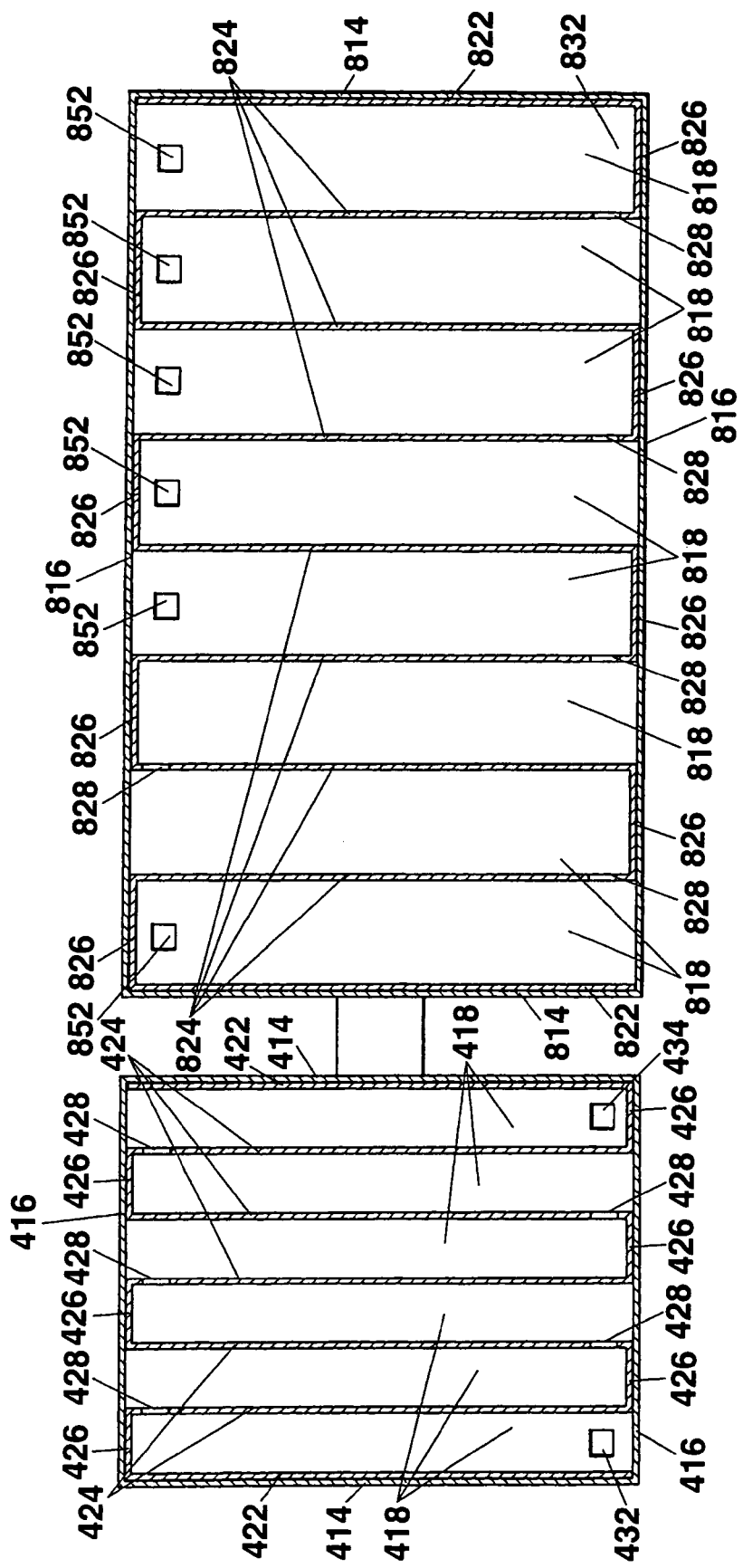
FIG. 51 is a cross sectional view taken along the section line XIII-XIII of FIG. 45.

FIG. 47 is an exploded perspective view of the microreactor module in the embodiment. FIG. 48 is a cross sectional view taken along the section line X-X of FIG. 45. FIG. 49 is a cross sectional view taken along the section line XI-XI of FIG. 45. FIG. 50 is a cross sectional view taken along the section line XII-XII of FIG. 45. FIG. 51 is a cross sectional view taken along the section line XIII-XIII of FIG. 45.

As shown in FIGS. 45, 47 and 48, the supply/discharge unit 602 comprises: a liquid fuel intake pipe 622; a combustor plate 624 provided so as to surround the liquid fuel intake pipe 622 at an upper end part of the liquid fuel intake pipe 622; and five pipes 626, 628, 630, 632, and 634 arranged at the periphery of the liquid fuel intake pipe 622.

The liquid fuel intake pipe 622 is made of a tubular metal material such as a stainless steel, for example, and the liquid fuel intake pipe 622 is filled with a liquid absorption material 623. The liquid absorption material 623 is intended to absorb a liquid. The liquid absorption material 623 is made of, for example, an inorganic fiber or an organic fiber bound with a binder; sintered inorganic powder; inorganic powder bound with a binder; or a mixture of graphite and grassy carbon. Specifically, a felt material, a ceramics porous material, a fiber material, a carbon porous material and the like are used as the liquid absorption material 623.

The pipes 626, 628, 630, 632, and 634 each are made of a tubular metal material such as a stainless steel, for example.

The combustor plate 624 is also made of a tubular metal material such as a stainless steel, for example. A through-hole is formed at the center part of the combustor plate 624, and the liquid fuel intake pipe 622 is engaged into the through-hole, so that the liquid fuel intake pipe 622 and the combustor plate 624 are joined to each other. Here, the liquid fuel intake pipe 622 is joined to the combustor plate 624 by means of brazing, for example. As a brazing agent, it is particularly preferable to use a gold brazing having a melting point higher than the highest temperature among the temperatures of the fluid that flows through the liquid fuel intake pipe 622 or the combustor plate 624 and containing gold, silver, zinc, and cadmium, a brazing consisting essentially of gold, silver, zinc, and nickel, or a brazing consisting essentially of gold, palladium, and silver. Further, a bulkhead is provided so as to protrude on one face of the combustor plate 624. A part of the bulkhead is provided all around the outer rim of the combustor plate 624, and the other part thereof is provided around a diameter direction. Then, the combustor plate 624 is joined to a bottom face of the low-temperature reaction unit 606, whereby a combustion flow channel 625 is formed on the bonded face, and the liquid fuel intake pipe 622 is surrounded by the combustion flow channel. A combustion catalyst for combusting a combustion gas mixture is carried onto a wall face of the combustion flow channel 625. Platinum is exemplified as the combustion catalyst, for example. The liquid absorption material 623 in the liquid fuel intake pipe 622 is filled up to a position of the combustion plate 624.

As shown in FIGS. 45 and 47, the high-temperature reaction unit 604, the low-temperature reaction unit 606, and the coupling unit 608 use as a common substrate an insulation plate 640 and a base plate 642 that are laminated with each other. For this reason, the insulation plate 640 is provided as a bottom face common to the high-temperature reaction unit 604, the low-temperature reaction unit 606, and the coupling unit 608, whereas the bottom face of the coupling unit 608 is in plane with the bottom face of the high-temperature reaction unit 604, and further, is in plane with the bottom face of the low-temperature reaction unit 606.

The base plate 642 is composed of: a base portion 652 serving as a substrate of the low-temperature reaction unit 606; a base portion serving as a substrate of the high-temperature reaction unit 604; and a coupling base portion 656 serving as a substrate of the coupling unit 608. The base plate 642 is formed integrally with the base portion 652, the base portion 654, and the coupling base portion 656, and is established in a state that the base plate is enclosed in the coupling base portion 656. The base plate 654 is made of a planar metal material such as a stainless steel, for example.

The insulation plate 640 is composed of: a base portion 662 serving as a substrate of the low-temperature reaction unit 606; a base portion 664 serving as a substrate of the high-temperature reaction unit 604; and a coupling base portion 666 serving as a substrate of the coupling unit 608. The insulation plate 640 is formed integrally with the base portion 662, the base portion 664, and the coupling base portion 666, and is established in a state that the insulation plate is enclosed in the coupling base portion 666. The insulation plate 640 is made of an electric insulation element such as ceramics, for example.

As shown in FIGS. 47 and 49, with the insulation plate 640 joined to the base plate 642, through-holes 671 to 678 each penetrate the base portion 652 of the base plate 642 and the base portion 662 of the insulation plate 640.

As shown in FIGS. 45 and 47, the base portion 662 of the insulation plate 640 is provided as the bottom face of the low-temperature reaction unit 606, whereas the pipes 626, 628, 630, 632, and 634 and the liquid fuel intake pipe 622 are joined to the bottom face of the low-temperature reaction unit 606 by means of brazing or the like. Here, the pipe 626 is passed through with the through-hole 671, the pipe 628 is passed through the through-hole 672, the pipe 630 is passed through the through-hole 673, the pipe 632 is passed through the through-hole 674, the pipe 634 is passed through the through-hole 675, and the liquid fuel intake pipe 622 is passed through the through-hole 678.

As shown in FIGS. 47, 48 and 49, the combustor plate 624 is joined to the bottom face of the low-temperature reaction unit 606, whereas one end of the combustion flow channel 625 of the combustor plate 624 is passed through the through-hole 676 while the other end of the combustion flow channel 625 is passed through the through-hole 677.

As shown in FIG. 49, the base plate 672 has formed thereon a reforming fuel supply flow channel 702, a communication flow channel 704, an air supply flow channel 706, a mixture chamber 708, a combustion fuel supply flow channel 710, a combustion chamber 712, an exhaust gas flow channel 714, a combustion fuel supply flow channel 716, and a discharge chamber 718.

The reforming fuel supply flow channel 702 is formed from the through-hole 678 up to a corner of the base portion 654 through the coupling base portion 656. The mixture chamber 708 is formed in a rectangular shape at the base portion 652. The communication flow channel 704 is formed from the corner of the base portion 654 up to the mixture chamber 708 through the coupling base portion 656. The air supply flow channel 706 is formed from the through-hole 675 up to the mixture chamber 708.

The combustion chamber 712 is formed in a C-shape at the center part of the base portion 654. A combustion catalyst for combusting a combustion gas mixture is carried onto a wall face of the combustion chamber 712.

The combustion fuel supply flow channel 710 is formed from the through-hole 672 up to the combustion chamber 712 through the coupling base portion 656. The exhaust gas flow channel 714 is formed from the through-hole 677 up to the through-hole 673 and is formed from the combustion chamber 712 up to the through-hole 673 through the coupling base portion 656. The combustion fuel supply flow channel 716 is formed from the through-hole 674 up to the through-hole 676 at the base portion 652. The discharge chamber 718 is formed in a rectangular shape at the base portion 652, and the through-hole 671 is provided at a corner of the evaluation chamber 718.

A carbon monoxide removing unit 800B is provided on the base portion 652. The carbon monoxide removing unit 800B is an application of the reaction device 800 in the sixth embodiment. The carbon monoxide removing unit 800B is configured in the same manner as that in the reaction device 800 shown in FIGS. 39 to 43.

A cross section of the carbon monoxide removing unit 800B shown in FIG. 50 corresponds to that of the reaction device 800 shown in FIG. 42 of the sixth embodiment, and a cross section of the carbon monoxide removing unit 800B shown in FIG. 51 corresponds to that of the reaction device 800 shown in FIG. 43. Constituent elements corresponding to each other between the carbon monoxide removing unit 800B and the reaction device 800 are designated by the identical reference numerals, and a duplicate description of the constituent elements corresponding to each other is omitted here.

As shown in FIGS. 45 and 47, a bottom plate 830 of the carbon monoxide removing unit 800B is joined to a top face of the base portion 652. The bottom plate 830 covers part of the reforming fuel supply flow channel 702, part of the exhaust gas flow channel 714, part of the combustion fuel supply flow channel 710, part of the communication flow channel 704, the air supply flow channel 706, the mixture chamber 708, the combustion fuel supply flow channel 716, and the discharge chamber 718. An intake port 832 formed at the bottom plate 830 is positioned on a corner 709 of the mixture chamber 708, and a discharge port 834 formed at the bottom plate 830 is positioned on a corner 719 of the discharge chamber 718.

In the carbon monoxide removing unit 800B, a carbon monoxide selective oxidization catalyst (for example, platinum) is carried onto the internal faces of the box type member 810 and the bottom plate 830, and the partition plate 820 and the separate plate 850.

Next, a reformer 400B is provided on the base portion 654. Now, a description will be given here with respect to the reformer 400B. The reformer 400B comprises a box type member 410 that opens at the bottom face; a partition plate 420 housed in the box type member 410; and a bottom plate 430 that closes a lower side opening of the box type member 410. Here, the partition plate 420 corresponds to the partition member in each of the third to fifth embodiments, although it is not limited thereto. A partition member having the similar configuration to that of the partition member 820 in the present embodiment or a partition member in another embodiment may be configured while it is housed in the box type member 410.

The box type member 410, the partition plate 420, and the bottom plate 430 may be made of a planar metal material such as a stainless steel, may be made of a ceramics material, may be made of a glass material, or may be made of a resin material.

The box type member 410 has a top plate 412 formed in a square or a rectangle shape; a pair of side plate 414 connected in a state that they communicate with two opposite edges among the four edges of the top plate 412 at right angle to the top plate 412; and a pair of side plates 416 connected in a state that they communicate with the other two opposite edges of the top plate 412 at right angle to the top plate 412. The side plates 414 are connected in a state that they vertically communicate with respect to the side plates 416. The square frame shape or the rectangular frame shape is provided by these four side plates 414 and 416.

A rim part of the bottom plate 430 is joined to a lower edge part of each of the side plates 414 and 416 so as to parallel to the top plate 412. The bottom face opening of the box type member 410 is thus closed by the bottom plate 430, whereby a reaction vessel formed in a parallel tetrahedron shape having a hollow is configured.

The partition plate 420 is formed in a rectangular wavy shape. Namely, the partition plate has: a pair of planar reinforce portions 422 opposed to each other at both sides thereof; a plurality of partition portions 4242 opposed to the reinforce portions 422 between the two reinforce portions 422; a plurality of return portions 426 connected between the partition portions 424 and 424 adjacent to each other or between the adjacent partition portion 424 and reinforce portion 422 at one edge of the four edges of the partition portion 424.

The partition plate 420 is housed in the box type member 410 such that the wave height direction is parallel to the top plate 412. The reinforce portions 422 of the partition plate 420 come into facial contact width the side plates 414, and preferably, the reinforce portions 422 are joined to the side plates 414 by means of welding. The return portions 426 of the partition plate 420 come into facial contact width the side plates 416, and preferably, the return portions 426 are joined to the side plates 416 by means of welding.

An upper edge part of the return portion 426 and an upper edge part of the reinforce portion 422 come into contact with the top plate 412 of the box type member 410, and preferably, are joined thereto by means of welding. A lower edge part of the return portion 426 and a lower edge part of the reinforce portion 422 come into contact with the bottom plate 430, and preferably, are jointed thereto by means of welding.

Since the partition plate 420 is thus housed in the box type member 410, a hollow defined by the box type member 410 and the bottom plate 430 is partitioned into a plurality of spaces 418 by the partition portion 424. Among the plurality of spaces 418, an intake port 432 communicating with a space 418 between one reinforce portion 422 and the partition portion 424 is formed at the bottom plate 430, and a discharge port 434 communicating with a space 418 between the other reinforce portion 422 and the partition portion 424 is formed at the bottom plate 430.

In addition, a pair of top and bottom through-holes (first through-holes) 428 and 428 are formed in the vicinity of one end in the wave height direction of the partition portion 424, and the adjacent spaces 418 communicate with each other via the through-holes 428. For this reason, a hollow defined by the box type member 410 and the bottom plate 430 is provided in a flow channel shape from the intake port 432 and the discharge port 434, and its flow channel is formed in a spiral shape.

As shown in FIGS. 45 and 47, the bottom plate 430 of the reformer 400B is joined to the top face of the vase portion 654. The bottom plate 430 covers part of the reforming fuel supply flow channel 702, part of the exhaust gas flow channel 714, part of the combustion fuel supply flow channel 710, part of the communication flow channel 704, and the combustion chamber 712. The intake port 432 formed at the bottom plate 430 is positioned on an end part 703 of the reforming fuel supply flow channel 702, and the discharge port 434 formed on the bottom plate 430 is positioned on an end part 705 of the communication flow channel 704.

In the reformer 400B, a reforming catalyst (for example, Cu/ZnO-based catalyst or Pd/ZnO-based catalyst) is carried onto the internal faces of the box type member 4109 and bottom plate 430 or on the partition plate 420.

As shown in FIG. 47, the bottom plate 430 of the reformer 400B and the bottom plate 830 of the carbon oxide removing unit 800B are integrally formed in a state that they are connected to each other by a coupling cap 680. A plate material 690 having integrated the bottom plate 430, the bottom plate 830, and the coupling cap 680 is established in a state that the plate material is enclosed in the coupling cap 680. Although the plate material 690 is joined to the base plate 642, the coupling cap 680 of the plate material 690 is joined to the coupling base portion 656 of the base plate 642, whereby the coupling unit 608 is configured. In the coupling unit 608, part of the reforming fuel supply flow channel 702, part of the exhaust gas flow channel 714, part of the combustion fuel supply flow channel 710, and part of the communication flow channel 704 are covered with the coupling cap 680.

As shown in FIG. 47 or the like, an external shape of the coupling unit 608 is formed in a rectangular cylinder shape, for example. A width of the coupling unit 608 is narrower than that of each of the high-temperature reaction unit 604 and the low-temperature reaction unit 606, and a height of the coupling unit 608 is lower than that of each of the high-temperature reaction unit 604 and the low-temperature reaction unit 606. Then, the coupling unit 608 is bridged between the high-temperature reaction unit 604 and the low-temperature reaction unit 606, whereas the coupling unit 608 is coupled with the high-temperature reaction unit at the center part in the widthwise direction of the high-temperature reaction unit 604 and is coupled with the low-temperature reaction unit 606 at the center part in the widthwise direction of the low-temperature reaction unit 606.

As has been described above, the reforming fuel supply flow channel 702, the communication flow channel 704, the combustion fuel supply flow channel 710, and the exhaust gas flow channel 714 are provided at the coupling unit 608.

Now, a description will be given with respect to a flow channel provided inside of the supply/discharge portion 602, the high-temperature reaction unit 604, the low-temperature reaction unit 606, and the coupling unit 608.

Figure 52:
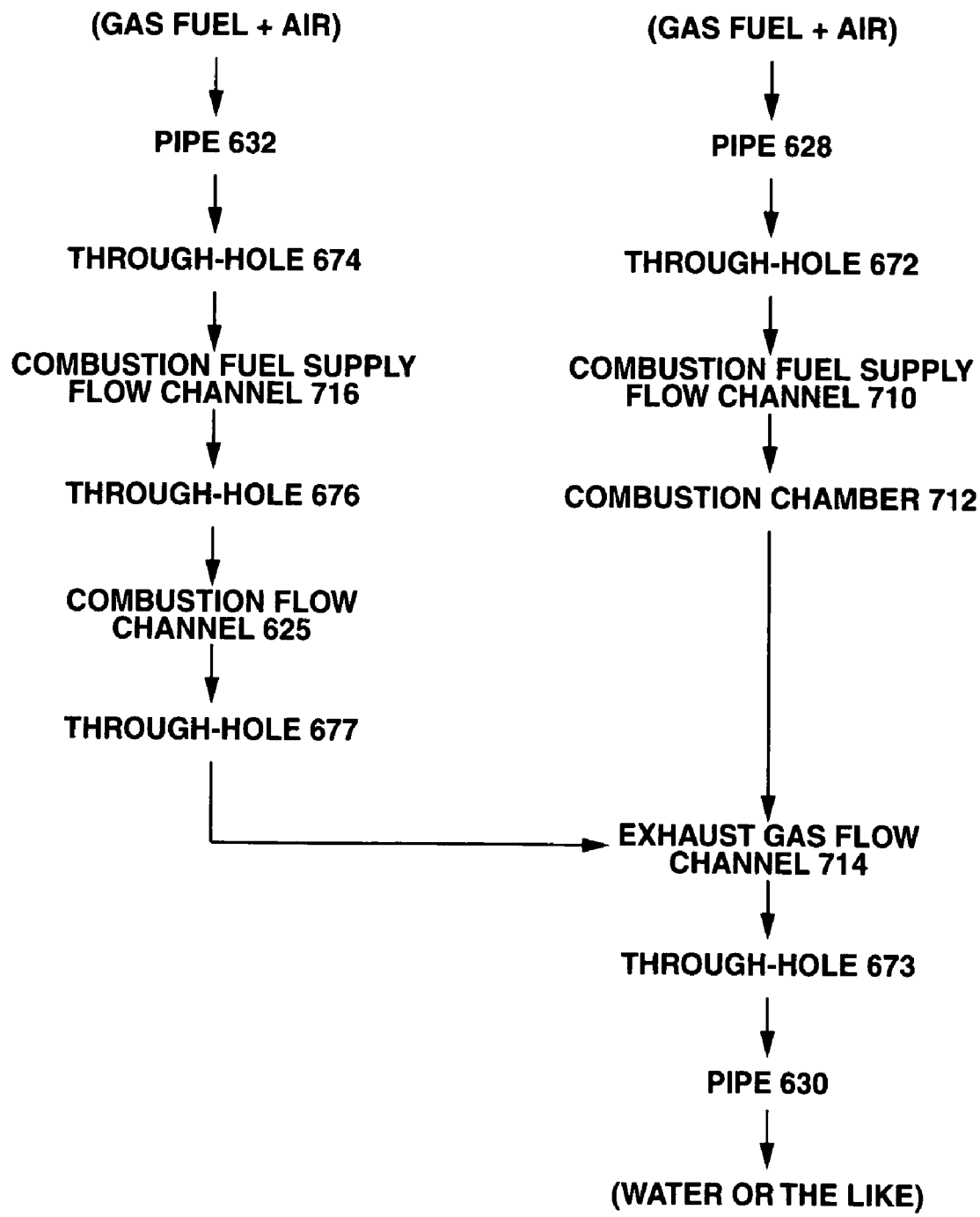
FIG. 52 shows a channel from supply of combustion gas mixture consisting of a gas fuel and air to discharge of water or the like that is a product in the microreactor module according to the seventh embodiment.
Figure 53:
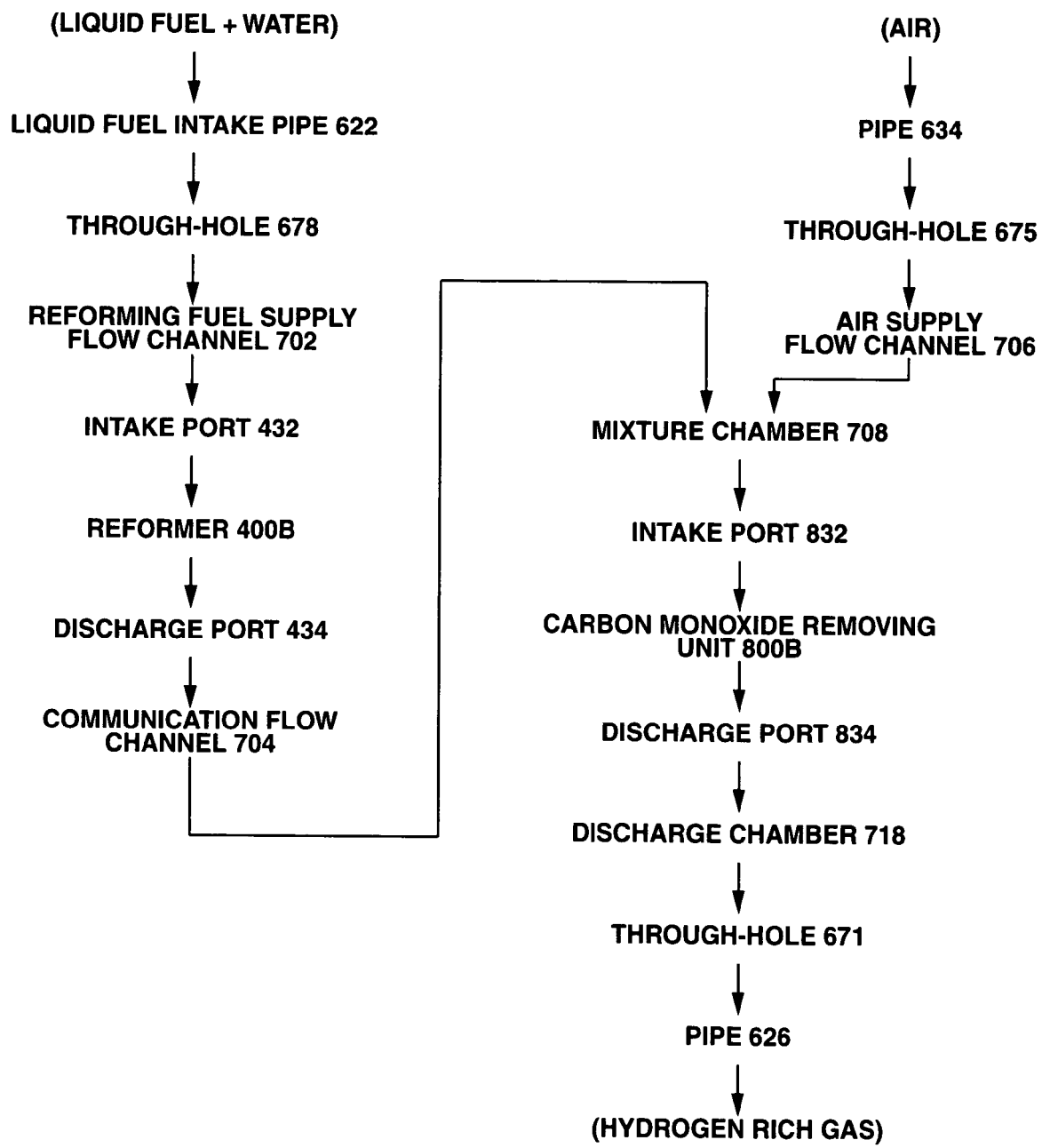
FIG. 53 shows a channel from supply of a liquid fuel and water to discharge of a hydrogen gas that is a product in the microreactor module according to the seventh embodiment.

FIG. 52 shows a channel from supply of a combustion gas mixture consisting of a gas fuel and air to discharge of water or the like that is a product in the microreactor module according to the embodiment. FIG. 53 shows a channel from supply a liquid fuel and water to discharge of a hydrogen gas that is a product in the microreactor module according to the embodiment.

A correlation among FIGS. 52, 53 and 46 will be described here. The liquid fuel intake pipe 622 corresponds to the vaporizer 610, the combustion flow channel 625 corresponds to the first combustor 612, and the combustion chamber 712 corresponds to the second combustor.

As shown in FIG. 47, a heating wire 720 is patterned in a wobble state on the bottom face of the low-temperature reaction unit 606, namely, on the bottom face of the insulation plate 640. On the bottom face from the low-temperature reaction unit 606 to the high-temperature reaction unit 604 through the coupling unit 608, a heating wire 722 is patterned in a wobble state. A heating wire 724 is patterned from the bottom face of the low-temperature reaction unit 606 to the side face of the liquid fuel intake pipe 622 through the surface of the combustor plate 624. Here, an insulation film made of silicon nitride, silicon oxide or the like is formed on the side face of the liquid fuel intake pipe 622 and on the surface of the combustor plate 624, and the heating wire 724 is formed on the surface of the insulation film. The heating wires 720, 722 and 724 are patterned on the insulation film or the insulation plate 640, whereby a voltage is not applied to the base plate 642, the liquid fuel intake pipe 622, the combustor plate 624 and the like which are made of a metal material, and then, heating efficiency of the heating wires 720, 722 and 724 can be improved.

The heating wires 720, 722 and 724 are laminated sequentially in order of the insulation film or insulation plate 640, a diffusion proof layer, and a heat generation layer. The heat generation layer is made of a material (for example, Au) having the lowest resistance rate among the three layers. If a voltage is applied to the heating wires 720, 722 and 724, a current intensively flows, and a heat is generated. Even if the heating wires 720, 722 and 724 are heated, a material for the heat generation layer is hardly thermally diffused to the diffusion proof layer, and a material for the diffusion proof layer is hardly thermally diffused to the heat generation layer. It is preferable to use as the diffusion proof layer a material (for example, W) having a comparatively high melting point and low reactivity. In the case where the diffusion proof layer is lowly coherent to the insulation film and is easily released, a coherent layer may be further provided between the insulation film and the diffusion proof layer. The coherent layer is made of a material (such as Ta, Mo, Ti, or Cr, for example) having superior coherence to the diffusion proof layer and to the insulation film or the insulation plate 640. The heating wire 720 heats the low-temperature reaction unit 606 during startup, the heating wire 722 heats the high-temperature reaction unit 604 and the coupling unit 608 during startup, and the heating wire 724 heats the vaporizer 610 and the first combustor 612 of the supply/discharge unit 602. Thereafter, when the second combustor 614 is combusted by an OFF gas containing hydrogen from a fuel cell, the heating wire 722 heats the high-temperature reaction unit 604 and the coupling unit 608 as an assistance of the second combustor 614. Similarly, in the case where the first combustor 612 is combusted by an OFF gas containing hydrogen from a fuel cell, the heating wire 720 heats the low-temperature reaction unit 606 as an assistance of the first combustor 612.

The heating wires 720, 722 and 724 also function as a temperature sensor for reading a temperature change from a change of a resistance value because an electrical resistance changes depending on a temperature. Specifically, a temperature of the heating wires 720, 722 and 724 is proportional to the electrical resistance.

All the ends of the heating wires 720, 722 and 724 are positioned on the bottom face of the low-temperature reaction unit 606, and these ends are arranged so as to surround the combustor plate 624. Lead wires 731 and 732 are respectively connected to both ends of the heating wire 720, lead wires 733 and 734 are respectively connected to both ends of the heating wire 722, and lead wires 735 and 736 are respectively connected to both ends of the heating wire 724. In FIG. 8, for the sake of clarity, the heating wires 720, 722 and 724 and the lead wires 731 to 736 are not shown.

As shown in FIG. 47, a getter material 728 may be provided on the surface of the coupling unit 608. A heater such as a heating material is provided on the getter material 728, and lead wires 737 and 738 each are connected to the getter material 728. The getter material 728 is heated so as to be activated, thereby providing an adsorption action. By adsorbing a residual gas in an internal space of a heat insulation package 791 described later, a gas having leaked from the microreactor module 600 into the internal space of the heat insulation package 791, or a gas having invaded into the heat insulation package 791 from the outside, the impaired degree of vacuum of the internal space of the heat insulation package 791 and the lowering of heat insulation effect are restricted. Examples of a material for the getter material 728 may include an alloy consisting essentially of zirconium, barium, titanium, or vanadium. In FIG. 45, for the sake of clarity, the lead wires 737 and 738 are not shown.

Also in the microreactor module 600 in the embodiment, as in the case of the second embodiment, the entirety of the microreactor module 600 may be covered with the heat insulation package 791 (heat insulation vessel) in order to restrict a thermal loss. In this case, constituent elements are similar to those in the case of the second embodiment, and therefore, a duplicate description is omitted here.

In addition, since an operation of the microreactor module 600 in the present embodiment is similar to that of the microreactor module in the second embodiment, a duplicate description thereof is omitted here.

As has been described above, according to the embodiment of the invention, the partition plate 820 erected on the bottom plate 830 is housed in the box type member 810, and the bottom face opening of the box type member 810 is closed by the bottom plate 830. As a consequence, a flow channel is formed in the box type member 810, and manufacturing can be facilitated.

In addition, the return portions 826 are provided between the reinforce portions 822 or between the partition portions 822, and these return portions 826 come into contact with the both side plates 816 of the box type member 810, so that the box type member 810 and the partition plate 820 can be rigidly fixed to each other. Further, by these return portions 826, the reinforce portion 822 and the partition portion 824 are easily mounted vertically to the separate plate 850 or the bottom plate 830. In addition, the external faces of the reinforce portions 822 come into contact with the side plates 814 of the box type member 810, respectively. Thus, in this regard as well, the box type member 810 and the partition plate 820 can be rigidly fixed to each other.

Through-holes 828a and 828b are formed at the partition portion 824. Thus, via these through-holes, flow channels adjacent to each other in a horizontal direction are caused to communicate with each other, and a liquid fuel can be distributed between both the flow channels.

Since a flow channel is vertically partitioned by the separate plate 850, a multi-staged flow channel can be easily manufactured and the partition plate 820 can be restricted from being extended in a horizontal direction. Then, cutouts 825 and 855 are formed on the partition plate 820 and the separate plate 850, respectively, and the cutouts 825 and 855 are assembled with each other, whereby they can be rigidly joined to each other.

Further, a plurality of through-holes 852 are formed on the separate plate 850. Consequently, flow channels adjacent to each other in a vertical direction are caused to be communicate with each other, and a liquid fuel can be distributed between both the flow channels.

According to the present embodiment, the high-temperature reaction unit 604 is spaced from the low-temperature reaction unit 606, and a gap from the high-temperature reaction unit 604 to the low-temperature reaction unit 606 is provided as a length of the coupling unit 608. Therefore, a channel of heat conduction from the high-temperature reaction unit 604 and the low-temperature reaction unit 606 is limited to the coupling unit 608, and heat conduction to the low-temperature reaction unit 606 that does not require a high temperature is limited. In particular, the height and width of the coupling unit 608 are smaller than those of both the reaction units 604 and 606, and thus, heat conduction through the coupling unit 608 is also restricted to the minimum. For this reason, a thermal loss of the high-temperature reaction unit 604 can be restricted, and the low-temperature reaction unit 606 can be restricted from rising in temperature to a set temperature or higher. In other words, even in the case where the high-temperature reaction unit 604 and the low-temperature reaction unit 606 are housed in one heat insulation package 791, a temperature difference can be produced between the high-temperature reaction unit 604 and the low-temperature reaction unit 606.

Since the flow channels 702, 704, 710, and 714 forming a communication between the low-temperature reaction unit 606 and the high-temperature reaction unit 604 are provided in a state that they are collected in one coupling unit 608, a stress produced with the coupling unit 608 or the like can be reduced. More specifically, because a temperature difference exists between the high-temperature reaction unit 604 and the low-temperature reaction unit 606, the high-temperature reaction unit 604 inflates more significantly than the low-temperature reaction unit 606. However, the high-temperature reaction unit 604 has a free end except that the coupling unit with the coupling unit 608, so that the stress produced with the coupling unit 608 or the like can be restricted. In particular, the coupling unit 608 is smaller in height and width than the high-temperature reaction unit 604 or the low-temperature reaction unit 606, and further, the coupling unit 608 connects to the high-temperature reaction unit 604 and the low-temperature reaction unit 606 at the center part in the widthwise direction of the high-temperature reaction unit 604 and the low-temperature reaction unit 606. As a result, the stress is restricted from being generated on the coupling unit 608, the high-temperature reaction unit 604, and the low-temperature reaction unit 606.

Although the pipes 626, 268, 630, 632, and 634 and the liquid fuel intake pipe 622 extend to the outside of the heat insulation package 791, they are all connected to the low-temperature reaction unit 606. For this reason, direct heat conduction from the high-temperature reaction unit 604 to the outside of the heat insulation package 791 can be restricted, and a thermal loss of the heat-insulation reaction unit 604 can be restricted. Accordingly, even in the case where the high-temperature reaction unit 604 and the low-temperature reaction unit 606 are housed in one heat insulation package 791, a temperature difference can be produced between the high-temperature reaction unit 604 and the low-temperature reaction unit 606.

A bottom face of the coupling unit 608, a bottom face of the high-temperature reaction unit 604, and a bottom face of the low-temperature reaction unit 606 are in plane with one another. As a consequence, the heating wire 722 can be patterned comparatively easily, and disconnection of the heating wire 722 can be restricted.

Further, the liquid fuel intake pipe 622 is filled with the liquid absorption material 623, and the liquid fuel intake pipe 622 is provided as the vaporizer 610. Accordingly, a temperature state required for vaporization of a liquid mixture (a state in which an upper part of the liquid fuel intake pipe 622 is set at 120° C.) can be established while downsizing and simplification of the microreactor module 600 are promoted.

Moreover, the combustor plate 624 is provided at the periphery of the liquid fuel intake pipe 622 at an upper end of the liquid fuel intake pipe 622, and further, the liquid absorption material 623 contained in the liquid fuel intake pipe 622 is filled up to the height position of the combustor plate 624. As a result, the combustion heat in the first combustor 612 can be efficiently used for vaporization of the liquid mixture.

The present invention is not limited to the above-described embodiments. Various modifications and design changes may occur without departing from the spirit of the invention.

For example, while the partition plate 820 and the separate plate 850 are joined to each other by means of welding, they may be joined to each other by means of glass sealing. A joint between the box type member 810 and the partition plate 820, a joint between the box type member 810 and the bottom plate 830, and a joint between the partition plate 820 and the bottom plate 830 may also be carried out by means of glass sealing.

While one separate plate 850 is configured to be provided in the wave height direction of the partition plate 820, a plurality of separate plates 850 may be provided so that a flow channel is partitioned in multiple stages. The number of the partition portions 824 and the quantities and shapes of the through-holes 828a and 828b and through-holes 852 can be changed as required. For example, while the through-holes 828a and 828b are formed to be spaced from the upper edge part or the lower edge part of the partition portion 824, the upper edge part or the lower edge part may be formed in a cutout manner.

While the plurality of cutouts 855 are formed on the separate plate 850, a joint can be established as long as the cutout 825 is formed at least at the side of the partition plate 820. For this reason, the separate plate 850 may be configured so as to be inserted intact into the cutout 825 of the partition plate 820 without forming the cutout 855 on the separate plate 850 in particular.

Further, in the above embodiment, the second combustor 508 is provided by joining the combustor plates 106 and 108 on the bottom plate 117. However, a box type member that opens at the lower side in advance is provided, and then, the box type member is joined to the bottom plate 117 between a first reformer and a second reformer, whereby the lower side opening of the box type member may be closed by the bottom plate. In this case, the inside of the box type member is provided as a combustion chamber. The configuration is also available such that the combustion chamber is partitioned into two or more sections by bulkheads, and through-holes of the bulkheads are formed, whereby they may be caused to communicate with each other.

EIGHTH EMBODIMENT

Now, an eighth embodiment of the reactor according to the present invention will be described here.

Figure 55A:
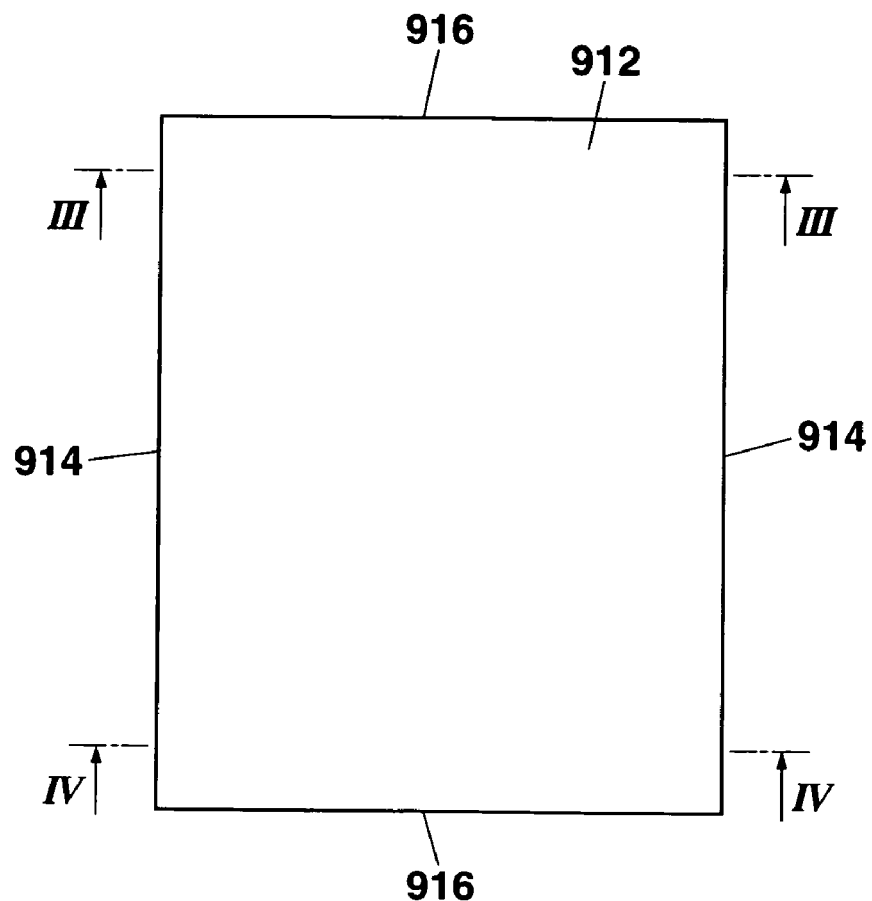
FIGS. 55A and 55B are a top view and a side view of the reaction device in the eighth embodiment.
Figure 55B:
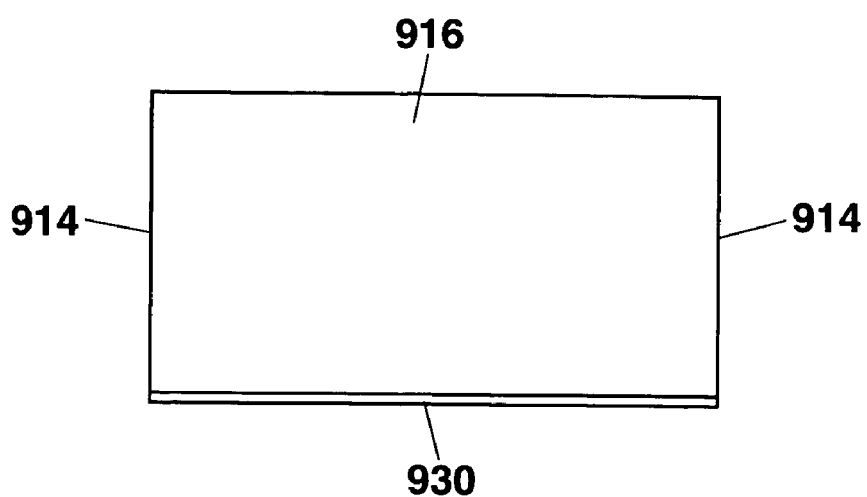
Figure 56:
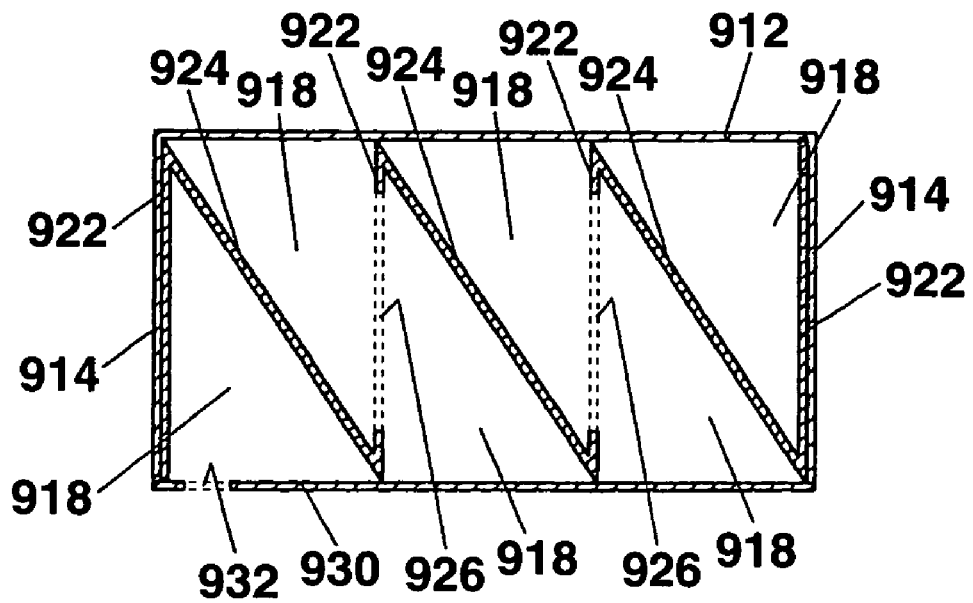
FIG. 56 is a sectional end face view taken along the section line III-III of FIG. 55A.
Figure 57:
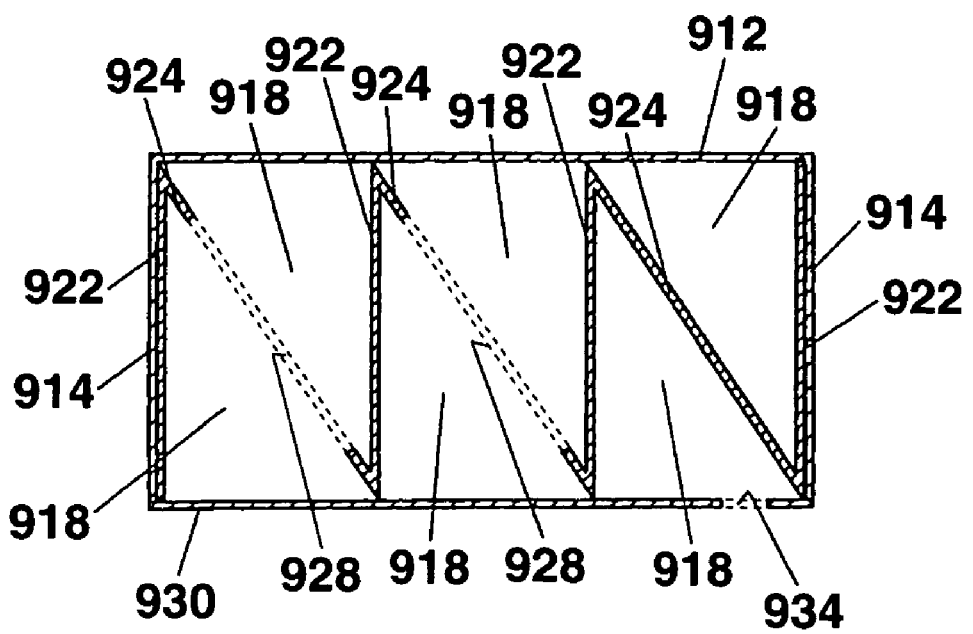
FIG. 57 is a sectional end face view taken along the section line IV-IV of FIG. 55A.

FIG. 54 is an exploded perspective view of a reaction device in the eighth embodiment of the reactor according to the invention as viewed from a slant power portion. FIGS. 55A and 55B are a top view and a side view of the reaction device in the eighth embodiment. FIG. 56 is an end face view taken along the section line III-III of FIG. 55A. FIG. 57 is an end face view taken along the section line IV-IV of FIG. 55A.

As shown in FIGS. 54 to 57, the reactor 900 comprises: a cup shaped box type member 910 that opens on one face thereof; a partition plate 920 housed in the box type member; and a cap plate 930 that closes a lower side opening of the box type member 910.

The box type member 910, the partition plate 920, and the bottom plate 930 may be made of a planar metal material such as a stainless steel, may be made of a ceramics material, may be made of a glass material, or may be made of a resin material.

The box type member 910 has a top plate 912 formed in a square or a rectangle shape; a pair of side plate 914 connected in a state that they communicate with two opposite edges among the four edges of the top plate at right angle to the top plate 912; and a pair of side plates 916 connected in a state that they communicate with the other two opposite edges of the top plate 912 at right angle to the top plate 912. The side plates 914 are connected in a state that they vertically communicate with respect to the side plates 916. The square frame shape or the rectangular frame shape is provided by these four side plates 914 and 916, and the top plate 912 is provided atop.

A rim part of the cap plate 930 is joined to a lower edge part of each of the side plates 914 and 916 such that the cap plate 930 is parallel to the top plate 912. The bottom face opening of the box type member 910 is thus closed by the cap plate 930, whereby a sealed parallel hexahedron shaped reaction vessel having a hollow is configured.

The partition plate 920 is formed in a corrugate plate shape folded in a triangular wavy shaped spirally folded manner. Namely, the partition plate has: a plurality of rectangular plate shaped first partition portions 922 opposite to each other; and a plurality of second partition portions 924 coupled between an upper edge of the first partition portion 922 and a lower edge of the adjacent first partition plate 922 thereto. A connection portion between the first partition portion 922 and the second partition portion 924 is provided as a ridge, and the partition plate 920 is returned on the ridge.

The partition plate is housed in the box type member 910 such that the wave height direction of the partition plate 920 is parallel to both the side plate 914 and the side plate 916, and then, one return ridge of the partition plate 920 is brought into linear contact with the top plate 912 of the box type member. In addition, the other return ridge of the partition plate 920 is brought into linear contact with the cap plate 930, the partition plate 920 is pushed by the cap plate, and the opening of the box type member 910 is closed by the cap plate 930. In this manner, the first partition portion 922 and the second partition portion 924 are established in a bent state.

The partition plate 920 is housed in the box type member 910, so that a hollow formed by the box type member 910 and the cap plate 930 is partitioned into a plurality of reaction chambers 918 by the partition plate 920.

The partition plate 920 is thus pushed into a space between the box type member 910 and the cap plate 930, and the first partition plate 922 and the second partition plate 924 are established in a bent state. As a consequence, a return ridge of the partition plate 920 is established in a state that the ridge comes into strongly intimate contact with the top plate 912 and the cap plate 930 by means of a resisting stress of the first partition plate 922 and the second partition portion 924. Both rims formed in a wavy shape of the partition plate 920 each come into contact with the side plates 916, and partition portions 922 at both sides of the partition plate 920 each come into facial contact with the side plates 914. In this way, the partition plate 920 comes into contact with the internal faces of the box type member 910 or the cap plate 930, and comes into intimate contact therewith, whereby the air tightness of the reaction chambers 918 can be improved without being joined to each other by means of welding or the like.

Furthermore, one return ridge of the partition plate 920 may be joined to the top plate 912 by means of welding or the like, or the other return ridge of the partition plate 920 may be joined to the cap plate 930 by means of welding or the like. In addition, both rims formed in a waveform shape of the partition plate 920 may be joined to the side plates 916 by welding or the like, or the partition portions 922 at both sides of the partition plate 920 may be joined to the side plates 914, respectively, by means of welding or the like. The above elements are thus joined to each other by welding or the like, whereby the air tightness of the reaction chambers 918 can be further improved, and the rigidity of the reaction device 900 can be improved.

Among a plurality of reaction chambers 918, an intake port 932 communicating with a reaction chamber 918 between the first partition portion 922 serving as one end and the second partition portion 924 communicating therewith is formed at the cap plate 930. A discharge port 934 communicating with a reaction chamber 918 between the second partition portion 924 communicating with the first partition portion 922 serving as the other end and an opposite first partition portion 922 communicating therewith is formed at the cap plate 930.

A rectangular communicating port 926 is formed, for example, close to one side plate 916 at each of the first partition portions 922 other than the first partition portions 922 located at both sides. In addition, a rectangular communicating port 928 is formed, for example, close to the other side plate 916 at each of the second partition portions 924 other than a second partition portion 924 facing the reaction chamber 918 that communicates with the discharge port 934. In this manner, the reaction chamber 918 through which the intake port 932 passes communicates with another reaction chamber 918 adjacent thereto via the communicating port 928 formed at the second partition portion 924. The reaction chamber 918 through which the discharge port 934 passes communicates with another reaction chamber 918 adjacent thereto via the communicating port 926 formed at the first partition portion 922. Such another reaction chamber 918 communicates with two reaction chambers adjacent thereto through the communicating port 926 and the communicating port 928. By doing this, the cavity formed by the box type member 910 and the cap plate 930 is provided in a flow channel shape from the intake port 932 to the discharge port 934, and the flow channel is formed in a spiral shape.

If, in the reaction device 900, a reactant is supplied to the intake port 932 by a pump or the like, the reactant flows sequentially in order of the plurality of reaction chambers 918. While the reactant flows in these reaction chambers 918, a product is produced from the reactant. Then, the product is discharged from the discharge port 934 to the outside. In each of the reaction chambers 918, the reactant flows from one side plate 916 to the other side plate 916 and vice versa.

According to usage of the reaction device 900, a heater (such as a heating wire or combustor, for example) may be provided on the external face of at least one of the box type member 910 and the bottom plate 930, a catalyst may be carried onto the partition plate 920, or a catalyst may be carried onto the internal wall face of at least one of the box type member 910 and the bottom plate 930.

For example, in the case where the reaction device 900 is used as a vaporizer, a heating wire or a combustor is provided on the external face of at least one of the box type member 910 and the bottom plate 930. By doing this, a liquid serving as a reactant is heated while it flows from the intake port 932 to the discharge port 934, and a liquid is vaporized. In this manner, a gas serving as a product outflows from the discharge port 934.

In the case where the reacting device 900 is used as a reformer, a heating wire or a combustor is provided on the external face of at least one of the box type member 910 and the bottom plate 930, and a reforming catalyst (Cu/ZnO-based catalyst or Pd/ZnO-based catalyst, for example) is carried onto the surface of the partition plate 920. By dong this, a gas mixture of a fuel and water serving as a reactant (gas mixture of methanol and water, for example) is heated while it flows from the intake part 932 to the discharge port 924, and a hydrogen gas or the like is produced from the gas mixture by means of the reforming catalyst. In this manner, the gas mixture containing the hydrogen gas or the like outflows from the discharge port 934 as a product.

In the case where the reaction device 900 is used as a carbon monoxide removing unit, a heating wire or a combustor is provided on the external face of at least one of the box type member 910 and the bottom plate 930, and a carbon monoxide selective oxidizing catalyst (platinum, for example) is carried on the surface of the partition plate 920. By doing this, a carbon monoxide gas is selectively oxidized by the carbon monoxide selective oxidization catalyst while a gas mixture of a hydrogen gas, oxygen gas, and the carbon monoxide gas serving as a reactant flow from the intake port 932 to the discharge port 934. In this manner, a gas from which the carbon monoxide has been removed outflows as a product from the discharge port 934.

In the case where the reaction device 900 is used as a combustor, a combustion catalyst (for example, platinum) is carried onto the surface of the partition plate 920. By doing this, a hydrogen gas is combusted while a gas mixture of the hydrogen gas and an oxygen gas serving as a reactant flows from the intake port 932 to the discharge port 934. In this manner, water outflows as a product from the discharge port 934.

Figure 58:
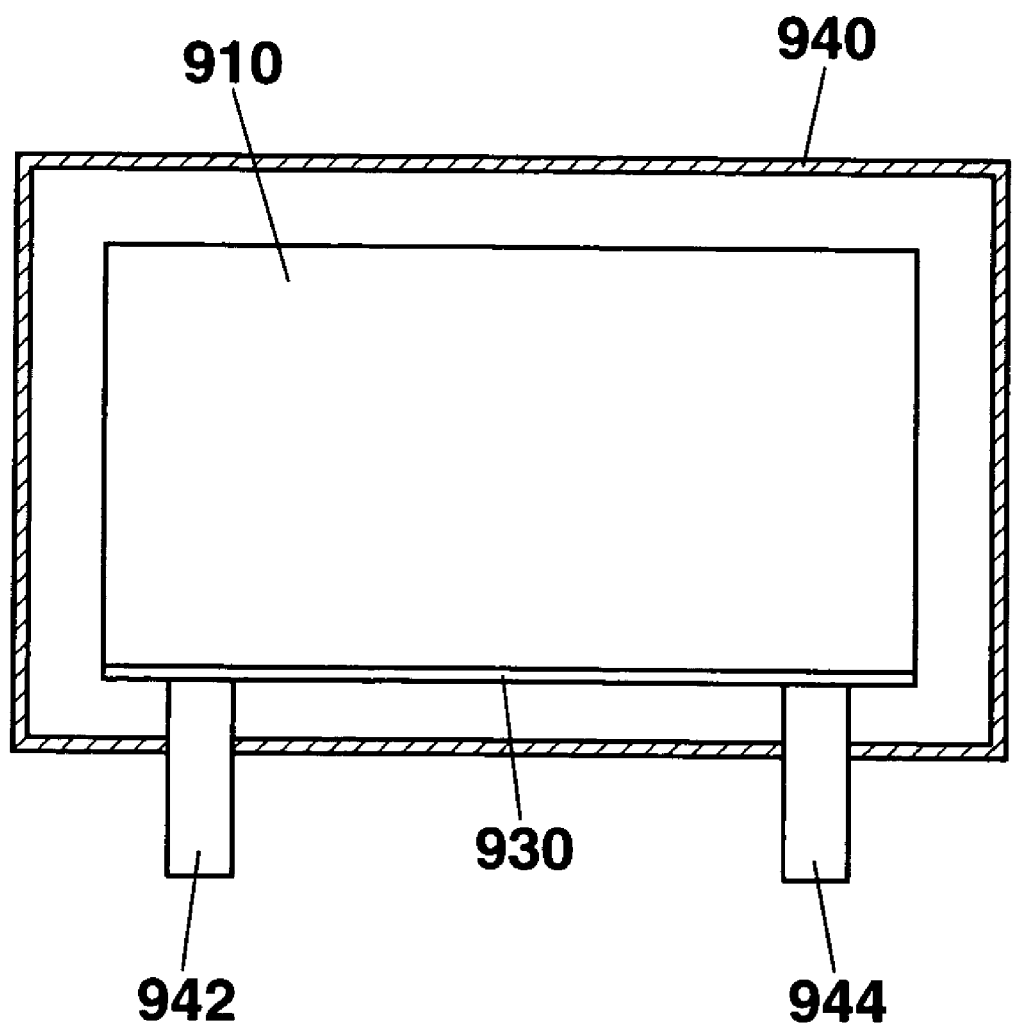
FIG. 58 is a perspective side view of a state in which a heat insulation package is provided in the reaction device in the eighth embodiment.

Now, a heat insulation structure for restricting a thermal loss of the reaction device 900 will be described here with reference to FIG. 58 that is a perspective side view of a state in which a heat insulation package is provided in the reaction device according to the present embodiment.

A heat insulation package 940 is made of, for example, a metal material such as a stainless steel, or ceramics. The box type member 910 and the cap plate 930 are housed in the heat insulation package 940. In this case, two pipes 942 and 944 are penetrated on a wall face of the heat insulation package 940. An end of one pipe 942 is connected to the intake port 932 in the heat insulation package 940, and the other end of the pipe 944 is connected to the discharge port 934. Here, assume that the box type member 910 and the bottom plate 930 are supported by the two pipes 942 and 944, and the box type member 910 and the bottom plate 930 are spaced from the internal face of the heat insulation package 940. In this state, direct heat conduction from the box type member 910 and the bottom plate 930 to the heat insulation package 940 can be restricted, and heat insulation property is improved more significantly. Moreover, the inside of the heat insulation package 940 is vacuum-evacuated, and the inside space is set at a vacuum pressure, thereby forming a vacuum heat insulation structure. If the internal space of the heat insulation package 940 is set at a vacuum pressure, the reaction vessel of the reaction device 900 is subjected to a stress in a direction in which the box type member 910 and the bottom plate 830 inflate. However, when the partition plate 920 is joined to the box type member 910 or the cap plate 930, the box type member or the cap plate can be reinforced, whereby the reaction vessel is prevented from being deformed by a stress.

While the intake port 932 and the discharge port 934 are formed at the cap plate 930, at least one of the intake port and the discharge port may be formed on the box type member 910. In the case where the intake port has been formed at the box type member 910, the intake port 932 may or may not be provided at the cap plate 930. In the case where the discharge port has been formed at the box type member 910, the intake port 932 may or may not be provided at the cap plate 930.

As has been described above, in the present embodiment, the opening of the box type member 910 is closed by the cap plate 930 with the partition plate 920 pushed by the cap plate 930, whereby the partition plate 920 comes into contact with and comes into intimate contact with the internal face of the box type member 910 or the cap plate 930. As a consequence, the air tightness of each of the reaction chambers 918 can be improved. Furthermore, the partition plate 920 is joined to the internal face of the box type member 910 or the cap plate 930 by welding or the like, the reaction vessel produced by the box type member 910 and the cap plate 930 is reinforced, so that the rigidity of the reaction device 900 can be improved. In addition, a space in the box type member 910 is partitioned into a plurality of reaction chambers 918 by the partition plate 920, and the reaction chambers 918 are caused to communicate with each other, whereby a spiral flow channel is formed. For this reason, a structure of the reaction device 900 can be simplified, and assembling of the reaction device 900 can be facilitated.

NINTH EMBODIMENT

Now, a ninth embodiment of the reactor according to the present invention will be described here.

Figure 59:
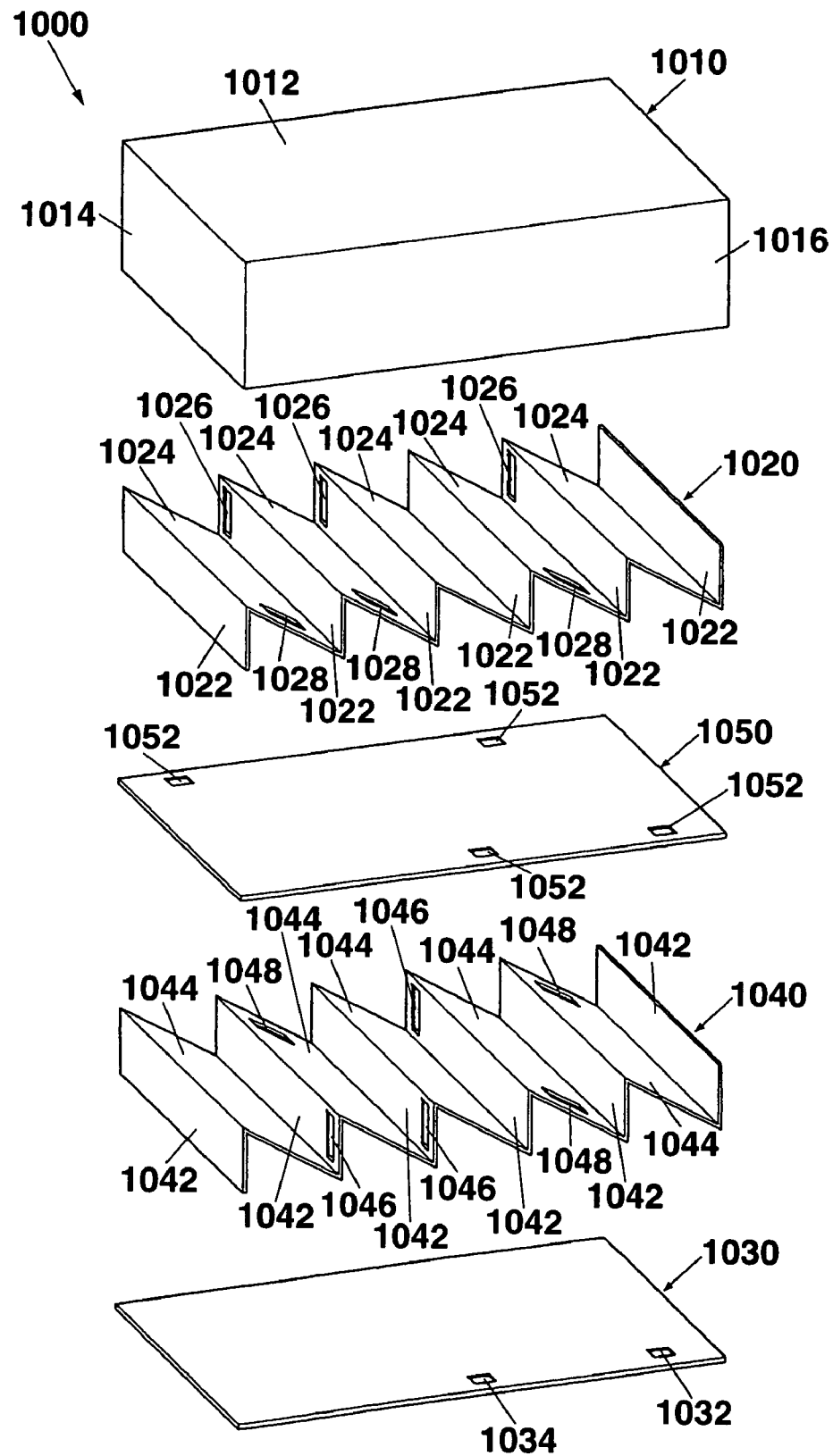
FIG. 59 is an exploded perspective view of a reaction device in a ninth embodiment of the reactor according to the present invention as viewed in a slant upper portion.
Figure 60A:
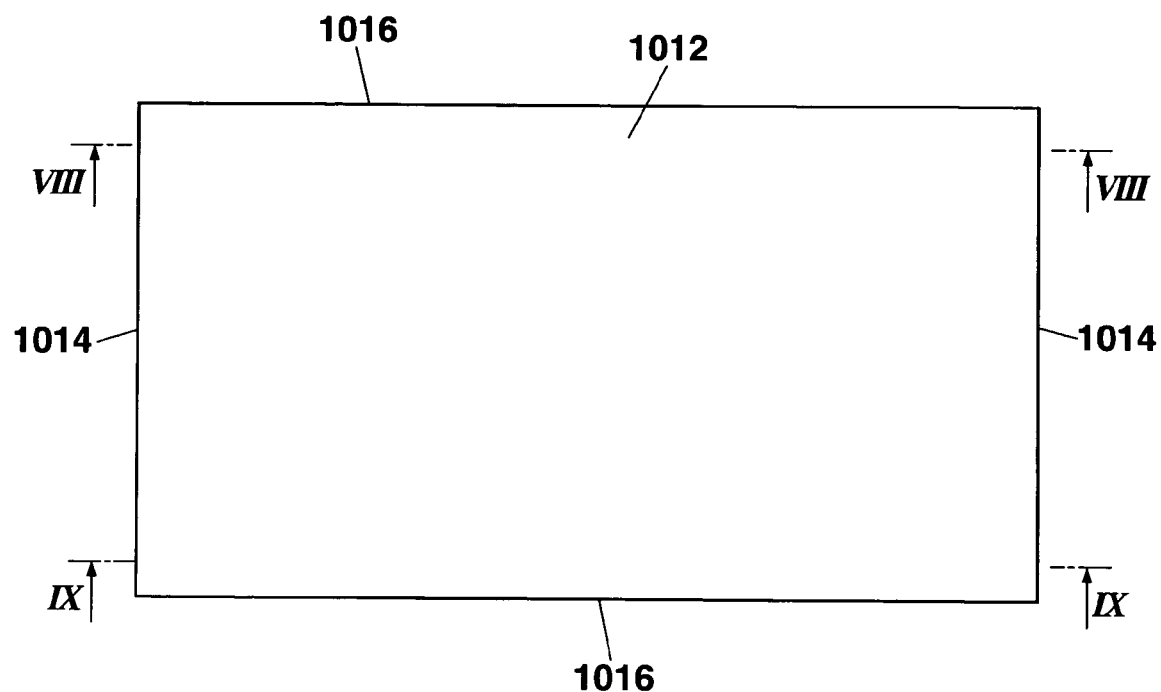
FIGS. 60A and 60B are a top view and a side view of the reaction device in the ninth embodiment.
Figure 60B:
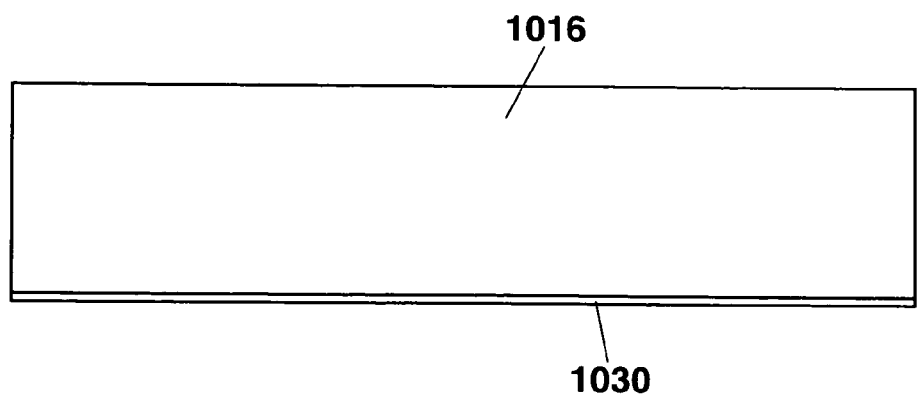
Figure 61:
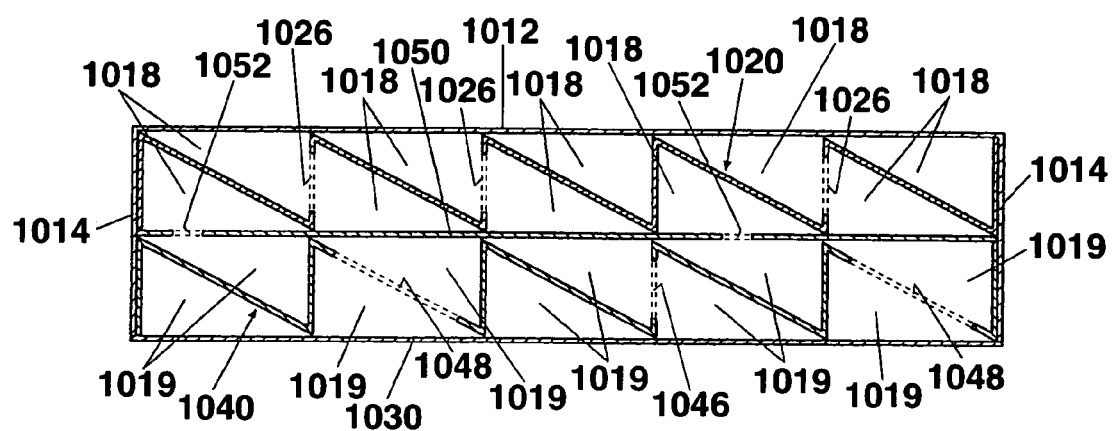
FIG. 61 is a sectional end face view taken along the section line VIII-VIII of FIG. 60A.
Figure 62:
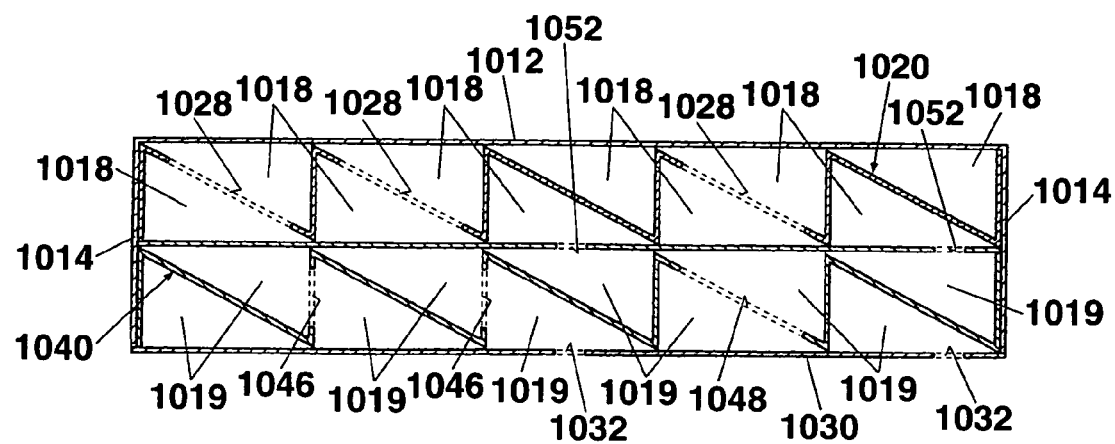
FIG. 62 is a sectional end face view taken along the section line IX-IX of FIG. 60A.

FIG. 59 is an exploded perspective view of a reaction device in the ninth embodiment of the reactor according to the invention as viewed in a slant upper portion. FIGS. 60A and 60B are a top view and a side view of the reaction device in the ninth embodiment. FIG. 61 is a sectional end face view taken along the section line VIII-VIII of FIG. 60A. FIG. 62 is a sectional end face view taken along the section line IX-IX of FIG. 60A.

The reaction device 1000 comprises: a box type member 1010 that opens on one face thereof; a separate plate 1050 housed in the box type member to partition a space in the box type member 1010 into a bottom side space and an opening side space; a cap plate or bottom plate 1030 that closes the opening of the box type member 1010; a partition plate 1020 housed in the bottom side space among the two spaces partitioned by the separate plate 1050; and a partition plate 1040 housed in the opening side space.

The box type member 1010, the partition plate 1020, the cap plate 1030, the partition plate 1040 and the separate plate 1050 may be made of a metal material such as a stainless steel, may be made of a ceramics material, may be made of a glass material, or may be made of a resin material.

The box type member 1010 comprises a top plate 1012, a pair of side plates 1014, and a pair of side plates 1016 as in the box type member 910 in the eighth embodiment.

A rim part of the cap plate 1030 is joined to a lower edge part of each of the side plates 1014 and 1016 such that the cap plate 1030 is parallel to the top plate 1012, and a reaction vessel formed in a sealed parallel hexahedron shape having a hollow is configured. The separate plate 1050 is housed in the box type member 110 so as to be parallel to the cap plate 1050 and the top plate 1012. The entire rim of the separate plate 1050 comes into contact with the top and bottom bellows parts of the side plates 1014 and 1016, and preferably, is joined thereto.

The partition plate 1020 is formed in a corrugate plate shape spirally folded in a triangular wavy shape as in the partition plate 920 in the eighth embodiment. More specifically, the partition plate 1020 is formed by alternately folding a band shaped plate, and a connection portion between a first partition portion 1022 and a second partition portion 1024 of the partition plate is provided as a return ridge. The partition plate 104 is also formed in a corrugate plate shape formed in a triangular wavy shape as in the partition plate 920 in the eighth embodiment. A connection portion between a first partition portion 1042 and as second partition plate 1044 of the partition plate 1040 is provided as a return ridge.

The partition plate 1020 and the partition plate 1040 are equal to each other in number of returns, and, for example, are equal to each other in wavelength and wave height of a triangular wave.

The partition plate 1020 is housed in a space between the separate plate 1050 and the top plate 1012 such that the wave height direction of the partition plate 1020 is parallel to both the side plates 1014 and the side plates 1016, and one return ridge of the partition plate 1020 is brought into linear contact with the top plate 1012 of the box type member 1010. In addition, the separate plate 1050 is engaged halfway with the box type member 1010, and the other return ridge of the partition plate 1020 is brought into linear contact with the separate plate 1050 to push the partition plate 1020 by the separate plate. In this manner, the first partition portion 1022 and the second partition portion 1024 are established in a bent state.

The partition plate 1020 is thus housed in a space between the top plate 1012 and the separate plate 1050 in the box type member 1010, whereby the space is partitioned into a plurality of reaction chambers 1018 by the partition plate 1020.

The partition plate 1020 is thus pushed into the space between the top plate 1012 and the separate plate 1050 in the box type member 1010, and the first partition portion 1022 and the second partition portion 1024 are established in a bent state. As a consequence, a return ridge of the partition plate 1020 is established in a state that the ridge comes into strongly intimate contact with the top plate 1012 and the separate plate 1050 by a resisting stress of the first partition portion 1022 and the second partition portion 1024. Both rims of the partition plate 1020 formed in a wavy shape come into contact with the side plates 1016, respectively, and the partition portions 1022 at the both sides of the partition plate 1020 come into facial contact with side plates 1014, respectively.

The partition plate 1040 is housed in a space between the separate plate 1050 and the cap plate 1030 such that the wave height direction of the partition plate 1040 is parallel to both the side plates 1014 and the side plates 1016, and one return ridge of the partition plate 1040 is brought into linear contact with the separate plate 1050. In addition, the other return ridge of the partition plate 1040 is brought into linear contact with the cap plate 1030, and the partition plate 1040 is pushed by the cap plate to close the opening of the box type member 1010 by the cap plate. In this manner, the first partition portion 1022 and the second partition portion 1024 are established in a bent state.

The partition plate 1040 is housed in a space between the cap plate 1030 and the separate plate 1050 in the box type member 1010, whereby the space is partitioned into a plurality of reaction chambers 1019 by the partition plate 1040. A bottom partition plate 1040 overlaps on a top partition plate 1020 while the separate plate 1050 is sandwiched therebetween, and a top reaction chamber 1018 is partitioned from a bottom reaction chamber 1019 by the separate plate 1050.

The partition plate 1040 is thus pushed into the space between the separate plate 1050 and the cap plate 1030 in the box type member 1010, and the first partition plate 1022 and the second partition plate 1024 are established in a bent state. As a consequence, a return ridge of the partition plate 1040 is established in a state that the ridge comes into strongly intimate contact with the separate plate 1050 and the cap plate 1030 by a resisting stress of the first partition plate 1022 and the second partition plate 1024. Both rims of the partition plate 1040 formed in a wavy shape come into contact with the side plates 1016, respectively, and the partition portions 1042 at both sides of the partition plate 1040 come into facial contact with the side plates 1014, respectively. In this way, the partition plates 1020 and 1040 come into contact with and come into intimate contact with the internal face of the box type member 1010 or the cap plate 1030 and the separate plate 1050, whereby the air tightness of each of the reaction chambers 1018 and 1019 can be improved.

Furthermore, a return ridge of the partition plate 1020 may be joined to the top plate 1012 and the separate plate 1050 by welding or the like; the both rims of the partition plate 1020 formed in a wavy shape may be joined to the side plates 1016, respectively, by welding; or the partition portions 1022 at both sides of the partition plate 1020 may be joined to the side plates 1014, respectively, by welding or the like. In addition, a return ridge of the partition plate 1040 may be joined to the separate plate 1050 and the cap plate 1030 by welding or the like; the both rims of the partition plate 1040 formed in a wavy shape may be joined to the side plates 1016, respectively, by welding; or the partition portions 1042 at both sides of the partition plate 1040 may be joined to the side plates 1014, respectively, by welding or the like. These elements are thus joined to each other by welding or the like, whereby the air tightness of each of the reaction chambers 1018 and 1019 can be further improved and the rigidity of the reaction device 1000 can also be improved.

A first communicating port 1026 is formed at the first partition portion 1022 of the partition plate 1020, and the adjacent reaction chambers 1018 communicate with each other via the communicating port 1026. A first communicating port 1028 is formed at the second partition portion 1024 of the partitioning late 1020, and the adjacent reaction chambers 1018 communicate with each other via the communicating port 1028. With respect to the partition plate 1040 as well, a second communicating port 1046 is formed at the first partition portion 1042, a second communicating port 1048 is formed at the second partition portion 1044, and the adjacent reaction chambers 1019 communicate with each other via the communicating port 1026 or the communicating port 1028.

A plurality of third communicating ports 1052 are formed at the separate plate 1050, and the vertically adjacent reaction chambers 1018 and 1019 communicate with each other via an communicating port 1052. By means of the communicating ports 1026, 1028, 1046, 1048, and 1052, these reaction chambers 1018 and 1019 are provided as a predetermined series of spiral flow channels.

An intake port 1032 communicating with any of the plurality of reaction chambers 1019 is formed at the cap plate 930, and a discharge port 1034 communicating with another reaction chamber 1019 is formed at the cap plate 1030.

If, in the reaction device 1000, a reactant is supplied to the intake port 1032 by a pump or the like, the reactant flows in a plurality of reaction chambers 1018 and 1019. While the reactant flows in these reaction chambers 1018 and 1019, a product is produced from the reactant. Then, the product is discharged from the discharge port 1034 to the outside. In each of the reaction chambers 1018 and 1019, the reactant flows from one side plate 1016 to the other side plate 1016.

Also in the reaction device 1000, as in the reaction device 900 according to the eighth embodiment, a heater may be provided on the external face of at least one of the box type member 1010 and the cap plate 1030 according to usage. In addition, a catalyst can be carried onto the partition plates 1020 and 1040, a catalyst may be carried onto the internal face of at least one of the box type member 1010 and the cap plate 1030, or a catalyst may be carried onto the separate plate 1050.

As is the case with the reaction device 900, the box type member 1010 and the cap plate 1030 are housed in a heat insulation package (heat insulation vessel) set at a vacuum pressure at its inside, and as a result, a thermal loss of the reaction device 1000 can be restricted. In this case as well, the reaction vessel produced by the box type member 1010 and the cap plate 1030 is subjected to a stress in its inflating direction. Also in the present embodiment, however, the box type member 1010 and the bottom plate 1030 are reinforced by being joined by the partition plates 1020 and 1040 and the separate plate 1050, and the rigidity of the reaction vessel of the reaction device 1000 is improved with the result that deformation due to a stress is prevented. Further, one of the two pipes penetrating the heat insulation package is connected to the intake pot 1032, and the other one is connected to the discharge port 1034. The box type member 1010 and the cap plate 1030 are supported by the two pipes, and the box type member 1010 and the cap plate 1030 are spaced from the internal face of the heat insulation package. In this state, direct thermal conduction to the heat insulation package is restricted, whereby heat insulation property may be improved.

While the intake port 1032 and the discharge port 1034 are formed at the cap plate 1030, either one of the intake port and the discharge port may be formed at the box type member 1010. In the case where the intake port has been formed at the box type member 1010, the intake port 1032 may or may not be provided on the cap plate 1030. In the case where the discharge port has been formed at the box type member 1010, the intake port 1032 may or may not be provided on the cap plate 1030.

In the embodiment, one separate plate 1050 has been configured to be housed in the box type member 1010. However, a plurality of separate plates parallel to the cap plate 1030 and the top plate 1012 are housed in the box type member 1010, whereby a space in the box is type member 1010 may be partitioned. In this case, among a plurality of spaces formed in the box type member 1010 by a plurality of separate plates, a partition plate is housed in a space that is the closest to the bottom of the box type member 1010 as in the above partition plate 1020; a partition plate is housed in a space that is the closest to the cap plate 1030 as in the above partition plate 1040; and a partition plate is housed in a space sandwiched between two separate plates in a state that the partition plate is sandwiched between the two separate plates.

As has been described above, in the present embodiment, a space in the box type member 1010 is partitioned by the separate plate 1050 in a state that the partition plate 1020 is pushed by the separate plate 1050, and the opening of the box type member 1010 is closed in a state that the partition plate 1040 is pushed by the cap plate 1030. As a consequence, the partition plate 1020 and 1040 come into contact with and come into intimate contact with the internal face of the box type member 1010 or the cap plate 1030 and the separate plate 1050, whereby the air tightness of each of the reaction chambers 1018 and 1019 can be improved. Furthermore, the partition plates 1020 and 1040 are joined to the internal face of the box type member 1010 or the cap plate 1030 and the separate plate 1050 by welding or the like. As a result, the reaction vessel produced by the box member 1010 and the cap plate 1030 is reinforced, thereby making it possible to improve the rigidity of the reaction device 1000. In addition, a space in the box type member 1010 is partitioned into a plurality of reaction chambers 1018 and 1019 by means of the partition plates 1020 and 1040 and the separate plate 1050, and the respective reaction chambers 1018 and 1019 are caused to communicate with each other, whereby a spiral flow channel is formed. Therefore, a structure of the reaction device 1000 can be simplified, and assembling of the reaction device 1000 can be facilitated.

TENTH EMBODIMENT

Now, a tenth embodiment of the reactor according to the present invention will be described here. The identical or like constituent elements of the above-described embodiments are designated by the identical or like reference numerals, and a description thereof is briefly described or omitted here.

Figure 63:
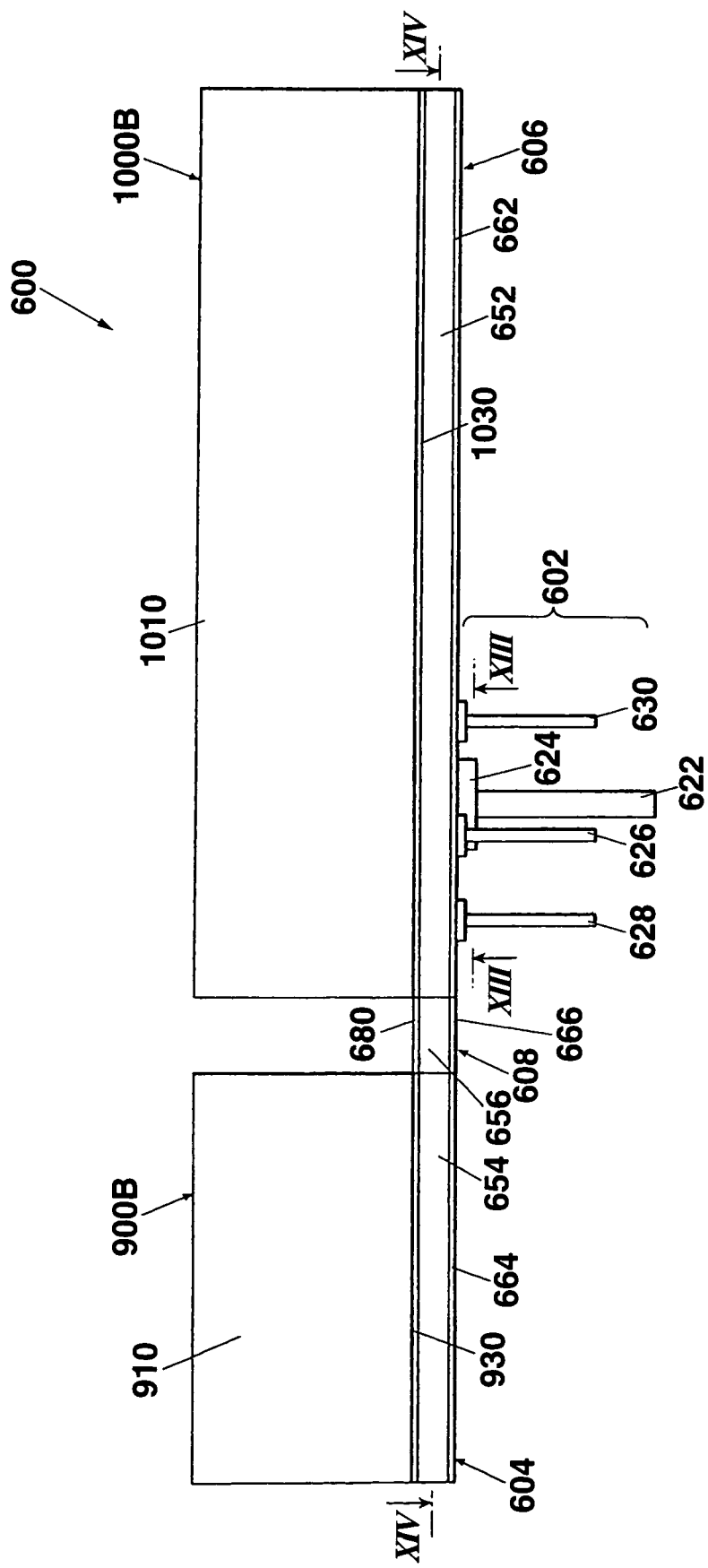
FIG. 63 is a side view of a microreactor module in a tenth embodiment of the reactor according to the present invention.
Figure 64:
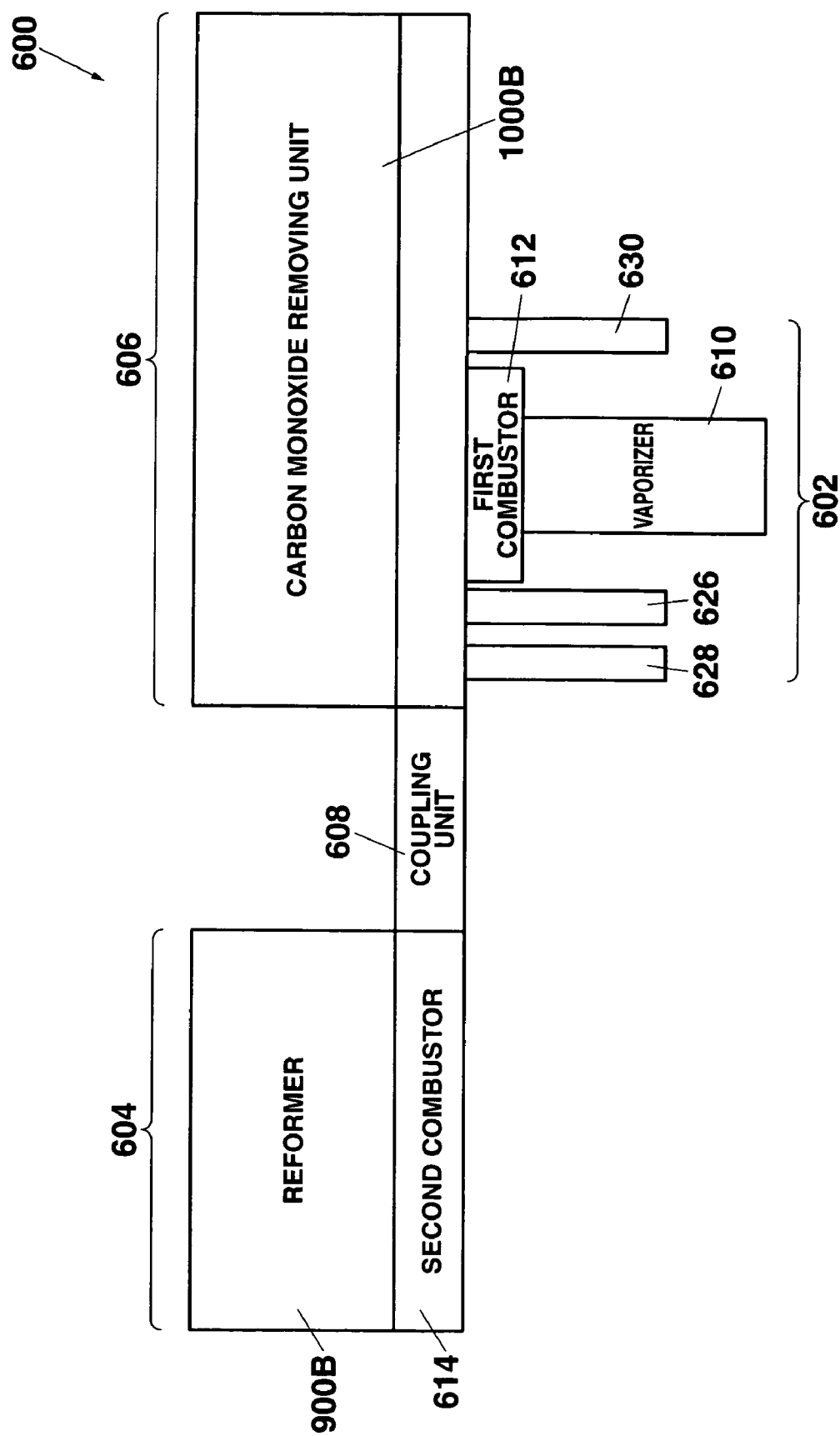
FIG. 64 is a schematic side view of the microreactor module in the tenth embodiment separated in terms of functions.

FIG. 63 is a side view of a microreactor module in the tenth embodiment of the reactor according to the invention. FIG. 64 is a schematic side view of the microreactor module in the tenth embodiment separated in terms of functions.

As shown in FIGS. 63 and 64, the microreactor module 600 has a configuration similar to that of the microreactor module 600 in the second embodiment, and comprises: a supply/discharge unit 602; a high-temperature reaction unit 604 (first reaction unit) at which a reforming reaction occurs; a low-temperature reaction unit 606 (second reaction unit) at which a selective oxidization reaction occurs; and a coupling unit 608 that sends a reactant or a product between the high-temperature reaction unit 604 and the low-temperature reaction unit 606.

A vaporizer 610 and a first combustor 612 are primarily provided at the supply/discharge unit 602. Air and a gas fuel are supplied respectively separately or as a gas mixture to the first combustor 612, and a heat is generated by a catalytic combustion of them. Water and a liquid fuel are supplied respectively separately or in a mixed state from a fuel container to the vaporizer 610, and the water and the liquid fuel are vaporized by a combustion heat in the first combustor 612.

The high-temperature reaction unit 604 is provided with a second combustor 614 and a reformer 900B provided on the second combustor 614. Air and a gas fuel (such as hydrogen gas or methanol gas, for example) are supplied respectively separately or as a gas mixture to the second combustor 614, and a heat is generated by a catalytic combustion of them.

A gas mixture (first reactant) of the vaporized water and liquid fuel supplied from the vaporizer 610 to the reformer 900B, and the reformer 900B is heated by the second combustor 614. In the reformer 900B, a hydrogen gas or the like (first product) is produced from the liquid fuel vaporized with water vapor by means of a catalytic reaction, and further, a carbon monoxide gas is produced, although its amount is very small. In the case where the fuel is methanol, the above chemical reactions as shown in the chemical formulas (1) and (2) occur.

The low-temperature reaction unit 606 is primarily provided with a carbon monoxide removing unit 1000B. The carbon monoxide removing unit 1000B is heated by the first combustor 612. A gas mixture (second reactant) containing a hydrogen gas from the reformer 900B and a small amount of carbon monoxide gas or the like produced by the chemical reaction of the above formula (2) is supplied, and further, air is supplied. In the carbon monoxide removing unit 1000B, carbon monoxide is selectively oxidized among the gas mixture, whereby the thus oxidized carbon monoxide is removed. A gas mixture (second product: hydrogen-rich gas) from which carbon monoxide has been removed is supplied to a fuel electrode of a fuel cell.

Now, a specific configuration of the microreactor module 600 in the present embodiment will be described with reference to FIGS. 63 and 65 to 67.

Figure 65:
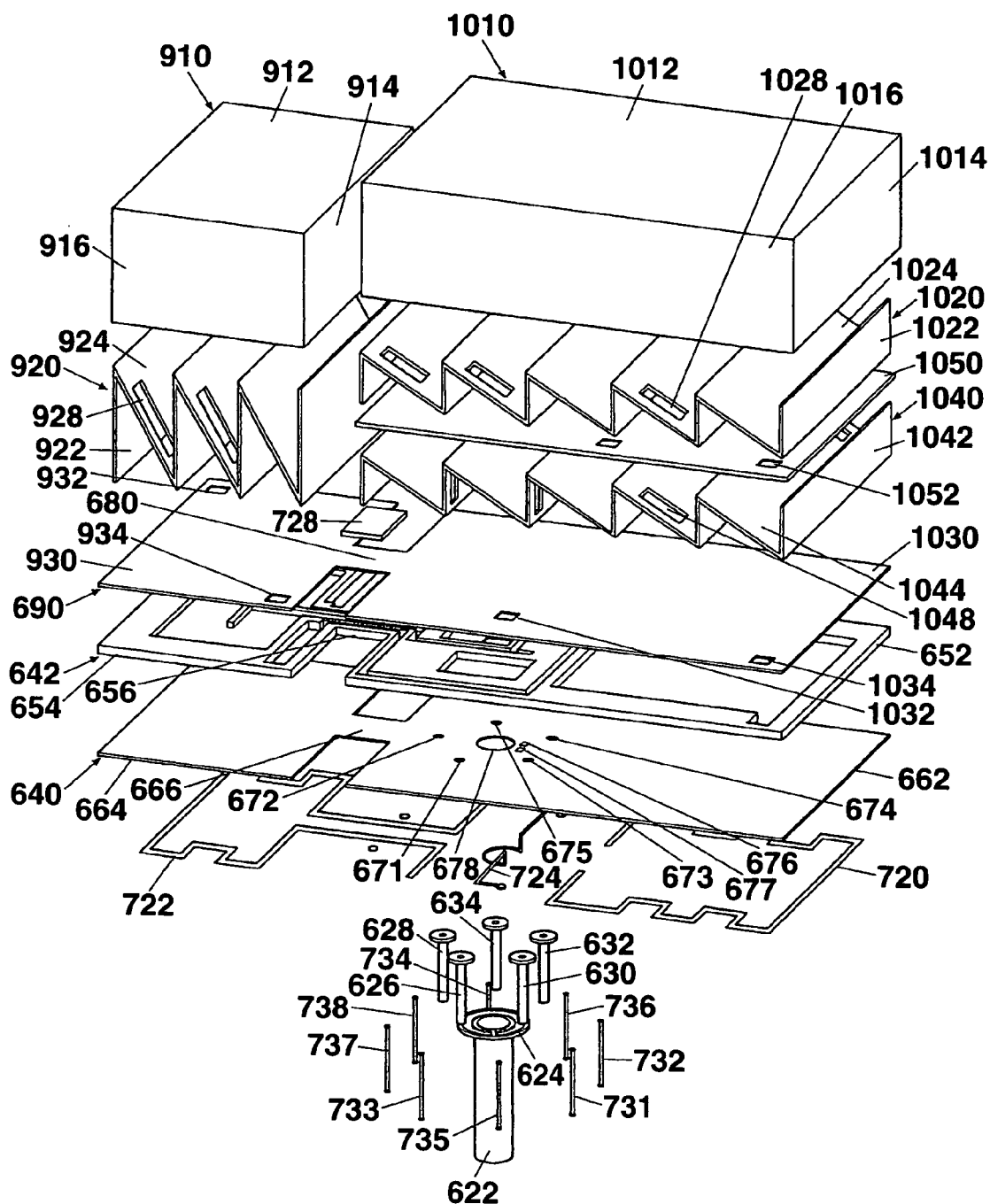
FIG. 65 is an exploded perspective view of the microreactor module in the tenth embodiment.
Figure 66:
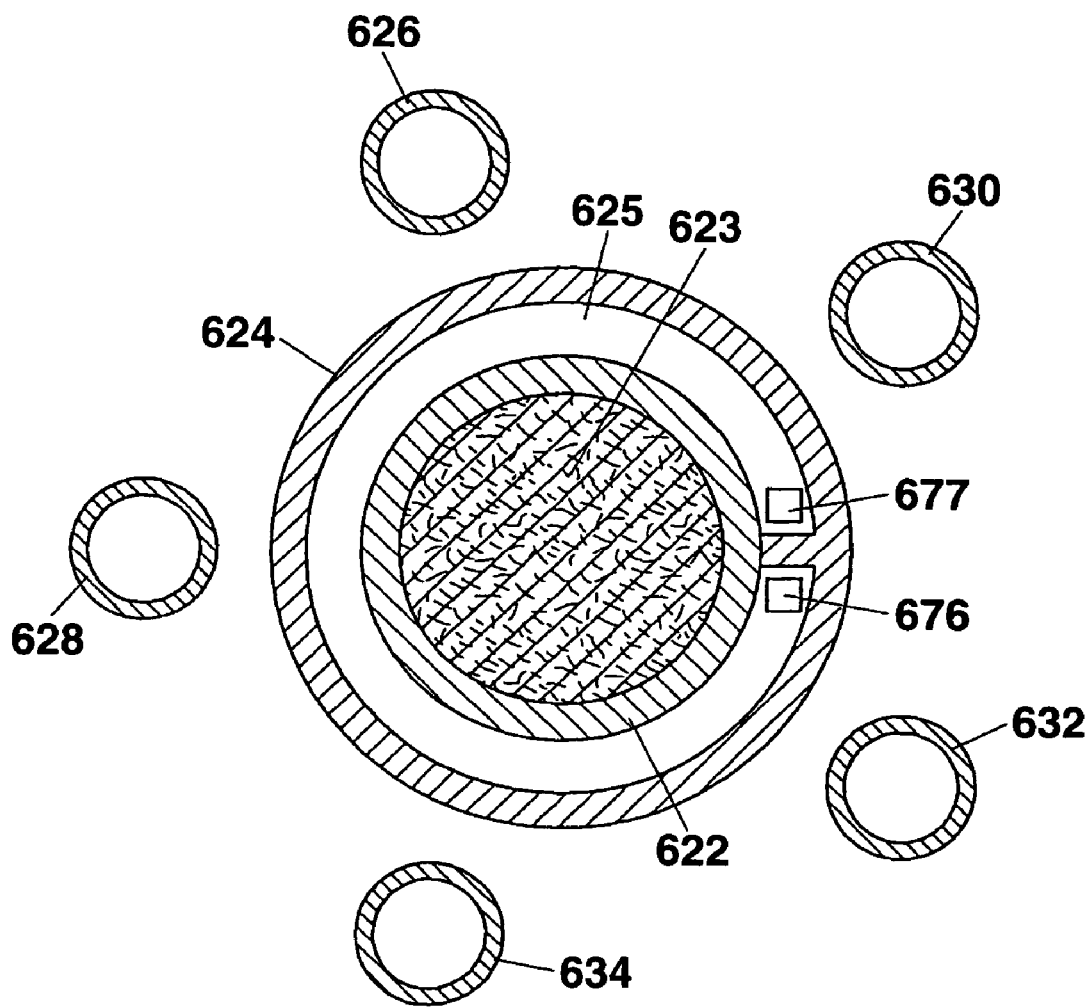
FIG. 66 is a cross sectional view taken along the section line XIII-XIII of FIG. 63.
Figure 67:
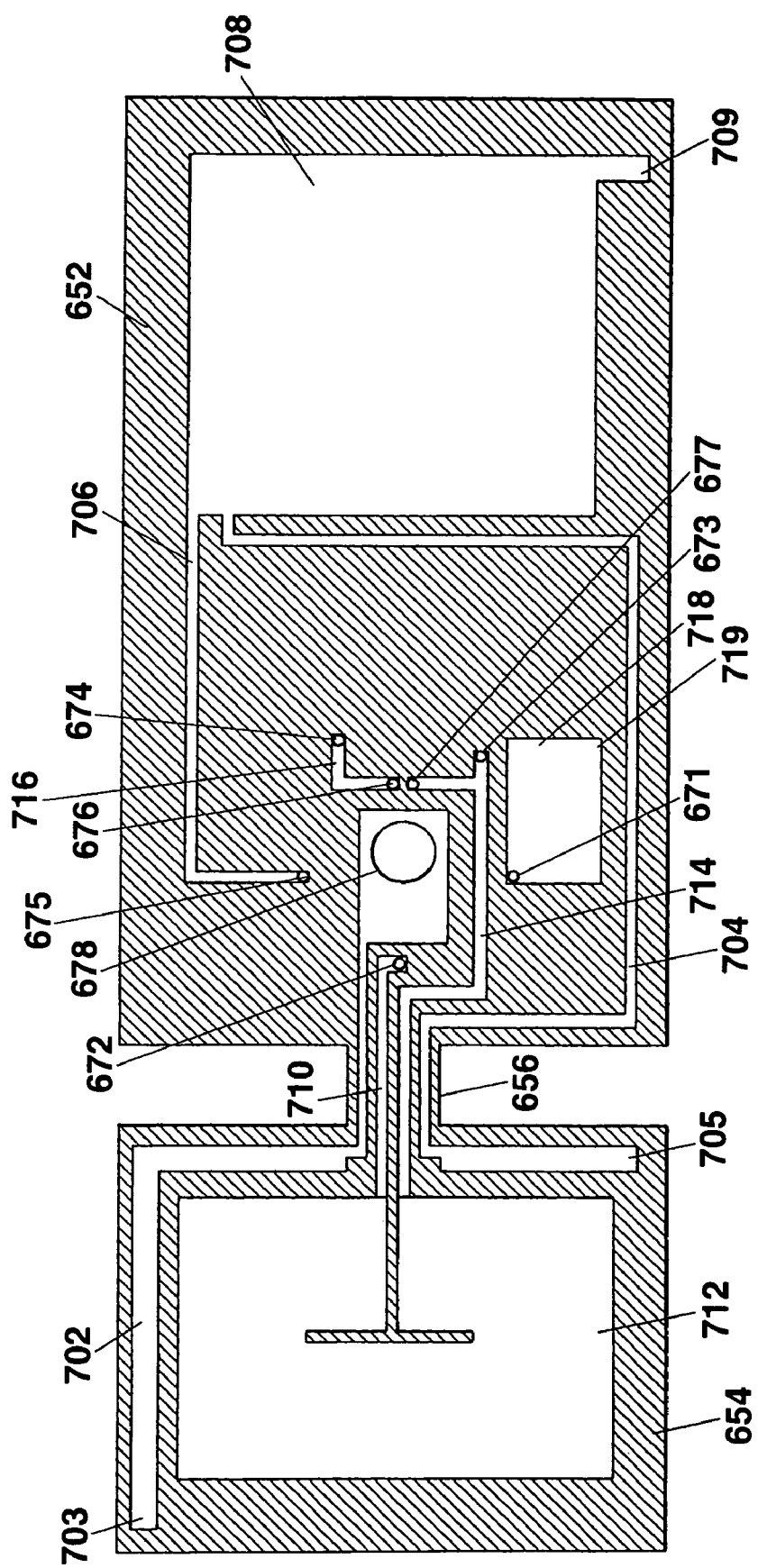
FIG. 67 is a cross sectional view taken along the section line XIV-XIV of FIG. 63.

FIG. 65 is an exploded perspective view of the microreactor module 600 in the present embodiment. FIG. 66 is a cross sectional view taken along the section line XIII-XIII of FIG. 63. FIG. 67 is a cross sectional view taken along the section line XIV-XIV of FIG. 63.

As shown in FIGS. 63, 65 and 66, the supply/discharge unit 602 comprises: a liquid fuel intake pipe 622; a combustor plate 624 provided so as to surround the liquid fuel intake pipe 622 at an upper end part of the liquid fuel intake pipe 622; and five pipes 626, 628, 630, 632, and 634 arranged at the periphery of the liquid fuel intake pipe 622.

The liquid fuel intake pipe 622 is made of a tubular metal material such as a stainless steel, for example, and the liquid fuel intake pipe 622 is filled with a liquid absorption material 623. The liquid absorption material 623 is intended to absorb a liquid. The liquid absorption material 623 is made of, for example, an inorganic fiber or an organic fiber bound with a binder; sintered inorganic powder; inorganic powder bound with a binder; or a mixture of graphite and grassy carbon. Specifically, a felt material, a ceramics porous material, a fiber material, a carbon porous material and the like are used as the liquid absorption material 623.

The pipes 626, 628, 630, 632, and 634 each are made of a tubular metal material such as a stainless steel, for example.

The combustor plate 624 is also made of a tubular metal material such as a stainless steel, for example. A through-hole is formed at the center part of the combustor plate 624, and the liquid fuel intake pipe 622 is engaged into the through-hole, so that the liquid fuel intake pipe 622 and the combustor plate 624 are joined to each other. Here, the liquid fuel intake pipe 622 is joined to the combustor plate 624 by means of brazing, for example. As a brazing agent, it is particularly preferable to use a gold brazing having a melting point higher than the highest temperature among the temperatures of the fluid that flows through the liquid fuel intake pipe 622 or the combustor plate 624 and containing gold, silver, zinc, and cadmium, a brazing consisting essentially of gold, silver, zinc, and nickel, or a brazing consisting essentially of gold, palladium, and silver. In addition, a bulkhead is provided so as to protrude on one face of the combustor plate 624. A part of the bulkhead is provided all around the outer rim of the combustor plate 624, and the other part thereof is provided around a diameter direction. The combustor plate is joined to a bottom face of the low-temperature reaction unit 606, whereby a combustion flow channel 625 is formed on a bonded face, and the liquid fuel intake pipe 622 is surrounded by the combustion flow channel 625. A combustion catalyst for combusting a combustion gas mixture is carried onto a wall face of the combustion flow channel 625. Platinum is exemplified as a combustion catalyst, for example. The liquid absorption material 623 in the liquid fuel intake pipe 622 is filled up to a position of the combustion plate 624.

As shown in FIGS. 63 and 65, the high-temperature reaction unit 604, the low-temperature reaction unit 606, and the coupling unit 608 use an insulation plate 640 and a base plate 642 that are laminated as a common substrate. For this reason, the insulation plate 640 is provided as a bottom face common to the high-temperature reaction unit 604, the low-temperature reaction unit 606, and the coupling unit 608, whereas a bottom face of the coupling unit 608 is in plane with a bottom face of the high-temperature reaction unit 604, and further, is in plane with a bottom face of the low-temperature reaction unit 606.

The base plate 642 is composed of: a base portion 652 serving as a substrate of the low-temperature reaction unit 606; a base portion 654 serving as a substrate of the high-temperature reaction unit 604; and a coupling base portion 656 serving as a substrate of the coupling unit 608. The base plate 642 is formed integrally with the base portion 652, the base portion 654, and the coupling base portion 656, and is established in a state that the base plate is enclosed in the coupling base portion 656. The base plate 654 is made of a planar metal material such as a stainless steel, for example.

The insulation plate 640 is composed of: a base portion 662 serving as a substrate of the low-temperature reaction unit 606; a base portion 664 serving as a substrate of the high-temperature reaction unit 604; and a coupling base portion 666 serving as a substrate of the coupling unit 608. The insulation plate 640 is formed integrally with the base portion 662, the base portion 664, and the coupling base portion 666, and is established in a state that the base plate is enclosed in the coupling base portion 666. The insulation plate 640 is made of an electric insulation element such as ceramics, for example.

As shown in FIGS. 65 and 67, in a state that the insulation plate 640 is joined to the base plate 642, through-holes 671 to 678 each penetrate the base portion 652 of the base plate 642 and the base portion 662 of the insulation plate 640.

As shown in FIGS. 63 and 65, the base portion 662 of the insulation plate 640 is provided as a bottom face of the low-temperature reaction unit 606, whereas the pipes 626, 628, 630, 632, and 634 and the liquid fuel intake pipe 622 are joined to the bottom face of the low-temperature reaction unit 606 by means of brazing or the like. Here, the pipe 626 is passed through the through-hole 671, the pipe 628 is passed through the through-hole 672, the pipe 630 is passed through the through-hole 673, the pipe 632 is passed through the through-hole 674, the pipe 634 is passed through the through-hole 675, and the liquid fuel intake pipe 622 is passed through the through-hole 678.

As shown in FIGS. 63, 65 and 67, the combustor plate 624 is joined to the bottom face of the low-temperature reaction unit 606, whereas one end of the combustion flow channel 625 of the combustor plate 624 is passed through the through-hole 676, and the other end of the combustion flow channel 625 is passed through the through-hole 677.

As shown in FIG. 67, the base plate 672 has formed thereon a reforming fuel supply flow channel 702, a communication flow channel 704, an air supply flow channel 706, a mixture chamber 708, a combustion fuel supply flow channel 710, a combustion chamber 712, an exhaust gas flow channel 714, a combustion fuel supply flow channel 716, and a discharge chamber 718.

The reforming fuel supply flow channel 702 is formed from the through-hole 678 up to a corner of the base portion 654 through the coupling base portion 656. The mixture chamber 708 is formed in a square shape at the base portion 652. The communication flow channel 704 is formed from the corner of the base portion 654 up to the mixture chamber 708 through the coupling base portion 656. The air supply flow channel 706 is formed from the through-hole 675 up to the mixture chamber 708.

The combustion chamber 712 is formed in a C-shape at the center part of the base portion 654. A combustion catalyst for combusting a combustion gas mixture is carried onto a wall face of the combustion chamber 712.

The combustion fuel supply flow channel 710 is formed from the through-hole 672 up to the combustion chamber 712 through the coupling base portion 656. The exhaust gas flow channel 714 is formed from the through-hole 677 up to the through-hole 673 and is formed from the combustion chamber 712 up to the through-hole 673 through the coupling base portion 656. The combustion fuel supply flow channel 716 is formed from the through-hole 674 up to the through-hole 676 at the base portion 652. The discharge chamber 718 is formed in a rectangular shape at the base portion 652, and the through-hole 671 is provided at a corner of the evaluation chamber 718.

As shown in FIG. 63, a carbon monoxide removing unit 1000B is provided on the base portion 652. The carbon monoxide removing unit 1000B is an application of the reaction device 1000 in the ninth embodiment, and the carbon monoxide removing unit 1000B is provided in the same manner as that in the reaction device 1000 shown in FIGS. 59 to 62. Constituent elements corresponding to each other between the carbon monoxide removing unit 1000B and the reaction device 1000 are designated by the identical reference numerals, and a duplicate description of the constituent elements corresponding to each other is omitted here.

As shown in FIGS. 63 and 65, a cap plate 1030 of the carbon monoxide removing unit 1000B is joined to the top face of the base portion 652. The cap plate 1030 covers part of the reforming fuel supply flow channel 702, part of the exhaust gas flow channel 714, part of the combustion fuel supply flow channel 710, part of the communication flow channel 704, the air supply flow channel 706, the mixture chamber 708, the combustion fuel supply flow channel 716, and the discharge chamber 718. An intake port 1032 formed at the cap plate 1030 is positioned on a corner 709 of the mixture chamber 708, and a discharge port 1034 formed at the cap plate is positioned on a corner 719 of the discharge chamber 718.

In the carbon monoxide removing unit 1000B, a carbon monoxide selective oxidization catalyst (for example, platinum) is carried onto the internal faces of a box type member 1010 and the cap plate 1030 or the partition plate 1020, the partition plate 1040 and the separate plate 1050.

Now, as shown in FIG. 63, a reformer 900B is provided on the base portion 654. The reformer 900B is application of the reaction device 900 in the eighth embodiment, and the reformer 900B is provided in the same manner as that in the reaction device 900 shown in FIGS. 54 to 57. Constituent elements corresponding to each other between the reformer 900B and the reaction device 900 are designated by the same reference numerals, and a duplicate description of the constituent elements corresponding to each other is omitted here.

As shown in FIGS. 63 and 65, a bottom plate 930 of the reformer 900B is joined to a top face of the base portion 654. The bottom plate 930 covers part of the reforming fuel supply flow channel 702, part of the exhaust gas flow channel 714, part of the combustion fuel supply flow channel 710, part of the communication flow channel 704, and the combustion chamber 712. An intake port 932 formed at the bottom plate 930 is positioned on an end part 730 of the reforming fuel supply flow channel 702, and a discharge port 934 formed at the bottom plate 930 is positioned on an end part 705 of the communication flow channel 704.

In the reformer 900B, a reforming catalyst (for example, Cu/ZnO-base catalyst or Pd/ZnO-based catalyst) is carried onto the internal faces of the box type member 910 and the bottom plate 930 or on the partition plate 920.

As shown in FIG. 65, the bottom plate 930 of the reformer 900B and the bottom plate 1030 of the carbon monoxide removing unit 1000B are formed integrally while being connected to each other by a coupling cap 680. A plate material 690 integrated with the bottom plate 930, the bottom plate 1030, and the coupling cap 680 is established while being enclosed in the coupling cap 680. Although the plate material 690 is joined to the base plate 642, the coupling cap 680 of the plate material 690 is joined to the coupling base portion 656 of the base plate 642, whereby the coupling unit 608 is configured. In the coupling unit 608, part of the reforming fuel supply flow channel 702, part of the exhaust gas flow channel 714, part of the combustion fuel supply flow channel 710, and part of the communication flow channel 704 are covered with the coupling cap 680.

As shown in FIG. 63 or the like, an external shape of the coupling unit 608 is formed in a rectangular cylinder shape, for example. A width of the coupling unit 608 is narrower than that of each of the high-temperature reaction unit 604 and the low-temperature reaction unit 606, and a height of the coupling unit 608 is lower than that of each of the high-temperature reaction unit 604 and the low-temperature reaction unit 606. Then, the coupling unit 608 is bridged between the high-temperature reaction unit 604 and the low-temperature reaction unit 606, whereas the coupling unit 608 is coupled with the high-temperature reaction unit at the center part in the widthwise direction of the high-temperature reaction unit 604 and is coupled with the low-temperature reaction unit 606 at the center part in the widthwise direction of the low-temperature reaction unit 606.

As has been described above, the coupling unit 608 is provided with the reforming fuel supply flow channel 702, the communication flow channel 704, the combustion fuel supply flow channel 710, and the exhaust gas flow. channel 714.

Now, a description will be given with respect to a flow channel provided inside of the supply/discharge portion 602, the high-temperature reaction unit 604, the low-temperature reaction unit 606, and the coupling unit 608.

Figure 68:
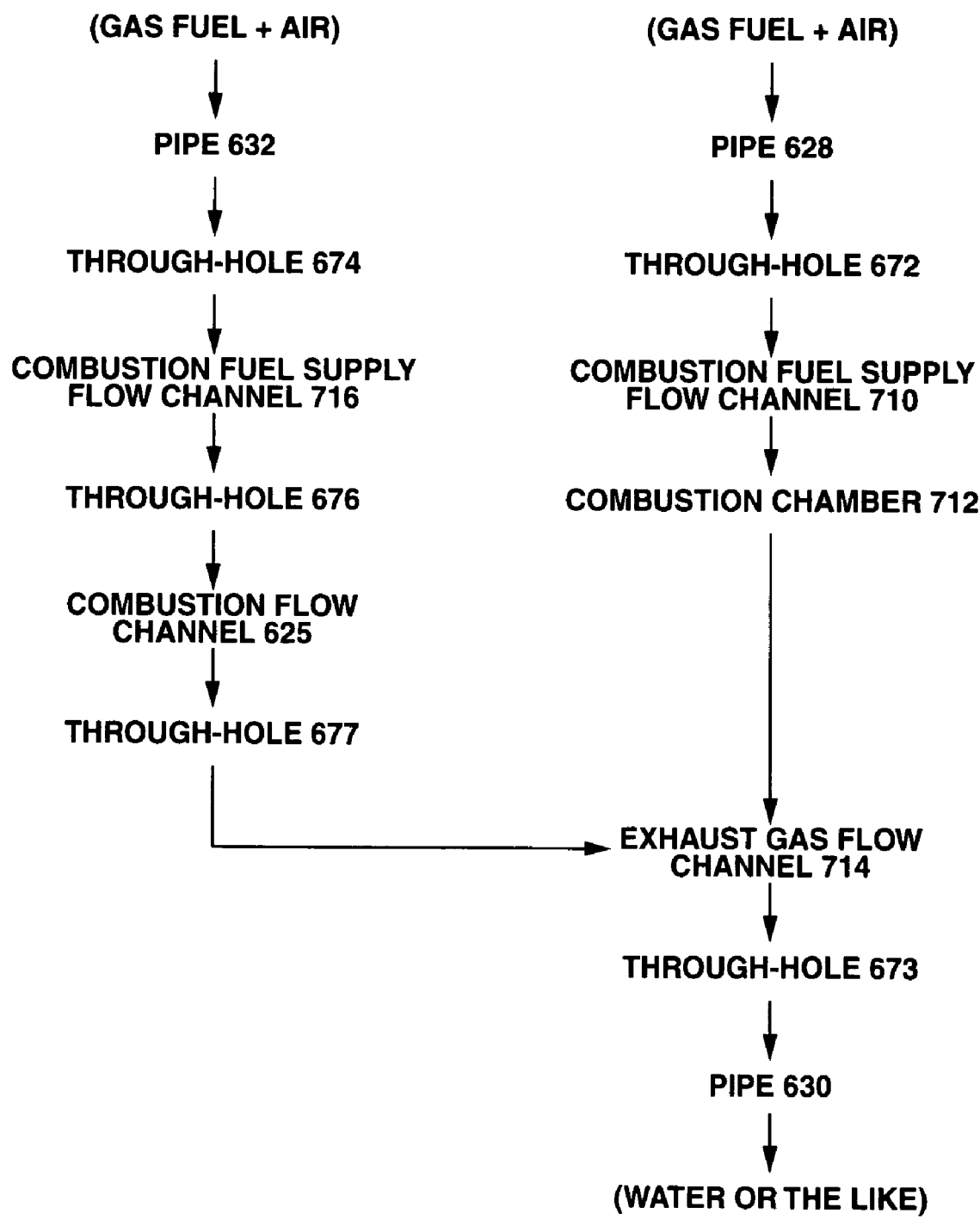
FIG. 68 shows a channel from supply of a combustion gas mixture consisting of a gas fuel and air to discharge of water or the like that is a product in the microreactor module according to the tenth embodiment.
Figure 69:
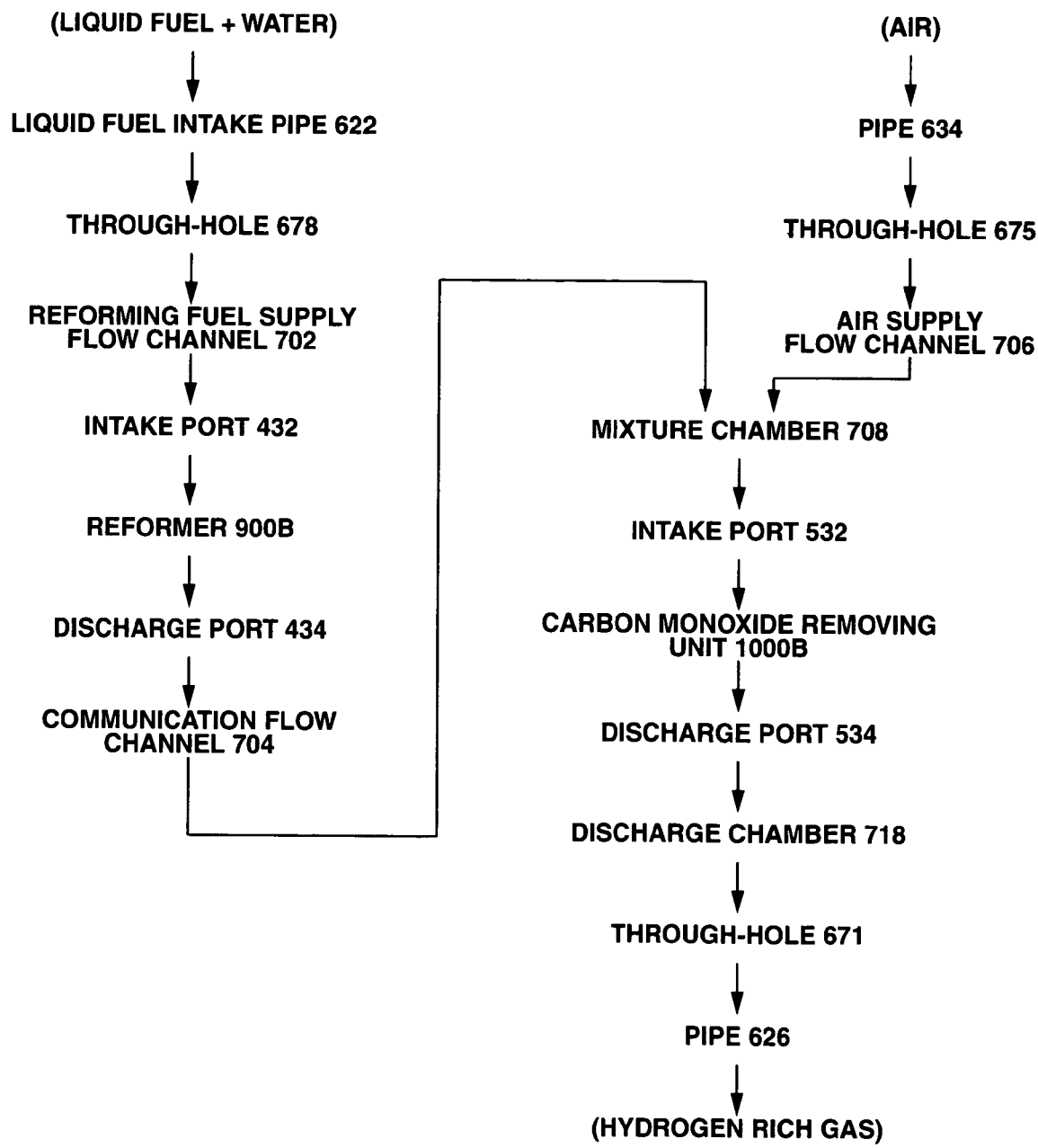
FIG. 69 shows a channel from supply of a combustion gas mixture consisting of a liquid fuel and water to discharge of a hydrogen gas that is a product in the microreactor module according to the tenth embodiment.

FIG. 68 shows a channel from supply of a combustion gas mixture consisting of a gas fuel and air to discharge of water or the like that is a product in the microreactor module according to the embodiment. FIG. 69 shows a channel from supply a liquid fuel and water to discharge of a hydrogen gas that is a product in the microreactor module according to the embodiment.

Here, a description will be given with respect to a correlation among FIGS. 68, 69 and 64. The liquid fuel intake pipe 622 corresponds to the vaporizer 610, the combustion flow channel 625 corresponds to the first combustor 612, and the combustion chamber 712 corresponds to the second combustor.

As shown in FIG. 65, a heating wire 720 is patterned in a wobble state on the bottom face of the low-temperature reaction unit 606, namely, on the bottom face of the insulation plate 640. On the bottom face from the low-temperature reaction unit 606 to the high-temperature reaction unit 604 through the coupling unit 608, a heating wire 722 is patterned in a wobble state. A heating wire 724 is patterned from the bottom face of the low-temperature reaction unit 606 to the side face of the liquid fuel intake pipe 622 through the surface of the combustor 624. Here, an insulation film made of silicon nitride, silicon oxide or the like is formed on the side face of the liquid fuel intake pipe 622 and on the surface of the combustor plate 624, and the heating wire 724 is formed on the surface of the insulation film. The heating wires 720, 722 and 724 are patterned on the insulation film or insulation plate 640, whereby a voltage is not applied to the base plate 642, the liquid fuel intake pipe 622, the combustor plate 624 and the like which are made of a metal material, and heating efficiency of the heating wires 720, 722 and 724 can be improved.

The heating wires 720, 722 and 724 are laminated sequentially in order of the insulation film or insulation plate 640, a diffusion proof layer, and a heat generation layer. The heat generation layer is made of a material (for example, Au) having the lowest resistance rate among the three layers. If a voltage is applied to the heating wires 720, 722 and 724, a current intensively flows, and a heat is generated. Even if the heating wires 720, 722 and 724 are heated, a material for the heat generation layer is hardly thermally diffused to the diffusion proof layer, and a material for the diffusion proof layer is hardly thermally diffused to the heat generation layer. It is preferable to use as the diffusion proof layer a material (for example, W) having a comparatively high melting point and low reactivity. In the case where the diffusion proof layer is lowly coherent to the insulation film and is easily released, a coherent layer may be further provided between the insulation film and the diffusion proof layer. The coherent layer is made of a material (such as Ta, Mo, Ti, or Cr, for example) having superior coherence to the diffusion proof layer and to the insulation film or the insulation plate 640. The heating wire 720 heats the low-temperature reaction unit 606 during startup, the heating wire 722 heats the high-temperature reaction unit 604 and the coupling unit 608 during startup, and the heating wire 724 heats the vaporizer 610 and the first combustor 612 of the supply/discharge unit 602. Thereafter, when the second combustor 614 is combusted by an OFF gas containing hydrogen from a fuel cell, the heating wire 722 heats the high-temperature reaction unit 604 and the coupling unit 608 as an assistance of the second combustor 614. Similarly, in the case where the first combustor 612 is combusted by an OFF gas containing hydrogen from a fuel cell, the heating wire 720 heats the low-temperature reaction unit 606 as an assistance of the first combustor 612.

The heating wires 720, 722 and 724 also function as a temperature sensor for reading a temperature change from a change of a resistance value because an electrical resistance changes depending on a temperature. Specifically, a temperature of the heating wires 720, 722 and 724 is proportional to the electrical resistance.

All the ends of the heating wires 720, 722 and 724 are positioned on the bottom face of the low-temperature reaction unit 606, and these ends are arranged so as to surround the combustor plate 624. Lead wires 731 and 732 are respectively connected to both ends of the heating wire 720, lead wires 733 and 734 are respectively connected to both ends of the heating wire 722, and lead wires 735 and 736 are respectively connected to both ends of the heating wire 724. In FIG. 63, for the sake of clarity, the heating wires 720, 722 and 724 and the lead wires 731 to 736 are not shown.

As shown in FIG. 65, a getter material 728 may be provided on the surface of the coupling unit 608. A heater such as a heating material is provided ion the getter material 728, and lead wires 737 and 738 each are connected to the getter material 728. The getter material 728 is heated so as to be activated, thereby providing an adsorption action. By adsorbing a residual gas in an internal space of a heat insulation package 791 described later, a gas having leaked from the microreactor module 600 into the internal space of the heat insulation package 791, or a gas having invaded into the heat insulation package 791 from the outside, the impaired degree of vacuum of the internal space of the heat insulation package 791 and the lowering of heat insulation effect are restricted. Examples of a material for the getter material 728 may include an alloy consisting essentially of zirconium, barium, titanium, or vanadium. In FIG. 63, for the sake of clarity, the lead wires 737 and 738 are not shown.

Also in the microreactor module in the present embodiment, as in the case of the second embodiment, the entirety of the microreactor module 600 may be covered with a heat insulation package 791 (heat insulation vessel) in order to restrict a thermal loss. In this case, constituent elements are similar to those in the case of the second embodiment, and a duplicate description is omitted here.

Since an operation of the microreactor module 600 in the embodiment is similar to that of the microreactor module 600 in the second embodiment, a duplicate description thereof is omitted here.

As has been described above, according to the present embodiment, the partition plate 920 is housed in the box type member 910 in a state that the partition plate is pushed by the cap plate 930, a space in the box type member 910 is partitioned into a plurality of reaction chambers by the partition plate 920, and the reaction chambers are caused to communicate with each other, thereby forming a spiral flow channel. As a consequence, a structure of the reformer 900B is formed in a simple shape, and assembling of the reformer 900B can be facilitated. With respect to a carbon monoxide removing unit 1000B as well, its structure is formed in a simple shape similarly, and easy assembling can be achieved.

In addition, a reaction vessel of the reformer 900B of the high-temperature reaction unit 604 is reinforced by joining the partition plate 920, thereby making it possible to improve its rigidity. A reaction vessel of the carbon monoxide removing unit 1000B of the low-temperature reaction unit 606 is reinforced by the partition plates 1020 and 1040, thereby making it possible to improve its rigidity.

An internal space of the heat insulation package 791 is provided as a heat insulation space, the high-temperature reaction unit 604 is spaced from the low-temperature reaction unit 606, and a gap from the high-temperature reaction unit 604 to the low-temperature reaction unit 606 is provided as a length of the coupling unit 608. Therefore, a channel of heat conduction from the high-temperature reaction unit 604 and the low-temperature reaction unit 606 is limited to the coupling unit 608, and heat conduction to the low-temperature reaction unit 606 that does not require a high temperature is limited. In particular, since the height and width of the coupling unit 608 are smaller than those of both the reaction units 604 and 606, heat conduction through the coupling unit 608 is also restricted to the minimum. For this reason, a thermal loss of the high-temperature reaction unit 604 can be restricted, and the low-temperature reaction unit 606 can be restricted from rising in temperature to a set temperature or higher. That is, even in the case where the high-temperature reaction unit 604 and the low-temperature reaction unit 606 are housed in one heat insulation package 791, a temperature difference can be produced between the high-temperature reaction unit 604 and the low-temperature reaction unit 606.

Since the flow channels 702, 704, 710, and 714 forming a communication between the low-temperature reaction unit 606 and the high-temperature reaction unit 604 are provided in a state that they are collected in one coupling unit 608, a stress produced with the coupling unit 608 or the like can be reduced. Namely, because a temperature difference exists between the high-temperature reaction unit 604 and the low-temperature reaction unit 606, the high-temperature reaction unit 604 inflates more significantly than the low-temperature reaction unit 606. However, the high-temperature reaction unit 604 has a free end except for the coupling unit with the coupling unit 608, so that the stress produced with the coupling unit 608 or the like can be restricted. In particular, the coupling unit 608 is smaller in height and width than the high-temperature reaction unit 604 or the low-temperature reaction unit 606. Further, the coupling unit 608 connects to the high-temperature reaction unit 604 and the low-temperature reaction unit 606 at the center part in the widthwise direction of the high-temperature reaction unit 604 and the low-temperature reaction unit 606. As a result, the stress can be restricted from being generated on the coupling unit 608, the high-temperature reaction unit 604, and the low-temperature reaction unit 606.

Although the pipes 626, 268, 630, 632, and 634 and the liquid fuel intake pipe 622 extend to the outside of the heat insulation package 791, they are all connected to the low-temperature reaction unit 606. For this reason, direct heat conduction from the high-temperature reaction unit 604 to the outside of the heat insulation package 791 can be restricted, and a thermal loss of the heat-insulation reaction unit 604 can be restricted. Accordingly, even in the case where the high-temperature reaction unit 604 and the low-temperature reaction unit 606 are housed in one heat insulation package 791, a temperature difference can be produced between the high-temperature reaction unit 604 and the low-temperature reaction unit 606.

The bottom face of the coupling unit 608, the bottom face of the high-temperature reaction unit 604, and the bottom face of the low-temperature reaction unit 606 are in plane with one another. Therefore, the heating wire 722 can be patterned comparatively easily, and disconnection of the heating wire 722 can be restricted.

In addition, the liquid fuel intake pipe 622 is filled with the liquid absorption material 623, and the liquid fuel intake pipe 622 is provided as the vaporizer 610. Thus, a temperature state required for vaporization of a liquid mixture (a state in which an upper part of the liquid fuel intake pipe 622 is set at 120° C.) can be established while downsizing and simplification of the microreactor module 600 are promoted.

In addition, the combustor plate 624 is provided at the periphery of the liquid fuel intake pipe 622 at an upper end of the liquid fuel intake pipe 622, and further, the liquid absorption material 623 contained in the liquid fuel intake pipe 622 is filled up to the height position of the combustor plate 624. As a result, the combustion heat in the first combustor 612 can be efficiently used for vaporization of the liquid mixture.

The present invention is not limited to the above-described embodiments, and various modifications and design changes may occur without departing from the spirit of the invention.

For example, although one coupling unit 608 is bridged between the low-temperature reaction unit 606 and the high-temperature reaction unit 604, a plurality of coupling units may be bridged between these reaction units 604 and 606.

<Power Generator Unit>

Now, a description will be given with respect to a schematic configuration of a power generator unit comprising the microreactor module (reactor) in the above-described embodiments of the present invention.

Figure 70:
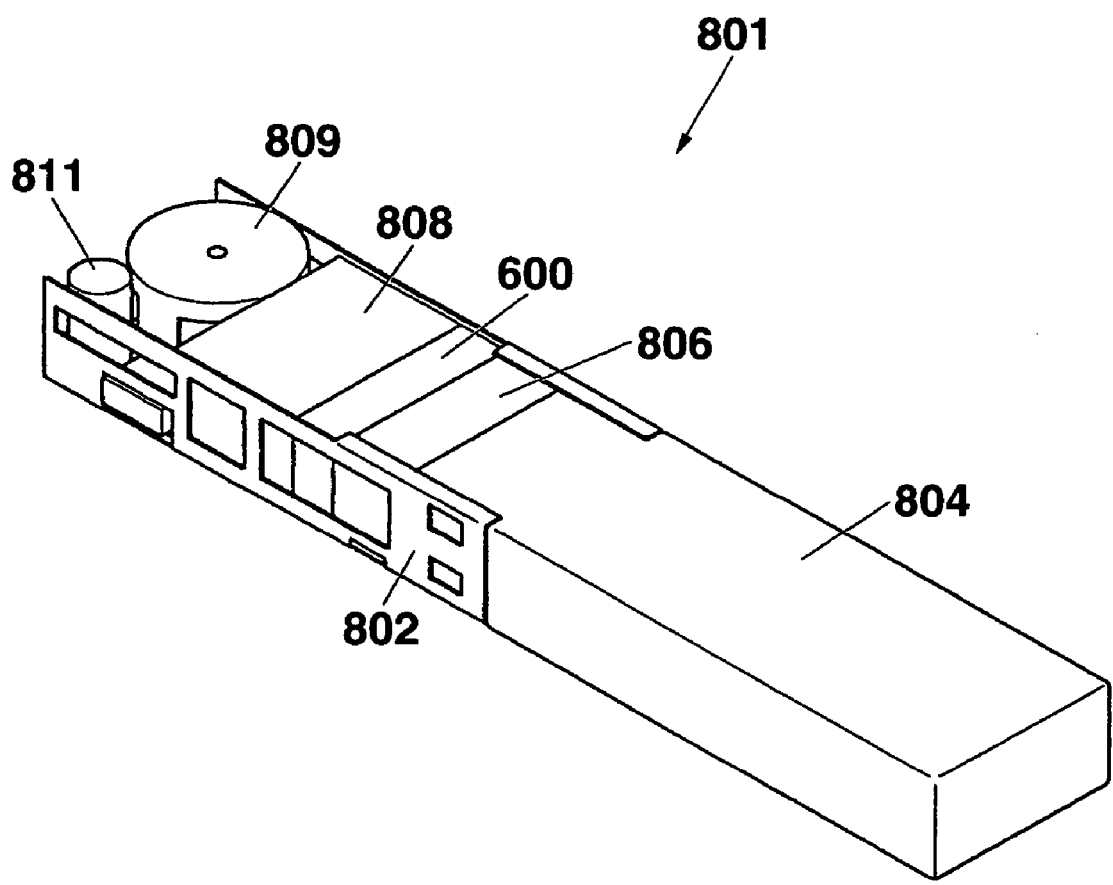
FIG. 70 is a perspective view showing an example of a power generator unit comprising a microreactor module in each of the embodiments of the invention.

FIG. 70 is a perspective view showing an example of the power generator unit comprising the microreactor module in the embodiments of the invention.

As shown in FIG. 70, the microreactor module 600 in the embodiments can be used while the module is assembled to a power generator unit 801. The power generator unit 801 comprises, for example, a frame 802, a fuel container 804, a flow rate control unit 806, a microreactor module 600 housed in a heat insulation package 791, a power generator module 808, an air pump 809, and a power supply unit 811. The fuel container 804 is removably mounted on the frame 802. The flow rate control unit 806 has a flow channel, a pump, a flow rate sensor, and a valve, etc. The power generator module 808 has, a fuel cell, a humidifier that humidifies the fuel cell, a recovery device that recovers a by-product produced by the fuel cell, and the like. The air pump 809 supplies air (oxygen) to the microreactor module 600 and the power generator module 808. The power supply unit 811 has a secondary battery, a DC-DC converter, an external interface for electrically connecting an external device driven by the power generator unit 801, and the like. A gas mixture of the water and liquid fuel contained in the fuel container 804 is supplied to the microreactor module 600, whereby a hydrogen rich gas is produced as described above. Then, the hydrogen rich gas is supplied to the fuel cell of the power generator module 808, and the produced electricity is accumulated in the secondary battery of the power supply unit 811.

Now, a description will be given with respect to an exemplary configuration of an electronic device that uses the above power generator unit 801 as a power supply.

Figure 71:
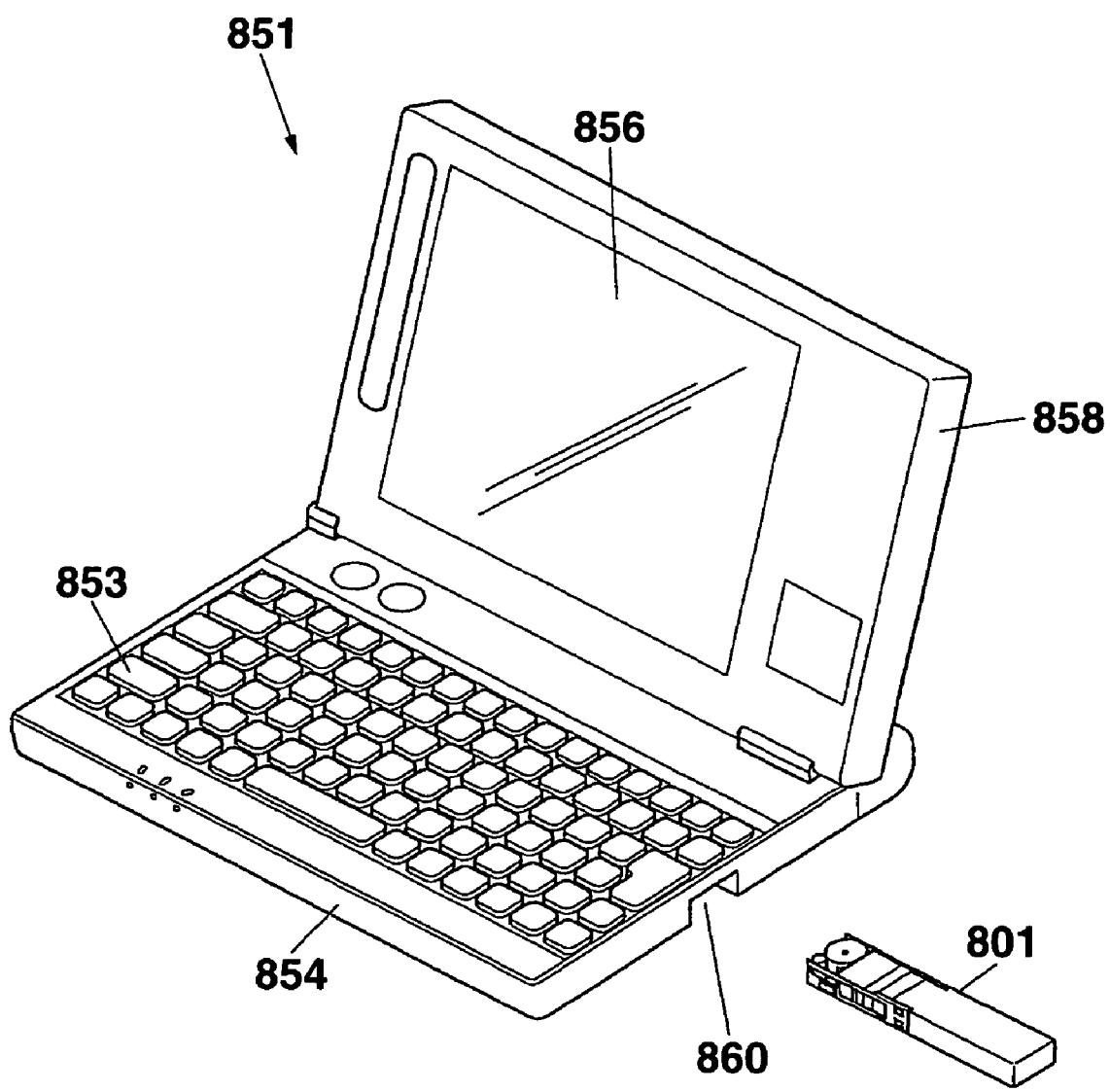
FIG. 71 is a perspective view showing an exemplary configuration of an electronic device using the power generator unit in the present embodiment as a power supply.

FIG. 71 is a perspective view showing an exemplary configuration of an electronic device using the power generator unit in the present embodiment as a power supply.

As shown in FIG. 71, the electronic device 851 is a portable electronic device, for example, a notebook personal computer. The electronic device 851 comprises a lower cabinet 854 and an upper cabinet 858. The lower cabinet 854 incorporates a computational processing circuit composed of a CPU, a RAM, a ROM, and other electronic components, and includes a keyboard 853. The upper cabinet 858 is equipped with a liquid crystal display 856. The lower cabinet 854 and the upper cabinet 858 are coupled with each other by a hinge. These cabinets are configured such that the upper cabinet 858 can be folded in a state that the upper cabinet is overlapped on the lower cabinet 854 and the liquid crystal display 856 faces the keyboard 853. A mount portion 860 for mounting the power generator unit 801 is formed from a left side face to a bottom face of the lower cabinet 854. When the power generator unit 801 is mounted on the mount portion 860, the electronic device 851 is operated by the electric power of the power generator unit 801.

What is claimed is:

1. A reactor, which is supplied with a reactant to cause a reaction of the reactant, the reactor comprising:
   a reaction device which comprises a hollow box member having a top plate and a bottom plate opposed to each other and side plates connected to an edge of the top plate and an edge of the bottom plate;
   a partition member housed in the box member, the partition member coming into contact with at least internal faces of the side plates of the box member and partitioning a space in the box member into a plurality of reaction chambers to which the reactant is to be supplied; and
   a penetrating region provided in the partition member to connect adjacent reaction chambers to each other, the penetrating region being adapted to have the reactant passed therethrough,
   wherein the partition member comprises a first partition plate and a plurality of second partition plates arranged perpendicularly with respect to the first partition plate and in parallel to each other; and
   wherein the second partition plates are combined with the first partition plate at slots formed in at least one of the first partition plate and the second partition plates.

2. A reactor according to claim 1, further comprising:
   a heat insulation vessel which covers an entirety of the reaction device, a gas pressure of an internal space of the heat insulation vessel being lower than an atmospheric pressure.

3. A reactor according to claim 1., wherein the first partition plate and each of the second partition plates are joined to each other by one of welding and brazing.

4. A reactor according to claim 1, wherein the first partition plate is arranged in parallel to the bottom plate.

5. A reactor according to claim 1, wherein rim parts of the first partition plate and the second partition plates come into contact with the internal faces of at least the side plates of the box member.

6. A reactor according to claim 1, wherein rim parts of the first partition plate and the second partition plates are joined to the internal faces of at least the side plates of the box member by one of welding and brazing.

7. A reactor according to claim 1, wherein a plurality of the penetrating regions are provided in the partition member, including a first communicating port, which connects reaction chambers that are adjacent to each other with the first partition plate therebetween, formed in the first partition plate, and a second communicating port, which connects reaction chambers that are adjacent to each other with one of the second partition plates therebetween, formed in each of the second partition plates therebetween, formed in each of the second partition plates.

8. A reactor according to claim 1, wherein a plurality of the penetrating regions are provided in the partition member, including a first cutout, which connects reaction chambers that are adjacent to each other with the first partition plate therebetween, formed at an end part of the first partition plate, and a second cutout, which connects reaction chambers that are adjacent to each other with one of the second partition plates therebetween, formed at an end part of each of the second partition plates.

9. A reactor, which is supplied with a reactant to cause a reaction of the reactant, the reactor comprising:
   a reaction device which comprises a hollow box member having a top plate and a bottom plate opposed to each other and side plates connected to an edge of the top plate and an edge of the bottom plate;
   a partition member housed in the box member, the partition member coming into contact with at least internal faces of the side plates of the box member and partitioning a space in the box member into a plurality of reaction chambers to which the reactant is to be supplied; and
   a penetrating region provided in the partition member to connect adjacent reaction chambers to each other, the penetrating region being adapted to have the reactant passed therethrough,
   wherein the partition member comprises at least one partition plate whose cross section is bent in a rectangular wave shape, the partition plate comprising: a plurality of partition portions, a plurality of return portions provided between opposed pairs of the partition portions, respectively, and reinforce portions arranged at respective ends of the partition plate to face the partition portions at the ends of the plate.

10. A reactor according to claim 9, wherein a plurality of the penetrating regions are provided in the partition member, including a through-hole, which connects reaction chambers that are adjacent to each other with one of the partition portions therebetween, formed in one of a first end side and a second end side of each of the partition portions of the partition plate along a wave height direction of the rectangular wave.

11. A reactor according to claim 9, wherein the partition plate is housed in the box member such that a wave height direction of the rectangular wave is parallel to the top plate of the box member.

12. A reactor according to claim 9, wherein the reinforce portions of the partition plate are joined to the internal faces of the side plates of the box member by one of welding and brazing.

13. A reactor according to claim 9, wherein the return portions of the partition plate come into facial contact with the internal faces of the side plates of the box member.

14. A reactor according to claim 13, wherein the return portions of the partition plate are joined to the internal faces of the side plates of the box member by one of welding and brazing.

15. A reactor according to claim 9, wherein a rim part of the partition plate comes into contact with the internal face of at least one of the top plate and the bottom plate of the box member.

16. A reactor according to claim 15, wherein the rim part of the partition plate is joined to the internal face of at least one of the top plate and the bottom plate of the box member by one of welding and brazing.

17. A reactor according to claim 9, wherein the partition member comprises:
  a plurality of the partition plates laminated along a wave height direction of the rectangular wave, each of which has the same configuration; and
  a bulkhead plate arranged between adjacent partition plates.

18. A reactor according to claim 17, wherein the penetrating region comprises a through-hole, which connects reaction chambers that are adjacent to each other with the bulkhead plate therebetween, formed in the bulkhead plate.

19. A reactor according to claim 17, wherein a rim part of the bulkhead plate comes into contact with the internal faces of the side plates of the box member.

20. A reactor according to claim 19, wherein the rim part of the bulkhead plate is joined to the internal faces of the side plates of the box member by one of welding and brazing.

21. A reactor according to claim 9, wherein the partition member further comprises a separating plate arranged in parallel to a wave height direction of the rectangular wave of the partition plate, the separating plate separating regions defined by the partition plate.

22. A reactor according to claim 21, wherein the partition plate and the separating plate are joined to each other by one of welding and brazing.

23. A reactor according to claim 21, wherein the separating plate is arranged in parallel to the bottom plate of the box member.

24. A reactor according to claim 21, wherein a first slot extending along the wave height direction of the rectangular wave is formed at each of the return portions and the partition portions of the partition plate, and the separating plate is inserted into the first slots.

25. A reactor according to claim 24, wherein the first slot formed in the partition plate is formed at a central position of the partition plate in a direction perpendicular to the wave height direction of the rectangular wave.

26. A reactor according to claim 24, wherein second slots corresponding respectively to the partition portions of the partition plate are formed in the separating plate, and part of each of the partition portions is inserted into the corresponding second slot.

27. A reactor according to claim 21, wherein a rim part of the separating plate comes into contact with the internal faces of the side plates of the box member.

28. A reactor according to claim 27, wherein the rim part of the separating plate is joined to the internal faces of the side plates of the box member by one of welding and brazing.

29. A reactor according to claim 21, wherein the penetrating region comprises a through-hole, which connects reaction chambers that are adjacent to each other with the separating plate therebetween, formed in the separating plate.

30. A reactor, which is supplied with a reactant to cause a reaction of the reactant, the reactor comprising:
  a reaction device which comprises a hollow box member having a top plate and a bottom plate opposed to each other and side plates connected to an edge of the top plate and an edge of the bottom plate;
  a partition member housed in the box member, the partition member coming into contact with at least internal faces of the side plates of the box member and partitioning a space in the box member into a plurality of reaction chambers to which the reactant is to be supplied; and
  a penetrating region provided in the partition member to connect adjacent reaction chambers to each other, the penetrating region being adapted to have the reactant passed therethrough,
  wherein the partition member comprises a partition plate having a triangular wave zigzag shape in cross section, the partition plate comprising a plurality of rectangular-plate-shaped bulkhead portions coupled at ridges of the triangular wave.

31. A reactor according to claim 30, wherein the partition plate is housed in the box member such that the ridges of the triangular wave come into contact with the internal face of at least one of the top plate and the bottom plate of the box member.

32. A reactor according to claim 30, wherein a plurality of the penetrating regions are provided in the partition member, including a through-hole, which connects reaction chambers that are adjacent to each other with one of the bulkhead portions therebetween, formed in each of the bulkhead portions of the partition plate.

33. A reactor according to claim 30, wherein the partition member comprises:
  a plurality of the partition plates laminated along a wave height direction of the triangular wave, each of which has the same configuration; and
  a bulkhead plate arranged between adjacent partition plates.

34. A reactor according to claim 33, wherein the penetrating region comprises a through-hole, which connects reaction chambers that are adjacent to each other with the bulkhead plate therebetween, formed in the bulkhead plate.

35. A reactor according to claim 33, wherein a rim part of the bulkhead plate comes into contact with the internal faces of the side plates of the box member.

36. A reactor according to claim 35, wherein a rim part of the bulkhead plate is joined to the internal faces of the side plates of the box member by one of welding and brazing.

37. A reactor module comprising:
  a first reaction unit set at a first temperature to cause reaction of a reactant;
  a second reaction unit set at a second temperature that is lower than the first temperature to cause reaction of a reactant; and
  a coupling unit which exchanges a reactant and a product between the first reaction unit and the second reaction unit,
  wherein at least one of the first reaction unit and the second reaction unit comprises the reactor of claim 1.

38. A reactor according to claim 37, wherein:
  the first reaction unit is supplied with a first reactant and generates a first product,
  the second reaction unit is supplied with the first product and generates a second product,
  the first reactant is a gas mixture of a vaporized water and a fuel whose composition contains a hydrogen atom,
  the first reaction unit is a reformer which causes a reforming reaction of the first reactant,
  hydrogen and carbon monoxide are contained in the first product, and
  the second reaction unit is a carbon monoxide removing unit which removes carbon monoxide contained in the first product by selective oxidization.

39. A reactor according to claim 37, further comprising:
  a heat insulation vessel which covers an entirety of the first reaction unit, the second reaction unit, and the coupling unit, a gas pressure of an internal space of the heat insulation vessel being lower than an atmospheric pressure.

* * * * *